(12) United States Patent
Sun et al.

(10) Patent No.: US 10,265,903 B2
(45) Date of Patent: Apr. 23, 2019

(54) CONTAINER AND PROCESS FOR MAKING THE SAME

(71) Applicant: Berry Plastics Corporation, Evansville, IN (US)

(72) Inventors: David Dezhou Sun, Evansville, IN (US); Philip A Driskill, Newburgh, IN (US); Jeffrey C Minnette, Evansville, IN (US); Birju A Surti, Ronks, PA (US); Jonathan K Williams, Lancaster, PA (US); Tony Cain, Spottsville, KY (US); Diane E Marret, Newburgh, IN (US); Jared B Waterman, Evansville, IN (US); Dan L Mackey, Henderson, KY (US); Debra R Wilson, Houston, TX (US); Timothy S Ponrathnam, Evansville, IN (US); David C Arnold, Evansville, IN (US); Michael J Grimm, Evansville, IN (US); Krystal D Springer, Evansville, IN (US)

(73) Assignee: Berry Plastics Corporation, Evansville, IN (US)

( * ) Notice: Subject to any disclaimer, the term of this patent is extended or adjusted under 35 U.S.C. 154(b) by 238 days.

(21) Appl. No.: 15/061,070

(22) Filed: Mar. 4, 2016

(65) Prior Publication Data

US 2016/0257052 A1    Sep. 8, 2016

Related U.S. Application Data

(60) Provisional application No. 62/128,195, filed on Mar. 4, 2015, provisional application No. 62/279,177, filed on Jan. 15, 2016.

(51) Int. Cl.
*B29C 49/00* (2006.01)
*B29C 49/04* (2006.01)
(Continued)

(52) U.S. Cl.
CPC .......... *B29C 49/0073* (2013.01); *B29B 11/14* (2013.01); *B29C 47/0054* (2013.01);
(Continued)

(58) Field of Classification Search
None
See application file for complete search history.

(56) References Cited

U.S. PATENT DOCUMENTS 3,221,954 A    12/1965    Lux
3,290,198 A    12/1966    Lux
(Continued)

FOREIGN PATENT DOCUMENTS

CN    1484602    3/2004
CN    1984763    6/2007
(Continued)

OTHER PUBLICATIONS

Office Action dated Jun. 15, 2016 for U.S. Appl. No. 14/787,901.
(Continued)

*Primary Examiner* — Monica A Huson
(74) *Attorney, Agent, or Firm* — Barnes & Thornburg LLP

(57) ABSTRACT

A vessel is configured to hold a product in an interior region formed in the vessel. The vessel includes an inner layer arranged to define the interior region and an outer layer. The vessel is formed using a blow-molding process in which a multiple layer parison is blow molded to form the vessel. The multiple layer parison is formed in an extrusion process in which a number of extruders are arranged to co-extrude the multi-layer parison.

33 Claims, 31 Drawing Sheets

(51) Int. Cl.

| | |
|---|---|
| *B29C 49/22* | (2006.01) |
| *B65D 81/38* | (2006.01) |
| *C08J 9/06* | (2006.01) |
| *C08J 9/12* | (2006.01) |
| *B29B 11/14* | (2006.01) |
| *B29C 47/06* | (2006.01) |
| *B32B 5/20* | (2006.01) |
| *B32B 1/02* | (2006.01) |
| *B32B 1/00* | (2006.01) |
| *B65D 1/02* | (2006.01) |
| *B65D 1/12* | (2006.01) |
| *B29C 47/00* | (2006.01) |
| *B32B 7/02* | (2019.01) |
| *B32B 27/08* | (2006.01) |
| *B32B 27/30* | (2006.01) |
| *B32B 27/32* | (2006.01) |
| *B29K 23/00* | (2006.01) |
| *B29L 31/00* | (2006.01) |
| *B29B 11/10* | (2006.01) |
| *B29K 105/00* | (2006.01) |
| *B29K 105/12* | (2006.01) |
| *B29K 223/00* | (2006.01) |
| *B29L 23/00* | (2006.01) |
| *B29C 47/56* | (2006.01) |
| *B29K 105/04* | (2006.01) |
| *B29C 49/48* | (2006.01) |
| *B29C 49/62* | (2006.01) |
| *B29L 9/00* | (2006.01) |

(52) U.S. Cl.
CPC .......... *B29C 47/065* (2013.01); *B29C 47/068* (2013.01); *B29C 49/04* (2013.01); *B29C 49/22* (2013.01); *B32B 1/00* (2013.01); *B32B 1/02* (2013.01); *B32B 5/20* (2013.01); *B32B 7/02* (2013.01); *B32B 27/08* (2013.01); *B32B 27/306* (2013.01); *B32B 27/32* (2013.01); *B65D 1/0215* (2013.01); *B65D 1/12* (2013.01); *B65D 81/38* (2013.01); *B65D 81/3846* (2013.01); *C08J 9/06* (2013.01); *C08J 9/122* (2013.01); *B29B 11/10* (2013.01); *B29B 2911/14053* (2013.01); *B29B 2911/14066* (2013.01); *B29B 2911/14093* (2013.01); *B29B 2911/14173* (2013.01); *B29C 47/005* (2013.01); *B29C 47/0023* (2013.01); *B29C 47/56* (2013.01); *B29C 49/48* (2013.01); *B29C 2049/627* (2013.01); *B29K 2023/065* (2013.01); *B29K 2023/0633* (2013.01); *B29K 2105/0005* (2013.01); *B29K 2105/0058* (2013.01); *B29K 2105/04* (2013.01); *B29K 2105/12* (2013.01); *B29K 2223/00* (2013.01); *B29K 2995/0063* (2013.01); *B29L 2009/001* (2013.01); *B29L 2023/00* (2013.01); *B29L 2031/712* (2013.01); *B29L 2031/7158* (2013.01); *B32B 2250/242* (2013.01); *B32B 2250/246* (2013.01); *B32B 2262/0253* (2013.01); *B32B 2262/14* (2013.01); *B32B 2270/00* (2013.01); *B32B 2307/4026* (2013.01); *B32B 2307/71* (2013.01); *B32B 2307/72* (2013.01); *B32B 2307/7242* (2013.01); *B32B 2439/60* (2013.01); *B32B 2439/70* (2013.01); *C08J 2323/06* (2013.01); *C08J 2323/08* (2013.01); *C08J 2423/06* (2013.01)

(56) References Cited

U.S. PATENT DOCUMENTS

| | | |
|---|---|---|
| 3,892,828 A | 7/1975 | Weatherly |
| 3,981,412 A | 9/1976 | Asmus |
| 4,047,868 A | 9/1977 | Kudo |
| 4,206,166 A | 6/1980 | Hayashi |
| 4,220,730 A | 9/1980 | Coyne |
| 4,264,672 A | 4/1981 | Taylor-Brown |
| 4,435,344 A | 3/1984 | Iioka |
| 4,468,435 A | 8/1984 | Shimba et al. |
| 4,479,989 A | 10/1984 | Mahal |
| 4,867,664 A | 9/1989 | Fukuhara |
| 4,990,382 A | 2/1991 | Weissenstein |
| 5,037,285 A | 8/1991 | Kudert |
| 5,055,022 A | 10/1991 | Hirschberger |
| 5,328,651 A | 7/1994 | Gallagher |
| 5,332,121 A | 7/1994 | Schmidt |
| 5,405,667 A | 4/1995 | Heider |
| 5,574,074 A | 11/1996 | Zushi |
| 5,575,965 A | 11/1996 | Caronia |
| 5,598,940 A | 2/1997 | Finkelstein |
| 5,601,200 A | 2/1997 | Finkelstein |
| 5,628,453 A | 5/1997 | MacLaughlin |
| 5,688,572 A | 11/1997 | Slat |
| 5,857,572 A | 1/1999 | Bird |
| 5,916,926 A | 6/1999 | Cooper |
| 5,927,525 A | 7/1999 | Darr |
| 5,952,423 A | 9/1999 | Shang |
| 6,053,214 A | 4/2000 | Sjoberg et al. |
| 6,221,925 B1 | 4/2001 | Constant |
| 6,284,810 B1 | 9/2001 | Burnham |
| 6,323,251 B1 | 11/2001 | Perez |
| 6,432,525 B1 | 8/2002 | Gokuraku |
| 6,444,149 B1 | 9/2002 | Valentinsson |
| 6,593,384 B2 | 7/2003 | Anderson |
| 6,616,434 B1 | 9/2003 | Burnham |
| 6,706,223 B1 | 3/2004 | Anderson |
| 6,811,843 B2 | 11/2004 | DeBraal |
| 6,875,484 B1 | 4/2005 | Kogure |
| 6,921,571 B2 | 7/2005 | Funakoshi |
| 6,986,922 B2 | 1/2006 | Hesse |
| 7,014,801 B2 | 3/2006 | Imanari |
| 7,169,338 B2 | 1/2007 | Imanari |
| 7,183,005 B2 | 2/2007 | Poloso |
| 7,462,307 B2 | 12/2008 | Hesse |
| 7,588,808 B2 | 9/2009 | Hutchinson |
| 7,588,810 B2 | 9/2009 | Semersky |
| 7,704,440 B2 | 4/2010 | Brandner |
| 7,759,267 B2 | 7/2010 | Conover |
| 7,871,558 B2 | 1/2011 | Merical |
| 7,973,100 B2 | 7/2011 | Wada |
| 8,061,540 B2 | 11/2011 | Toyoda |
| 8,061,541 B2 | 11/2011 | Trumpp |
| 8,124,203 B2 | 2/2012 | Semersky |
| 8,137,600 B2 | 3/2012 | Pierick |
| 8,263,198 B2 | 9/2012 | Carvell |
| 8,342,420 B2 | 1/2013 | Roberts, Jr. |
| 8,397,932 B2 | 3/2013 | Ichikawa |
| 8,414,823 B2 | 4/2013 | Rudiger |
| 8,435,615 B2 | 5/2013 | Tsuchida |
| 8,535,598 B2 | 9/2013 | Imanari |
| 9,447,248 B2 | 9/2016 | Sun |
| 9,937,652 B2 | 4/2018 | Sun |
| 2002/0006975 A1 | 1/2002 | Welsh |
| 2002/0172739 A1 | 11/2002 | Anderson |
| 2003/0065097 A1 | 4/2003 | DeGroot |
| 2003/0127765 A1 | 7/2003 | Weiland |
| 2003/0211350 A1 | 11/2003 | Migliorini |
| 2004/0013830 A1 | 1/2004 | Nonomura |
| 2004/0062885 A1 | 4/2004 | Imanari |
| 2004/0086703 A1 | 5/2004 | Semersky |
| 2004/0147625 A1 | 7/2004 | Dostal |
| 2005/0009973 A1 | 1/2005 | Lee |
| 2006/0091576 A1 | 5/2006 | Takase |
| 2006/0142495 A1 | 6/2006 | Lalho |
| 2006/0205833 A1 | 9/2006 | Martinez |
| 2008/0114131 A1 | 5/2008 | Harris |

(56) References Cited

U.S. PATENT DOCUMENTS

| | | | |
|---|---|---|---|
| 2008/0125547 A1 | 5/2008 | Swogger |
| 2008/0246193 A1 | 10/2008 | Smits |
| 2008/0261016 A1 | 10/2008 | Tamada |
| 2009/0269566 A1 | 10/2009 | Eichbauer |
| 2010/0196641 A1 | 8/2010 | DeVos |
| 2010/0215879 A1 | 8/2010 | Dooley |
| 2010/0227092 A1 | 9/2010 | Semersky |
| 2010/0279046 A1 | 11/2010 | Ashman |
| 2010/0282759 A1 | 11/2010 | Eckhardt |
| 2011/0129656 A1 | 6/2011 | Zur |
| 2011/0172363 A1 | 7/2011 | Share |
| 2011/0180509 A1 | 7/2011 | Hutchinson |
| 2011/0250384 A1 | 10/2011 | Sumi |
| 2012/0024459 A1 | 2/2012 | Igarashi |
| 2012/0061886 A1 | 3/2012 | Sumi |
| 2012/0076965 A1 | 3/2012 | Silvers |
| 2012/0103858 A1 | 5/2012 | Schmidt |
| 2012/0318805 A1 | 12/2012 | Leser |
| 2012/0318859 A1 | 12/2012 | Leser |
| 2013/0052385 A1 | 2/2013 | Leser |
| 2013/0059102 A1 | 3/2013 | Torchio |
| 2013/0085244 A1 | 4/2013 | Zhao |
| 2013/0143975 A1 | 6/2013 | Cassidy |
| 2014/0037880 A1 | 2/2014 | Siddhamalli |
| 2014/0228498 A1 | 8/2014 | Prince |
| 2014/0309320 A1 | 10/2014 | Prince |
| 2015/0014879 A1 | 1/2015 | Sun |
| 2015/0061194 A1 | 3/2015 | Sun |
| 2015/0284521 A1 | 10/2015 | Abubakar |
| 2016/0089852 A1 | 3/2016 | Lindenfelzer |
| 2016/0355659 A1 | 12/2016 | Sun |

FOREIGN PATENT DOCUMENTS

| | | | |
|---|---|---|---|
| CN | 102313084 | | 1/2012 |
| CN | 102762350 | | 10/2012 |
| CN | 102892678 | A | 1/2013 |
| EP | 1057608 | | 4/2002 |
| EP | 1472087 | | 4/2006 |
| EP | 1741744 | | 1/2007 |
| EP | 0851805 | | 12/2008 |
| EP | 1040158 | | 4/2012 |
| EP | 1749635 | | 9/2012 |
| EP | 2323829 | | 10/2012 |
| EP | 2141000 | | 2/2014 |
| JP | 4278340 | | 10/1992 |
| JP | 04278340 | | 10/1992 |
| JP | 404278340 | A | 10/1992 |
| JP | 410000748 | A | 1/1998 |
| JP | 2001139717 | A | 5/1999 |
| JP | 2001138378 | A | 5/2001 |
| JP | 2004137377 | | 5/2004 |
| JP | 2004137377 | A | 5/2004 |
| JP | 2005290329 | A | 10/2005 |
| JP | 2008213491 | A | 9/2008 |
| JP | 2012526006 | | 10/2012 |
| JP | 2013203886 | | 10/2013 |
| WO | 2003066320 | | 8/2003 |
| WO | 2010015673 | | 2/2010 |
| WO | 2012174567 | | 12/2012 |
| WO | 2012174567 | A2 | 12/2012 |
| WO | 2012174568 | | 12/2012 |
| WO | 2013032552 | | 3/2013 |
| WO | 2012174567 | A3 | 4/2013 |
| WO | 2014099335 | | 6/2014 |
| WO | 2015024018 | | 2/2015 |

OTHER PUBLICATIONS

Advisory Action dated Jun. 1, 2017 for U.S. Appl. No. 15/239,894; (pp. 1-6).
Chinese Office Action for Application Serial No. 201480021009.9, dated Aug. 7, 2017 including English language summary, 12 pages.
Chinese Office Action for Chinese App. No. 201480047976.2, 15 pages.
Dongwu Yang, Plastic Material Selection Technology, Light Industry Press, Jan. 2008, 1 page.
Australian First Patent Examination Report for Australian App. No. 2014311991 dated Oct. 4, 2017, 4 pages.
Office Action dated Oct. 3, 2017 for U.S. Appl. No. 15/491,443; (pp. 1-6).
Office Action dated Oct. 6, 2017 for U.S. Appl. No. 15/383,115; (pp. 1-5).
Office Action dated Oct. 27, 2017 for U.S. Appl. No. 15/239,894; (pp. 1-7).
Chinese Office Action for Chinese App. No. 201480047578.0 dated Jan. 24, 2018, 10 pages.
International Search Report and Written Opinion dated Jan. 21, 2015, relating to International Application No. PCT/US2014/053665.
International Search Report and Written Opinion dated Jan. 27, 2015, relating to International Application No. PCT/US2014/53667.
International Search Report and Written Opinion dated Jul. 18, 2014, relating to International Application No. PCT/US2014/027551.
International Search Report dated Nov. 2, 2014, relating to International Application No. PCT/US2014/53666.
International Search Report dated Nov. 24, 2014, relating to International Application No. PCT/US2014/52606.
International Search Report dated Nov. 7, 2014, relating to International Application No. PCT/US2014/046518.
Office Action dated May 11, 2015 for U.S. Appl. No. 14/331,066.
International Search Report and Written Opinion related to International Application No. PCT/US2014/053666 dated Oct. 29, 2014.
Cheng et al., "Improving processability of polyethylenes by radiation-induced long chain branching," Radiation Physics and Chemistry 79 (2009) 563-566.
International Preliminary Report on Patentability dated Mar. 1, 2016, relating to International Application No. PCT/US2014/053666.
International Preliminary Report on Patentability dated Mar. 1, 2016, relating to International Application No. PCT/US2014/053665.
International Preliminary Report on Patentability, dated Mar. 1, 2016, relating to International Application No. PCT/US2014/052606.
International Preliminary Report on Patentability, dated Mar. 1, 2016, relating to International Application No. PCT/US2014/053667.
English summary of Russian Office Action for Russian Patent Application Serial No. 2016104363, dated Jul. 5, 2016, 3 pages.
Chinese Office Action for Application Serial No. 201480021009.9, dated Jul. 5, 2016 including English language summary, 17 pages.
European Search Report for European Application No. 14768125.8, 8 pages.
English Translation of JP404278340A, 23 pages.
Office Action dated Aug. 15, 2016 for U.S. Appl. No. 14/468,789.
Office Action dated Aug. 12, 2016 for U.S. Appl. No. 14/475,096.
Extended European Search Report for European App. No. 14840353.8 dated Mar. 17, 2017, 6 pages.
Extended European Search Report for European App. No. 14838960.4 dated Mar. 17, 2017, 9 pages.
Extended European Search Report for European App. No. 14840262 dated Mar. 23, 2017, 8 pages.
New Zealand Examination Report for New Zealand Patent App. No. 712687 dated Mar. 30, 2017, 10 pages.
Office Action dated Apr. 21, 2017 for U.S. Appl. No. 14/475,411.
Taiwan Search Report for Taiwan Application No. 103109790 completed Apr. 20, 2017, 9 pages.
Extended European Search Report for European App. No. 14840734.9 dated Apr. 4, 2017, 10 pages.
Australian Examination Report for Australian App. No. 2014286957 dated May 2, 2017, 3 pages.
Office Action dated May 1, 2017 for U.S. Appl. No. 14/211,533.
Office Action dated Jul. 10, 2017 for U.S. Appl. No. 15/239,894; (pp. 1-10).

(56) References Cited

OTHER PUBLICATIONS

Office Action dated Jul. 19, 2017 for U.S. Appl. No. 15/059,995; (pp. 1-10).
Chinese Office Action for Chinese App. No. 201480047578.0 dated Jul. 4, 2017, 5 pages.
Unilever Launches Breakthrough Packaging Technology That Uses 15% Less Plastic, Unilever (Apr. 24, 2014), http://www.unilever.com/mediacentre/pressreleases/2014/Unileverlaunchesbreakthroughpackagingtechnologythatuses15lessplastic.aspx (2 pages).
Unilever Says It Will Use Less Plastic Per Bottle, Yahoo News (Apr. 22, 2014, 10:20 AM), http://news.yahoo.com/unilever-says-less-plastic-per-bottle-142039401-finance.html (3 pages).
U.S. Office Action dated Sep. 15, 2016 for U.S. Appl. No. 15/239,894; 8 pages.
Australian Patent Examination Report for Australian App. No. 2014239318 dated Nov. 25, 2016, 4 pages.
Chinese Office Action for Chinese App. No. 201480047976.2, 11 pages.
Typical Engineering Properties of Polypropylene information sheet, Ineos Olefins and Polymers USA, archived at https://web.archive.org/web/20160501000000*/http://www.ineos.com/globalassets/ineos-group/businesses/ineos-olefins-and-polymers-usa/products/technical-information-patents/ineos-engineering-properties-of-pp.pdf, Mar. 2016, p. 1.
Office Action dated Dec. 14, 2016 for U.S. Appl. No. 14/211,553.
Chinese Office Action for Chinese App. No. 201480047578.0 dated Nov. 30, 2016, 10 pages.
International Search Report and Written Opinion, International Application No. PCT/US2016/020844, search completed Apr. 14, 2016.
International Search Report and Written Opinion, International Application No. PCT/US2016/020674, search completed Apr. 18, 2016.
Office Action dated Mar. 14, 2017 for U.S. Appl. No. 14/475,266.
Office Action dated Mar. 21, 2017 for U.S. Appl. No. 14/475,411.
Chinese Office Action for Application Serial No. 201480021009.9, dated Jan. 2, 2018 including English language summary, 6 pages.
Office Action dated Jan. 17, 2018 for U.S. Appl. No. 15/591,355; (pp. 1-5).
Chinese Office Action for Chinese App. No. 20180042446.9 dated Oct. 31, 2018, 5 pages.
Definition of "Base," Dictionary.com, available at http://www.dictionary.com/browse/base, retrieved on Apr. 16, 2018.
Office Action dated Apr. 20, 2018 for U.S. Appl. No. 15/239,894, (pp. 1-13).
Office Action dated Apr. 27, 2018 for U.S. Appl. No. 15/061,005 (pp. 1-7).
Office Action dated Jun. 15, 2018 for U.S. Appl. No. 15/491,443, pp. 1-6.
Chinese Office Action for Chinese App. No. 201480047578.0 dated Aug. 29, 2018, 4 pages.
Chinese Office Action for Chinese App. No. 20180042446.9 dated Feb. 3, 2018, 9 pages.
Chinese Office Action for Chinese App. No. 20180039581.8 dated Feb. 23, 2018, 13 pages.
Chinese Office Action for Chinese App. No. 201480047978.1, 11 pages.
Chinese Final Rejection for Chinese App. No. 201480047976.2, 8 pages.
Vasile et al., Practical Guide to Polyethylene, published by Smithers Rapra Press, 2008, p. 119, 3 pages.
Lubrizol Advanced Materials, Inc., Extrusion Guide, 2014, 16 pages.
Chinese Office Action for Application Serial No. 201480021009.9, dated Apr. 20, 2018 including English language summary, 6 pages.
Office Action dated Sep. 7, 2018 for U.S. Appl. No. 15/239,894, (pp. 1-9).

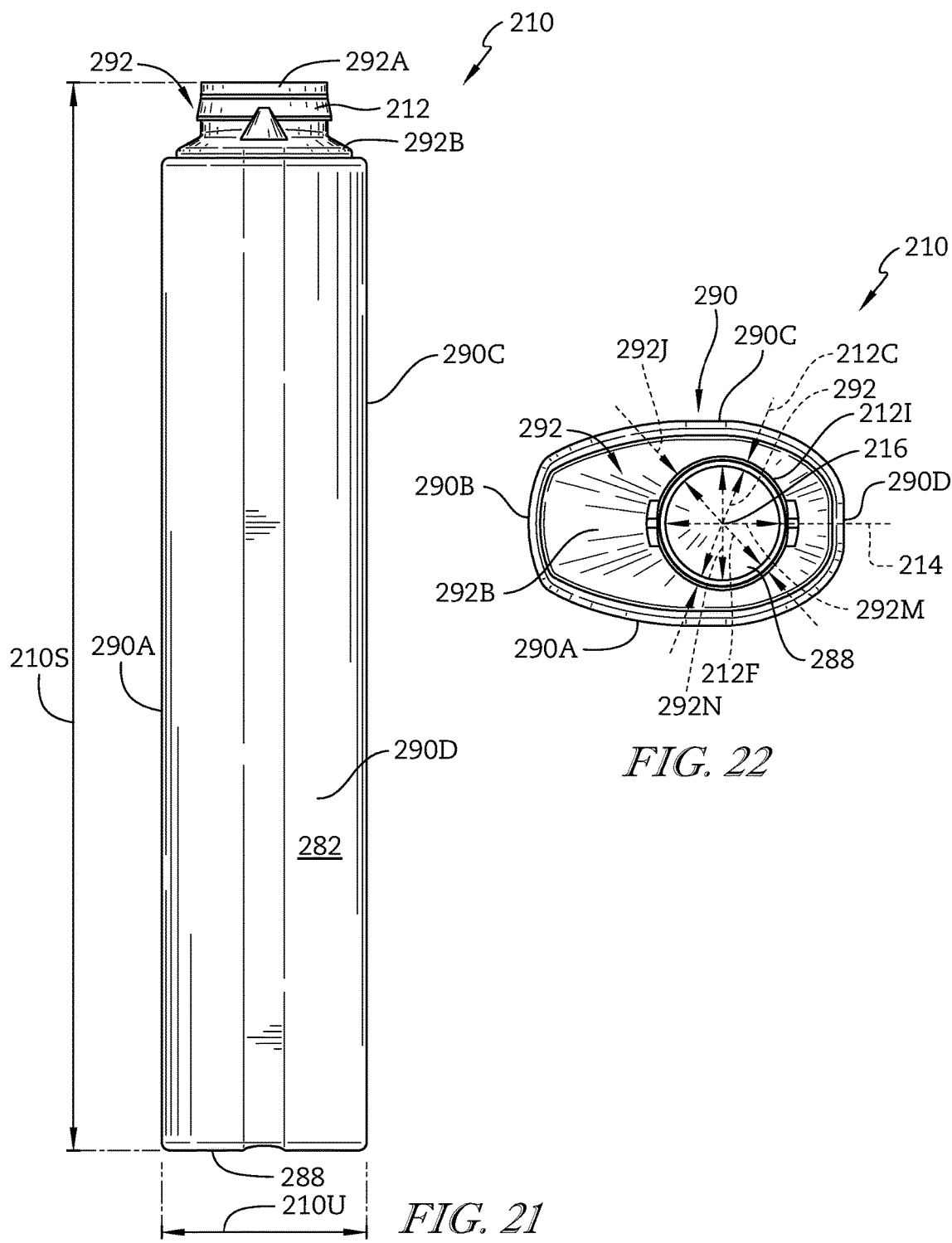

CONTAINER AND PROCESS FOR MAKING THE SAME

PRIORITY CLAIM

This application claims priority under 35 U.S.C. § 119(e) to U.S. Provisional Application No. 62/128,195, filed Mar. 4, 2015, and Provisional Application No. 62/279,177, filed Jan. 15, 2016, each of which are expressly incorporated by reference herein.

BACKGROUND

The present disclosure relates to containers, and in particular to containers made from polymeric materials. More particularly, the present disclosure relates containers made using a blow-molding process.

SUMMARY

According to the present disclosure, a container is formed to include an interior region adapted to store products therein. The container is made using a container-molding process in which a tube of polymeric materials is extruded and then blow molded.

In illustrative embodiments, a container-molding process is used to establish a multi-layer container from a multi-layer tube. The container-molding process includes an extruding operation, a blow-molding operation, and a trimming operation. During the extruding operation, a co-extrusion system co-extrudes a multi-layer tube that comprises an inner layer, an outer layer spaced apart from the inner layer, and a core layer located therebetween. In some embodiments, the tube does not have an inner layer. The core layer is made from relatively low-density insulative cellular non-aromatic polymeric materials. During the blow-molding operation, the multi-layer tube is located in a mold and pressurized gas is pumped into a space formed in the multi-layer tube to cause the multi-layer tube to expand and take on a shape of the mold so that a vessel is established. During the trimming operation, excess materials are removed from the vessel to establish the multi-layer container.

In illustrative embodiments, the multi-layer container includes an inner layer, an outer layer spaced apart from the inner layer, and a compressed core layer located therebetween. In some embodiments, the container does not have an inner layer. The compressed core layer is made from relatively low-density insulative cellular non-aromatic polymeric material, which has been compressed during the blow-molding operation. As a result, the multi-layer container has a relatively low density while stack strength, rigidity, and top load performance are maximized. The low density of the multi-layer container also minimizes an amount of polymeric material used to form the multi-layer container.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a diagrammatic and perspective view of a container-molding process in accordance with the present disclosure showing that the container-molding process includes an extruding operation in which a multi-layer tube is extruded from a co-extrusion system, a closing operation in which a mold is closed around the multi-layer tube, an inserting operation in which a blow needle is inserted into a tube space formed in the multi-layer tube while vacuum is applied to the mold, a pumping operation in which pressurized gas is pumped into a tube space, an expanding operation in which the pressurized gas expands the multi-layer tube against an inner surface of the mold, an opening operation in which the mold is opened and a vessel is released, and a trimming operation in which excess material is trimmed from the vessel to establish a multi-layer container in accordance with the present disclosure as suggested in FIG. 13;

FIG. 2 is a diagrammatic view of the container-molding process of FIG. 1 showing that the container-molding process includes a series of operations which produce the multi-layer tube and form the multi-layer container;

FIG. 3 is a perspective and diagrammatic view of the co-extrusion system used to make the multi-layer tube showing that the co-extrusion system includes an outer-layer extruder configured to receive an outer-layer formulation and provide an outer-layer parison, an inner-layer extruder configured to receive an inner-layer formulation and provide an inner-layer parison, a core-layer extruder configured to receive a core-layer formulation and provide a core-layer parison, and a co-extrusion die coupled to each of the extruders to receive the associated parisons and configured to extrude the inner-layer, core-layer, and outer-layer parisons to establish the multi-layer tube;

FIG. 4 is a partial perspective view taken from below the co-extrusion die of the co-extrusion system showing that the co-extrusion die includes an annular aperture configured to extrude the multi-layer tube;

FIG. 5 is a view similar to FIG. 4 after co-extrusion of the multi-layer tube has begun with portions of the multi-layer tube broken away to reveal that the inner layer is spaced apart from the outer layer and that the core layer is located therebetween and that the multi-layer tube has a first profile shape in which a top portion, middle portion, and lower portion of the profile all have about the same width;

Figure 13:
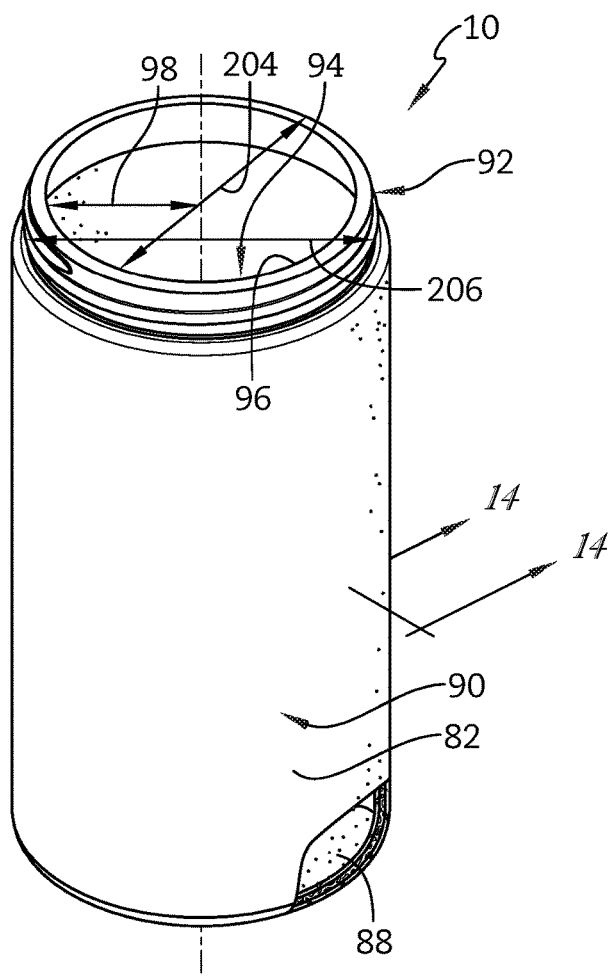
FIG. 13 is a perspective view of the multi-layer container formed from the container-molding process of FIGS. 1 and 2 after the trimming operation has completed.
Figure 14:
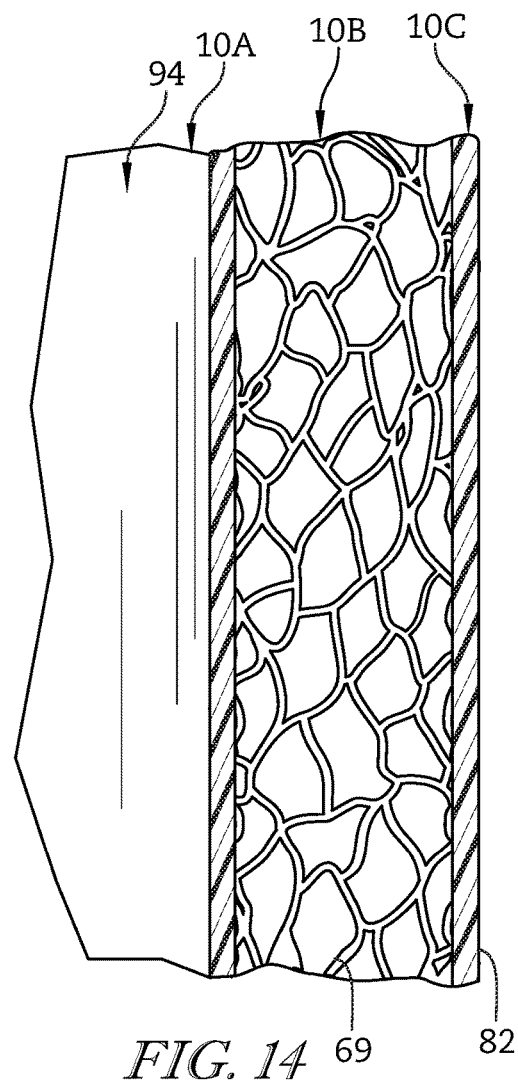
Figure 15:
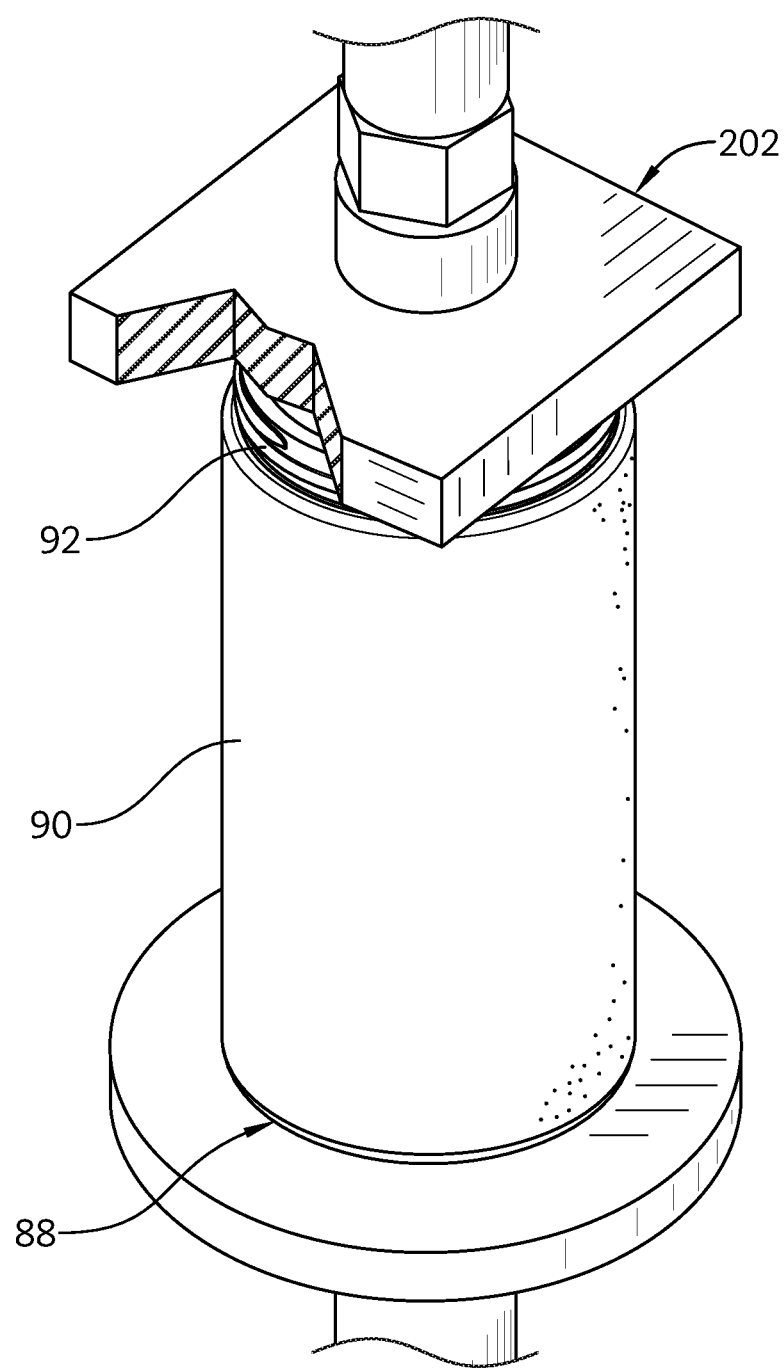
Figure 16:
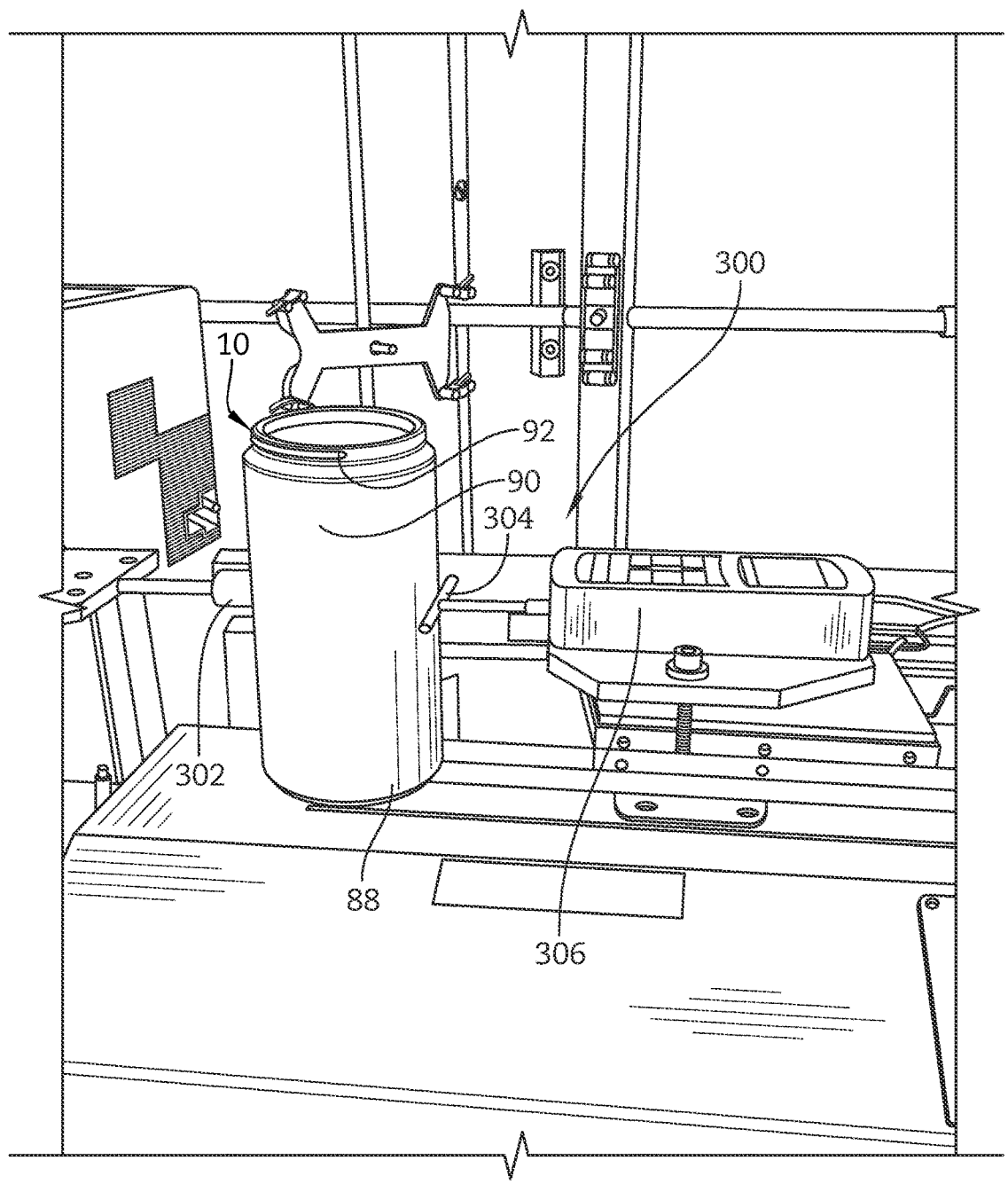
Figure 17:
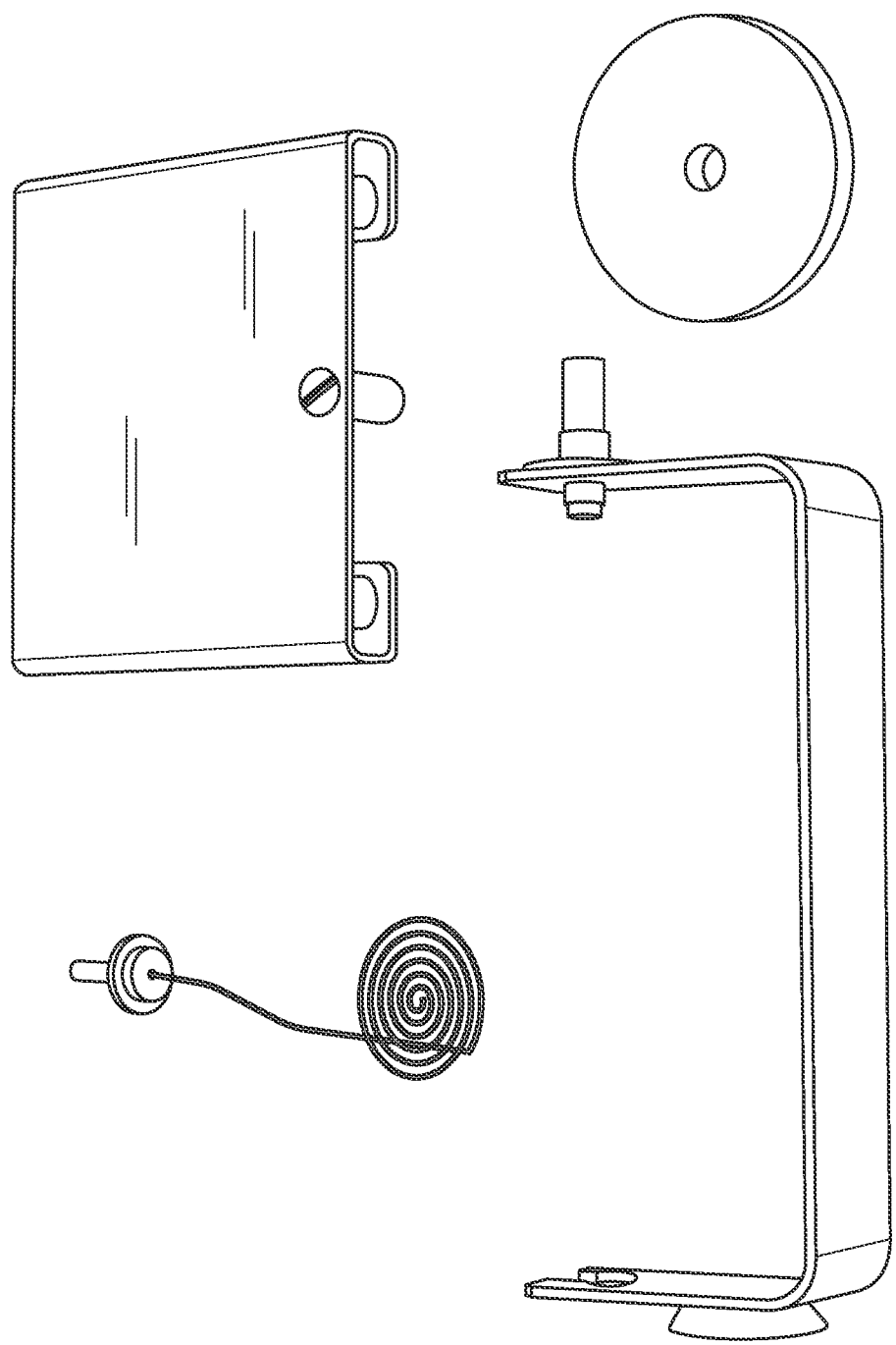
Figure 18:
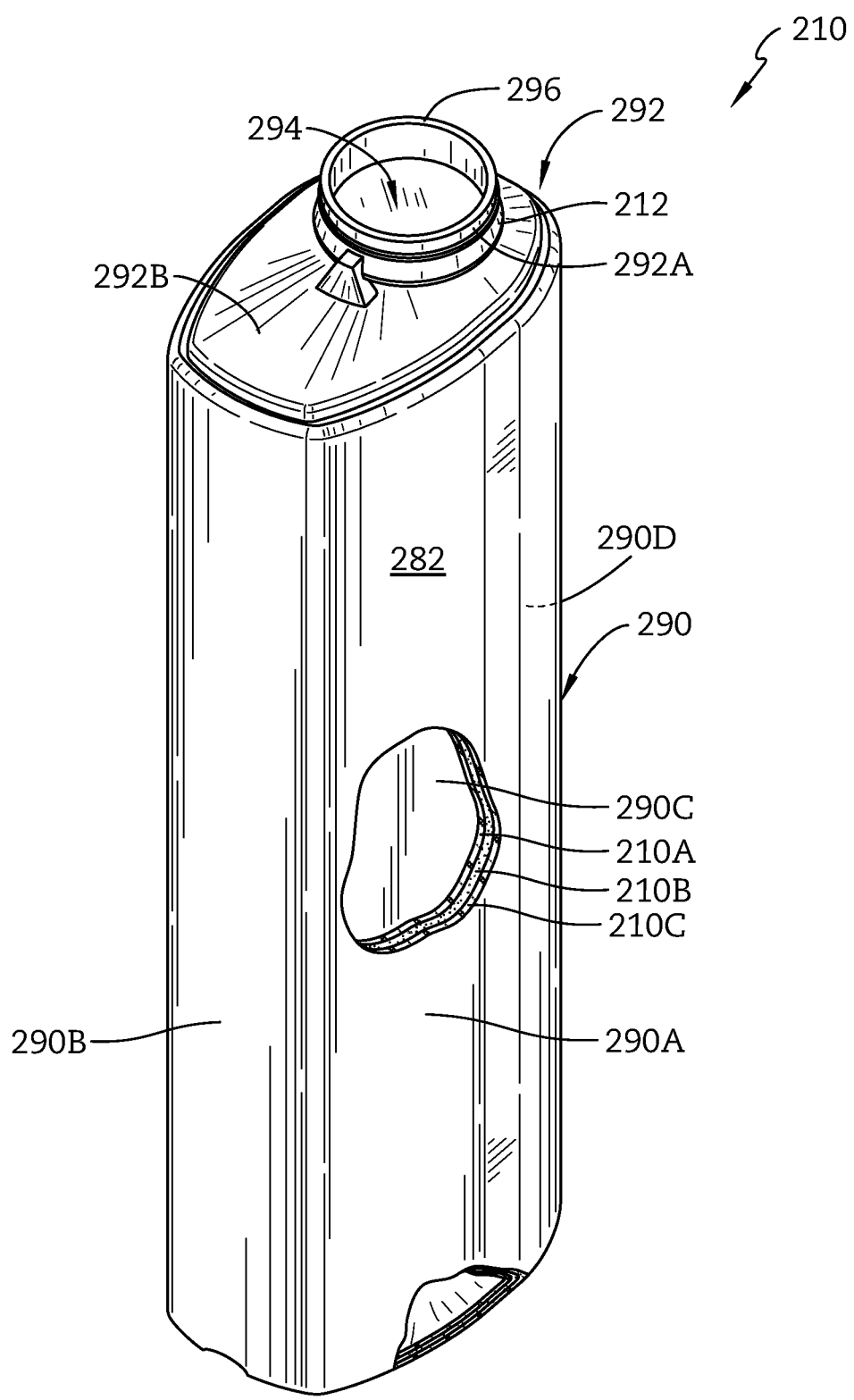
Figure 19:
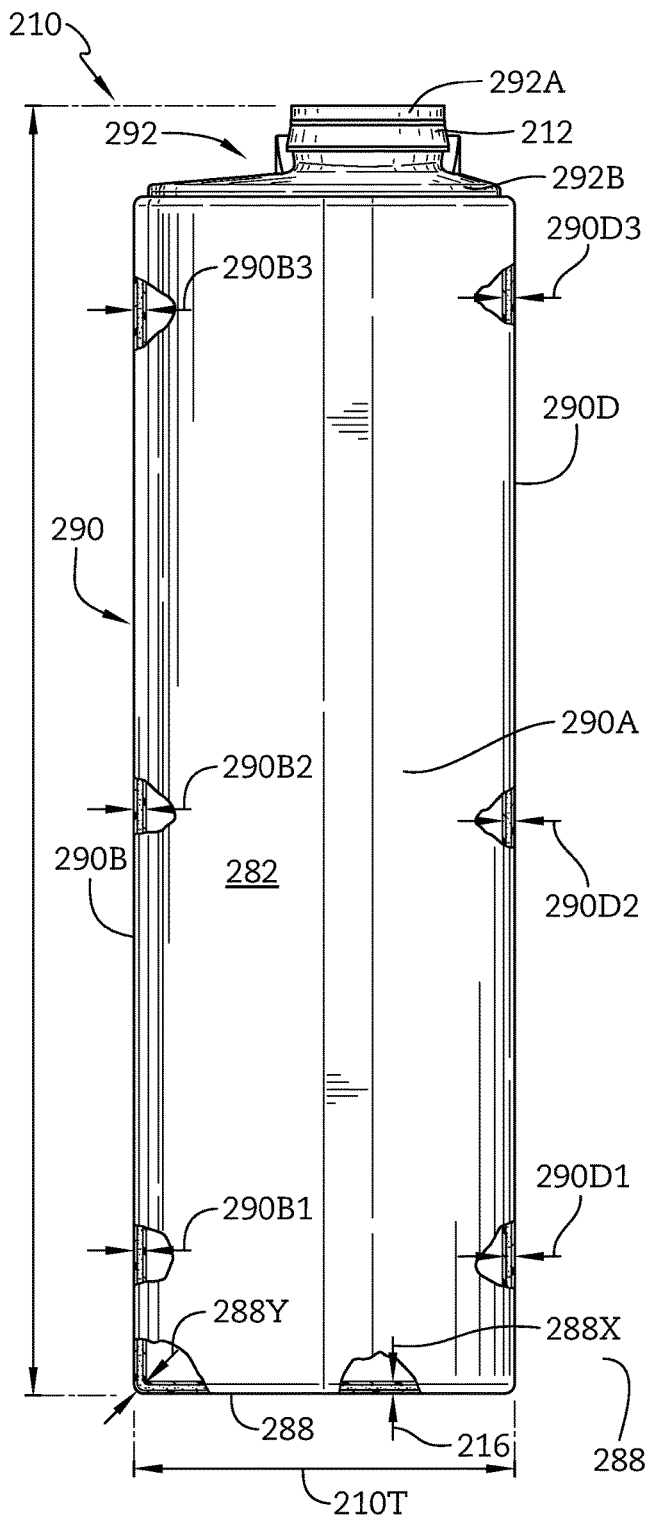
Figure 20:
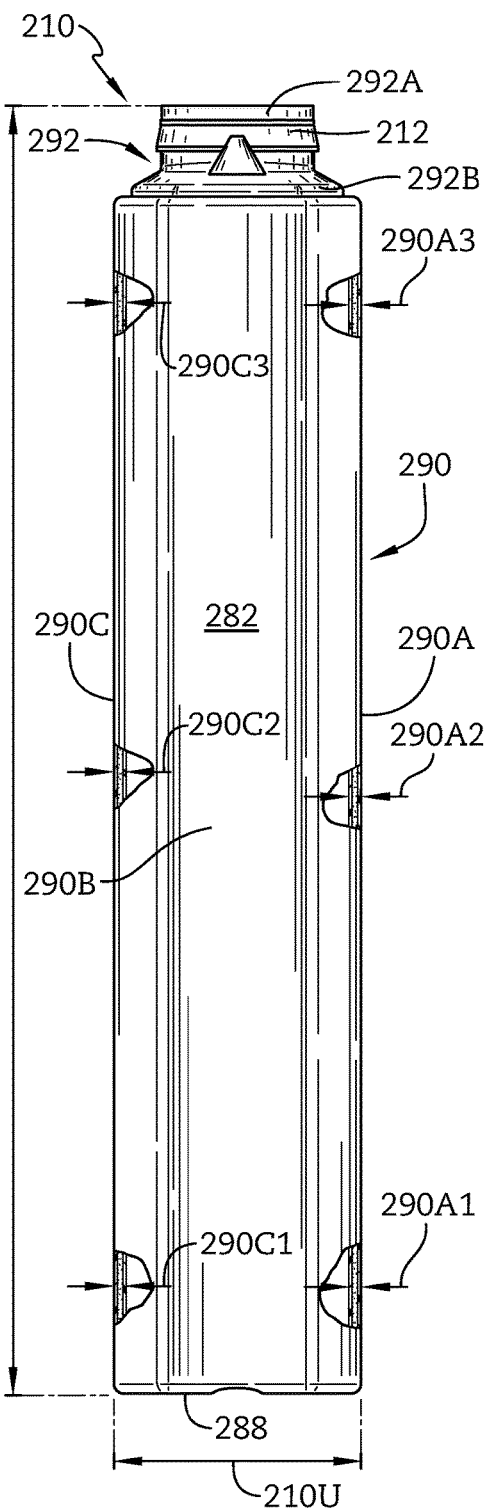
Figure 23:
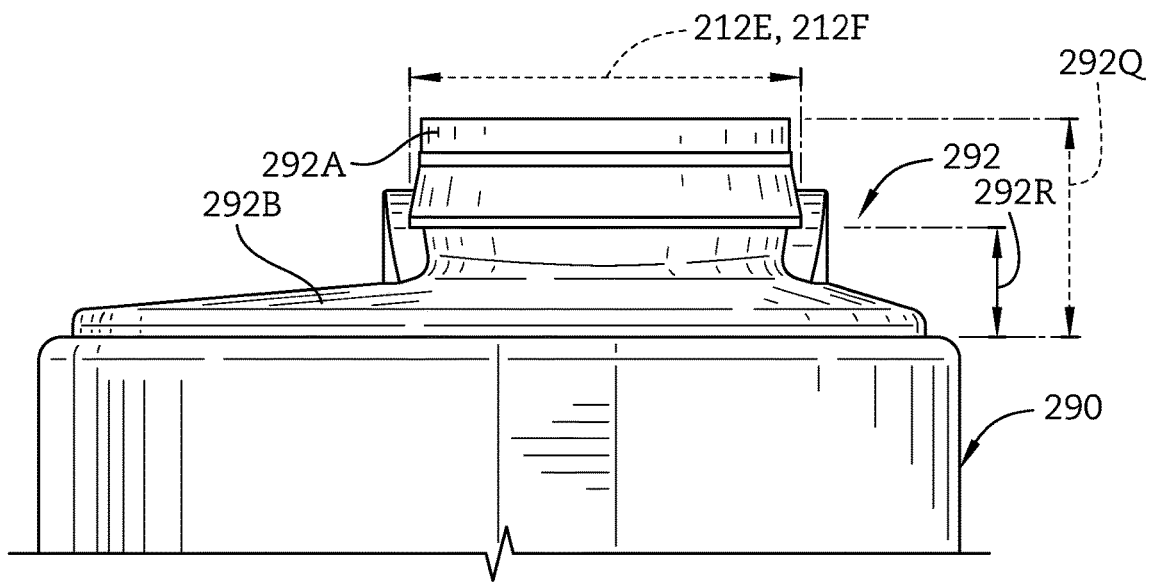
Figure 24:
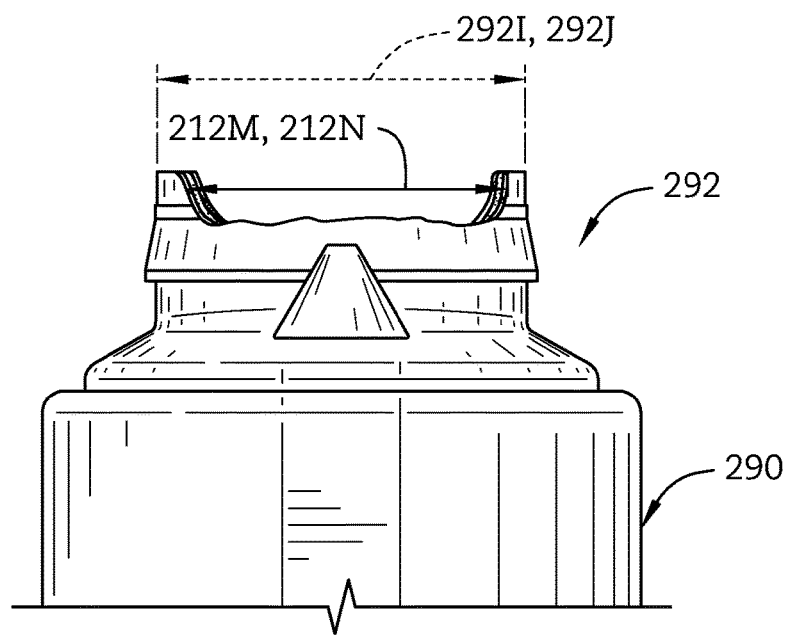
Figures 25, 26:
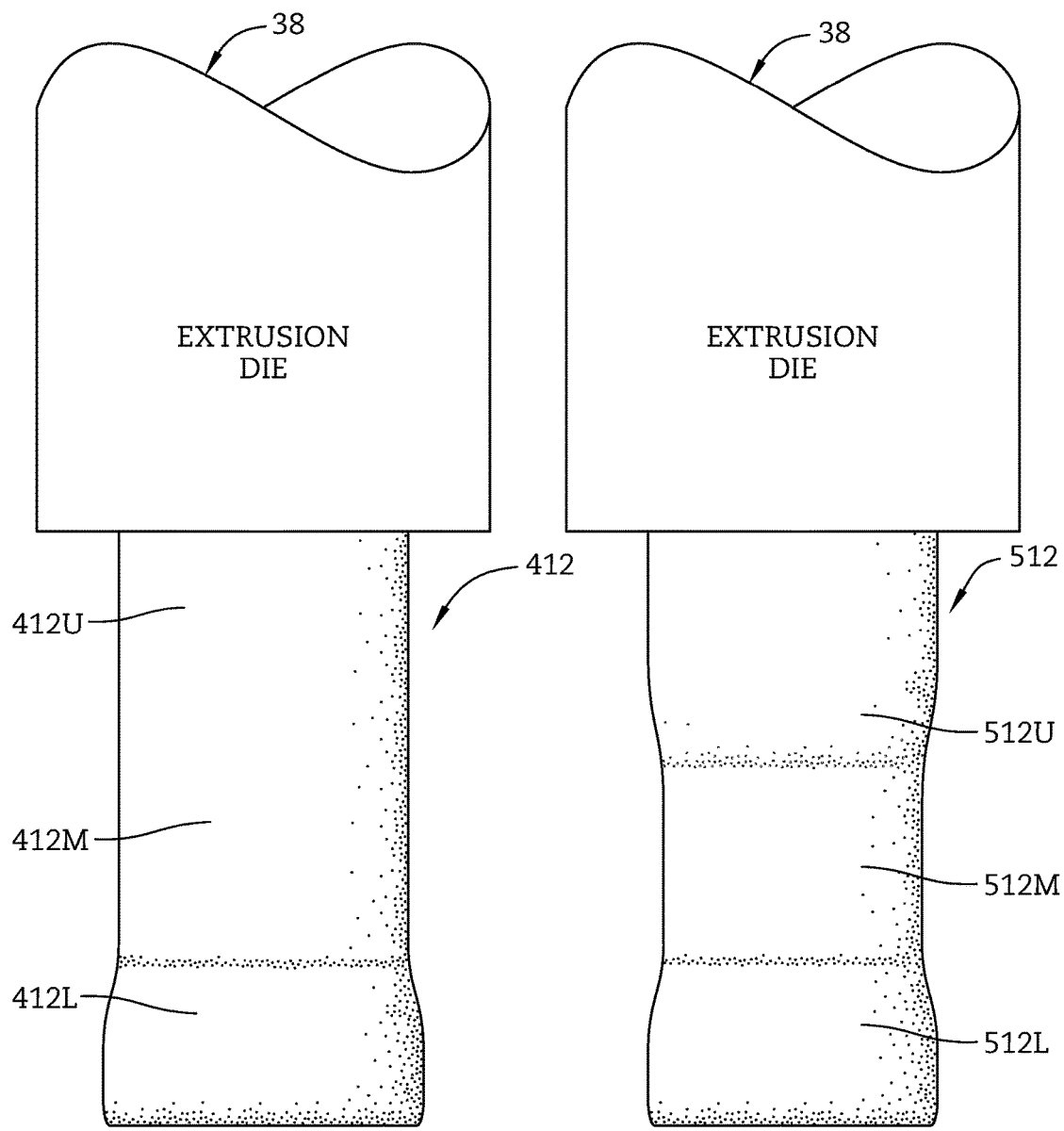
Figure 27:
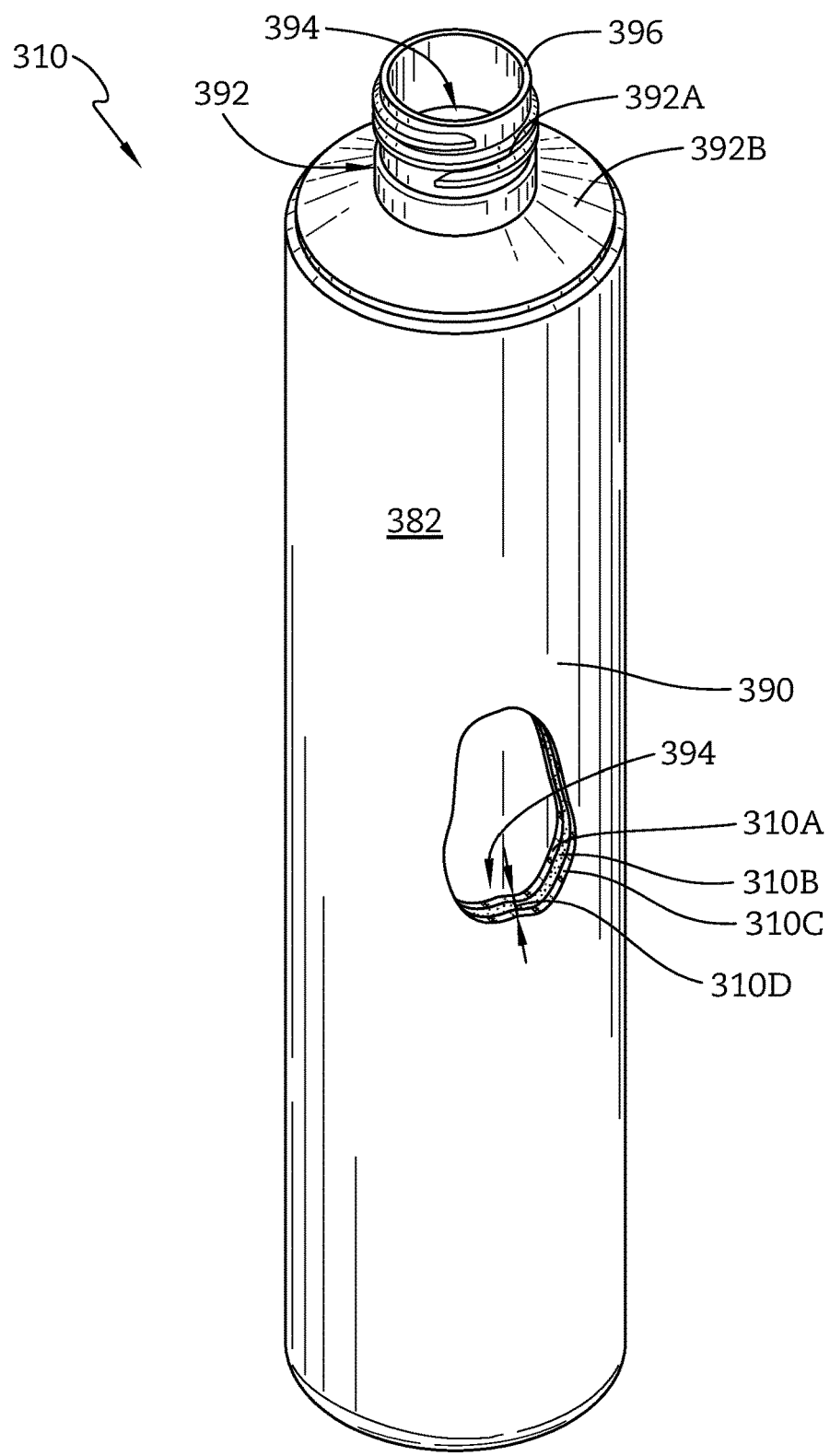
Figure 28:
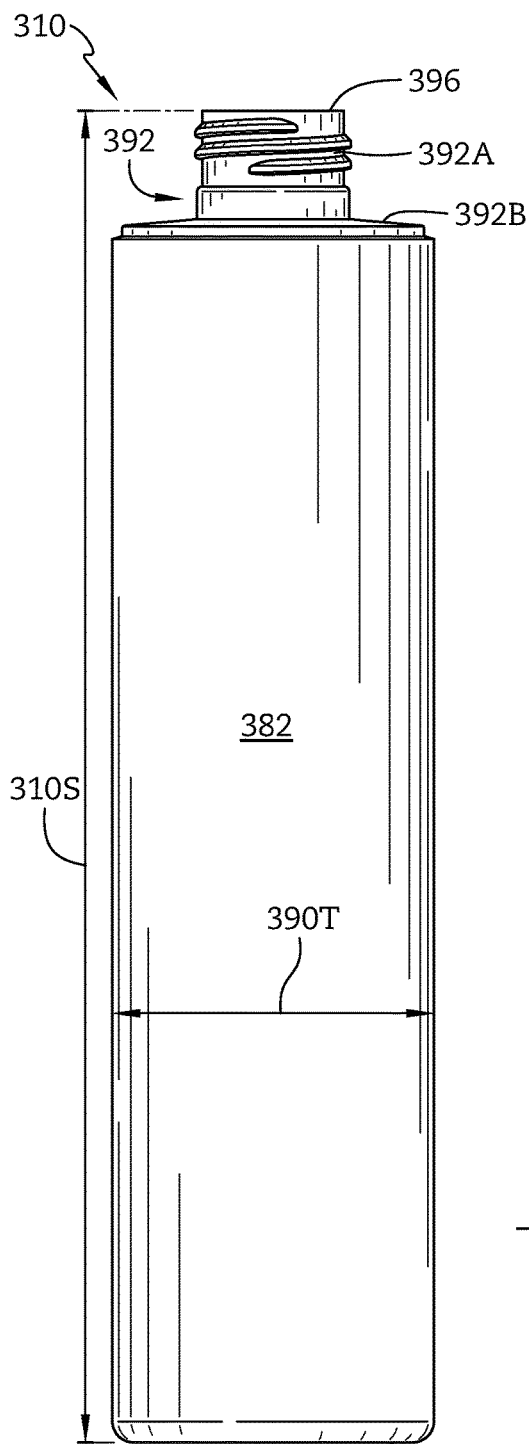
Figure 29:
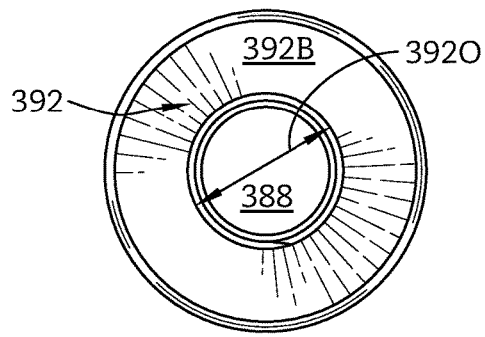
Figure 30:
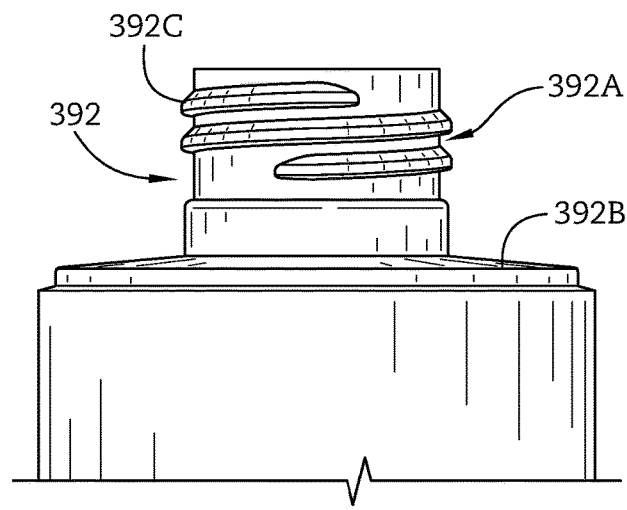
Figure 31:
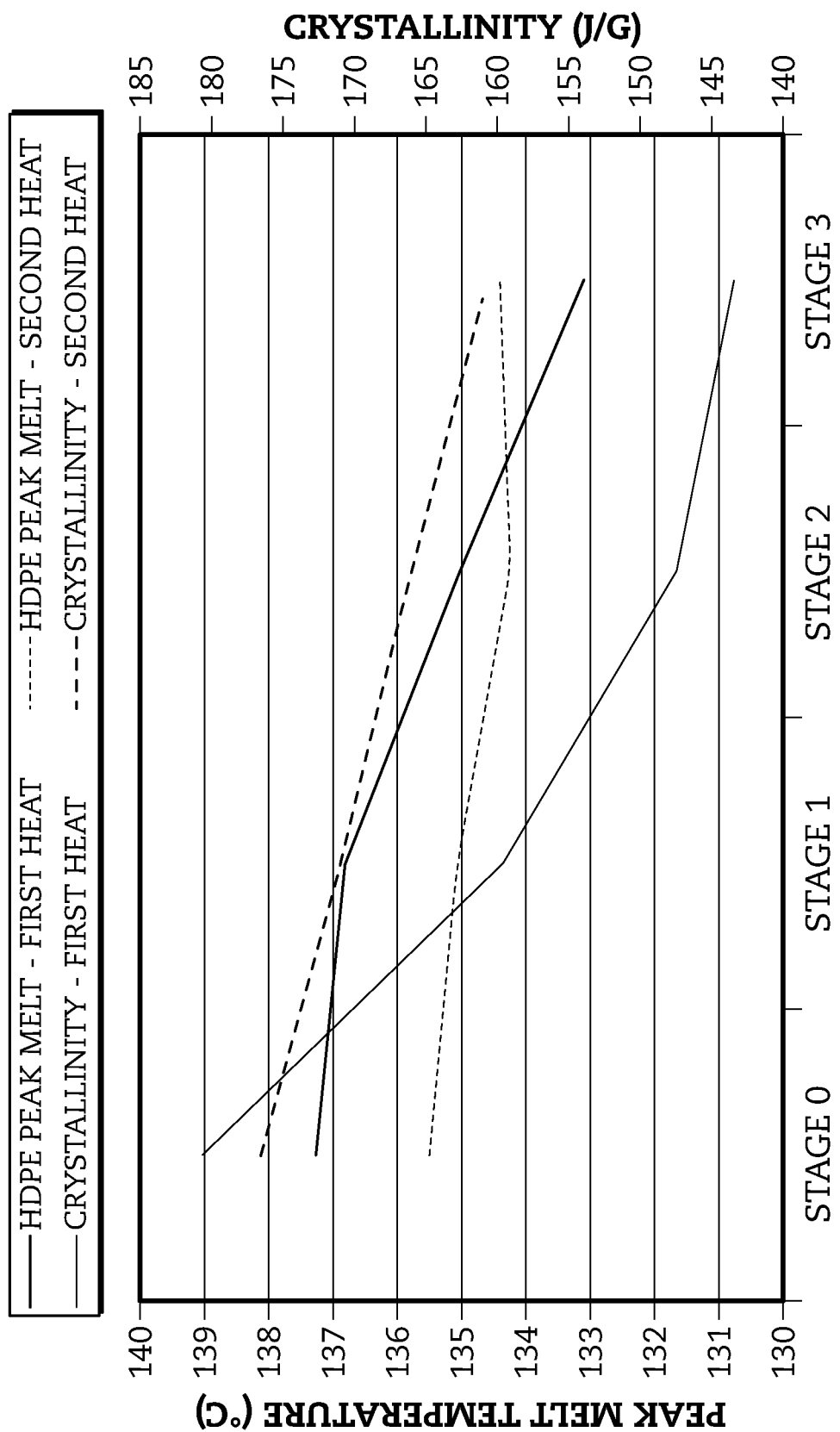
Figure 32:
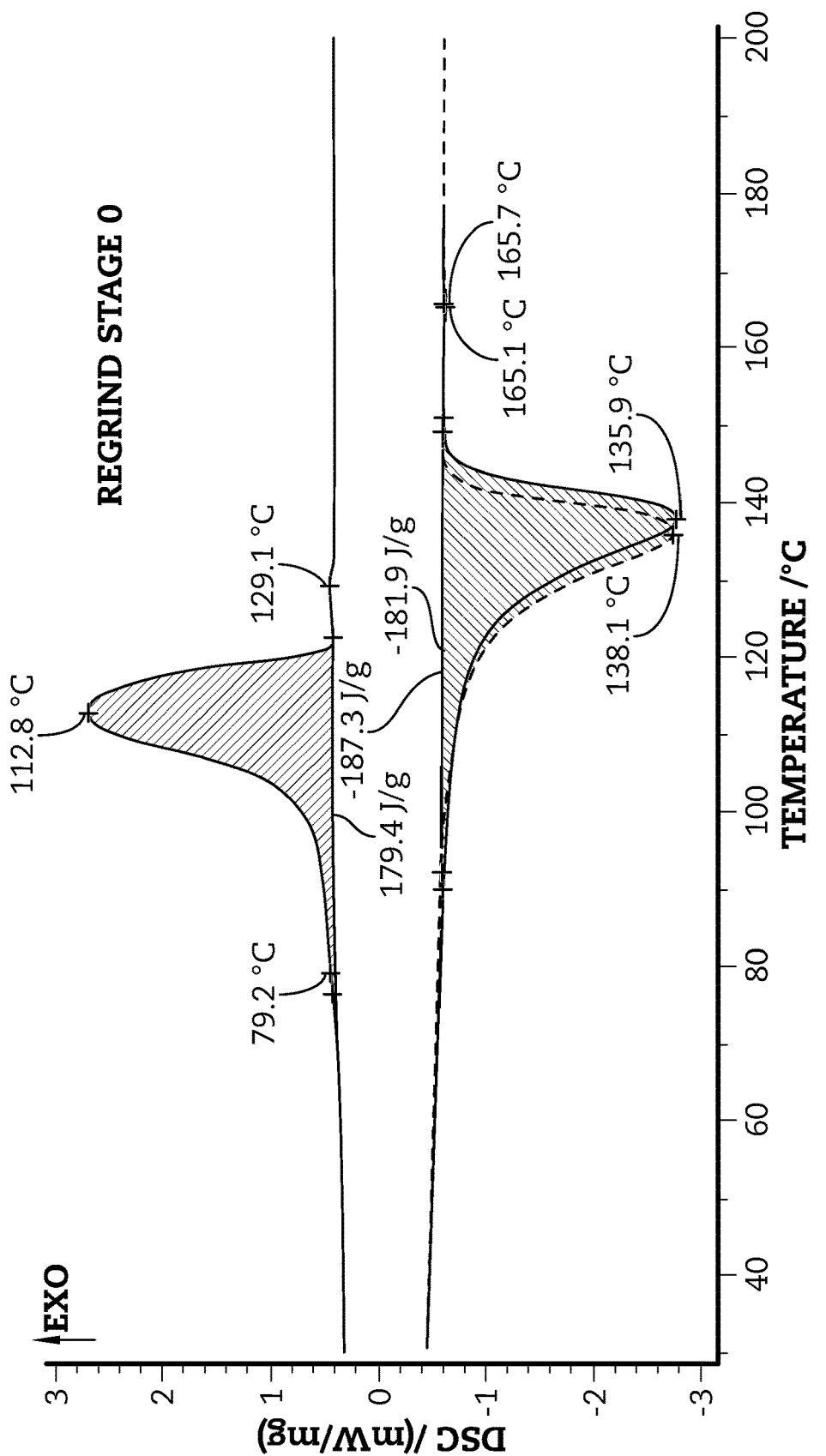
Figure 33:
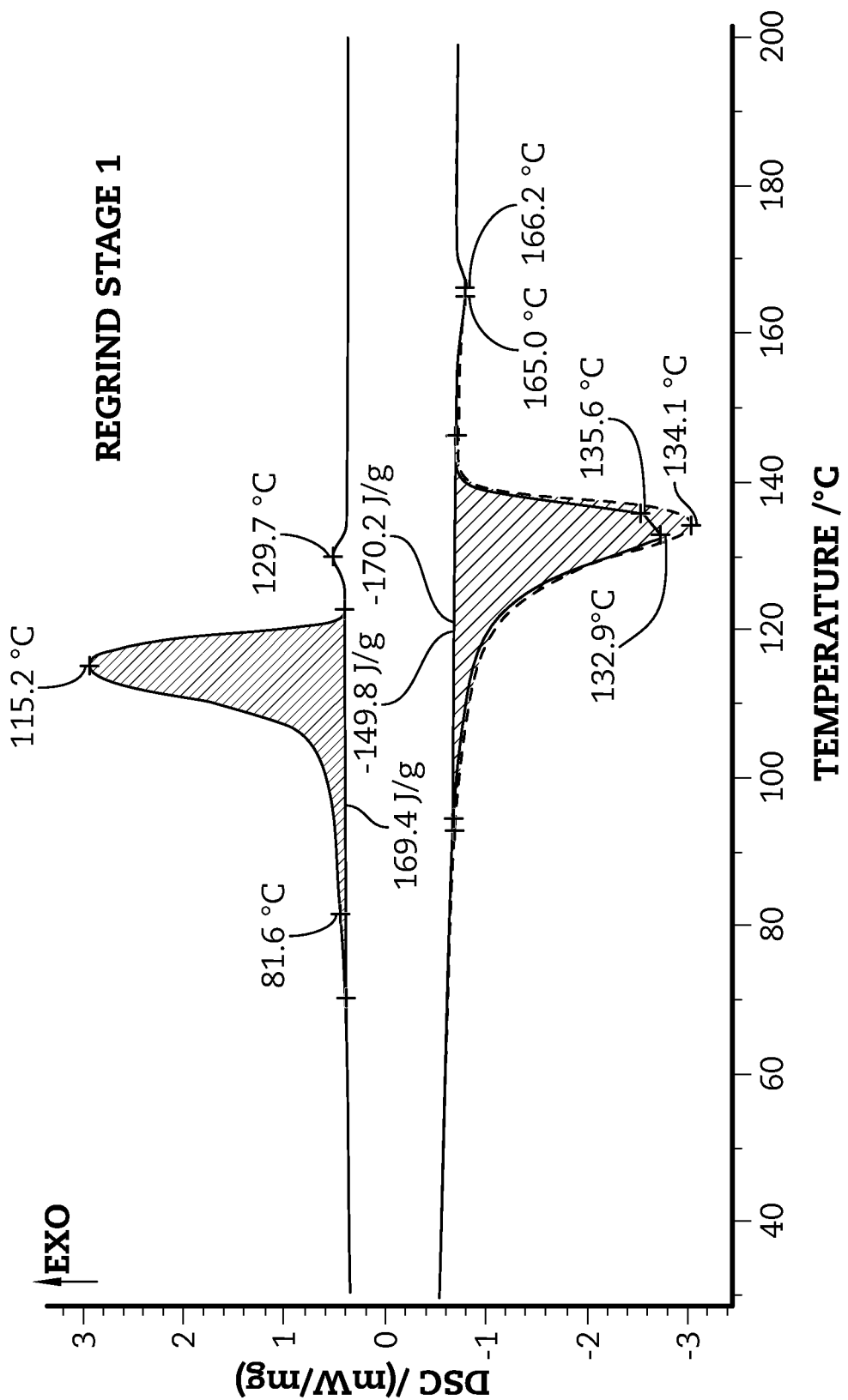
Figure 34:
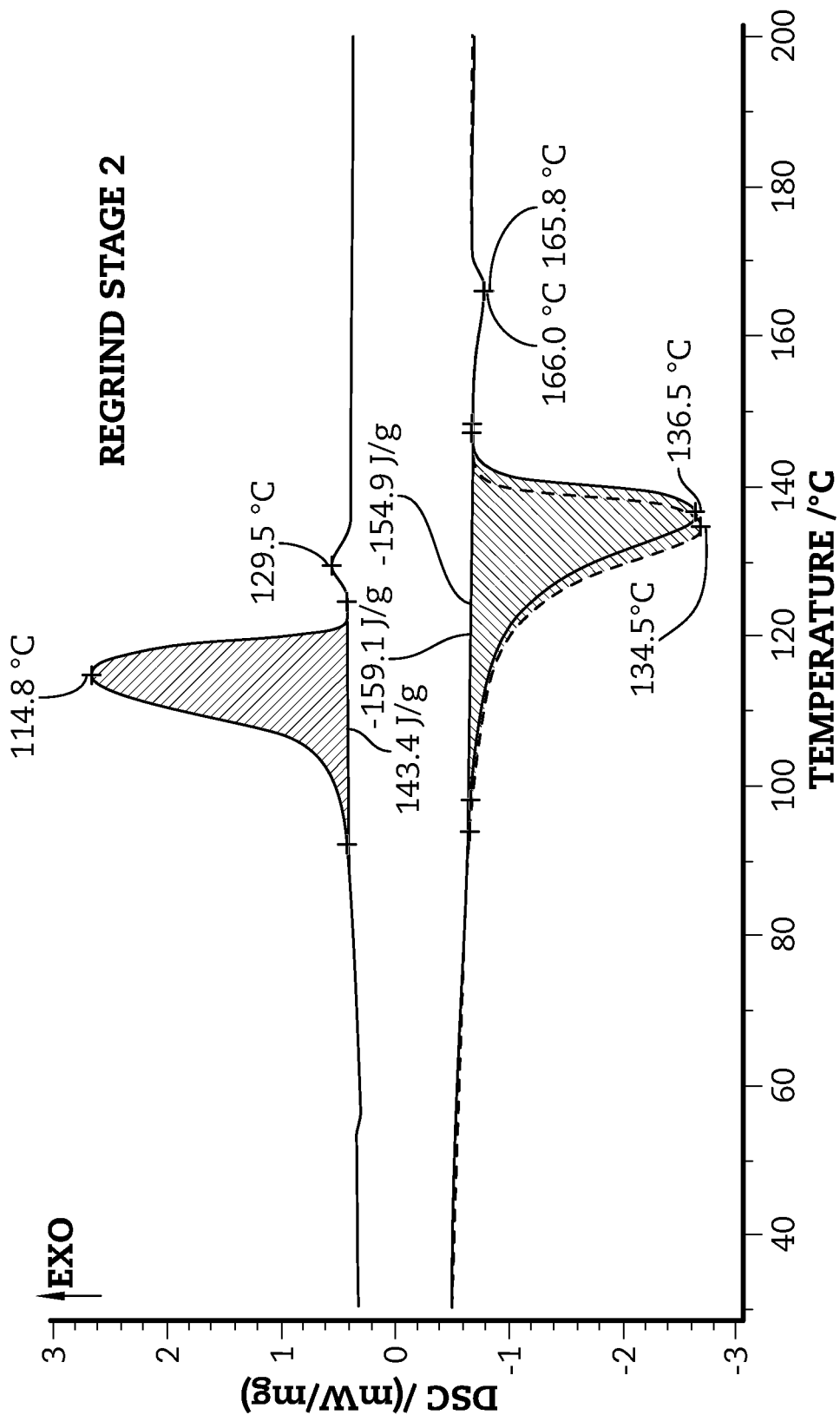
Figure 35:
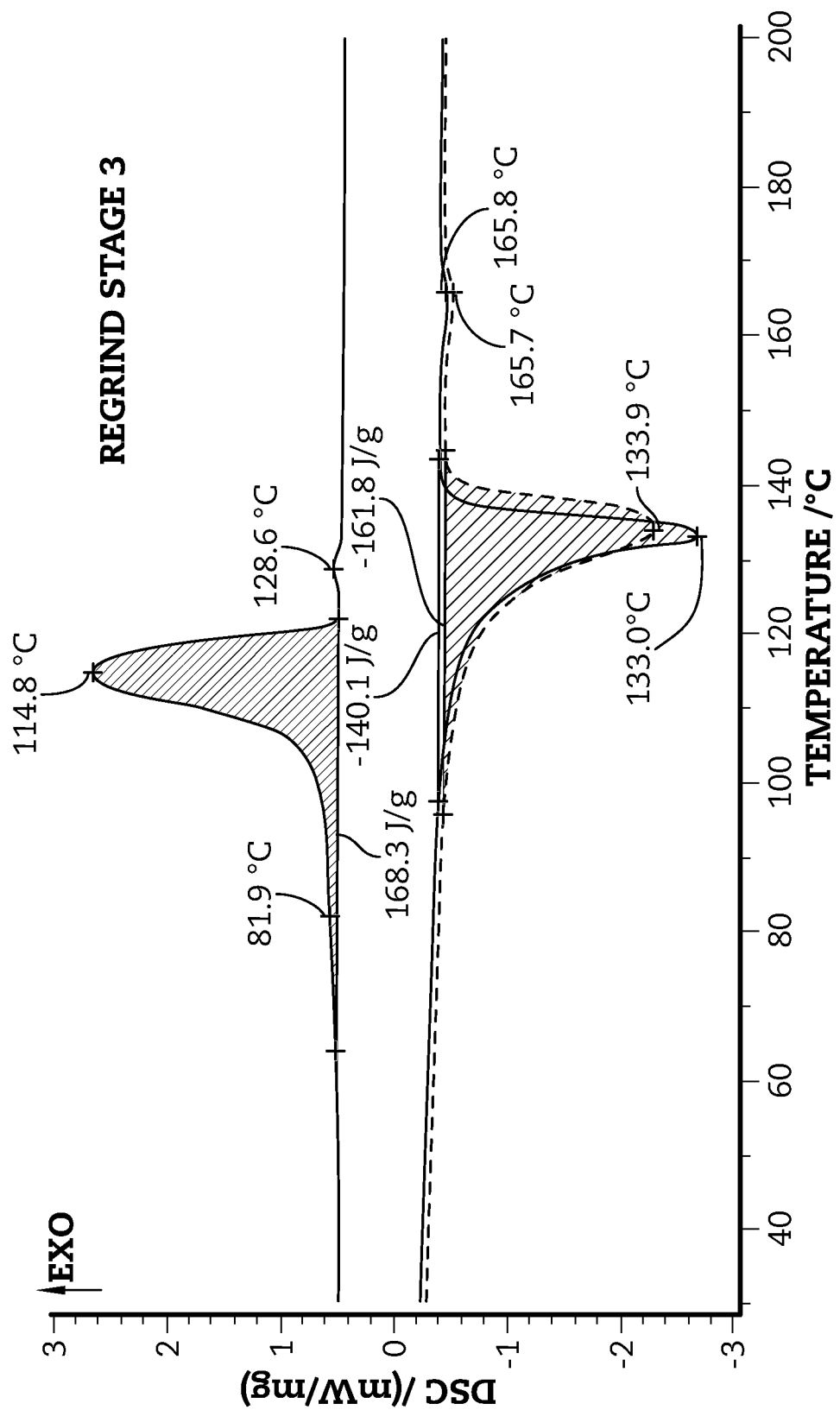
Figure 36:
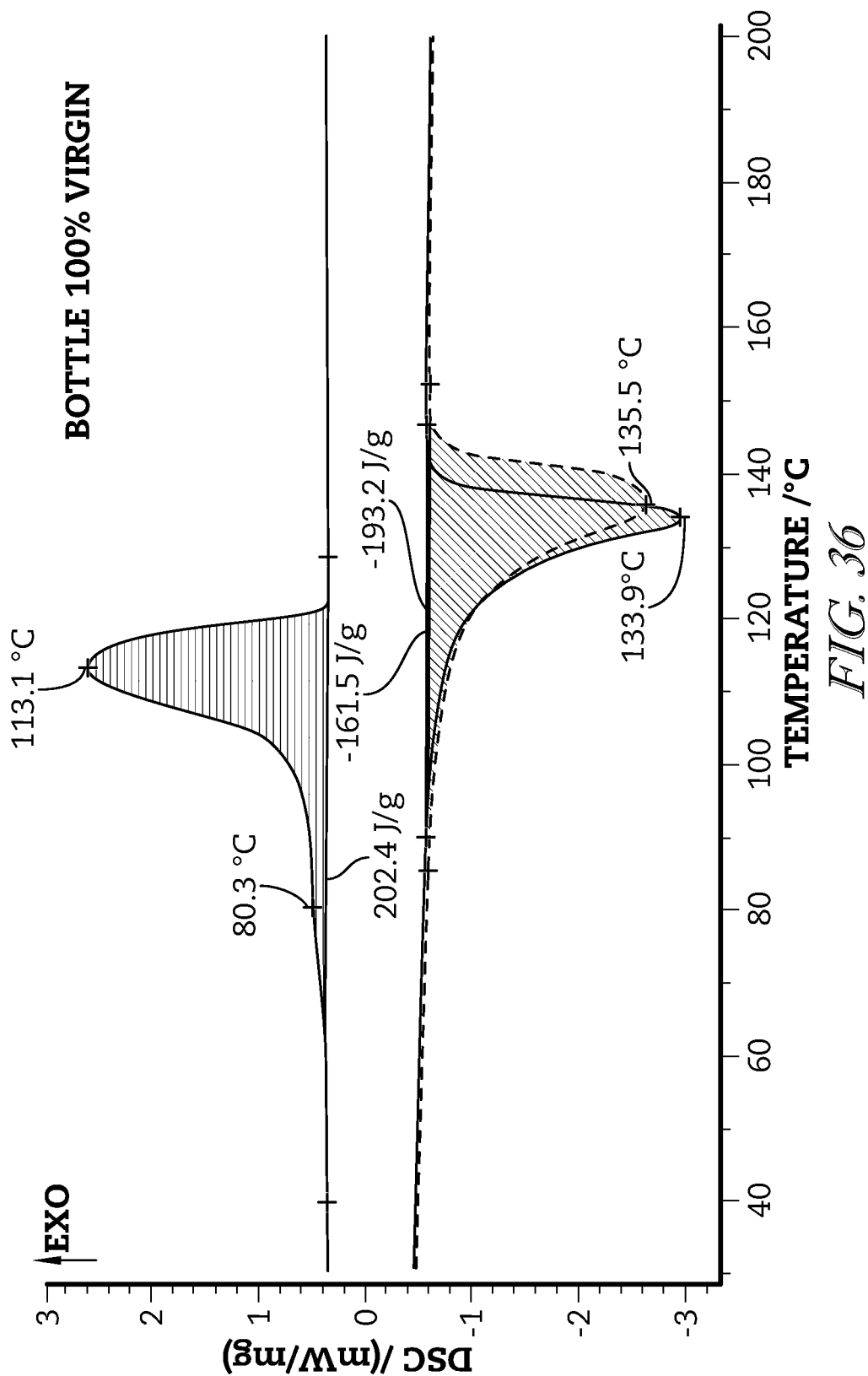
Figure 37:
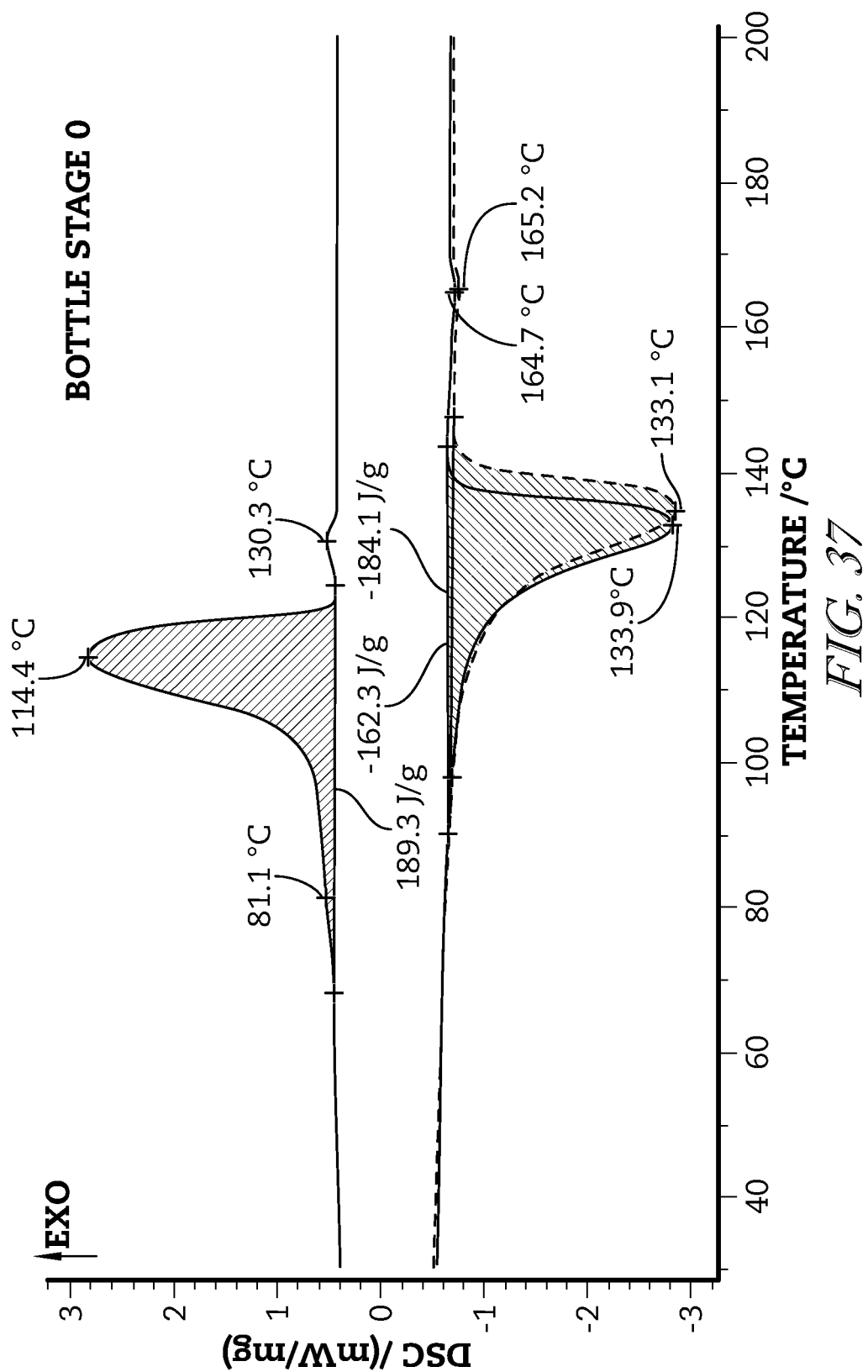
Figure 38:
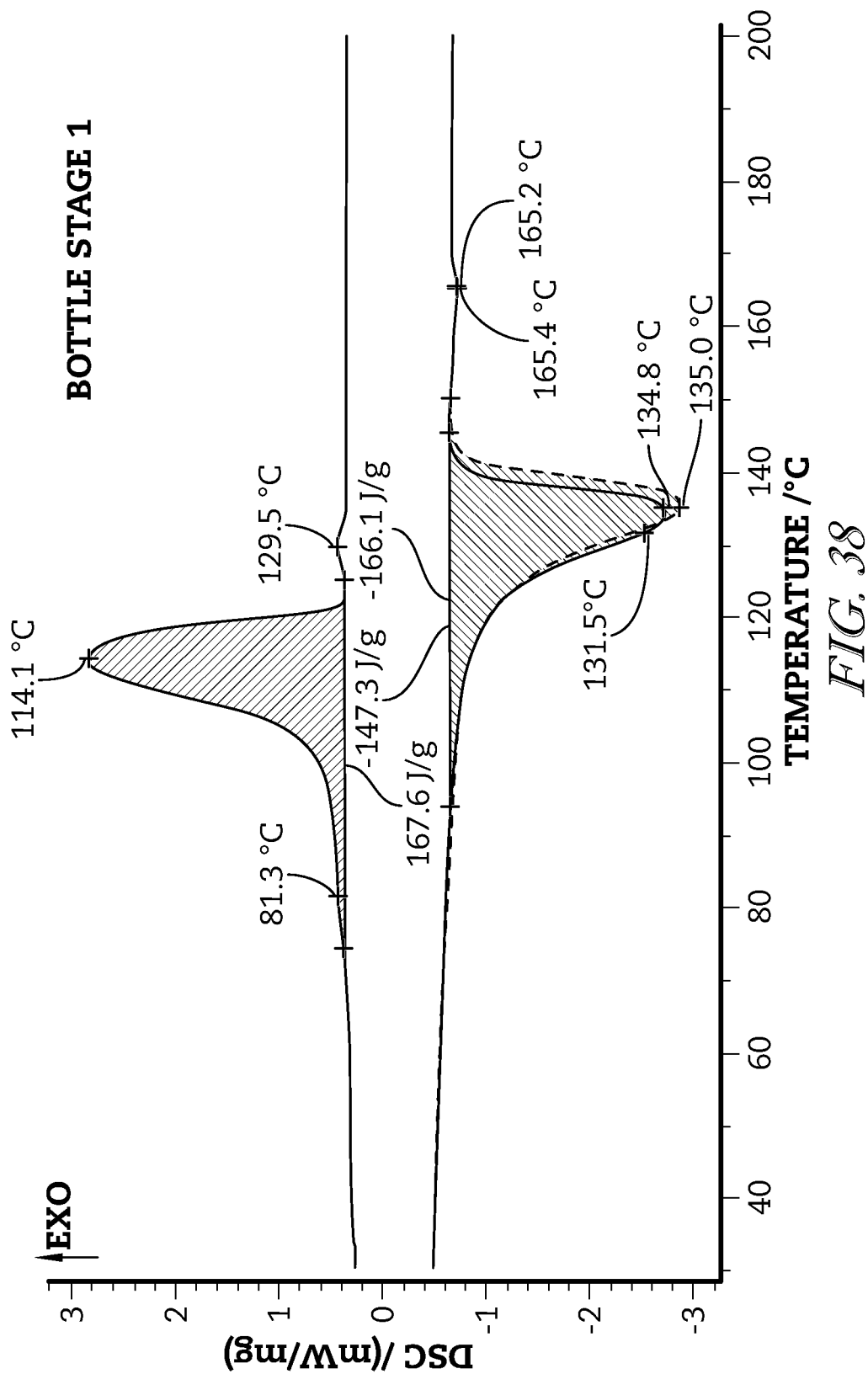
Figure 39:
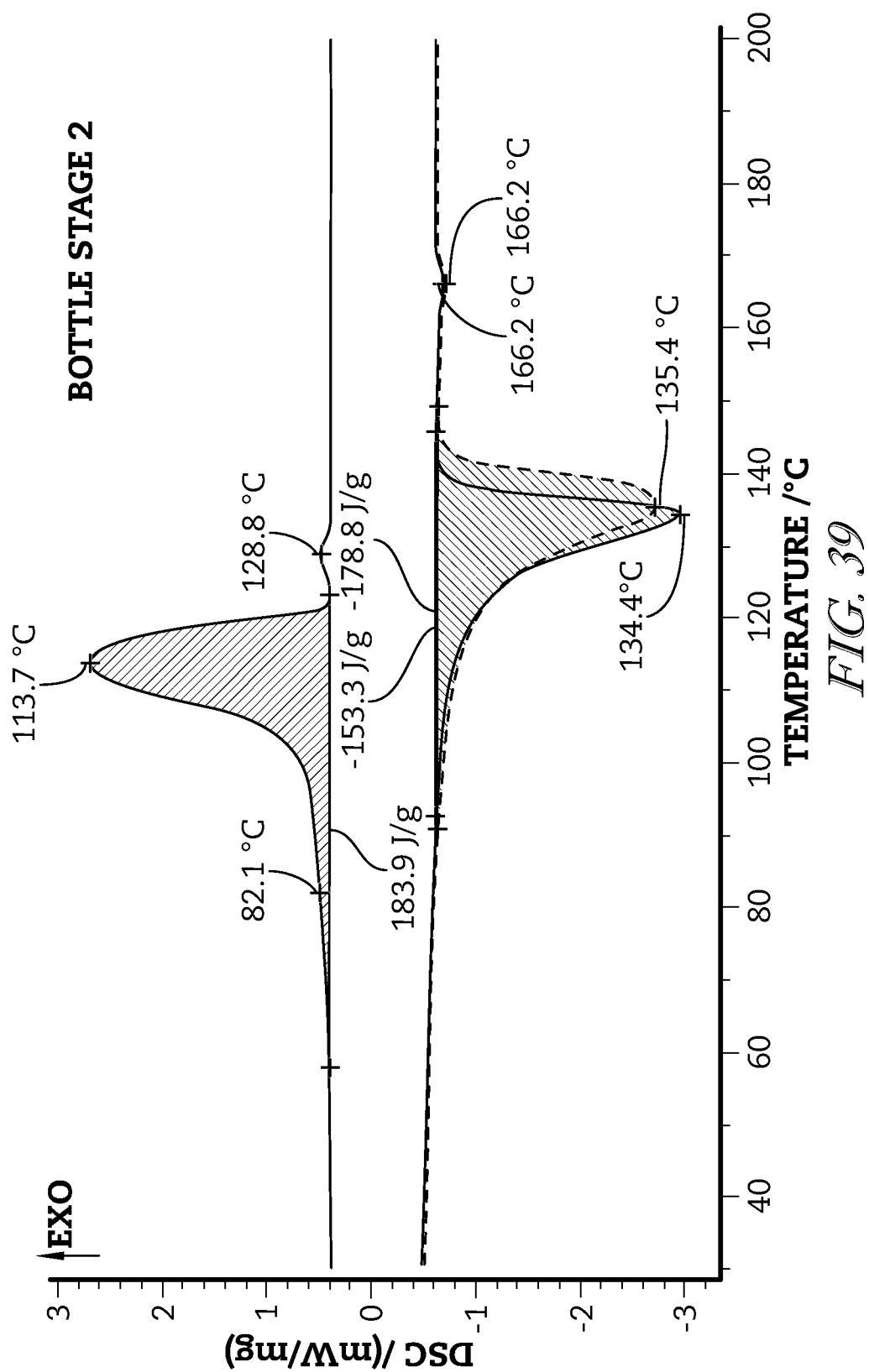
Figure 40:
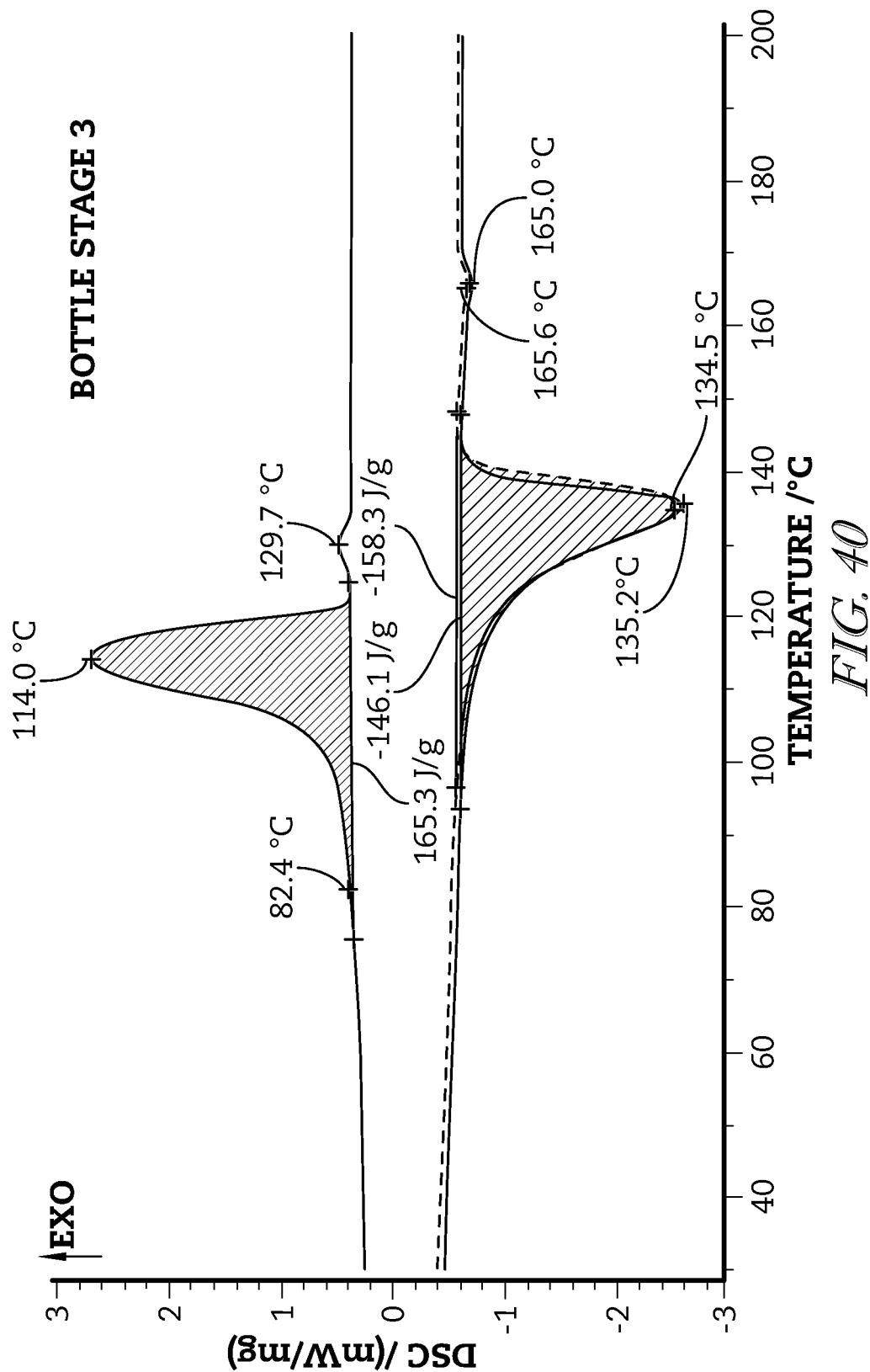
Figure 41:
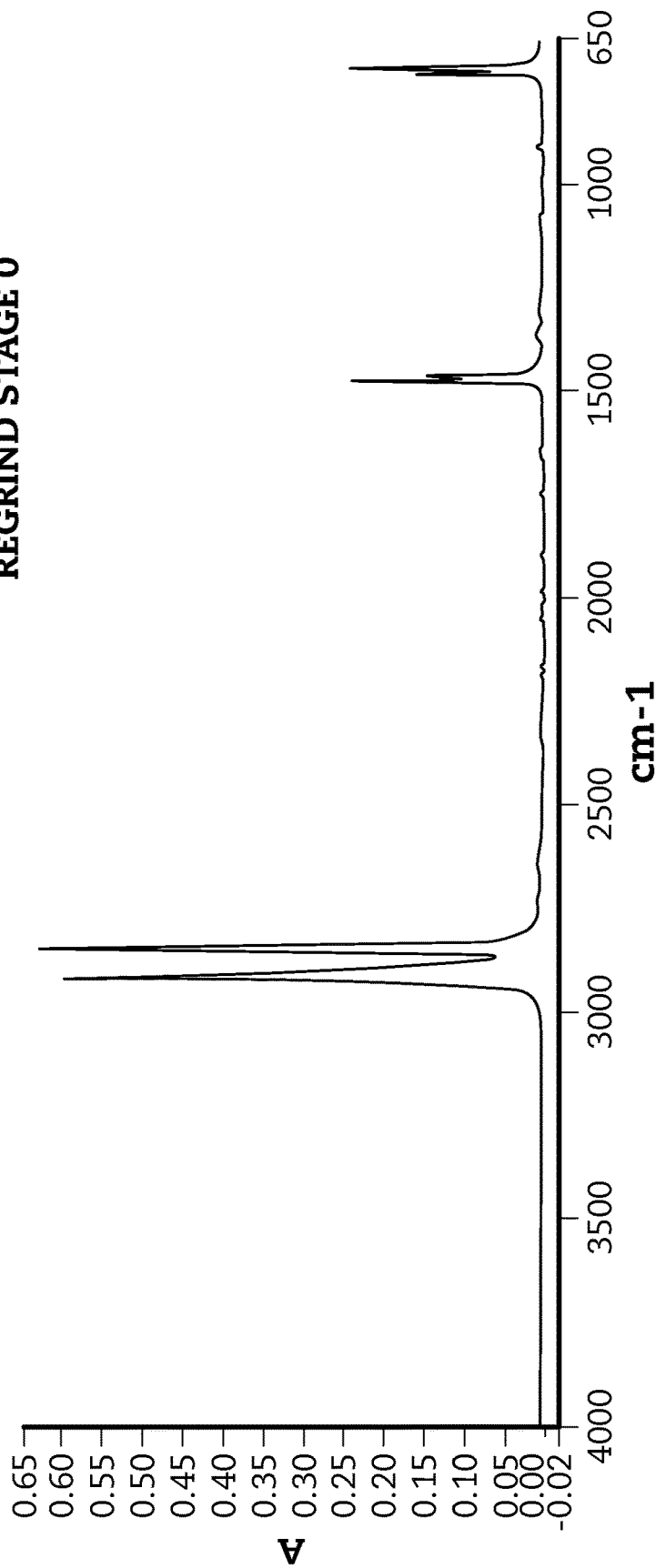
Figure 42:
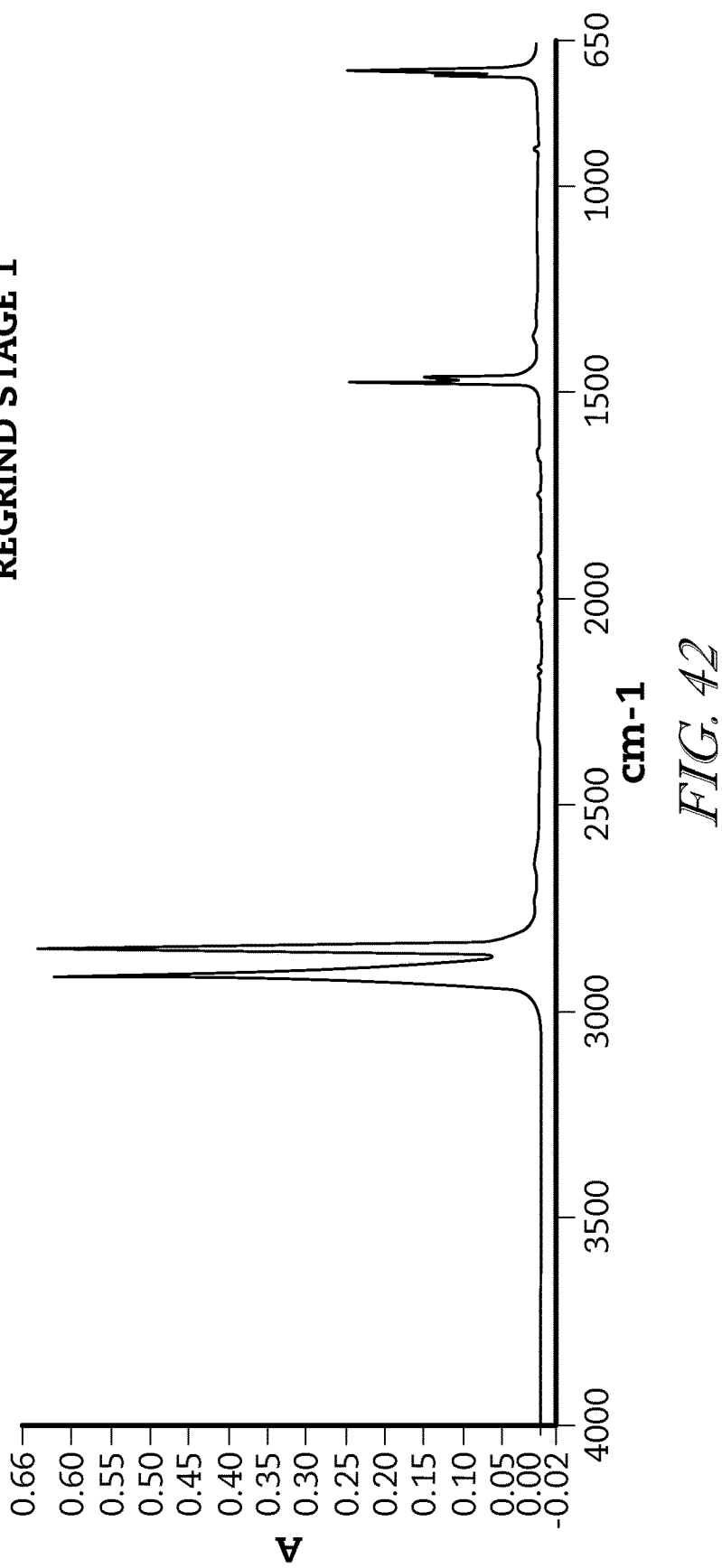

FIG. 14 is a sectional view taken along line 14-14 of FIG. 13 showing that the multi-layer container includes a side wall including the inner layer, the outer layer spaced apart from the inner layer, and a compressed core layer located therebetween and showing that some of the expanded cells have collapsed along the inner and outer layers to cause the compressed core layer to have a relatively greater density than the core layer of the multi-layer tube;

FIG. 15 is a partial perspective view of the multi-layer container of FIG. 13 coupled to a top-load testing device undergoing top-load testing;

FIG. 16 is a photograph of the multi-layer container of FIG. 13 coupled to a rigidity testing device undergoing rigidity testing;

FIG. 17 is a perspective view of an unassembled density determination apparatus showing the components (clockwise starting in the upper left) gem holder, platform, suspension bracket, and suspension spacer;

FIG. 18 is a perspective view of another embodiment of a multi-layer container made in accordance with the present disclosure with portions broken away to reveal that the multi-layer container includes an inner layer, a core layer, and an outer layer;

FIG. 19 is a front elevation view of the multi-layer container of FIG. 18;

FIG. 20 is a left-side elevation view of the multi-layer container of FIGS. 18 and 19;

FIG. 21 is a right-side elevation view of the multi-layer container of FIGS. 18 and 19;

FIG. 22 is a top plan view of the multi-layer container of FIGS. 18-21;

FIG. 23 is an enlarged front elevation view showing the neck and the spout of the multi-layer container of FIGS. 18-22;

FIG. 24 is an enlarged side-elevation view of the multi-layer container of FIGS. 18-23 showing the top portion of the multi-layer container;

FIG. 25 is a diagrammatic view of one embodiment of a multi-layer tube formed in accordance with the present disclosure and showing that the multi-layer tube has a second profile shape in which a lower portion of the profile has a relatively greater width than both a middle portion and a top portion of the profile;

FIG. 26 is a diagrammatic view of one embodiment of a multi-layer tube formed in accordance with the present disclosure showing that the multi-layer tube has a third profile shape in which both a lower portion and an upper portion of the profile have relatively greater widths than a middle portion of the profile;

FIG. 27 is a perspective view of another embodiment of a multi-layer container made in accordance with the present disclosure with portions broken away to reveal that the multi-layer container includes an inner layer, a core layer, and an outer layer;

FIG. 28 is a side elevation view of the multi-layer container of FIG. 27;

FIG. 29 is a top plan view of the multi-layer container of FIGS. 27 and 28;

FIG. 30 is an enlarged partial side elevation view of the multi-layer container of FIG. 28;

FIG. 31 is a plot of DSC analysis of virgin, stage 0, stage 1, stage 2 and stage 3 regrind formulations showing Peak Melt Temperature and Crystallinity as a function of regrind stage;

FIG. 32 is a plot of DSC analysis of a stage-0 regrind formulation;

FIG. 33 is a plot of DSC analysis of a stage-1 regrind formulation;

FIG. 34 is a plot of DSC analysis of a stage-2 regrind formulation;

FIG. 35 is a plot of DSC analysis of a stage-3 regrind formulation;

FIG. 36 is a plot of DSC analysis of a virgin bottle;

FIG. 37 is a plot of DSC analysis of a stage-0 regrind bottle;

FIG. 38 is a plot of DSC analysis of a stage-1 regrind bottle;

FIG. 39 is a plot of DSC analysis of a stage-2 regrind bottle;

FIG. 40 is a plot of DSC analysis of a stage-3 regrind bottle;

FIG. 41 is a plot of an FTIR analysis of a stage-0 regrind formulation;

FIG. 42 is a plot of an FTIR analysis of a stage-1 regrind formulation; and

Figure 43:
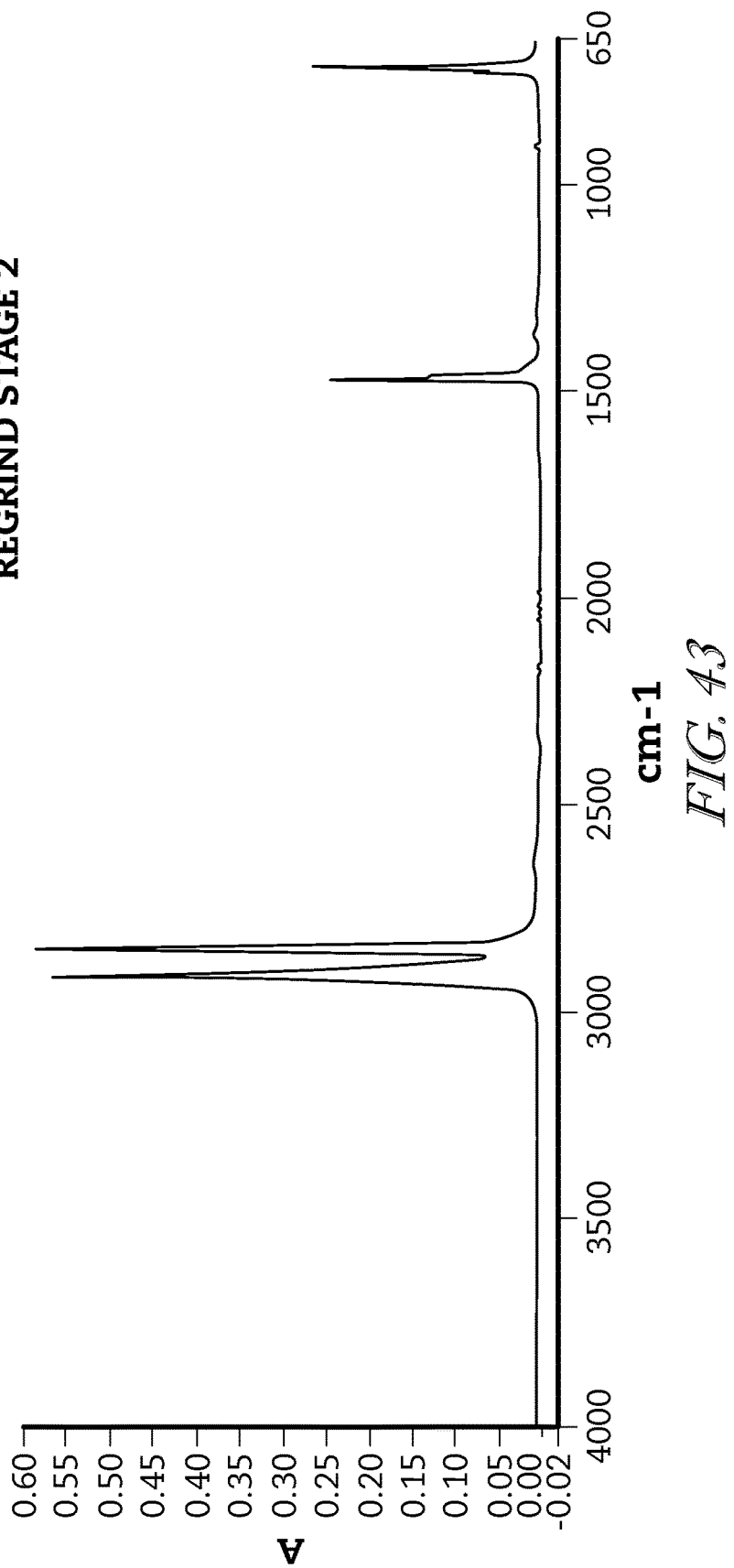

FIG. 43 is a plot of an FTIR analysis of a stage-2 regrind formulation.

DETAILED DESCRIPTION

Figure 1:
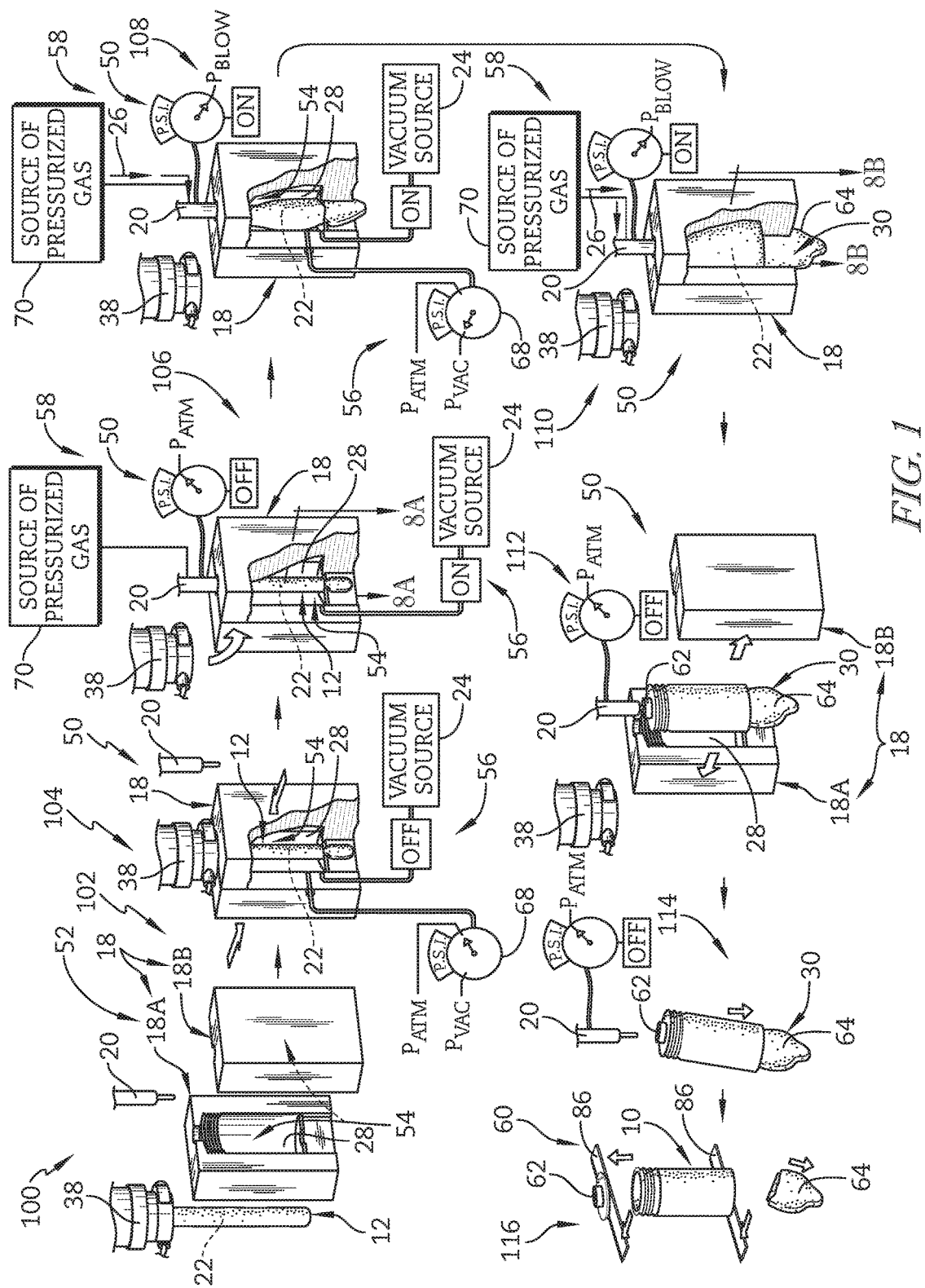

A multi-layer container 10 in accordance with the present disclosure is suggested in FIG. 1 and shown in FIG. 13. Multi-layer container 10 is formed by a container-molding process 100 in accordance with the present disclosure as shown in FIG. 1 and suggested in FIG. 2. Container-molding process 100 begins with extruding 102 a multi-layer tube 12 that includes a core layer 12B made from relatively low-density insulative cellular non-aromatic polymeric material. Container-molding process 100 proceeds by molding multi-layer tube 12 into multi-layer container 10 which may cause core layer 12B of multi-layer tube 12 to compress and establish a compressed core layer 10B included in multi-layer container 10. As a result of compressed core layer 10B being made from relatively low-density insulative cellular non-aromatic polymeric material, a density of multi-layer container 10 is minimized while stack strength, rigidity, and top-load performance of multi-layer container 10 are maximized. In one example, the density of multi-layer container 10 is between about 0.4 g/cm³ to about 0.8 g/cm³. In another example, the density of multi-layer container 10 is less than about 0.6 g/cm³.

Figure 3:
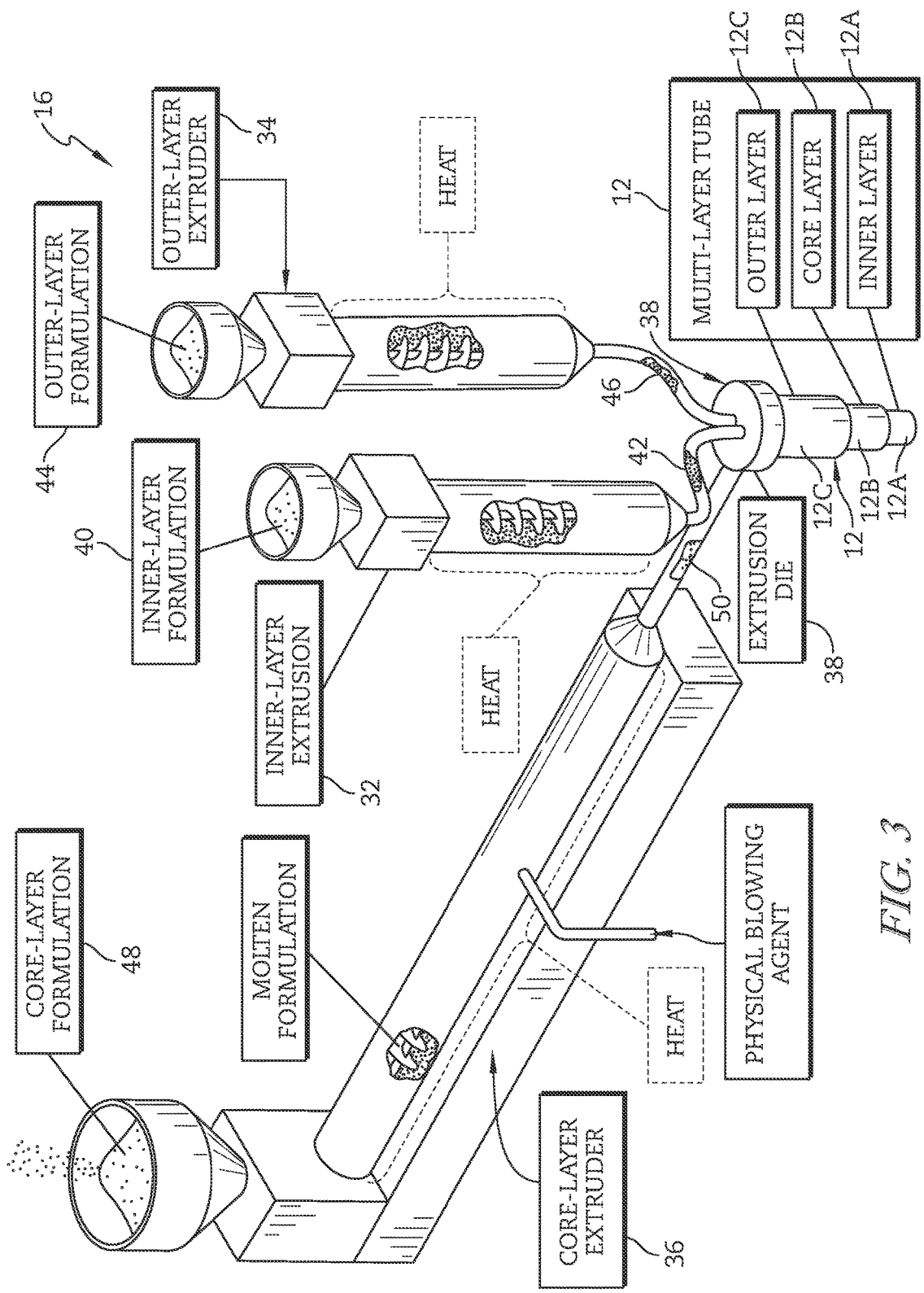

Container-molding process 100 begins with an extruding operation 102 in which multi-layer tube 12 is extruded from a co-extrusion as suggested in FIG. 1 and shown in FIG. 3. Container-molding process 100 then proceeds to a closing operation 104 in which a mold 18 is closed around multi-layer tube 12 as shown in FIG. 1. Container-molding process then moves onto an inserting operation 106 in which a blow needle 20 is inserted into a tube space 22 formed in multi-layer tube 12 while vacuum from a vacuum source 24 is applied to mold 18. Container-molding process 100 then proceeds to a pumping operation 108 in which pressurized gas 26 is pumped into tube space 22 as suggested in FIG. 1. Container-molding process 100 then moves on to simultaneous operations including a vacuuming operation 109 in which vacuum is applied to mold 18 and an expanding operation 110 in which pressurized gas 26 expands multi-layer tube 12 against an inner surface 28 of mold 18 and establishes a vessel 30. An opening operation 112 then occurs in which mold 18 opens to reveal vessel 30. Next, a removing operation 114 occurs in which vessel 30 is separated from mold 18 and released from blow needle 20. Container-molding process 100 then ends with a trimming operation 116 in which excess materials 62, 64 are trimmed from multi-layer container 10 to establish multi-layer container 10 as suggested in FIG. 1 and shown in FIG. 13.

Multi-layer container 10 is made during container-molding process 100 using multi-layer tube 12 as shown in FIG. 1. Multi-layer tube 12 is provided during extruding operation 102 of container-molding process 100. Extruding operation 102 is performed using co-extrusion system 16 as shown in FIG. 3. Extruding operation 102 includes a preparing stage 102A in which various material formulations are provided to co-extrusion system 16, an extrusion stage 102B in which the various material formulations are processed by co-extrusion system 16 to provide associated parisons, and a co-extruding stage 102C in which the various parisons are extruded to provide multi-layer tube 12 as shown in FIG. 1 and suggested in FIG. 3. Reference is hereby made to U.S. Application Ser. No. 61/872,260, filed Aug. 30, 2013 and titled MULTI-LAYER TUBE AND PROCESS FOR MAKING THE SAME and U.S. application Ser. No. 14/475,411, filed Sep. 2, 2014 and titled MULTI-LAYER TUBE AND PROCESS FOR MAKING THE SAME for disclosure relating to an extruding operation, each of which is hereby incorporated by reference in its entirety.

Figure 4:
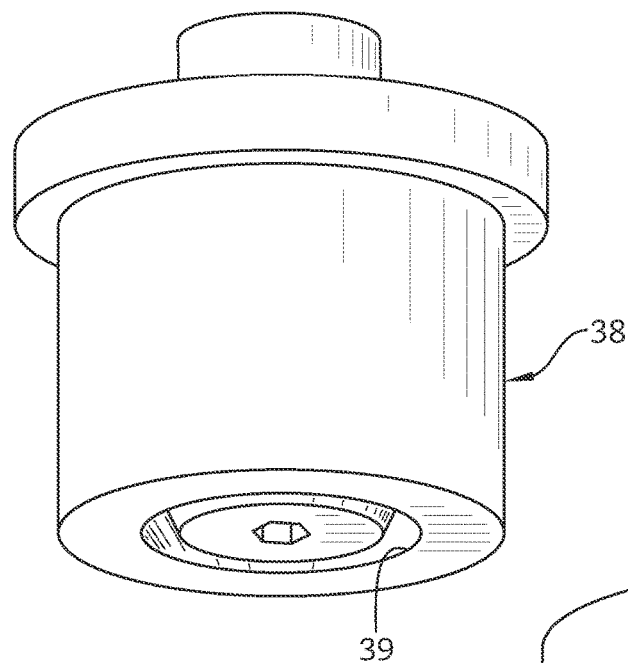

Extruding operation 102 is performed on co-extrusion system 16 which includes an inner-layer extruder 32, an outer-layer extruder 34, a core-layer extruder 36, and a co-extrusion die 38 as shown in FIG. 3. Inner-layer extruder 32 receives an inner-layer formulation 40 of a relatively high-density polymeric material and processes inner-layer formulation 40 to provide an inner-layer parison 42 to co-extrusion die 38 as shown in FIG. 3. Outer-layer extruder 34 receives an outer-layer formulation 44 of a relatively high-density polymeric material and processes outer-layer formulation 44 to provide an outer-layer parison 46 to co-extrusion die 38 as shown in FIG. 3. Core-layer extruder 36 receives a core-layer formulation 48 of a relatively low-density insulative cellular non-aromatic polymeric material and processes core-layer formulation 48 to provide a core-layer parison 50 to co-extrusion die 38 as shown in FIG. 3. Co-extrusion die 38 receives the various parisons 42, 46, and 50 and extrudes multi-layer tube 12 having an inner layer 12A, an outer layer 12C, and a core layer 12B located between inner layer 12A and outer layer 12C through an annular aperture 39 as suggested in FIGS. 1 and 3 and shown in FIGS. 4 and 5. Reference is hereby made to U.S. Application Ser. No. 61/869,830, filed Aug. 26, 2013 and titled POLYMERIC MATERIAL FOR CONTAINER and U.S. application Ser. No. 14/331,066, filed Jul. 14, 2014 and titled POLYMERIC MATERIAL FOR CONTAINER for disclosure relating to a core-layer formulation, each of which is hereby incorporated by reference in its entirety.

While extruding operation 102 is shown forming multi-layer tube 12 having three layers, any number of layers may be formed during the extruding operation. Additional layers may include relatively low-density layers, tie layers, thermoplastic polyurethane (TPU), other olefins, combinations thereof, or any other suitable alternatives and combinations.

Once extruding operation 102 is complete and multi-layer tube 12 is provided, container-molding process 100 proceeds to establish multi-layer container 10 using a molding system 52 as shown in FIG. 1. Molding system 52 includes, for example, mold 18 formed to include a mold cavity 54 defined by inner surface 28 of mold 18, a vacuum system 56 configured to provide a vacuum pressure to mold cavity 54 during molding of multi-layer container 10, a blowing system 58 configured to provide pressurized gas 26 to tube space 22, and a trimming system 60 configured to remove excess materials 62, 64 from vessel 30 as shown in FIG. 1.

Figure 2:
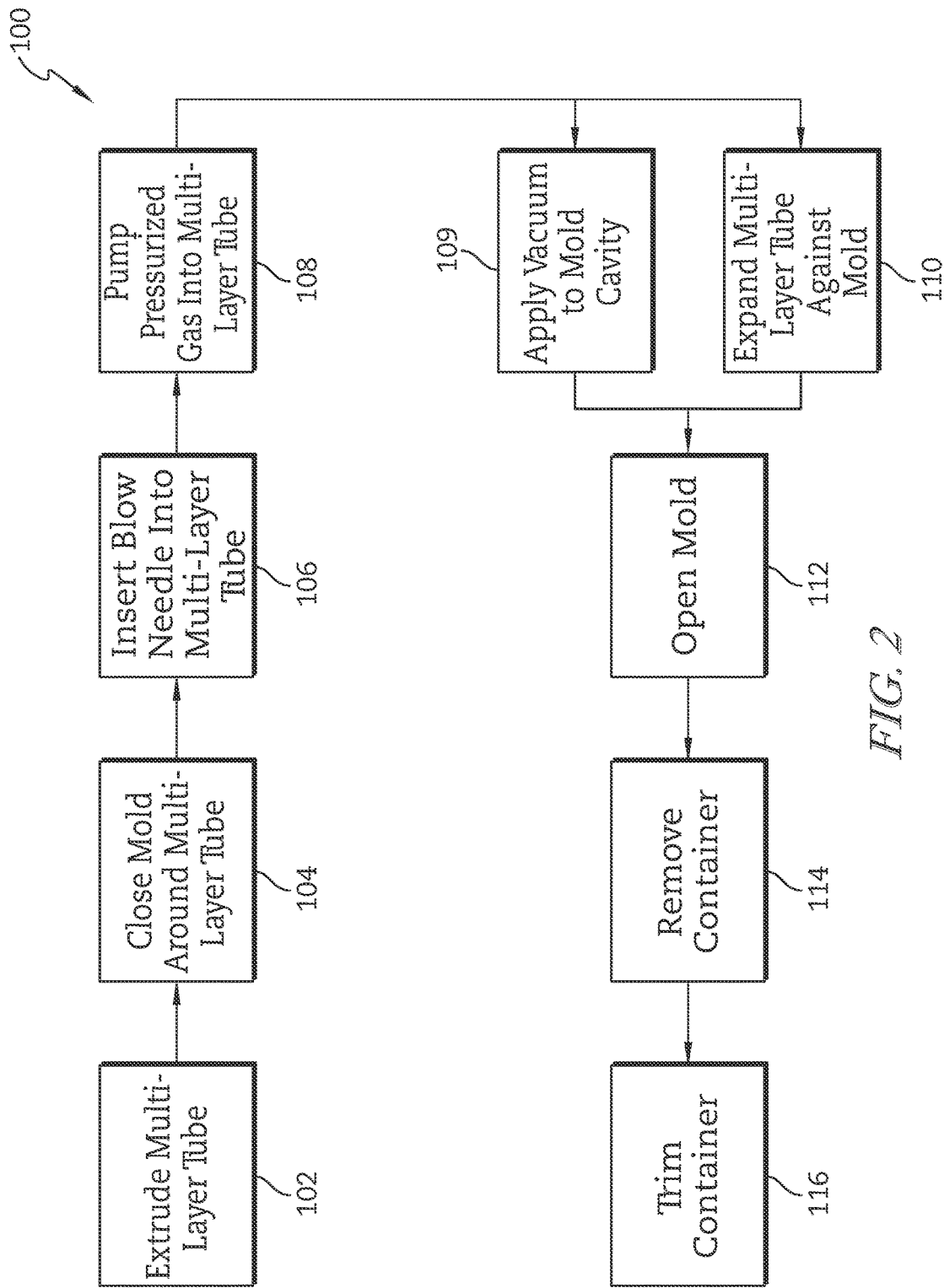

Container-molding process 100 proceeds to closing operation 104 after multi-layer tube 12 has been established as shown in FIGS. 1 and 2. First and second mold halves 18A, 18B included in mold 18 begin in an opened position in which mold halves 18A, 18B are spaced apart from one another as shown in FIG. 1. During closing operation 104, mold halves 18A, 18B move toward one another to achieve a closed position in which multi-layer tube 12 is located in mold cavity 54 formed therebetween. During closing operation 104, a vacuum source 66 included in vacuum system 56 remains off and pressure in mold cavity 54 remains at about atmospheric pressure as measured by a mold-cavity pressure gauge 68 as shown in FIG. 1.

Once mold 18 is in the closed position, container-molding process 100 proceeds to inserting operation 106 as shown in FIGS. 1 and 2. During inserting operation 106, mold 18 moves away from co-extrusion die 38 and aligns with blow needle 20 included in blowing system 58. Blow needle 20 then moves downwardly through mold 18 into tube space 22 included in multi-layer tube 12 as shown in FIGS. 1 and 2. At the same time, vacuum source 66 is turned on causing pressure in mold cavity 54 to decrease to $P_{VAC}$ which is below atmospheric pressure. Vacuum is applied at a pressure in a range of about 5 inches Hg to about 30 inches Hg, about 10 inches Hg to about 30 inches Hg, about 10 inches Hg to about 25 inches Hg, about 15 inches Hg to about 25 inches Hg, about 20 inches Hg to about 25 inches Hg, about 15 inches Hg to about 20 inches Hg, or about 10 inches Hg to about 15 inches Hg. In another example vacuum is applied at a pressure of about 20 inches Hg. As a result, $P_{VAC}$ is greater than the vacuum applied and less than atmospheric pressure. $P_{VAC}$ may be in a range of about 5 inches Hg to about 30 inches Hg. In another example, $P_{VAC}$ is in a range of about 10 inches Hg to about 20 inches Hg. In still yet another example, $P_{VAC}$ is about 10 inches Hg.

As a result of blow needle 20 being inserted into tube space 22, pressurized gas (e.g., air) provided by a source 70 of pressurized gas 26 included in blowing system 58 may be communicated into tube space 22 to expand a size of multi-layer tube 12 in subsequent operations. However, during inserting operation 106, source 70 of pressurized gas 26 is turned off and pressure in tube space 22 is measured by a tube pressure gauge 72 to be at about atmospheric pressure ($P_{ATM}$). Pressurized gas may be, for example, standard air, nitrogen, carbon dioxide, combinations thereof, or any other suitable alternative.

After blow needle 20 has been inserted into tube space 22, container-molding process 100 proceeds to pumping operation 108 as shown in FIGS. 1 and 2. During pumping operation 108, source 70 of pressurized gas 26 is turned on and pressure inside tube space 22 increases to a relatively higher pressure ($P_{BLOW}$). In one example, $P_{BLOW}$ is in a range of about 30 pounds per square inch and about 120 pounds per square inch. In another example, $P_{BLOW}$ is in a range of about 10 pounds per square inch to about 130 pounds per square inch. In yet another example, $P_{BLOW}$ is in a range of about 35 pounds per square inch to about 45 pounds per square inch. In still yet another example, $P_{BLOW}$ is about 40 pounds per square inch. In one example, $P_{BLOW}$ is in one of the following ranges: about 40 pounds per square inch to about 120 pounds per square inch, about 50 pounds per square inch to about 120 pounds per square inch, about 60 pounds per square inch to about 120 pounds per square inch, about 70 pounds per square inch to about 120 pounds per square inch, about 40 pounds per square inch to about 100 pounds per square inch, about 50 pounds per square inch to about 100 pounds per square inch, about 60 pounds per square inch to about 100 pounds per square inch, about 70 pounds per square inch to about 100 pounds per square inch. In another illustrative example, source 70 of pressurized gas 26 may be configured to deliver pressurized gas 26 at a temperature to tube space 22. In one example, the temperature is in a range of about 33 degrees Fahrenheit to about 75 degrees Fahrenheit. In one example, the temperature is in a range of about 35 degrees Fahrenheit to about 75 degrees Fahrenheit. In another example, the temperature is in a range of about 40 degrees Fahrenheit to about 70 degrees Fahrenheit. In yet another example, the temperature is in a range of about 50 degrees Fahrenheit to about 75 degrees Fahrenheit. In another example, the temperature is about room temperature. In another example, the temperature is about 40 degrees Fahrenheit. In still yet another example, the temperature is about 50 degrees Fahrenheit.

Figure 11:
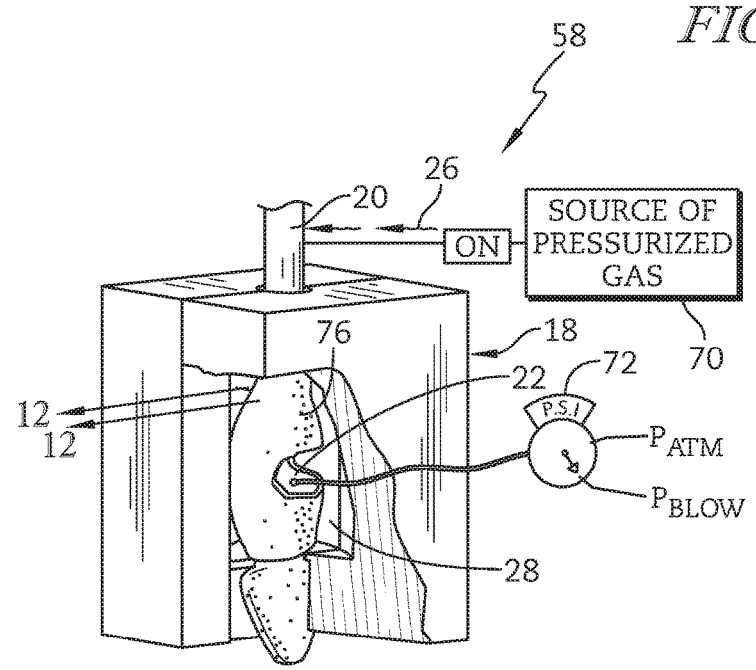
FIG. 11 is view similar to FIG. 9 showing the mold and multi-layer tube during the expanding operation in which the source of pressurized gas has been turned on causing pressure in the tube space to increase to $P_{BLOW}$ which is above atmospheric pressure so that the multi-layer tube expands outwardly toward the inner surface of the mold.
Figure 12:
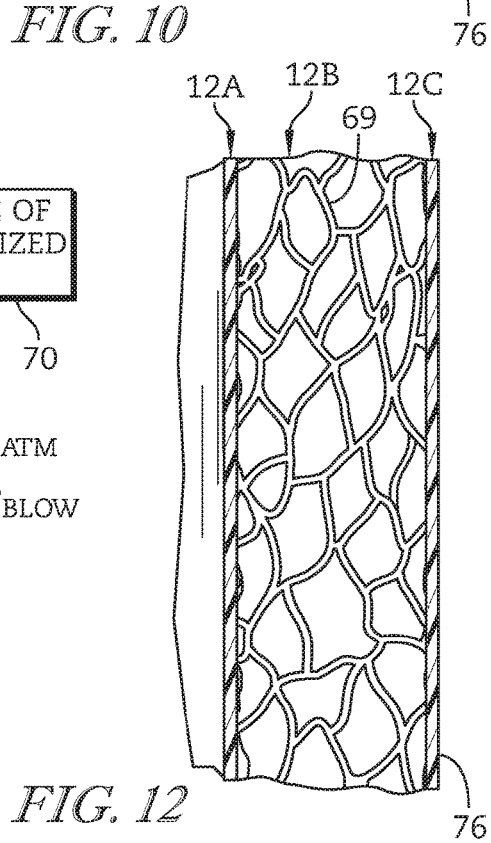
FIG. 12 is a view similar to FIG. 10 taken along line 12-12 of FIG. 11 showing that during the expanding operation, the plurality of expanded cells remain intact in the core layer so that the density of the vessel is minimized.

After pressurized gas 26 has begun to enter tube space 22 through blow needle 20, container-molding process 100 proceeds to both vacuuming operation 109 and expanding operation 110 as shown in FIGS. 1 and 2. During vacuuming operation 109, vacuum is applied to mold cavity 54. At the same time vacuuming operation 109 is ongoing, expanding operation 110 commences. During expanding operation 110, pressurized gas 26 continues to flow through blow needle 20 causing multi-layer tube 12 to expand and engage inner surface 28 of mold 18 and fill mold cavity 54 as suggested in FIG. 1 and FIG. 11. Expanding operation 110 is complete once multi-layer tube 12 has substantially the same shape as mold cavity 54. While expanding operation 110 is ongoing, vacuum source 66 remains on and pressure in mold cavity 54 remains below atmospheric pressure to minimize collapse and damage of expanded cells 69 included in core layer 12B of multi-layer tube 12 as shown in FIG. 12.

Figure 8A:
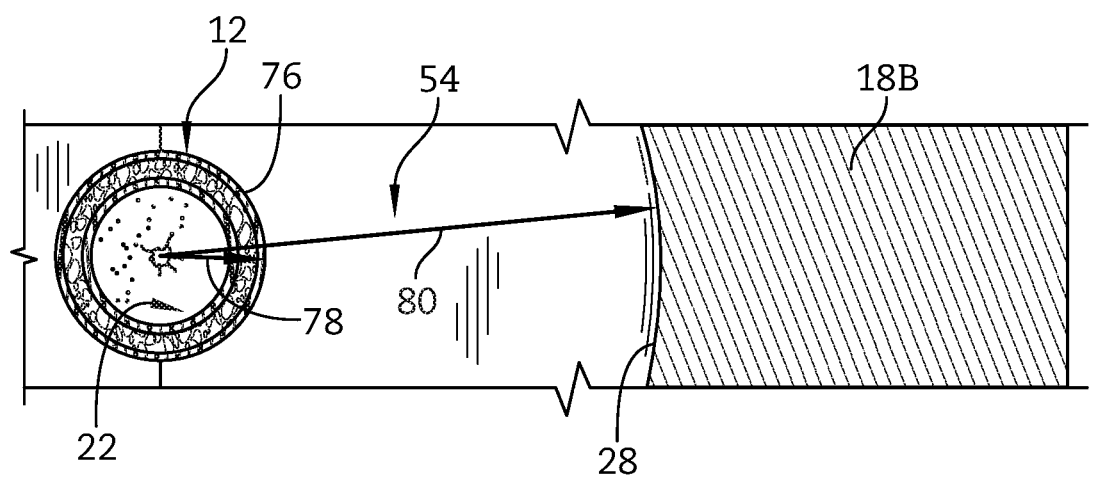
FIG. 8A is a sectional view taken along line 8A-8A of FIG. 1 showing that prior to the blowing operation, the multi-layer tube has an outer tube surface which establishes a pre-form radius and an inner surface of the mold has a relatively greater mold radius.
Figure 8B:
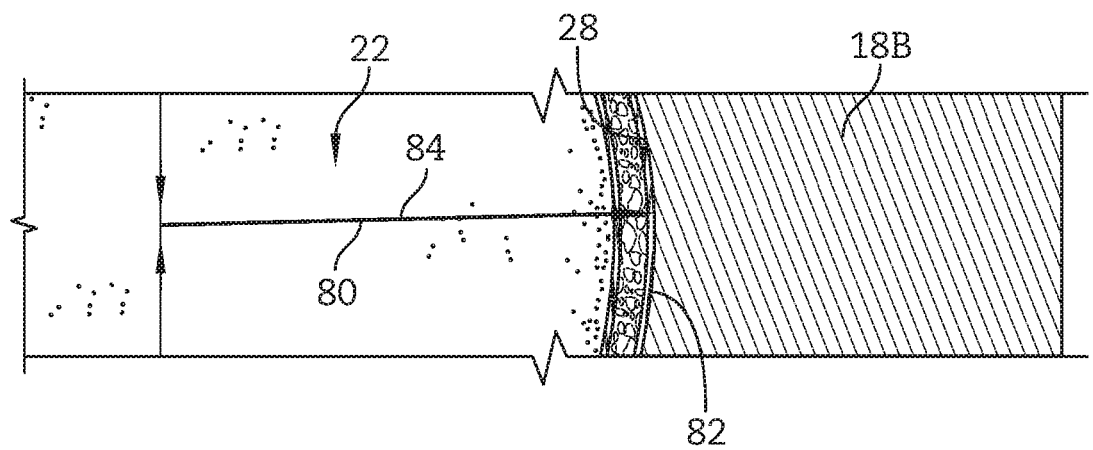
FIG. 8B is a view similar to FIG. 8A taken along line 8B-8B of FIG. 1 showing that the multi-layer tube has expanded to engage the inner surface of the mold after the expanding operation is complete and that the vessel includes an outer container surface which establishes a relatively greater container radius which is about equal to the mold radius.
Figure 9:
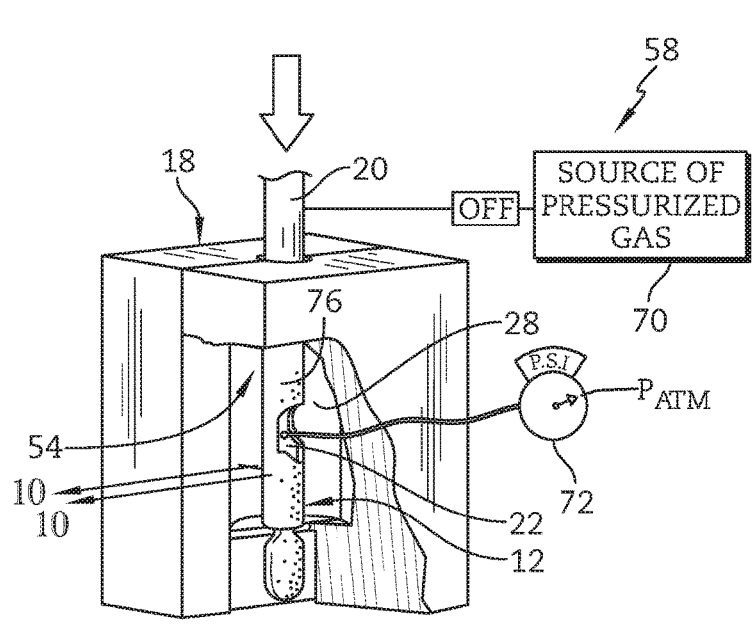
FIG. 9 is a view similar to FIG. 7 showing the mold and multi-layer tube after the inserting operation in which the blow needle is inserted through the mold and into the tube space of the multi-layer tube and that a pressurized source of gas is turned off so that a pressure in the space is about atmospheric.
Figure 10:
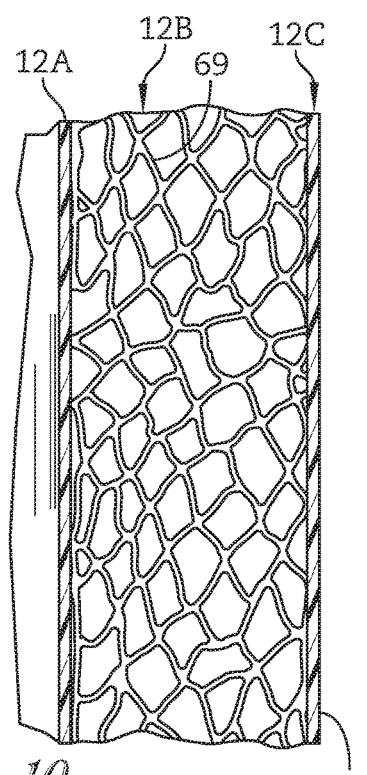
FIG. 10 is a sectional view taken along line 10-10 of FIG. 9 showing that prior to the blowing operation, the core layer of the multi-layer tube includes a plurality of expanded cells filled with gas which cause a density of the core layer to be minimized so that a density of the of the multi-layer container is also minimized.

Pumping operation 108, vacuuming operation 109, and expanding operation 110 cause multi-layer tube 12 to expand from a pre-expansion shape as shown in FIGS. 8A and 9 to a post-expansion shape shown in FIGS. 1 and 8B which is substantially similar to a shape of vessel 30. An outer tube surface 76 of multi-layer tube 12 has a pre-form radius 78 as shown in FIG. 8A. Inner surface 28 of mold 18 has a relatively greater mold radius 80 as shown in FIG. 8A. As shown, for example, in FIG. 8B, vessel 30 has an outer container surface 82 which has a relatively greater container radius 84. Relatively greater container radius 84 is about equal to relatively greater mold radius 80 after expanding operation 110 is complete.

In another example, vacuuming operation 109 uses a two-stage process. In a first stage, an initial vacuum is applied to mold 18. Alternatively, the initial vacuum can be applied to a valve that would control two separate vacuum circuits. In a second stage, mold 18 would close around multi-layer tube 12 and the vacuum would be timed to maximize multi-layer container 10 geometry and thickness.

Mold 18 can include vacuum holes located extending through the mold 18 and inner surface 28 to open into mold cavity 54. For example, vacuum holes could be located about every 5 degrees off of the parting line location. Alternatively, a vacuum could be pulled through a Porcerax material included in mold 18. In another example, portions of mold 18 are formed of Porcerax material and are self-venting. Illustratively, portions of mold 18 that form neck 92 can be formed of Porcerax. The two-stage process would time the vacuum so it could form different parts of the bottle at different times during vacuum operation 109 and expanding operation 110.

In another example, the two-stage vacuum system would have vacuum lines connected to two separate vacuum channels located in specific areas of mold 18 that would be determined based on feature locations and multi-layer bottle 10 geometries. These vacuum lines would then be sent to a valve that controls what circuit to apply vacuum and when to apply vacuum. Applying a vacuum to hard to mold areas can decrease the amount of blow air required to form certain geometries.

A blow-up ratio for mold 18 and multi-layer tube 12 is calculated by dividing mold radius 80 by pre-form radius 78. In one example, the blow-up ratio is in a range of about 1 to about 3. In another example, the blow-up ratio is in a range of about 1.5 to about 2. In still yet another example, the blow-up ratio is about 2. The blow-up ratio may be adjusted to suit various sizes of containers.

Alternatively, a blow-up ratio can be described as blow-up percentage. A blow-up percentage for mold 18 and multi-layer tube 12 is calculated by dividing mold radius 80 by pre-form radius 78. In one example, the blow-up percentage is in a range of about 100% to about 300%. In another example, the blow-up percentage is in a range of about 150% to about 200%. In still yet another example, the blow-up percentage is about 200%. The blow-up percentage may be adjusted to suit various sizes of containers.

After expanding operation 110 is complete, vessel 30 is established. Vessel 30 includes multi-layer container 10 and excess material 62 coupled to an upper end of multi-layer container 10 and excess material 64 coupled to a lower end of multi-layer container 10. Container-molding process 100 then proceeds to opening operation 112 as shown in FIGS. 1 and 2. During opening operation 112, source 70 of pressurized gas 26 is turned off and mold 18 moves from the closed position to the opened position as shown in FIG. 1. Vessel 30 is then ready for removal from mold 18 and remains coupled to blow needle 20 as suggested in FIG. 1.

Container-molding process 100 then proceeds to removing operation 114 in which vessel 30 is separated from mold 18 and released from blow needle 20. In one example, source 70 of pressurized gas 26 briefly turns on to blow vessel 30 off of blow needle 20.

Once vessel 30 is separated from mold 18 and blow needle 20, container-molding process 100 proceeds to trimming operation 116. During trimming operation 116, excess material 62, 64 is cut using one or more knives 86 or blades to provide multi-layer container 10 as shown in FIG. 1.

Molding system 52 is used in cooperation with a continuous extrusion process such as extruding operation 102. As suggested in FIG. 1, molding system 52 may be a shuttle blow-molding machine. In this example, mold 18 begins in the opened position and moves on a track toward co-extrusion die 38 to locate multi-layer tube 12 between mold halves 18A, 18B. Mold 18 then moves to the closed position. Mold 18 then slides away from co-extrusion die 38 while another multi-layer tube 12 is extruded. At the same time, inserting operation 106, pumping operation 108, and expanding operation 110 are performed. Opening operation 112 and removing operations 114 are then performed which causes vessel 30 to be ejected from mold 18. Mold 18 is now in the opened position ready to slide back toward co-extrusion die 38 and begin the process again. Reference is hereby made to U.S. Application Ser. No. 61/872,183, filed Aug. 30, 2013 and titled CONTAINER AND PROCESS FOR MAKING THE SAME and U.S. application Ser. No. 14/475,266, filed Sep. 2, 2014 and titled CONTAINER AND PROCESS FOR MAKING THE SAME for disclosure relating to a multi-layer container and a process for making the same, each of which is hereby incorporated by reference in its entirety.

In one example, molding machine 52 is a shuttle blow-molding machine available from Graham Engineering Corporation of York, Pa. In another example of a shuttle blow-molding machine, more than one mold may be used to minimize cycle time and increase an extrusion rate of co-extrusion system 16.

In another example, molding machine 52 may be a rotary blow molding machine. In this example, a continuous multi-layer tube is extruded and a series of molds included in the rotary blow-molding machine rotate relative to the multi-layer tube. As molds approach co-extrusion die 38 forming the multi-layer tube 12, they begin to move from an opened arrangement to a closed arrangement trapping a portion of the multi-layer tube 12 in a mold cavity formed in the mold. As the molds move away from the co-extrusion die forming the multi-layer tube, pressurized gas is injected in the tube space expanding the multi-layer container. The molds then move from the closed position to an opened position where the vessel 30 is ejected from the mold cavity. One example of a rotary extrusion blow-molding machine is available from Wilmington Machinery of Wilmington, N.C.

Container-molding process 100 has a cycle time which is an amount of time between closing operation 104 and opening operation 112. This cycle time is the same whether molding machine 52 is a shuttle blow-molding machine or a rotary extrusion blow-molding machine. Multi-layer containers 10 including core layer 10B made from relatively low-density insulative cellular non-aromatic polymeric material may have decreased cycle time due to reduced mass of the container resulting from the use of core-layer 10B.

In one example, the cycle time for container-molding process 100 and multi-layer container 10 on a shuttle blow-molding machine is in a range of about 5% to about 40% faster than molding operations and containers lacking a layer made from relatively low-density insulative cellular non-aromatic polymeric material. However, it is believed that similar cycle time improvements also occur when using a rotary extrusion blow-molding machine. In another example, cycle time may be in a range of about 5% to about 30% faster than molding operations and containers lacking a layer made from relatively low-density insulative cellular non-aromatic polymeric material. The cycle time of container-molding process 100 and multi-layer container 10 was about 16 seconds.

In one example, cycle time is about 14 second, about 15 seconds, or about 16 seconds. In another embodiment, cycle time is one of the following ranges: about 10 seconds to about 20 seconds, about 10 seconds to about 17 seconds, about 10 seconds to about 15 seconds, about 12 seconds to about 20 seconds, about 12 seconds to about 17 seconds, about 12 seconds to about 15 seconds, about 14 seconds to about 20 seconds, about 14 seconds to about 17 seconds, about 14 seconds to about 15 seconds, about 14 seconds to about 16 seconds, about 14 seconds to about 15 seconds, or about 15 seconds to about 16 seconds. Container-molding process 100 uses multi-layer tube 12 to establish multi-layer container 10 as shown, for example, in FIGS. 1 and 13.

Multi-layer container 10 includes an inner layer 10A, an outer layer 10C, and a core layer 10B located extending between and interconnecting inner layer 10A and outer layer 10C, as shown in FIG. 14. In an example, each layer 10A, 10B, 10C is formed from inner layer 12A, core layer 12B, and outer layer 12C of multi-layer tube 12 during container-molding process 100. For example, inner layer 10A may be formed from inner layer 12A, core layer 10B may be formed from core layer 12B, and outer layer 10C may be formed from outer layer 12C.

Multi-layer container 10 includes a floor 88, a side wall 90, and neck 92 as shown in FIG. 13. Side wall 90 is relatively straight and vertical and provides outer container surface 82. Illustratively, outer layer 10C forms outer container surface 82. Floor 88 is coupled to a lower end of side wall 90 and cooperates with side wall 90 to define interior product-storage region 94 therebetween. Neck 92 is coupled to an opposite upper end of side wall 90 and defines an open mouth 96 that is arranged to open into interior product-storage region 94. Neck 92 has a neck radius 98 which is relatively smaller than container radius 84 as shown in FIG. 13.

Multi-layer container 10 was subjected to a series of performance tests which include drop testing, top load testing, rigidity testing, and metrology testing. Drop testing determines a likelihood of container survival due to a drop or impact to the container. Top load testing determines how much force a container can withstand before the container fails or necks in to form an hourglass shape. Rigidity testing determines how resistant containers are to deformation. Metrology testing determines dimensions of multi-layer container 10 in comparison to specifications for the container.

Multi-layer container 10 was subjected to drop testing according to one of the Plastic Bottle Institute Test for Drop Impact Resistance of Plastic Bottles, PBI 4-1968, Rev. 2-1988 test method and the Rigid Plastics Container Division of the Society of Plastics Industry, Inc. RPCD-7-1991 test method. Various runs of multi-layer container 10 were tested according to Rigid Plastics Container Division of the Society of Plastics Industry, Inc. RPCD-7-1991 test method and the results are shown below in Table 1. In some embodiments, the rigidity of the multi-layer container is from about 0.8 kg-F to about 1.9 kg-F.

In another example, the drop test may be performed according to the following procedure. The container is filled with water and closed off with, for example, a lid. The sample container is then held at about 73 degrees Fahrenheit (22.8 degrees Celsius) and about 50% relative humidity. The filled, capped containers are then subjected to the following procedure: (a) the filled, capped container is located at about five feet above a hard surface such as concrete or tile; (b) the filled, capped container is then oriented such that a bottom of the filled, capped container is arranged to lie in a substantially parallel relation to the hard surface; (c) each of ten capped, filled containers are dropped; (d) upon impact, each filled, capped container is examined for any break or shattering of the wall that causes water to leak out of the bottle; and (d) the total number of bottles showing any sign of leakage after the drop test are counted as failures. Results for various different trial runs of multi-layer container 10 are shown below in Table. 1.

TABLE 1

Drop Test Results for Various Multi-Layer Containers

| Trial Run Number | Failure Quantity | Total Quantity Tested |
|---|---|---|
| 1 | 3 | 5 |
| 2 | 5 | 5 |
| 3 | 3 | 5 |
| 4 | 3 | 5 |
| 5 | 5 | 5 |
| 6 | 4 | 5 |
| 7 | 4 | 5 |
| 8 | 4 | 5 |
| 9 | 4 | 5 |
| 10 | 2 | 5 |
| 11 | 4 | 5 |
| 12 | 4 | 5 |
| 13 | 5 | 5 |
| 14 | 5 | 5 |
| 15 | 4 | 5 |
| 16 | 5 | 5 |

Various multi-layer containers 10 were also subjected to top load testing. An Instron tester 202 is used to determine top load performance as suggested in FIG. 15. Multi-layer containers 10 were tested until they failed or necked in to form an hourglass shape. Once failure or necking was observed, the value shown on Instron tester 202 was recorded. Table 2 shows the performance of several multi-layer containers including compressed core layer 10B tested vs. several high density polyethylene containers (excluding a core layer). Both types of containers had a total mass of about 56 grams.

TABLE 2

Top Load Test Results for Various Multi-Layer Containers

| Trial Run Number | Average Collapse Force (pounds-Force) | Percent Improvement over X1 |
|---|---|---|
| X1* | 108.85 | N/A |
| 1 | 133.77 | 23% |
| 2 | 148.68 | 37% |
| 3 | 131.65 | 21% |
| 4 | 140.12 | 29% |
| 5 | 140.93 | 29% |
| 6 | 145.11 | 34% |
| 7 | 145.96 | 34% |
| 8 | 115.25 | 6% |
| 9 | 118.46 | 9% |
| 14 | 131.16 | 20% |
| 15 | 132.32 | 22% |
| 16 | 144.45 | 33% |
| 17 | 169.2 | 55% |

TABLE 2-continued

Top Load Test Results for Various Multi-Layer Containers

| Trial Run Number | Average Collapse Force (pounds-Force) | Percent Improvement over X1 |
|---|---|---|
| 18 | 133.6 | 23% |
| 19 | 152.4 | 40% |
| 20 | 121.04 | 11% |

*High density polyethylene container lacking a core layer made from relatively low-density insulative cellular non-aromatic polymeric material Various types of multi-layer containers 10 in accordance with the present disclosure survived top loads in a range of about 115 pounds-Force to about 170 pounds-Force. In another example, various types of multi-layer containers 10 in accordance with the present disclosure performed about 6% to about 55% better than comparable containers lacking the core layer.

Various multi-layer containers 10 in accordance with the present disclosure were subjected to rigidity testing. Each multi-layer container was placed in a rigidity tester as shown in FIG. 16 and tested to determine rigidity as shown below in Table 3. Testing involves placing a multi-layer container 10 in a rigidity tester 300 as shown in FIG. 16 in two orientations. The rigidity tester includes a stationary cylindrical stop 302 on a left side and a movable anvil 304 and force gauge 306 on a right side. The movable anvil is generally T-shaped as shown in FIG. 16. For each orientation, side wall 90 of multi-layer container 10 is deformed about midway between floor 88 and neck 92 of multi-layer container 10. Side wall 90 is deformed about 0.25 inches over a 10 second interval and the force required to do so is recorded in pounds-Force. The first orientation places a mold seam of multi-layer container in alignment to engage movable anvil 304 (0 Degrees). The second orientation rotates multi-layer container 10 so that the seam is about 90 degrees away from the movable anvil (90 Degrees).

Various multi-layer containers 10 were also subjected to metrology measurements to determine accuracy and repeatability of container-molding process 100 to manufacture multi-layer containers 10 to specification. Table 4 below shows a neck diameter 204 measured at different points along a multi-layer container for several multi-layer containers along with the specified values and limits for each multi-layer container. The measurements were taken at 0 degrees (part line of the mold), 90 degrees (counter-clockwise from the part line), 45 degrees (counter-clockwise from the part line), 135 degrees (counter-clockwise from the part line), average neck diameter, and ovality of the neck. Ovality is the difference between highest and lowest neck diameter measurements.

TABLE 3

Rigidity Test Results for Various Multi-Layer Containers

| Trial Run Number | Sidewall Rigidity - 0 Degrees (pounds-Force) | Sidewall Rigidity - 90 Degrees (pounds-Force) | Sidewall Rigidity - Average (pounds-Force) |
|---|---|---|---|
| X1* | 1.703 | 0.887 | 1.295 |
| 1 | 2.286 | 1.836 | 2.061 |
| 2 | 2.298 | 2.253 | 2.2755 |
| 3 | 2.231 | 1.741 | 1.986 |
| 4 | 2.309 | 1.857 | 2.083 |
| 5 | 2.555 | 1.845 | 2.2 |
| 6 | 2.25 | 1.841 | 2.0455 |

TABLE 3-continued

Rigidity Test Results for Various Multi-Layer Containers

| Trial Run Number | Sidewall Rigidity - 0 Degrees (pounds-Force) | Sidewall Rigidity - 90 Degrees (pounds-Force) | Sidewall Rigidity - Average (pounds-Force) |
|---|---|---|---|
| 7 | 2.424 | 1.904 | 2.164 |
| 8 | 2.421 | 1.928 | 2.1745 |
| 9 | 2.203 | 1.775 | 1.989 |
| X2* | 2.081 | 0.974 | 1.5275 |
| 15 | 2.192 | 1.698 | 1.945 |
| 16 | 2.624 | 2.009 | 2.3165 |
| 17 | 3.029 | 2.551 | 2.79 |
| 18 | 2.765 | 2.434 | 2.5995 |
| 19 | 2.731 | 2.585 | 2.658 |
| 20 | 2.104 | 1.707 | 1.9055 |

*High density polyethylene container lacking a core layer made from relatively low-density insulative cellular non-aromatic polymeric material

TABLE 4

Neck Diameter Values for Various Runs of Multi-Layer Containers

| Trial Run Number | 0 Degree Value (inches) | 90 Degree Value (inches) | 45 Degree Value (inches) | 135 Degree Value (inches) | Average Value (inches) | Ovality |
|---|---|---|---|---|---|---|
| Spec. Dimension | 3.4940 | 3.4940 | 3.4940 | 3.4940 | 3.4940 | .090 Max. |
| Spec. Tolerance | +/−.017 | +/−.017 | +/−.017 | +/−.017 | +/−.017 | |
| 1 | 3.5719 | 3.5605 | 3.4200 | 3.4337 | 3.4965 | 0.1534 |
| 2 | 3.4603 | 3.4181 | 3.4669 | 3.5091 | 3.4636 | 0.0964 |
| 3 | 3.5697 | 3.5657 | 3.4261 | 3.4332 | 3.4987 | 0.1442 |
| 4 | 3.5675 | 3.5667 | 3.4159 | 3.4110 | 3.4903 | 0.1609 |
| 5 | 3.5700 | 3.5671 | 3.4136 | 3.4085 | 3.4898 | 0.1721 |
| 6 | 3.5658 | 3.5636 | 3.4105 | 3.4121 | 3.4880 | 0.1583 |
| 7 | 3.5655 | 3.5729 | 3.4129 | 3.4030 | 3.4886 | 0.1701 |
| 8 | 3.5847 | 3.5599 | 3.3980 | 3.4136 | 3.4890 | 0.1866 |
| 9 | 3.4960 | 3.4951 | 3.5072 | 3.5054 | 3.5009 | 0.0169 |
| 14 | 3.5949 | 3.5315 | 3.3871 | 3.4449 | 3.4896 | 0.2078 |
| 15 | 3.5941 | 3.5441 | 3.3895 | 3.4362 | 3.4910 | 0.2046 |
| 17 | 3.5739 | 3.5332 | 3.3857 | 3.4135 | 3.4766 | 0.1882 |
| 18 | 3.4864 | 3.4774 | 3.4559 | 3.4557 | 3.4689 | 0.0425 |
| 19 | 3.4551 | 3.4126 | 3.4997 | 3.5088 | 3.4690 | 0.1032 |
| 20 | 3.5039 | 3.4888 | 3.4710 | 3.4749 | 3.4846 | 0.0392 |
| 21 | 3.5661 | 3.4777 | 3.4235 | 3.5062 | 3.4934 | 0.1427 |

Various multi-layer containers 10 were subjected to metrology measurements to determine accuracy and repeatability of container-molding process 100 to manufacture multi-layer containers 10 to specification. Table 5 below shows a thread diameter 206 measured at different points along a multi-layer container for several multi-layer containers along with the specified values and limits for each multi-layer container. The measurements were taken at 0 degrees (part line of the mold), 90 degrees (counter-clockwise from the part line), 45 degrees (counter-clockwise from the part line), 135 degrees (counter-clockwise from the part line), average neck diameter, and ovality of the neck. Ovality is the difference between highest and lowest thread diameter measurements.

TABLE 5

Thread Diameter Values for Various Runs of Multi-Layer Containers

| Trial Run Number | 0 Degree Value (inches) | 90 Degree Value (inches) | 45 Degree Value (inches) | 135 Degree Value (inches) | Average Value (inches) | Ovality |
|---|---|---|---|---|---|---|
| Spec. Dimension | 3.3740 | 3.3740 | 3.3740 | 3.3740 | 3.3740 | .090 Max. |
| Spec. Tolerance | +/−.017 | +/−.017 | +/−.017 | +/−.017 | +/−.017 | |
| 1 | 3.4508 | 3.4409 | 3.2993 | 3.3196 | 3.3777 | 0.1528 |
| 2 | 3.3417 | 3.3075 | 3.3447 | 3.3946 | 3.3471 | 0.0954 |
| 3 | 3.4504 | 3.4483 | 3.3063 | 3.3209 | 3.3815 | 0.1455 |
| 4 | 3.4477 | 3.4484 | 3.2963 | 3.2991 | 3.3729 | 0.1566 |
| 5 | 3.4485 | 3.4479 | 3.2946 | 3.2970 | 3.3720 | 0.1652 |
| 6 | 3.4462 | 3.4455 | 3.2911 | 3.3005 | 3.3708 | 0.1573 |
| 7 | 3.4448 | 3.4530 | 3.2942 | 3.2910 | 3.3708 | 0.1644 |
| 8 | 3.4651 | 3.4401 | 3.2785 | 3.3021 | 3.3715 | 0.1867 |
| 9 | 3.3822 | 3.3808 | 3.3840 | 3.3914 | 3.3846 | 0.0133 |
| 14 | 3.4732 | 3.4141 | 3.2679 | 3.3318 | 3.3717 | 0.2054 |
| 15 | 3.4732 | 3.4273 | 3.2706 | 3.3239 | 3.3737 | 0.2026 |
| 17 | 3.4530 | 3.4135 | 3.2667 | 3.3001 | 3.3583 | 0.1863 |
| 18 | 3.3667 | 3.3620 | 3.3333 | 3.3415 | 3.3509 | 0.0422 |
| 19 | 3.3330 | 3.2997 | 3.3778 | 3.3882 | 3.3497 | 0.0954 |
| 20 | 3.3841 | 3.3712 | 3.3483 | 3.3586 | 3.3656 | 0.0384 |
| 21 | 3.4449 | 3.3594 | 3.3025 | 3.3900 | 3.3742 | 0.1423 |

Various multi-layer containers 10 were subjected to metrology measurements to determine accuracy and repeatability of container-molding process 100 to manufacture multi-layer containers 10 to specification. Table 6 below shows various measurements taken for several multi-layer containers 10 along with the specified values and limits for each multi-layer container. The measurements taken were an Overall Height (OAH) of the container, an outside diameter of the side wall taken at 0 degrees (part line of the mold) and 90 degrees (counter-clockwise from the part line), an average outside diameter, ovality of the diameter, weight of the container, OFC. OFC is an overflow capacity of multi-layer container 10 and measured in cubic centimeters (cc).

TABLE 6

Metrology Body Values for Various Runs of Multi-Layer Containers

|  | OAH (inches) | 0 Deg. Value (inches) | 90 Deg. Value (inches) | Average Value (inches) Spec. Dimension | Ovality | Weight (g) | OFC (cc) |
|---|---|---|---|---|---|---|---|
| Trial | 7.5970 | 3.7110 | 3.7110 | 3.7110 Spec. Tolerance | .090 Max. | 80.0000 | 1225.3000 |
| Run Number | +/−.047 | +/−.047 | +/−.047 | +/−.047 |  | +/−3.500 | +/−12.900 |
| 1 | 7.5387 | 3.7282 | 3.6762 | 3.7022 | 0.0520 | 55.5033 | 1217.4150 |
| 2 | 7.5083 | 3.6977 | 3.6602 | 3.6790 | 0.0375 | 55.5000 | * |
| 3 | 7.5518 | 3.7333 | 3.6668 | 3.7001 | 0.0665 | 56.0433 | 1233.1400 |
| 4 | 7.5482 | 3.7303 | 3.6628 | 3.6966 | 0.0675 | 57.2567 | 1224.2700 |
| 5 | 7.5372 | 3.7277 | 3.6534 | 3.6906 | 0.0743 | 57.9767 | 1218.6800 |
| 6 | 7.5415 | 3.7321 | 3.6537 | 3.6929 | 0.0784 | 56.3967 | 1216.5367 |
| 7 | 7.5394 | 3.7301 | 3.6577 | 3.6939 | 0.0724 | 57.5567 | 1210.1567 |
| 8 | 7.5431 | 3.7365 | 3.6518 | 3.6942 | 0.0847 | 56.9300 | 1216.0400 |
| 9 | 7.5814 | 3.7240 | 3.7028 | 3.7134 | 0.0212 | 54.3667 | 1259.6100 |
| 14 | 7.5309 | 3.7276 | 3.6700 | 3.6988 | 0.0576 | 55.4033 | 1212.4733 |
| 15 | 7.5307 | 3.7306 | 3.6666 | 3.6986 | 0.0640 | 56.0200 | 1216.4100 |
| 17 | 7.5197 | 3.7317 | 3.6905 | 3.7111 | 0.0520 | 56.7133 | 1190.3700 |
| 18 | 7.5157 | 3.7132 | 3.7110 | 3.7121 | 0.0754 | 55.7967 | * |
| 19 | 7.5263 | 3.7236 | 3.6370 | 3.6803 | 0.0866 | 56.4967 | 1165.9950 |
| 20 | 7.5438 | 3.7457 | 3.6322 | 3.6890 | 0.1135 | 53.5700 | 1219.2850 |
| 21 | 7.5469 | 3.7351 | 3.6617 | 3.6984 | 0.0734 | 56.8267 | 1222.3133 |

* Value not available as multi-layer container leaked

Various multi-layer containers 10 were subjected to metrology measurements to determine accuracy and repeatability of container-molding process 100 to manufacture multi-layer containers 10 to specification. Table 7 below shows various thicknesses for each inner, outer, and core layer for several multi-layer containers 10. Table 8 shows various layer thicknesses as a percent of a total thickness for each inner, outer, and core layer and a layer distribution between solid (inner and outer layer) and cellular (core layer) for several multi-layer containers 10. In one example, a total solid phase distribution of inner and outer layers is targeted at about 12-15% while a cellular phase distribution is targeted about 85-88% as suggested in Table 8 below. In another example, a total solid phase distribution of inner and outer layers is targeted at about 5-20%, about 5-18%, about 5-15%, about 8-20%, about 8-18%, about 8-15%, about 10-20%, about 10-18%, about 10-15%, about 12-20%, about 12-18%, or about 12-15%, while the cellular phase distribution account for the remaining thickness. In some embodiments, the thickness of the inner layer is about 1 to about 10 mils, about 2 to about 5 mils, about 3 to about 5 mils, about 1 to about 4 mils, about 2 to about 4 mils, about 3 to about 4 mils, about 1 to about 3 mils, or about 2 to about 3 mils. In additional embodiments, the thickness of the outer layer is about 1 to about 10 mils, about 2 to about 5 mils, about 3 to about 5 mils, about 1 to about 4 mils, about 2 to about 4 mils, about 3 to about 4 mils, about 1 to about 3 mils, or about 2 to about 3 mils. In further embodiments, the thickness of the core layer is about 30 to about 80 mils, about 30 to about 70 mils, about 30 to about 60 mils, about 40 to about 80 mils, about 40 to about 70 mils, about 40 to about 60 mils, about 45 to about 45 mils, about 45 to about 70 mils, or about 45 to about 60 mils.

TABLE 7

Layer Thicknesses for Various Runs of Multi-Layer Containers

| Trial Run Number | Inner Layer (mils) | Compressed Core Layer (mils) | Outer Layer (mils) |
|---|---|---|---|
| 1 | 3.6 | 48.8 | 1.6 |
| 2 | 3.0 | 50.6 | 1.9 |
| 3 | 3.6 | 42.2 | 1.6 |
| 4 | 3.7 | 49.3 | 1.3 |
| 5 | 3.9 | 49.3 | 7.9 |
| 6 | 4.4 | 46.8 | 3.6 |
| 7 | 5.9 | 45.5 | 2.1 |
| 8 | 5.1 | 52.2 | 2.1 |
| 9 | 2.7 | 51.5 | 1.7 |
| 14 | 4.1 | 46.1 | 3.4 |
| 15 | 4.4 | 50.4 | 1.9 |
| 17 | 5.4 | 51.4 | 2.9 |
| 18 | 5.6 | 65.6 | 5.0 |
| 19 | 6.7 | 72.3 | 5.8 |
| 20 | 5.9 | 48.1 | 6.4 |
| 21 | 5.4 | 43.6 | 5.1 |

TABLE 8

Layer Analysis for Various Runs of Multi-Layer Containers

| Trial Run Number | Inner Layer (%) | Compressed Core Layer (%) | Outer Layer (%) | Solid Phase Distribution (%) | Cellular Phase Distribution (%) |
|---|---|---|---|---|---|
| 1 | 6.6 | 90.5 | 2.9 | 9.5 | 90.5 |
| 2 | 5.5 | 91.1 | 3.5 | 8.9 | 91.1 |
| 3 | 7.6 | 89.0 | 3.4 | 11.0 | 89.0 |
| 4 | 6.9 | 90.8 | 2.3 | 9.2 | 90.8 |
| 5 | 6.4 | 80.7 | 12.9 | 19.3 | 80.7 |
| 6 | 8.0 | 85.4 | 6.6 | 14.6 | 85.4 |
| 7 | 11.0 | 85.0 | 3.9 | 15.0 | 85.0 |
| 8 | 8.6 | 87.9 | 3.5 | 12.1 | 87.9 |
| 9 | 4.8 | 92.1 | 3.1 | 7.9 | 92.1 |

TABLE 8-continued

Layer Analysis for Various Runs of Multi-Layer Containers

| Trial Run Number | Inner Layer (%) | Compressed Core Layer (%) | Outer Layer (%) | Solid Phase Distribution (%) | Cellular Phase Distribution (%) |
|---|---|---|---|---|---|
| 14 | 7.7 | 86.0 | 6.3 | 14.0 | 86.0 |
| 15 | 7.8 | 88.9 | 3.3 | 11.1 | 88.9 |
| 17 | 9.0 | 86.1 | 4.9 | 13.9 | 86.1 |
| 18 | 7.4 | 86.0 | 6.6 | 14.0 | 86.0 |
| 19 | 7.9 | 85.3 | 6.9 | 14.7 | 85.3 |
| 20 | 9.7 | 79.6 | 10.6 | 20.4 | 79.6 |
| 21 | 9.9 | 80.7 | 9.4 | 19.3 | 80.7 |

Multi-layer container 10 is made using container-molding process 100 which begins with an extruding operation 102 as shown in FIGS. 1-3. Extruding operation 102 includes several stages that each comprise several operations which cooperate to provide multi-layer tube 12. As suggested in FIG. 3, extruding operation 102 includes a preparing stage 102A in which various material formulations are prepared and provided to each associated extruder to provide the associated layer of multi-layer tube 12. Extruding operation 102 further includes an extrusion stage 102B in which the various formulations are processed by associated extruders to provide associated parisons which are communicated to co-extrusion die 38 as shown in FIGS. 1 and 3. Finally, extruding operation 102 ends with a co-extruding stage 102C in which the various parisons are aligned and co-extruded together to establish multi-layer tube 12.

As suggested in FIG. 3, preparing stage 102A of extruding operation 102 includes a first preparing operation 102A1 in which an inner-layer formulation 40 is prepared and provided to inner-layer extruder 32 as shown in FIG. 3. In one example, inner-layer formulation 40 comprises at least one polymeric material. The polymeric material may include one or more resins. In one example, inner-layer formulation 40 includes a relatively high-density polymeric material. In another example, inner-layer formulation 40 comprises relatively high-density polymeric material. In yet another example, inner-layer formulation 40 is FORMOLENE® HB5502F HDPE hexene copolymer (available from Formosa Plastics Corporation). In another example, inner-formulation 40 comprises Chevron Phillips MARLEX® HHM 5502 BN.

In another example, inner-layer formulation 40 comprises a relatively high-density polymeric material and a colorant. The relatively high-density polymeric material may be FORMOLENE® HB5502F HDPE hexene copolymer (available from Formosa Plastics Corporation) and the colorant may be COLORTECH® 11933-19 Titanium Oxide Colorant (available from COLORTECH® a PPM Company).

Preparing stage 102A of extruding operation 102 further includes a second preparing operation 102A2. During second preparing operation 102A2, outer-layer formulation 44 is prepared and provided to outer-layer extruder 34 as shown in FIG. 3. In one example, outer-layer formulation 44 comprises at least one polymeric material. The polymeric material may include one or more resins. In one example, inner-layer formulation 40 includes a relatively high-density polymeric material. In another example, outer-layer formulation 44 comprises relatively high-density polymeric material. In yet another example, outer-layer formulation 44 is FORMOLENE® HB5502F HDPE hexene copolymer (available from Formosa Plastics Corporation). In another example, outer-layer formulation 44 comprises DOW DMDA 6400 NT7.

In another example, outer-layer formulation 44 comprises a relatively high-density polymeric material and a colorant. The relatively high-density polymeric material may be FORMOLENE® HB5502F HDPE hexene copolymer (available from Formosa Plastics Corporation) and the colorant may be COLORTECH® 11933-19 Titanium Oxide Colorant (available from COLORTECH® a PPM Company).

In some examples, inner-layer formulation 40 and outer-layer formulation 44 may be the same. In other examples, inner-layer formulation 40 and outer-layer formulation 44 may be different. In still yet other example, additional layers may be included and configured to be an oxygen barrier such as Ethylene Vinyl Alcohol (EVOH), a ultra-violet light barrier, and the like. The additional layers or alternative layers may include other relatively low-density layers, tie layers, TPU layers, other olefins, combinations thereof, or any other suitable combinations and alternatives.

Preparing stage 102A of extruding operation 102 further includes a third preparing operation 102A3 in which core-layer formulation 48 is prepared and provided to core-layer extruder 36 as shown in FIG. 3. Core-layer formulation 48 is an insulative cellular non-aromatic polymeric material. Reference is hereby made to U.S. application Ser. No. 14/331,066, filed Jul. 14, 2014 and titled POLYMERIC MATERIAL FOR CONTAINER, for disclosure relating to possible material formulations which is hereby incorporated by reference in its entirety.

Figure 5:
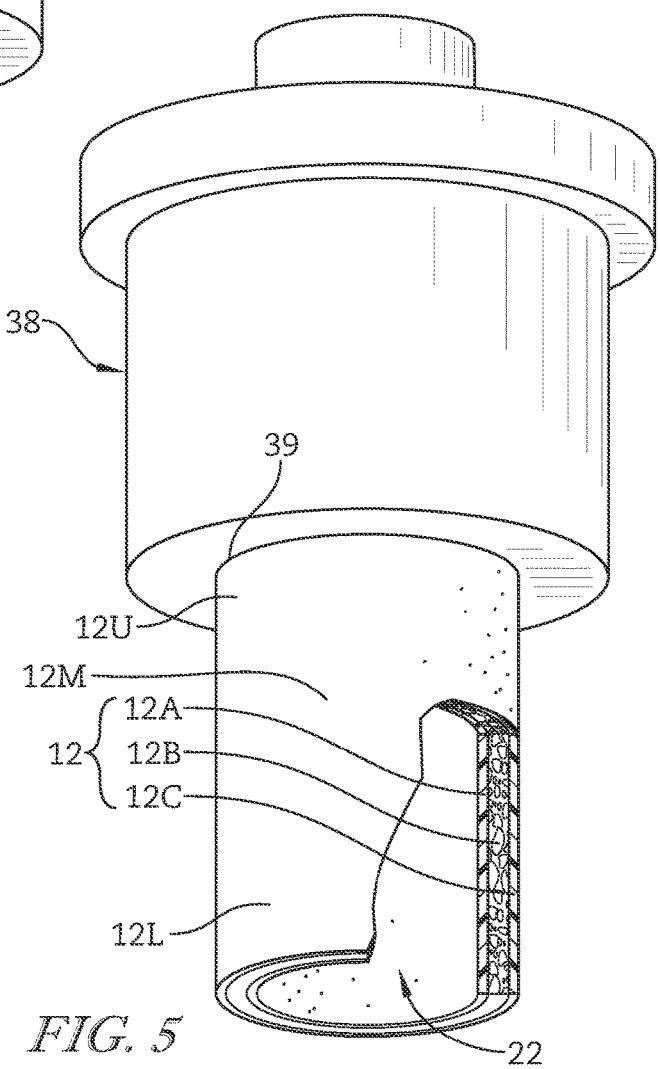
Figure 6:
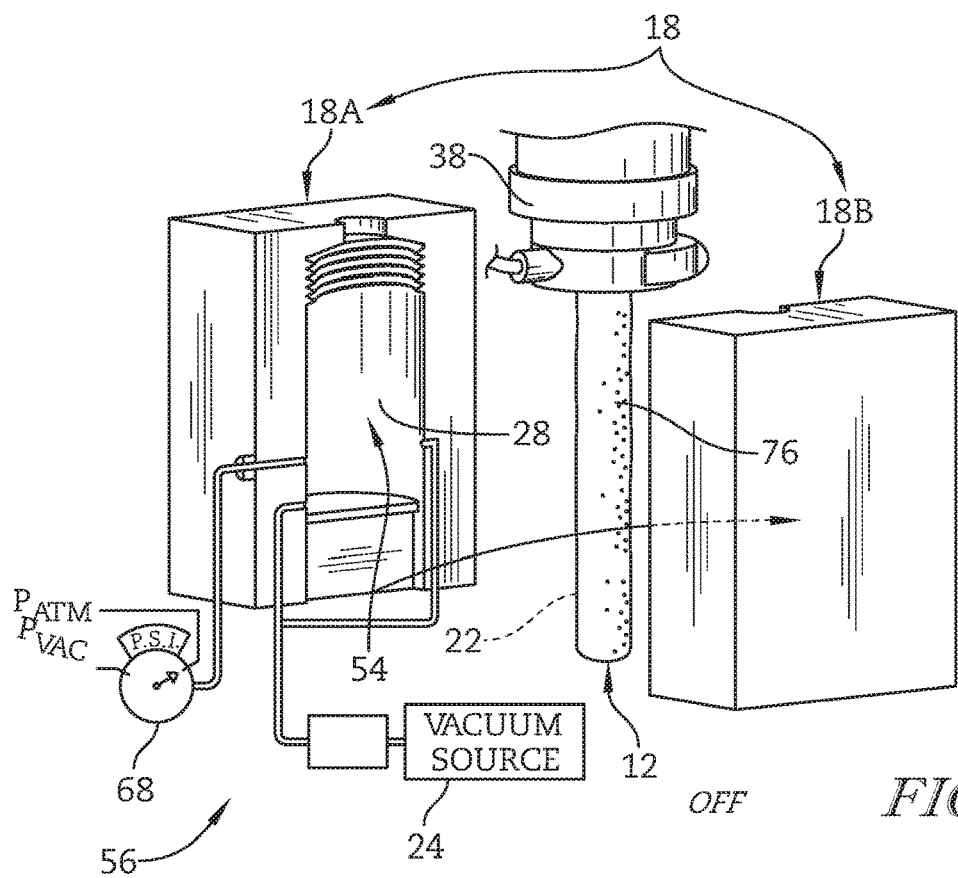
FIG. 6 is an enlarged partial perspective view of FIG. 1 showing that prior to the closing operation, the multi-layer tube is located between two mold halves and that a vacuum source coupled to the mold is turned off so that atmospheric pressure exists in a mold cavity formed between the two mold halves when the mold is in a closed position.
Figure 7:
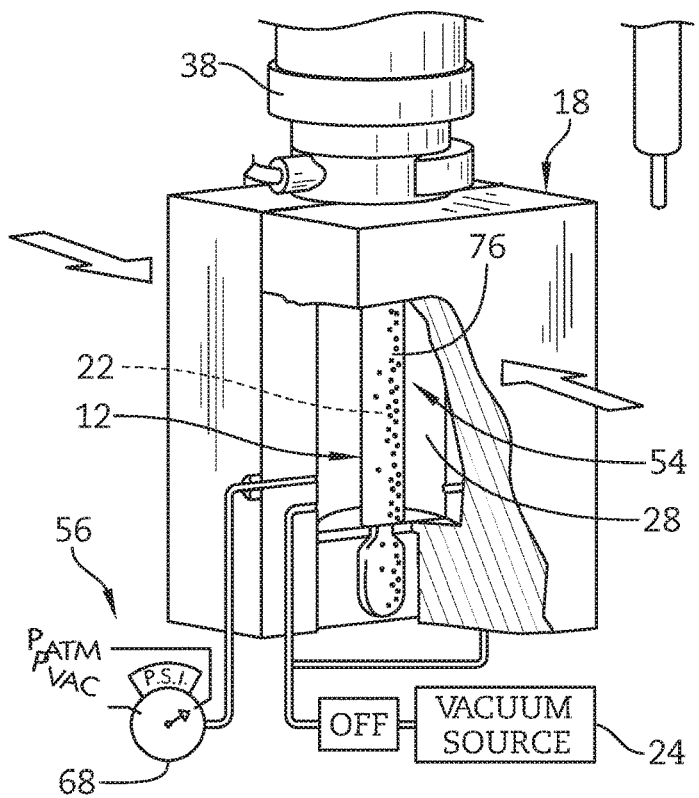
FIG. 7 is an enlarged partial perspective view of FIG. 1 showing that after the closing operation, the two halves of the mold combine to close off and seal the bottom of the multi-layer tube.

Multi-layer tube 12 has an upper portion 12U, a lower portion 12L, and a middle portion 12M extending between and interconnecting the upper portion 12U and the lower portion 12L, as shown in FIG. 5. Each of the upper portion 12U, the lower portion 12L, and the middle portion 12M have a width that is transverse to the direction of tube formation. In an example, each of lower portion 12L, middle portion 12M and lower portion 12L have the same width.

In another embodiment, a multi-layer tube 412 has an upper portion 412U, a lower portion 412L, and a middle portion 412M extending between and interconnecting the upper portion 412U and the lower portion 412L, as shown in FIG. 25. In an example, multi-layer tube 412 has a non-uniform profile C1. Each of the upper portion 412U, the lower portion 412L, and the middle portion 412M have a width that is transverse to the direction of tube formation, as shown in FIG. 25. The width of upper portion 412U is generally the same as the width of middle portion 412M. The width of lower portion 412L is generally greater than the width of upper portion 412U and middle portion 412M.

In another embodiment, a multi-layer tube 512 has an upper portion 512U, a lower portion 512L, and a middle portion 512M extending between and interconnecting the upper portion 512U and the lower portion 512L, as shown in FIG. 26. In an example, multi-layer tube 512 has a non-uniform profile C2. Each of the upper portion 512U, the lower portion 512L, and the middle portion 512M have a width that is transverse to the direction of tube formation, as shown in FIG. 26. The width of upper portion 512U is generally the same as the width of lower portion 410L. The width of middle portion 512M is generally less than the width of upper portion 512U and lower portion 512L.

Parison cell counting is a method to measure the quality of the foam of the extruded material from co-extrusion process 100. The extruded material, for example a multi-layer tube 12, 412, 512, is cut in cross sections and viewed with microscopy. The number of cells are counted in a given unit volume, for example cubic inches. In an example, a square of a sample to be subjected to the parison cell counting method is cut from multi-layer tube 12, 412, 512. The excised square of the multi-layer tube 12, 412, 512 is then divided by cutting across the diagonal exposing the underlying cell structure. The cells are then visualized using microscopy and counted to give a cell density.

The cell density measured using the parison cell counting method may be one of several different values or fall within one of several different ranges. It is within the scope of the present disclosure to select a density to be one of the following values: about $0.9 \times 10^6$ cells/in$^3$, about $0.95 \times 10^6$ cells/in$^3$, about $1 \times 10^6$ cells/in$^3$, about $1.2 \times 10^6$ cells/in$^3$, about $1.4 \times 10^6$ cells/in$^3$, about $1.6 \times 10^6$ cells/in$^3$, about $1.7 \times 10^6$ cells/in$^3$, about $1.8 \times 10^6$ cells/in$^3$, about $1.9 \times 10^6$ cells/in$^3$, about $2 \times 10^6$ cells/in$^3$, about $2.1 \times 10^6$ cells/in$^3$, about $2.2 \times 10^6$ cells/in$^3$, about $2.3 \times 10^6$ cells/in$^3$, about $2.4 \times 10^6$ cells/in$^3$, about $2.5 \times 10^6$ cells/in$^3$, about $2.6 \times 10^6$ cells/in$^3$, about $2.7 \times 10^6$ cells/in$^3$, about $2.8 \times 10^6$ cells/in$^3$, about $2.9 \times 10^6$ cells/in$^3$, about $3 \times 10^6$ cells/in$^3$, about $3.1 \times 10^6$ cells/in$^3$, about $3.2 \times 10^6$ cells/in$^3$, and about $3.5 \times 10^6$ cells/in$^3$. It is within the scope of the present disclosure to select a density to be within one of the following ranges: about $0.9 \times 10^6$ cells/in$^3$ to about $3.5 \times 10^6$ cells/in$^3$, about $1 \times 10^6$ cells/in$^3$ to about $3.5 \times 10^6$ cells/in$^3$, about $1 \times 10^6$ cells/in$^3$ to about $3.2 \times 10^6$ cells/in$^3$, about $1 \times 10^6$ cells/in$^3$ to about $3 \times 10^6$ cells/in$^3$, about $1.2 \times 10^6$ cells/in$^3$ to about $3 \times 10^6$ cells/in$^3$, about $1.2 \times 10^6$ cells/in$^3$ to about $2.8 \times 10^6$ cells/in$^3$ about $1.2 \times 10^6$ cells/in$^3$ to about $2.5 \times 10^6$ cells/in$^3$ and about $1.2 \times 10^6$ cells/in$^3$ to about $2.2 \times 10^6$ cells/in$^3$.

In one example, core-layer formulation 48 comprises a polyethylene base resin and one or more cell-forming agents. Core-layer formulation 48 uses a polyethylene-based formulation to produce insulative cellular non-aromatic polymeric material after being processed through core-layer extruder 36. Core-layer formulation 48 is heated in core-layer extruder 36 where a cell-forming agent is introduced into the molten core-layer formulation prior to moving the materials from core-layer extruder 36 to co-extrusion die 38. As molten core-layer formulation 48 exits co-extrusion die 38 between inner and outer layers 12A, 12C, cells nucleate in the molten material and the material expands to form core layer 12B made from insulative cellular non-aromatic polymeric material. The insulative cellular non-aromatic polymeric material may be an insulative cellular non-aromatic polyolefin material having a density less than about 0.65 g/cm$^3$. In an example, the insulative cellular non-aromatic polyolefin material has a density in a range of about 0.35 g/cm$^3$ to about 0.55 g/cm$^3$. In yet another example, the density of the insulative cellular non-aromatic polyolefin material is in one of the following ranges: about 0.4 g/cm$^3$ to about 0.8 g/cm$^3$, about 0.4 g/cm$^3$ to about 0.7 g/cm$^3$, about 0.4 g/cm$^3$ to about 0.55 g/cm$^3$, about 0.4 g/cm$^3$ to about 0.5 g/cm$^3$, or about 0.4 g/cm$^3$ to about 0.45 g/cm$^3$.

In illustrative embodiments, the insulative cellular non-aromatic polymeric material has a density of less than about 0.9 grams per cubic centimeter. In illustrative embodiments, the insulative cellular non-aromatic polymeric material has a density in a range of about 0.2 grams per cubic centimeter to about 0.5 grams per cubic centimeter. In illustrative embodiments, the insulative cellular non-aromatic polymeric material has a density in a range of about 0.25 grams per cubic centimeter to about 0.4 grams per cubic centimeter. In illustrative embodiments, the insulative cellular non-aromatic polymeric material has a density of about 0.35 grams per cubic centimeter.

In one example, the density of multi-layer container 10 is less than about 0.75 g/cm$^3$. In one example, the density of multi-layer container 10 is less than about 0.7 g/cm$^3$. In one example, the density of multi-layer container 10 is less than about 0.75 g/cm$^3$. In one example, the density of multi-layer container 10 is less than about 0.7 g/cm$^3$. In one example, the density of multi-layer container 10 is less than about 0.65 g/cm$^3$.

In one exemplary embodiment, core-layer formulation 48 used to produce the insulative cellular non-aromatic polymeric material includes at least one polymeric material. The polymeric material may include one or more base resins. In one example, the base resin is High Density Polyethylene (HDPE). In another example, the base resin is a unimodal HDPE. In yet another example, the base resin is unimodal, high-melt strength HDPE. In still yet another example, the base resin is unimodal, high-melt strength HDPE such as DOW® DOWLEX™ IP 41 HDPE (available from The Dow Chemical Company) that has been electron beam modified to provide long chain branching and a melt index of about 0.25 g/10 min. Another example a unimodal, high-melt strength HDPE is EQUISTAR® ALATHON® H5520 HDPE copolymer (available from Lyondell Chemical Company) which has been electron beam modified to have long-chain branching and a melt index of about 0.25 g/10 min. Another example of a suitable unimodal HDPE is FORMOLENE® HB5502F HDPE hexene copolymer (available from Formosa Plastics Corporation). In some embodiments, the HDPE has a melt index from about 0.1 g/10 min to about 0.4 g/10 min.

In certain exemplary embodiments, core-layer formulation 48 may include two base resins that are HDPE. One illustrative example of core-layer formulation 48 includes a first base resin of FORMOLENE® HB5502F HDPE hexene copolymer (available from Formosa Plastics Corporation) and a second base resin of EQUISTAR® ALATHON® H5520 HDPE copolymer (available from Lyondell Chemical Company). In embodiments with more than one HDPE copolymer, different HDPE copolymers can be used depending on the attributes desired in the formulation. For example, core-layer formulation 48 may include both e-beam modified EQUISTAR® ALATHON® H5520 and FORMOLENE® HB5502F HDPE. In such an embodiment, the EQUISTAR® ALATHON® H5520 provides higher melt strength which increases foaming potential, and has less flexural modulus or brittleness. The FORMOLENE® HB5502F HDPE provides wide unimodal polydispersity index or distribution and maximizes economic advantage.

In another example, core-layer formulation 48 includes about 50% e-beam modified EQUISTAR® ALATHON® H5520 and about 50% FORMOLENE® HB5502F HDPE. Together the combination provides a film having drop resistance capability associated with a non-modified HDPE resin and increased melt strength of an e-beam modified long-chain branched HDPE. Depending on the desired characteristics, the percentage of two HDPE copolymers may be varied, e.g., 25%/75%, 30%/70%, 35%/65%, 40%/60%, 45%/55%, 50%/50%, etc. In an embodiment, core-layer formulation 48 includes three HDPE copolymers in the base resin. Again, depending on the desired characteristics, the percentage of three HDPE copolymers can be varied, 33%/33%/33%, 30%/30%/40%, 25%/25%/50%, etc.

A core-layer formulation can include one or more base resins. The amount of HDPE base resin may be one of several different values or fall within one of several different ranges. It is within the scope of the present disclosure to select an amount of HDPE base resin and be one of the following values: about 85%, about 90%, about 95%, about 97%, about 98%, about 99%, about 99.5%, and about 99.9% of the total formulation by weight percentage. In some embodiments, the HDPE base resin may be a blend of multiple HDPE resins. It is within the scope of the present disclosure for the amount of HDPE base resin in the formulation to fall within one of many different ranges. In a first set of ranges, the range of HDPE base resin is one of the following ranges: about 85% to about 99.9%, about 86% to about 99.9%, about 87% to about 99.9%, about 87.5% to about 99.9%, about 88% to about 99.9%, about 89% to about 99.9%, about 90% to about 99.9%, about 91% to about 99.9%, about 92% to about 99.9%, about 93% to about 99.9%, about 94% to about 99.9%, about 95% to about 99.9%, about 96% to about 99.9%, about 96.5% to about 99.9%, about 97% to about 99.9%, and about 98% to about 99.9% of the total formulation by weight percentage. In a second set of ranges, the range of HDPE base resin is one of the following ranges: about 85% to about 99.5%, about 85% to about 99%, about 85% to about 98%, about 85% to about 97%, about 85% to about 96%, about 85% to about 96.5%, about 85% to about 95%, about 85% to about 94%, about 85% to about 93%, about 85% to about 92%, about 85% to about 91%, about 85% to about 90%, about 85% to about 89%, about 85% to about 88%, about 85% to about 87%, and about 85% to about 86% of the total formulation by weight percentage. In a third set of ranges, the range of HDPE base resin is one of the following ranges: about 87.5% to about 96.5%, about 87.5% to about 96%, about 87.5% to about 95.5%, about 87.5% to about 95%, about 95% to about 99%, about 95.5% to about 99%, about 96% to about 99%, and about 96.5% to about 99% of the total formulation by weight percentage. Each of these values and ranges is embodied in the Examples.

In certain exemplary embodiments, the formulation may include two base resins wherein the first base resin is an HDPE resin and the second base resin is a Low-Density Polyethylene (LDPE) resin. Without being bound by theory, LDPE may be added to improve the compression resistance of the core layer during container-molding process 100. In an example, the HDPE has a melt index between 0.7 g/10 min and 0.9 g/10 min. In another example, the HDPE resin is DOW DMDA 6400 NT7. In an example, the LDPE resin has a melt index between 0.7 g/10 min and 0.9 g/10 min as measured by ASTM D1238. In another example, the LDPE resin is DOW™ LDPE 692 LDPE HEALTH+™ available from The Dow Chemical Company®.

In an illustrative example, the formulation comprises a blend of a certain percentage by weight of an HDPE resin and the remainder of the blend is an LDPE resin. In embodiments described herein, the percentage amount of HDPE in the blend may be 100%, 90%, 80%, 70%, 60%, 50%, 40%, 30%, 20%, 10% or 0% and the remainder of the blend is LDPE.

It is within the present disclosure for the amount of HDPE in the blend to fall within one of many different ranges. In a set of ranges, the amount of HDPE in the blend can be about 0% to about 100%, about 20% to about 100%, about 40% to about 100%, about 60% to about 100%, about 70% to about 100%, about 80% to about 100%, about 80% to about 95%, and about 85% to about 95% of the blend.

Polymeric material as disclosed herein includes at least one base resin. In illustrative embodiments, the at least one base resin may be HDPE. The amount of a base resin may be one of several different values or fall within one of several different ranges. It is within the scope of the present disclosure to select an amount of base resin to be one of the following values: about 20%, about 25%, about 30%, about 35%, about 40%, about 45%, about 50%, about 55%, about 60%, about 65%, about 70%, about 75%, about 80%, about 85%, about 86%, about 87%, about 88%, about 89%, about 90%, about 91%, about 92%, about 93%, about 94%, about 95%, about 96%, about 97%, about 98%, about 99%, about 99.5%, about 99.9%, and about 100% of the total formulation of the polymeric layer by weight percentage. It is within the present disclosure for the amount of base resin in the formulation to fall within one of many different ranges. In a first set of ranges, the range of base resin is one of the following ranges: about 20% to about 99.9%, about 25% to about 99.9%, about 85% to about 99.9%, about 90% to about 99.9%, about 95% to about 99.9%, about 98% to about 99.9%, and about 99% to about 99.9% of the total formulation of the polymeric layer by weight percentage. In a second set of ranges, the range of base resin is one of the following ranges: about 85% to about 99%, about 85% to about 98%, about 85% to about 95%, and about 85% to about 90% of the total formulation of the polymeric layer by weight percentage. In a third set of ranges, the range of base resin is one of the following ranges: about 90% to about 99%, and about 95% to about 98% of the total formulation by weight percentage. Each of these values and ranges is embodied in Examples 1 to 51.

In some embodiments, the HDPE base resin comprises up to about 90% regrind, up to about 80% regrind, up to about 60% regrind, up to about 40% regrind, up to about 20% regrind, about 20% to about 90% regrind, about 30% to about 90% regrind, about 40% to about 90% regrind, about 50% to about 90% regrind, about 20% to about 75% regrind, about 30% to about 75% regrind, about 40% to about 75% regrind, about 50% to about 75% regrind, about 20% to about 60% regrind, about 30% to about 60% regrind, about 40% to about 60% regrind, or about 50% to about 60% regrind. The regrind may be first pass regrind, second pass regrind, third pass regrind, and the like.

Long chain branching refers to the presence of polymer side chains (branches) that have a length that is comparable or greater than a length of the backbone to which the polymer side chains are coupled to. Long chain branching creates viscoelastic chain entanglements (polymer entanglements) that hamper flow during extensional or oriented stretching and provide for a strain hardening phenomenon. The strain hardening phenomenon may be observed through two analytical methods.

The first analytical method used to observe the presence of strain hardening on an extensional rheometer. During extensional or oriented flow on an extensional rheometer, strain hardening will occur when polymer entanglements do not allow the polymer to flow under Linear Viscoelastic (LVE) conditions. As a result, these polymer entanglements hamper flow and create a deviation from the LVE conditions as observed as a hook formation. The strain hardening phenomenon becomes more severe as strain and strain rate increase due to faster and more severe polymer chain entanglement motion. Virgin polymers without long chain branching will exhibit LVE flow characteristics. In comparison, long chain branched polymers will exhibit strain hardening and which causes a deviation from the LVE flow characteristics of the virgin polymer providing the hook formation under the same test conditions.

The second analytical method used to observe the presence of long chain branching is evaluating melt strength data as tested per ISO 16790 which is incorporated by reference herein in its entirety. An amount of melt strength is known to be directly related to the presence of long chain branching when compared to similar virgin polymers lacking long chain branching. By way of example, Borealis DAPLOY™ WB 140HMS Polypropylene (PP) (available from Borealis AG) is compared to other polymers having similar molecular weight, polydispersity index, and other physical characteristics. The DAPLOY™ WB 140HMS PP has a melt strength which exceeds about 36 centi-Newton while other similar PP resins lacking long chain branching have a melt strength of less than about 10 centi-Newton.

Core-layer formulation 48 used to produce the insulative cellular non-aromatic polymeric material may further include one or more cell-forming agents. Cell-forming agents include nucleating agents and blowing agents. A nucleating agent is used to provide and control nucleation sites within a molten formulation to promote formation of cells, bubbles, or voids in the molten formulation during extrusion. A blowing agent is used to grow cells in the molten material at nucleation sites. Blowing agents may be used alone in the formulation or with nucleating agents.

Nucleating agent means a chemical or physical material that provides sites for cells to form in a molten formulation mixture. Nucleating agents may include chemical nucleating agents and physical nucleating agents. The nucleating agent may be blended with the formulation that is introduced into the hopper of the extruder. Alternatively, the nucleating agent may be added to the molten resin mixture in the extruder.

Suitable physical nucleating agents have desirable particle size, aspect ratio, and top-cut properties. Examples include, but are not limited to, talc, $CaCO_3$, mica, and mixtures of at least two of the foregoing. One representative example is Heritage Plastics HT6000 Linear Low Density Polyethylene (LLDPE) Based Talc Concentrate.

A core-layer formulation can include a physical nucleating agent. The amount of a physical nucleating agent may be one of several different values or fall within one of several different ranges. It is within the scope of the present disclosure to select an amount of a physical nucleating agent and be one of the following values: about 0%, about 0.1%, about 0.25%, about 0.5%, about 0.75%, about 1.0%, about 1.25%, about 1.5%, about 1.75%, about 2%, about 2.25%, about 2.5%, about 3%, about 4%, about 5%, about 6%, and about 7% of the total formulation by weight percentage. It is within the scope of the present disclosure for the amount of a physical nucleating agent in the formulation to fall within one of many different ranges. In a first set of ranges, the range of a physical nucleating agent is one of the following ranges: about 0% to about 7%, about 0.1% to about 7%, about 0.25% to about 7%, about 0.5% to about 7%, about 0.75% to about 7%, about 1% to about 7%, about 1.25% to about 7%, about 1.5% to about 7%, about 1.75% to about 7%, about 2.0% to about 7%, about 2.25% to about 7%, about 2.5% to about 7%, about 3% to about 7%, about 4% to about 7%, about 5% to about 7%, and about 6% to about 7% of the total formulation by weight percentage. In a second set of ranges, the range of a physical nucleating agent is one of the following ranges: about 0% to about 6%, about 0% to about 5%, about 0% to about 4%, about 0% to about 3%, about 0% to about 2.5%, about 0% to about 2.25%, about 0% to about 2%, about 0% to about 1.75%, about 0% to about 1.5%, about 0% to about 1.25%, about 0% to about 1%, about 0% to about 0.75%, and about 0% to about 0.5% of the total formulation by weight percentage. In a third set of ranges, the range of a physical nucleating agent is one of the following ranges: about 0.1% to about 6%, about 0.1% to about 5%, about 0.1% to about 4%, about 0.1% to about 3.5%, about 0.1% to about 3%, about 0.1% to about 2.5%, about 0.1% to about 2.25%, about 0.1% to about 2%, about 0.1% to about 1.75%, about 0.1% to about 1.5%, about 0.1% to about 1.25%, about 0.1% to about 1%, about 0.1% to about 0.75%, and about 0.1% to about 0.5% of the total formulation by weight percentage. Each of these values and ranges is embodied in the Examples. In an embodiment, the formulation lacks talc.

Suitable chemical nucleating agents decompose to create cells in the molten formulation when a chemical reaction temperature is reached. These small cells act as nucleation sites for larger cell growth from a physical or other type of blowing agent. In one example, the chemical nucleating agent is citric acid or a citric acid-based material. One representative example is HYDROCEROL™ CF-40E (available from Clariant Corporation), which contains citric acid and a crystal nucleating agent.

A core-layer formulation may include a chemical nucleating agent. The amount of a chemical nucleating agent may be one of several different values or fall within one of several different ranges. It is within the scope of the present disclosure to select an amount of a chemical nucleating agent and be one of the following values: about 0.1%, about 0.25%, about 0.5%, about 0.75%, about 1%, about 1.5%, about 2%, about 2.5%, about 3%, about 3.5%, about 4%, about 5%, about 10%, and about 15% of the total formulation by weight percentage. It is within the scope of the present disclosure for the amount of a chemical nucleating agent in the formulation to fall within one of many different ranges. In a first set of ranges, the range of a chemical nucleating agent is one of the following ranges: about 0.1% to about 15%, about 0.25% to about 15%, about 0.5% to about 15%, about 1% to about 15%, about 1.5% to about 15%, about 2% to about 15%, about 2.5% to about 15%, about 3% to about 15%, about 3.5% to about 15%, about 4% to about 15%, about 4.5% to about 15%, and about 5% to about 15% of the total formulation by weight percentage. In a second set of ranges, the range of a chemical nucleating agent is one of the following ranges: about 0.1% to about 10%, about 0.25% to about 10%, about 0.5% to about 10%, about 0.75% to about 10%, about 1% to about 10%, about 1.5% to about 10%, about 2% to about 10%, about 2.5% to about 10%, about 3% to about 10%, about 3.5% to about 10%, about 4% to about 10%, about 4.5% to about 10%, and about 5% to about 10% of the total formulation by weight percentage. In a third set of ranges, the range of a chemical nucleating agent is one of the following ranges: about 0.1% to about 5%, about 0.25% to about 5%, about 0.5% to about 5%, about 0.75% to about 5%, about 1% to about 5%, about 1.5% to about 5%, 2 about % to about 5%, about 2.5% to about 5%, about 3% to about 5%, about 3.5% to about 5%, about 4% to about 5%, and about 4.5% to about 5% of the total formulation by weight percentage. Each of these values and ranges is embodied in the Examples.

A blowing agent refers to a physical or a chemical material (or combination of materials) that acts to expand nucleation sites. Blowing agents may include only chemical blowing agents, only physical blowing agents, combinations thereof, or several types of chemical and physical blowing agents. The blowing agent acts to reduce density by forming cells in the molten formulation at the nucleation sites. The blowing agent may be added to the molten resin mixture in the extruder.

Chemical blowing agents are materials that degrade or react to produce a gas. Chemical blowing agents may be endothermic or exothermic. Chemical blowing agents typically degrade at a certain temperature to decompose and release gas. One example of a chemical blowing agent is citric acid or citric-based material. One representative example is HYDROCEROL™ CF-40E (available from Clariant Corporation), which contains citric acid and a crystal nucleating agent. Here, the citric acid decomposes at the appropriate temperature in the molten formulation and forms a gas which migrates toward the nucleation sites and grows cells in the molten formulation. If sufficient chemical blowing agent is present, the chemical blowing agent may act as both the nucleating agent and the blowing agent.

In another example, chemical blowing agents may be selected from the group consisting of azodicarbonamide; azodiisobutyro-nitrile; benzenesulfonhydrazide; 4,4-oxybenzene sulfonylsemicarbazide; p-toluene sulfonyl semicarbazide; barium azodicarboxylate; N,N'-dimethyl-N,N'-dinitrosoterephthalamide; trihydrazino triazine; methane; ethane; propane; n-butane; isobutane; n-pentane; isopentane; neopentane; methyl fluoride; perfluoromethane; ethyl fluoride; 1,1-difluoroethane; 1,1,1-trifluoroethane; 1,1,1,2-tetrafluoro-ethane; pentafluoroethane; perfluoroethane; 2,2-difluoropropane; 1,1,1-trifluoropropane; perfluoropropane; perfluorobutane; perfluorocyclobutane; methyl chloride; methylene chloride; ethyl chloride; 1,1,1-trichloroethane; 1,1-dichloro-1-fluoroethane; 1-chloro-1,1-difluoroethane; 1,1-dichloro-2,2,2-trifluoroethane; 1-chloro-1,2,2,2-tetrafluoroethane; trichloromonofluoromethane; dichlorodifluoromethane; trichlorotrifluoroethane; dichlorotetrafluoroethane; chloroheptafluoropropane; dichlorohexafluoropropane; methanol; ethanol; n-propanol; isopropanol; sodium bicarbonate; sodium carbonate; ammonium bicarbonate; ammonium carbonate; ammonium nitrite; N,N'-dimethyl-N,N'-dinitrosoterephthalamide; N,N'-dinitrosopentamethylene tetramine; azodicarbonamide; azobisisobutylonitrile; azocyclohexylnitrile; azodiaminobenzene; bariumazodicarboxylate; benzene sulfonyl hydrazide; toluene sulfonyl hydrazide; p,p'-oxybis(benzene sulfonyl hydrazide); diphenyl sulfone-3,3'-disulfonyl hydrazide; calcium azide; 4,4'-diphenyl disulfonyl azide; p-toluene sulfonyl azide, and combinations thereof.

In one aspect of the present disclosure, where a chemical blowing agent is used, the chemical blowing agent may be introduced into the material formulation that is added to the hopper.

One example of a physical blowing agent is nitrogen ($N_2$). The $N_2$ is pumped into the molten formulation via a port in the extruder as a supercritical fluid. The molten material with the $N_2$ in suspension then exits the extruder via a die where a pressure drop occurs. As the pressure drop happens, $N_2$ moves out of suspension toward the nucleation sites where cells grow. Excess gas blows off after extrusion with the remaining gas trapped in the cells formed in the extrudate. Other suitable examples of physical blowing agents include, but are not limited to, carbon dioxide ($CO_2$), helium, argon, air, pentane, butane, or other alkane mixtures of the foregoing and the like. In some embodiments, the physical blowing agent is carbon dioxide or nitrogen. In an illustrative example, a physical blowing agent may be introduced at a rate of about 0.01 pounds per hour to about 0.2 pounds per hour. In an illustrative example, a physical blowing agent may be introduced at a rate of about 0.02 pounds per hour to about 0.16 pounds per hour, about 0.02 pounds per hour to about 0.16 pounds per hour. In still yet another illustrative example, the physical blowing agent may be introduced at a rate of about 0.05 pounds per hours to about 0.15 pounds per hour. In some embodiments, the blowing agent is used between about 0.01 lbs/h to about 0.2 lbs/h, 0.01 lbs/h to about 0.17 lbs/h, 0.01 lbs/h to about 0.15 lbs/h, 0.01 lbs/h to about 0.1 lbs/h, 0.05 lbs/h to about 0.2 lbs/h, 0.05 lbs/h to about 0.17 lbs/h, 0.05 lbs/h to about 0.15 lbs/h, 0.05 lbs/h to about 0.1 lbs/h, 0.1 lbs/h to about 0.2 lbs/h, 0.1 lbs/h to about 0.17 lbs/h, or 0.1 lbs/h to about 0.15 lbs/h. In further embodiments, $N_2$ saturation is about 0.1% to about 0.4%, about 0.1% to about 0.35%, about 0.1% to about 0.3%, about 0.1% to about 0.25%, 0.15% to about 0.4%, about 0.15% to about 0.35%, about 0.15% to about 0.3%, about 0.15% to about 0.25%, 0.2% to about 0.4%, about 0.2% to about 0.35%, about 0.2% to about 0.3%, or about 0.2% to about 0.25%.

In one aspect of the present disclosure, at least one slip agent may be incorporated into the formulation to aid in increasing production rates. Slip agent (also known as a process aid) is a term used to describe a general class of materials which are added to the formulation and provide surface lubrication to the polymer during and after conversion. Slip agents may also reduce or eliminate die drool. Representative examples of slip agent materials include amides of fats or fatty acids, such as, but not limited to, erucamide and oleamide. In one exemplary aspect, amides from oleyl (single unsaturated C-18) through erucyl (C-22 single unsaturated) may be used. Other representative examples of slip agent materials include low molecular weight amides and fluoroelastomers. Combinations of two or more slip agents can be used. Slip agents may be provided in a master batch pellet form and blended with the resin formulation. One example of a suitable slip agent is Ampacet 102823 Process Aid PE MB.

A core-layer formulation can include a slip agent. The amount of a slip agent may be one of several different values or fall within one of several different ranges. It is within the scope of the present disclosure to select an amount of a slip agent and be one of the following values: about 0%, about 0.1%, about 0.25%, about 0.5%, about 0.75%, about 1%, about 1.25%, about 1.5%, about 1.75%, about 2%, about 2.25%, about 2.5%, about 3%, and about 0.5% of the total formulation by weight percentage. It is within the scope of the present disclosure for the amount of a slip agent in the formulation to fall within one of many different ranges. In a first set of ranges, the range of a slip agent is one of the following ranges: about 0% to about 3%, about 0.1% to about 3%, about 0.25% to about 3%, about 0.5% to about 3%, about 1% to about 3%, about 1.25% to about 3%, about 1.5% to about 3%, about 1.75% to about 3%, about 2% to about 3%, about 2.25% to about 3%, and about 2.5% to about 3% of the total formulation by weight percentage. In a second set of ranges, the range of a slip agent is one of the following ranges: about 0% to about 2.5%, about 0% to about 2%, about 0% to about 1.75%, about 0% to about 1.5%, about 0% to about 1.25%, about 0% to about 1%, about 0% to about 0.75%, about 0% to about 0.5%, and about 0.1% to about 2.5% of the total formulation by weight percentage. In a third set of ranges, the range of a slip agent is one of the following ranges: about 0.1% to about 2.5%, about 0.1% to about 2%, about 0.1% to about 1.75%, about 0.1% to about 1.5%, about 0.1% to about 1.25%, about 0.1% to about 1%, about 0.1% to about 0.75%, and about 0.1% to about 0.5% of the total formulation by weight percentage. Each of these values and ranges is embodied in the Examples.

In another aspect of the present disclosure, an impact modifier may be incorporated into the formulation to minimize fracturing of the insulative cellular non-aromatic polymeric material when subjected to an impact such as a drop test. One representative example of a suitable impact modifier is DOW® AFFINITY™ PL 1880G polyolefin plastomer. In an embodiment, the core-layer formulation comprises about 5% of an impact modifier. In some embodiments, the core-layer formulation comprises Vistamaxx™ available from the ExxonMobil™ Corporation. In some embodiments, inner-layer formulation 40 or the outer-layer formulation 44, sometimes called the skin-layer formulation, comprises an impact modifier to improve the performance of the container. In an embodiment, the skin-layer formulation can comprise about 2.5% of an impact modifier. In some embodiments, the skin-layer formulation comprises Vistamaxx™ available from the ExxonMobil™ Corporation.

In an embodiment, a colorant can be about 0% to about 4% (w/w), about 0.1% to about 4%, about 0.25% to about 4%, about 0.5% to about 4%, about 0.75% to about 4%, about 1.0% to about 4%, about 1.25% to about 4%, about 1.5% to about 4%, about 1.75% to about 4%, about 2.0% to about 4%, about 2.25% to about 4%, about 2.5% to about 4%, about 3% to about 4%, about 0% to about 3.0%, about 0% to about 2.5%, about 0% to about 2.25%, about 0% to about 2.0%, about 0% to about 1.75%, about 0% to about 1.5%, about 0% to about 1.25%, about 0% to about 1.0%, about 0% to about 0.75%, about 0% to about 0.5%, about 0.1% to about 3.5%, about 0.1% to about 3.0%, about 0.1% to about 2.5%, about 0.1% to about 2.25%, about 0.1% to about 2.0%, about 0.1% to about 1.75%, about 0.1% to about 1.5%, about 0.1% to about 1.25%, about 0.1% to about 1.0%, about 0.1% to about 0.75%, or about 0.1% to about 0.5%. In an embodiment, the formulation lacks a colorant.

A core-layer formulation can include a colorant. The amount of a colorant may be one of several different values or fall within one of several different ranges. It is within the scope of the present disclosure to select an amount of a colorant and be one of the following values: about 0%, about 0.1%, about 0.25%, about 0.5%, about 0.75%, about 1%, about 1.25%, about 1.5%, about 1.75%, about 2%, about 2.25%, about 2.5%, about 3%, and about 4% of the total formulation by weight percentage. It is within the scope of the present disclosure for the amount of a colorant in the formulation to fall within one of many different ranges. In a first set of ranges, the range of a colorant is one of the following ranges: about 0% to about 4%, about 0.1% to about 4%, about 0.25% to about 4%, about 0.5% to about 4%, about 1% to about 4%, about 1.25% to about 4%, about 1.5% to about 4%, about 1.75% to about 4%, about 2% to about 4%, about 2.25% to about 4%, about 2.5% to about 4%, and about 3% to about 4% of the total formulation by weight percentage. In a second set of ranges, the range of a colorant is one of the following ranges: about 0% to about 3%, about 0% to about 2.5%, about 0% to about 2.25%, about 0% to about 2%, about 0% to about 1.75%, about 0% to about 1.5%, about 0% to about 1.25%, about 0% to about 1%, about 0% to about 0.75%, and about 0% to about 0.5% of the total formulation by weight percentage. In a third set of ranges, the range of a colorant is one of the following ranges: about 0.1% to about 3.5%, about 0.1% to about 3.0%, about 0.1% to about 2.5%, about 0.1% to about 2.25%, about 0.1% to about 2%, about 0.1% to about 1.75%, about 0.1% to about 1.5%, about 0.1% to about 1.25%, about 0.1% to about 1%, about 0.1% to about 0.75%, and about 0.1% to about 0.5% of the total formulation by weight percentage. Each of these values and ranges is embodied in the Examples.

In an embodiment, the density of the core layer may be one of several different values or fall within one of several different ranges. It is within the scope of the present disclosure to select a density and be one of the following values: about 0.1 g/cm$^3$, about 0.15 g/cm$^3$, about 0.2 g/cm$^3$, about 0.25 g/cm$^3$, about 0.3 g/cm$^3$, about 0.35 g/cm$^3$, about 0.4 g/cm$^3$ about 0.45 g/cm$^3$, about 0.5 g/cm$^3$, about 0.55 g/cm$^3$, about 0.6 g/cm$^3$, about 0.65 g/cm$^3$, about 0.7 g/cm$^3$, about 0.75 g/cm$^3$, about 0.785 g/cm$^3$, and about 0.8 g/cm$^3$. It is within the scope of the present disclosure for the density of the core layer to fall within one of many different ranges. In a first set of ranges, the range of density is one of the following ranges: about 0.1 g/cm$^3$ to about 0.8 g/cm$^3$, about 0.15 g/cm$^3$ to about 0.8 g/cm$^3$, about 0.2 g/cm$^3$ to about 0.8 g/cm$^3$, about 0.25 g/cm$^3$ to about 0.8 g/cm$^3$, about 0.3 g/cm$^3$ to about 0.8 g/cm$^3$, about 0.35 g/cm$^3$ to about 0.8 g/cm$^3$, about 0.4 g/cm$^3$ to about 0.8 g/cm$^3$, about 0.45 g/cm$^3$ to about 0.8 g/cm$^3$, about 0.5 g/cm$^3$ to about 0.8 g/cm$^3$, about 0.55 g/cm$^3$ to about 0.8 g/cm$^3$, about 0.6 g/cm$^3$ to about 0.8 g/cm$^3$, about 0.65 g/cm$^3$ to about 0.8 g/cm$^3$, about 0.7 g/cm$^3$ to about 0.8 g/cm$^3$, and about 0.75 g/cm$^3$ to about 0.8 g/cm$^3$. In a second set of ranges, the range of density is one of the following ranges: about 0.1 g/cm$^3$ to about 0.75 g/cm$^3$, about 0.1 g/cm$^3$ to about 0.7 g/cm$^3$, about 0.1 g/cm$^3$ to about 0.65 g/cm$^3$, about 0.1 g/cm$^3$ to about 0.6 g/cm$^3$, about 0.1 g/cm$^3$ to about 0.55 g/cm$^3$, about 0.1 g/cm$^3$ to about 0.5 g/cm$^3$, about 0.1 g/cm$^3$ to about 0.45 g/cm$^3$, about 0.1 g/cm$^3$ to about 0.4 g/cm$^3$, about 0.1 g/cm$^3$ to about 0.35 g/cm$^3$, about 0.1 g/cm$^3$ to about 0.3 g/cm$^3$, about 0.1 g/cm$^3$ to about 0.25 g/cm$^3$, about 0.1 g/cm$^3$ to about 0.2 g/cm$^3$, and about 0.1 g/cm$^3$ to about 0.15 g/cm$^3$. In a third set of ranges, the range of density is one of the following ranges: about 0.1 g/cm$^3$ to about 0.8 g/cm$^3$, about 0.15 g/cm$^3$ to about 0.75 g/cm$^3$, about 0.2 g/cm$^3$ to about 0.6 g/cm$^3$, about 0.2 g/cm$^3$ to about 0.5 g/cm$^3$, about 0.2 g/cm$^3$ to about 0.45 g/cm$^3$, about 0.25 g/cm$^3$ to about 0.45 g/cm$^3$, and about 0.25 g/cm$^3$ to about 0.4 g/cm$^3$. In a fourth set of ranges, the range of density is one of the following ranges: about 0.2 g/cm$^3$ to about 0.5 g/cm$^3$, about 0.25 g/cm$^3$ to about 0.45 g/cm$^3$, about 0.25 g/cm$^3$ to about 0.4 g/cm$^3$, about 0.3 g/cm$^3$ to about 0.45 g/cm$^3$, about 0.3 g/cm$^3$ to about 0.4 g/cm$^3$, about 0.35 g/cm$^3$ to about 0.4 g/cm$^3$, and about 0.3 g/cm$^3$ to about 0.35 g/cm$^3$. In a fifth set of ranges, the range of density is one of the following ranges: about 0.4 g/cm$^3$ to about 0.65 g/cm$^3$, about 0.45 g/cm$^3$ to about 0.65 g/cm$^3$, about 0.5 g/cm$^3$ to about 0.6 g/cm$^3$, about 0.55 g/cm$^3$ to about 0.65 g/cm$^3$, about 0.6 g/cm$^3$ to about 0.65 g/cm$^3$, about 0.4 g/cm$^3$ to about 0.6 g/cm$^3$, about 0.45 g/cm$^3$ to about 0.6 g/cm$^3$, about 0.5 g/cm$^3$ to about 0.6 g/cm$^3$, about 0.4 g/cm$^3$ to about 0.55 g/cm$^3$, about 0.45 g/cm$^3$ to about 0.55 g/cm$^3$, about 0.5 g/cm$^3$ to about 0.55 g/cm$^3$, about 0.4 g/cm$^3$ to about 0.5 g/cm$^3$, and about 0.45 g/cm$^3$ to about 0.5 g/cm$^3$. In a sixth set of ranges, the range of density is one of the following ranges: about 0.40 g/cm$^3$ to about 0.70 g/cm$^3$, about 0.37 g/cm$^3$ to about 0.56 g/cm$^3$, about 0.470 g/cm$^3$ to about 0.526 g/cm$^3$, about 0.421 g/cm$^3$ to about 0.571 g/cm$^3$, about 0.406 g/cm$^3$ to about 0.644 g/cm$^3$, about 0.397 g/cm$^3$ to about 0.468 g/cm$^3$, and about 0.429 g/cm$^3$ to about 0.431 g/cm$^3$. Each of these values and ranges is embodied in the Examples.

In an example, core layer 10B may be formed of an insulative cellular non-aromatic polymeric material. In another example, core-layer parison 50 may be formed of an insulative cellular non-aromatic polymeric material. In yet, another example, core layer 12B of multi-layer tube 12 may be formed of an insulative cellular non-aromatic polymeric material. In an embodiment, the density of the insulative cellular non-aromatic polymeric material may be one of several different values or fall within one of several different ranges. It is within the scope of the present disclosure to select a density and be one of the following values: about 0.1 g/cm$^3$, about 0.15 g/cm$^3$, about 0.2 g/cm$^3$, about 0.25 g/cm$^3$, about 0.3 g/cm$^3$, about 0.35 g/cm$^3$, about 0.4 g/cm$^3$ about 0.45 g/cm³, about 0.5 g/cm³, about 0.55 g/cm³, about 0.6 g/cm³, about 0.65 g/cm³, about 0.7 g/cm³, about 0.75 g/cm³, about 0.785 g/cm³, and about 0.8 g/cm³. It is within the scope of the present disclosure for the density of the insulative cellular non-aromatic polymeric material to fall within one of many different ranges. In a first set of ranges, the range of density is one of the following ranges: about 0.1 g/cm³ to about 0.8 g/cm³, about 0.15 g/cm³ to about 0.8 g/cm³, about 0.2 g/cm³ to about 0.8 g/cm³, about 0.25 g/cm³ to about 0.8 g/cm³, about 0.3 g/cm³ to about 0.8 g/cm³, about 0.35 g/cm³ to about 0.8 g/cm³, about 0.4 g/cm³ to about 0.8 g/cm³, about 0.45 g/cm³ to about 0.8 g/cm³, about 0.5 g/cm³ to about 0.8 g/cm³, about 0.55 g/cm³ to about 0.8 g/cm³, about 0.6 g/cm³ to about 0.8 g/cm³, about 0.65 g/cm³ to about 0.8 g/cm³, about 0.7 g/cm³ to about 0.8 g/cm³, and about 0.75 g/cm³ to about 0.8 g/cm³. In a second set of ranges, the range of density is one of the following ranges: about 0.1 g/cm³ to about 0.75 g/cm³, about 0.1 g/cm³ to about 0.7 g/cm³, about 0.1 g/cm³ to about 0.65 g/cm³, about 0.1 g/cm³ to about 0.6 g/cm³, about 0.1 g/cm³ to about 0.55 g/cm³, about 0.1 g/cm³ to about 0.5 g/cm³, about 0.1 g/cm³ to about 0.45 g/cm³, about 0.1 g/cm³ to about 0.4 g/cm³, about 0.1 g/cm³ to about 0.35 g/cm³, about 0.1 g/cm³ to about 0.3 g/cm³, about 0.1 g/cm³ to about 0.25 g/cm³, about 0.1 g/cm³ to about 0.2 g/cm³, and about 0.1 g/cm³ to about 0.15 g/cm³. In a third set of ranges, the range of density is one of the following ranges: about 0.1 g/cm³ to about 0.8 g/cm³, about 0.15 g/cm³ to about 0.75 g/cm³, about 0.2 g/cm³ to about 0.6 g/cm³, about 0.2 g/cm³ to about 0.5 g/cm³, about 0.2 g/cm³ to about 0.45 g/cm³, about 0.25 g/cm³ to about 0.45 g/cm³, and about 0.25 g/cm³ to about 0.4 g/cm³. Each of these values and ranges is embodied in the Examples. Density of the insulative cellular non-aromatic polymeric material may be determined by any suitable method. One example of determining density includes measuring a density of the multi-layer tube or multi-layer container, determining relative thicknesses of each layer, and calculating the density of the insulative cellular non-aromatic polymeric material using the relative thicknesses of the layers, the known density of the other layers, and the known density of the multi-layer tube or container.

Density of the core layer may be determined by any suitable method. One example of determining density includes measuring a density of the multi-layer tube or multi-layer container, determining relative thicknesses of each layer, and calculating the density of the core layer using the relative thicknesses of the layers, the known density of the other layers, and the known density of the multi-layer tube or container.

According to an aspect of the present disclosure, there is provided a method of producing a multi-layer vessel, the method comprising the steps of (a) extruding an inner-layer formulation, a core-layer formulation, and an outer-layer formulation to form an inner parison, an outer parison, and a core parison configured to have a core-parison density different than each of an inner-parison density of the inner parison and an outer-parison density of the outer parison, (b) aligning the inner parison, the core parison, and the outer parison to cause the core parison to be located between the inner parison and the outer parison to cause the core parison to surround the inner parison and to be surrounded by the outer parison to form a multi-layer tube, (c) placing the multi-layer tube in a mold cavity formed in a mold, and (d) forming a multi-layer vessel having an interior region formed therein by expanding the multi-layer tube within the mold so that the outer parison engages an inner surface of the mold, and wherein the core parison of the multi-layer tube is transformed into a core layer of the vessel having a core-layer density that enables cell collapse and damage within the core layer of multi-layer vessel to be minimized.

The inner, core and outer parisons forming the multi-layer parison are disposed one directly on top of the other, in the sense that the core parison is coupled to the inner parison on one side and the outer parison on the other side. It will also be understood that in step (b), the multi-later parison is extruded in the form of a multi-layer tube in which the core parison surrounds the inner parison and the outer parison surrounds the core parison.

In an embodiment, in step (b), the inner parison core parison, and outer parison from step (a) are aligned such that the core parison is located between the inner parison and the outer parison and the aligned parisons are then co-extruded to form the multi-layer tube.

In an embodiment, the outer and inner parisons each comprise a high density polymeric material. In another embodiment, the high-density polymeric material is high density polyethylene or polypropylene.

In one example, the polypropylene used in either of the skin layers is a high stiffness polypropylene. In another example, the polypropylene used in either of the skin layers is a high impact polypropylene. In another example, the polypropylene used in either of the skin layers is DOW® D 207.03 developmental performance polypropylene resin or DOW® DC 7067.00 polypropylene impact copolymer. Reference is hereby made to U.S. patent application Ser. No. 14/468,789, filed Aug. 26, 2014 and titled POLYMERIC MATERIAL FOR CONTAINER for disclosure relating to polypropylene used in either of the skin layers in accordance with the present disclosure, which application is hereby incorporated herein by reference in its entirety.

In a particular embodiment, both of the outer and inner parisons are a formed from a polypropylene selected from DOW® D 207.03 developmental performance polypropylene resin and/or DOW® DC 7067.00 polypropylene impact copolymer.

In an embodiment, the polyethylene used in either of the inner and outer parisons is a high density ethylene hexane-1 copolymer. In an embodiment, the high density polyethylene is a HDPE hexene copolymer. In a particular embodiment, the high density polyethylene is FORMOLENE® HB5502F HDPE hexene copolymer (available from Formosa Plastics Corporation).

Alternatively, the polyethylene used in either of the inner and outer parisons may be Chevron Phillips MARLEX® HHM 5502 BN.

In certain embodiment, one or both of the inner and outer layers comprise a high-density polymeric material as hereinbefore disclosed and a colorant. For example, one or both of the inner and outer layers may comprise 95-99.9% (w/w) of a high-density polymeric material as hereinbefore disclosed and 0.1 to 5% (w/w) a colorant. In an embodiment, one or both of the inner and outer layers may comprise 97-99.9% (w/w) of a high-density polymeric material as hereinbefore disclosed and 0.1 to 3% (w/w) a colorant. In a further embodiment, one or both of the inner and outer layers may comprise 98-99.5% (w/w) of a high-density polymeric material as hereinbefore disclosed and 0.5 to 2% (w/w) a colorant. The relatively high-density polymeric material may be FORMOLENE® HB5502F HDPE hexene copolymer (available from Formosa Plastics Corporation) and the colorant may be COLORTECH® 11933-19 Titanium Oxide Colorant (available from COLORTECH® a PPM Company).

In some examples, inner-layer formulation and outer-layer formulation may be the same. In other examples, inner-layer formulation and outer-layer formulation may be different.

The core formulation may be disclosed hereinbefore. In an embodiment, the core formulation comprises:
85-99.9% (w/w) of a high density polyethylene (HDPE) as disclosed herein;
0.1-15% (w/w) of a nucleating agent as disclosed herein;
0-3% (w/w) of a slip agent as disclosed herein; and
0-4% (w/w) of a colorant as disclosed herein.

In a further embodiment, the core formulation comprises:
97-99.9% (w/w) of a high density polyethylene (HDPE) as disclosed herein;
0.1-3% (w/w) of a nucleating agent as disclosed herein;
0-3% (w/w) of a slip agent as disclosed herein; and
0-3% (w/w) of a colorant as disclosed herein.

In a further embodiment, the core formulation comprises:
98-99.9% (w/w) of a high density polyethylene (HDPE) as disclosed herein;
0.1-2% (w/w) of a nucleating agent as disclosed herein;
0-2% (w/w) of a slip agent as disclosed herein; and
0-2% (w/w) of a colorant as disclosed herein.

In step (d) the expansion of the multi-layer tube is achieved by blow molding the multi-layer tube using techniques known in the art.

According to another aspect of the present disclosure, there is provided a multi-layer vessel obtainable, obtained, or directly obtained by a process disclosed herein.

In another example, container-molding process 100 uses multi-layer tube 12 to establish a multi-layer container 210 as shown, for example, in FIGS. 18-26. Multi-layer container 210 includes a floor 288, a side wall 290, and neck 292 as shown in FIG. 18. Side wall 290 includes a first panel 290A, a second panel 290B, a third panel 290C, and a fourth panel 290D as shown in FIGS. 18 and 22. Together, panels 290A, 290B, 290C, 290D cooperate to provide outer container surface 282. Floor 288 is coupled to a lower end of side wall 290 and cooperates with side wall 290 to define an interior product-storage region 294 therebetween. Neck 292 is coupled to an opposite upper end of side wall 290 and defines an open mouth 296 that is arranged to open into interior product-storage region 294.

Multi-layer container 210 further includes a snap-retainer ring 212 as shown in FIGS. 23 and 24. Snap-retainer ring 212 is configured to retain a snap-on closure in place after filling of multi-layer container 210. Snap-retainer ring 212 has a diameter 212E, 212F which is measured at 45 degrees and 315 degrees of rotation from a reference line 214 as shown in FIG. 22. The target diameters 212E, 212F are 0.943 inches. Ovality is the difference between highest and lowest diameter measurements and the target ovality is 0.0 inches.

Neck 292 has an outer diameter 292I, 292J at a location just above snap-retainer ring 212 which is measured at 45 degrees and 315 degrees of rotation from reference line 214 as shown in FIG. 22. The target diameters 292I, 292J are 0.878 inches. The target ovality is 0.0 inches.

Neck 292 has an inner diameter 292M, 292N at a location about 0.125 inches below a top edge of neck 292. Inner diameters 292M, 292N are measured at 0 degrees and 90 degrees of rotation from reference line 214 as shown in FIG. 22. The target diameters 292M, 292N are 0.787 inches. The target ovality is 0.0 inches. Thus, neck 292 has a thickness at about 0.125 inches below the top edge of neck 292 of about 0.091 inches.

Neck 292 includes a spout 292A and a top wall 292B as shown in FIG. 23. A neck height 292Q is measured between the top edge of neck 292 and a transition between side wall 290 and top wall 292B. Neck height is targeted to be 0.520 inches. A retaining-ring height 292R is targeted to be 0.264 inches.

Multi-layer container 210 has an overall height 210S of about 7.378 inches as shown in FIGS. 19-21. Multi-layer container 210 has an overall width 210T of about 2.465 inches. Multi-layer container 210 has an overall depth 210U of about 1.409 inches.

Multi-layer container 210 may have various thicknesses in floor 288 and side wall 290. A first floor thickness 288X was measured at a center point 216 of floor 288 as shown in FIG. 19. A second floor thickness 288Y was measured at a point where floor 288 and panel 290B of side wall 290 intersect as shown in FIG. 19. A first set 2901 of lower side wall thickness 290A1, 290B1, 290C1, 290D1 are measured at 0 degrees, 90 degrees, 180 degrees, and 270 degrees of rotation from reference line 214 at a lower portion of the side wall 290 as shown in FIGS. 19 and 20. A second set 2902 of middle side wall thickness 290A2, 290B2, 290C2, 290D2 are measured at 0 degrees, 90 degrees, 180 degrees, and 270 degrees of rotation from reference line 214 at a middle portion of side wall 290 as shown in FIGS. 19 and 20. A third set 2903 of middle side wall thickness 290A3, 290B3, 290C3, 290D3 are measured at 0 degrees, 90 degrees, 180 degrees, and 270 degrees of rotation from reference line 214 at an upper portion of side wall 290 as shown in FIGS. 19 and 20.

During extrusion operation 102, a multi-layer tube extruded from co-extrusion die 38 may be configured to have multiple different profile shapes as shown in FIGS. 5, 25, and 26. A first embodiment of multi-layer tube 12 has a relatively straight profile shape as shown in FIG. 5 where an upper portion 12U, a middle portion 12M, and a lower portion 12L all have about the same diameter as shown in FIG. 5. A second embodiment of a multi-layer tube 312 has a profile shape in which a lower portion 312L has a relatively greater width than both a middle portion 312M and an upper portion 313U. In this example, more material is provided for use in forming an associated top portion of a multi-layer container at lower portion 312L as a result of lower portion 312L having a relatively greater width (more material). A third embodiment of a multi-layer tube 412 has a profile shape in which a lower portion 412L has a relatively greater width than a middle portion 412M and an upper portion 412U has a relatively greater width than middle portion 412M. In this example, more material is provided for use in forming associated upper and lower portions of a multi-layer container at upper portion 412U and lower portion 412L as a result of lower portion 412L and upper portion 412U having relatively greater widths (more material).

In another example, container-molding process 100 uses multi-layer tube 12 to establish a multi-layer container 310 as shown, for example, in FIGS. 27-30. Multi-layer container 310 includes a floor 388, a cylindrical container wall 390, and cylindrical neck 392 as shown in FIG. 27. Multi-layer container 310 is formed of an outer layer 310C, an inner layer 310A, and a core layer 310B located therebetween that has a thickness 390D.

Illustratively container wall 390 provides outer container surface 382. Floor 388 is coupled to a lower end of container wall 390 and cooperates with container wall 390 to define an interior product-storage region 394 therebetween. Neck 392 is coupled to an opposite upper end of side wall 390 and defines an open mouth 396 that is arranged to open into interior product-storage region 394. Neck 392 has an outer diameter 3900 defining the width of the neck 392 near the open mouth 396, as shown in FIGS. 29 and 30.

Neck 392 includes a spout 392A, a top wall 392B, and a set of threads 392C as shown in FIG. 30. The top wall 392B extends between and interconnects the container wall 390 and the spout 392A. The set of threads 392C are arranged to surround spout 392A and are formed to secure a closure thereon. Spout 392A has an outer diameter 3920 that defines the thickness of the spout 392A. In an embodiment, outer diameter 3920 is about 0.9 inches.

Multi-layer container 310 has an overall height 310S of about 7.9 inches as shown in FIG. 28. Multi-layer container 310 has an overall width 310T of about 1.9 inches.

In an embodiment, container wall 390 has a thickness 310D. The container wall thickness 310D may be one of several different values or fall within one of several different ranges. It is within the scope of the present disclosure to select container wall thickness 310 to be about 10 mils, about 15 mils, about 20 mils, about 25 mils, about 30 mils, about 35 mils, about 40 mils, about 45 mils, about 50 mils, about 55 mils, about 60 mils, about 65 mils, about 70 mils, about 75 mils, about 80 mils, about 85 mils, about 90 mils, about 95 mils, about 100 mils, about 105 mils, about 110 mils, about 120 mils, about 130 mils, about 150 mils, about 175 mils, and about 200 mils. It is within the scope of the present disclosure for container wall thickness 310D to fall within one of many different ranges. In a first set of ranges, the range of container wall thickness 310D is one of the following ranges: about 10 mils to about 200 mils, about 10 mils to about 150 mils, about 10 mils to about 100 mils, about 10 mils to about 95 mils, about 10 mils to about 75 mils, about 10 mils to about 50 mils, about 10 mils to about 45 mils, about 10 mils to about 40 mils, about 10 mils to about 35 mils, about 10 mils to about 30 mils, and about 10 mils to about 25 mils. In a second set of ranges, the range of container wall thickness 310D is one of the following ranges: about 10 mils to about 200 mils, about 15 mils to about 200 mils, about 20 mils to about 200 mils, about 25 mils to about 200 mils, about 30 mils to about 200 mils, about 35 mils to about 200 mils, and about 40 mils to about 200 mils. In a third set of ranges, the range of container wall thickness 310D is one of the following ranges: about 10 mils to about 100 mils, about 10 mils to about 75 mils, about 15 mils to about 75 mils, about 20 mils to about 75 mils, about 20 mils to about 50 mils, about 25 mils to about 50 mils, and about 25 mils to about 40 mils.

EXAMPLE 1

Formulations and Test Results

Inner-layer formulation 40 comprises about 100% FORMOSA PLASTICS® FORMOLENE® HB5502F HDPE hexene copolymer. Outer-layer formulation 44 comprises about 99% FORMOSA PLASTICS® FORMOLENE® HB5502F HDPE hexene copolymer and about 1% COLORTECH® 11933-19.

Core-layer formulation 48 comprises FORMOSA PLASTICS® FORMOLENE® HB5502F HDPE hexene copolymer which was used as polyethylene base resin. The polyethylene base resin was used in various percentages from about 97.95% to about 100% of the formulation. In some examples, the polyethylene base resin was blended with HYDROCEROL® CF 40E as a nucleating agent and Heritage Plastics HT6000 LLDPE talc as another nucleating agent, and $N_2$ as a blowing agent. The blowing agent was used at levels between about 0.05 lbs/h to about 0.15 lbs/h. COLORTECH® 11933-19 was added as a colorant in some examples. The various formulations and resulting multi-layer tube densities are shown below in Table 9.

TABLE 9

Comparison of different core layer formulations to create various multi-layer parison and insulative container densities

| | Inner-Layer | Core Layer Formulation | | | | | Outer-Layer Formulation | | |
|---|---|---|---|---|---|---|---|---|---|
| Trial | Formulation Formosa 5502F [%] | Formosa 5502F [%] | Colortech [%] | CF-40E [%] | HT6000 [%] | $N_2$ [lbs/h] | Formosa 5502F [%] | Colortech [%] | Tube Density [g/cm$^3$] |
| 1 | 100 | 97.95 | 1 | 0.75 | 0.3 | 0.1222 | 99 | 1 | * |
| 2 | 100 | 98 | 0 | 2 | 0 | 0.0529 | 99 | 1 | * |
| 3 | 100 | 99.25 | 0 | 0.75 | 0 | 0.0534 | 99 | 1 | * |
| 4 | 100 | 99 | 0 | 1.0 | 0 | 0.0511 | 99 | 1 | 0.429 |
| 5 | 100 | 98.7 | 0 | 1.0 | 0.3 | 0.0514 | 99 | 1 | 0.427 |
| 6 | 100 | 98.45 | 0 | 1.25 | 0.3 | 0.0521 | 99 | 1 | 0.428 |
| 7 | 100 | 98.75 | 0 | 1.25 | 0 | 0.0529 | 99 | 1 | 0.424 |
| 8 | 100 | 98.75 | 0 | 1.25 | 0 | 0.0522 | 99 | 1 | 0.423 |
| 9 | 100 | 98.75 | 0 | 1.25 | 0 | 0.0538 | 99 | 1 | 0.430 |
| 10 | 0 | 100 | 0 | 0 | 0 | 0.1468 | 0 | 0 | * |
| 11 | 100 | 100 | 0 | 0 | 0 | 0.1392 | 99 | 1 | * |
| 12 | 100 | 99.9 | 0 | 0 | 0.1 | 0.1393 | 99 | 1 | * |
| 13 | 100 | 99.5 | 0 | 0 | 0.5 | 0.0656 | 99 | 1 | * |
| 14 | 100 | 99.4 | 0 | 0.1 | 0.5 | 0.0702 | 99 | 1 | * |
| 15 | 100 | 99.3 | 0 | 0.2 | 0.5 | 0.0692 | 99 | 1 | * |
| 16 | 100 | 99.7 | 0 | 0.1 | 0.2 | 0.0673 | 99 | 1 | * |
| 17 | 100 | 99.7 | 0 | 0.1 | 0.2 | 0.0892 | 99 | 1 | * |
| 18 | 100 | 99.7 | 0 | 0.1 | 0.2 | 0.105 | 99 | 1 | * |
| 19 | 100 | 99.7 | 0 | 0.1 | 0.2 | 0.1188 | 99 | 1 | * |
| 20 | 100 | 99.7 | 0 | 0.1 | 0.2 | 0.0915 | 99 | 1 | * |
| 21 | 100 | 99.05 | 0 | 0.75 | 0.2 | 0.0906 | 99 | 1 | * |

* Data not available

EXAMPLE 2

Density Measurements

This Example demonstrates the test used to measure the density of filled and unfilled polymer parts.

Procedure

The density was determined by the apparatus shown, unassembled, in FIG. 17. Although not shown in FIG. 17, the apparatus also included a thermometer to measure the suspension liquid temperature. A suspension liquid is a fluid with a density lower than that of the sample to be measured. The sample must sink in the suspension fluid to determine the sample density. Water has a density of 1 g/cm$^3$, so most unfilled polymers require some other suspension fluid such as isopropyl alcohol, density=0.8808 g/cm$^3$. A Mettler AT400 balance (Mettler-Toledo LLC, Columbus, Ohio) was also used.

The density of a limestone-filled HDPE bottle was measured. After taring the balance to zero, the dry solid sample was weighed after placing it in the cup of the Mettler balance. The dry weight was 0.3833 g. After weighing the dry sample and before removing the sample from the cup, the balance was tared again. The sample was removed from the cup and placed on the gem holder in the suspension fluid. The sample was weighed providing the weight with a negative number (−0.3287 g). The number was converted to its absolute value (0.3287 g); the positive value is the sample buoyancy. The sample density was calculated by multiplying the dry weight (0.3833 g) by the suspension fluid density (0.8808 g/cc) and dividing by the sample buoyancy (0.3287 g), which equaled 1.0272 g/cc.

EXAMPLE 3

Formulations

Core-layer formulation 48 comprised FORMOSA PLASTICS® FORMOLENE® HB5502F HDPE hexene copolymer which was used as polyethylene base resin. In some examples, core-layer formulation 48 comprised VERSALITE (A) or VERSALITE (B). Reference is hereby made to U.S. patent application Ser. No. 14/462,073, filed Aug. 18, 2014 and titled POLYMERIC MATERIAL FOR AN INSULATED CONTAINER for disclosure relating to various formulations of VERSALITE in accordance with the present disclosure, which application is hereby incorporated herein by reference in its entirety. In further examples, LLDPE comprised DOW® DOWLEX™ 2045G LLDPE (available from The Dow Chemical Company), electron beam modified to have long-chain branching and a melt index of about 0.2 or 0.13 g/10 min. In still further examples, the polyethylene base resin was blended with HYDROCEROL® CF 40E as a chemical blowing agent and Heritage Plastics HT6000 LLDPE talc as another nucleating agent. In still yet further examples, N$_2$ was used as a blowing agent. The blowing agent was used at levels between about 0.02 lbs/h to about 0.15 lbs/h. The molding machine 52 was a rotary extrusion blow-molding machine available from Wilmington Machinery of Wilmington, N.C. The RPM speed of this machine was at levels between about 5 RPM to about 75 RPM. The various formulations are shown below in Table 10.

The blowing agent, N$_2$, was injected into the molten formulation to expand the molten formulation and reduce the density of the mixture of polymer and nucleating agent. The resulting expanded formulation was then extruded through a die head to establish a core-layer parison. The core-layer parison was molded to form a container according to the present disclosure.

TABLE 10

Comparison of different core layer formulations of Example 3.

| Trial [#] | Formosa 5502F [%] | Ampacet 102823 [0.2MI] | Ampacet 102823 [0.13MI] | Versalite | CF-40E [%] | HT6000 [%] | N$_2$ [lbs/h] | Processing [RPM] |
|---|---|---|---|---|---|---|---|---|
| 7.0.0 | 100 | 0% | 0% | 0% | 0 | 0 | 0 | 20 |
| 7.0.5 | 100 | 0% | 0% | 0% | 0 | 0 | 0.132 | 20 |
| 7.1.0 | 98.8 | 0% | 0% | 0% | 0.2 | 1.0 | 0.132 | 20 |
| 7.2.0 | 49.7 | 49.7% | 0% | 0% | 0.1 | 0.5 | 0.132 | 20 |
| 7.3.0 | 0 | 0% | 0% | 100% (B) | 0 | 0 | 0.132 | 12 |
| 7.3.1 | 0 | 0% | 0% | 100% (B) | 0 | 0 | 0.132 | 24 |
| 7.4.0 | 0 | 0% | 0% | 100% (A) | 0 | 0 | 0.132 | 12 |
| 7.4.1 | 0 | 0% | 0% | 100% (A) | 0 | 0 | 0.132 | 24 |
| 7.4.2 | 0 | 0% | 0% | 100% (A) | 0 | 0 | 0.132 | 36 |
| 7.4.3 | 0 | 99.4% | 0% | 0% | 0.1 | 0.5 | 0.132 | 18 |
| 7.4.4 | 0 | 99.4% | 0% | 0% | 0.1 | 0.5 | 0.132 | 36 |
| 7.5.0 | 0 | 99.4% | 0% | 0% | 0.1 | 0.5 | 0.132 | 20 |
| 7.5.1 | 0 | 99.4% | 0% | 0% | 0.1 | 0.5 | 0.132 | 75 |
| 7.6.0 | 0 | 74.55% | 0% | 24.85% | 0.1 | 0.5 | 0.132 | 20 |
| 7.7.0 | 0 | 0% | 99.4% | 0% | 0.1 | 0.5 | 0.07 | 20 |
| 7.7.1 | 0 | 0% | 99.4% | 0% | 0.1 | 0.5 | 0.07 | 20 |
| Pre-7.8.0 Purge | 100 | 0% | 0% | 0% | 0 |  | 0.07 | 20 |
| 7.8.0 | 99.4 | 0% | 0% | 0% | 0.1 | 0.5 | 0.07 | 11 |
| 7.8.1 | 99.4 | 0% | 0% | 0% | 0.1 | 0.5 | 0.035 | 11 |
| 7.9.0A | 99.4 | 0% | 0% | 0% | 0.1 | 0.5 | 0.035 | 11 |
| 7.9.0B | 99.4 | 0% | 0% | 0% | 0.1 | 0.5 | 0.035 | 19 |
| 7.9.1 | 99.4 | 0% | 0% | 0% | 0.1 | 0.5 | 0.07 | 18 |

TABLE 10-continued

Comparison of different core layer formulations of Example 3.

| Trial [#] | Formosa 5502F [%] | Ampacet 102823 [0.2MI] | Ampacet 102823 [0.13MI] | Versalite | CF-40E [%] | HT6000 [%] | $N_2$ [lbs/h] | Processing [RPM] |
|---|---|---|---|---|---|---|---|---|
| 7.9.2A | 99.4 | 0% | 0% | 0% | 0.1 | 0.5 | 0.05 | 18 |
| 7.9.2B | 99.4 | 0% | 0% | 0% | 0.1 | 0.5 | 0.05 | 11 |
| 7.10A | 0 | 0% | 99.4% | 0% | 0.1 | 0.5 | 0.02 | 9 |
| 7.10B | 0 | 0% | 99.4% | 0% | 0.1 | 0.5 | 0.02 | 25 |
| 7.10C | 0 | 0% | 99.4% | 0% | 0.1 | 0.5 | 0.05 | 25 |
| 7.11A | 84.5 | 0% | 14.9% | 0% | 0.1 | 0.5 | 0.03 | 18 |
| 7.9 | 99 | 0% | 0% | 0% | 1 | 0 | 0.05 | * |
| 7.10 | 98.7 | 0% | 0% | 0% | 1 | 0.3 | 0.05 | * |
| 7.11 | 98.45 | 0% | 0% | 0% | 1.25 | 0.3 | 0.05 | * |
| 7.12 | 98.75 | 0% | 0% | 0% | 1.25 | 0 | 0.05 | * |
| 7.20 | 99.4 | 0% | 0% | 0% | 0.10 | 0.5 | 0.07 | * |
| 7.21 | 99.3 | 0% | 0% | 0% | 0.20 | 0.5 | 0.07 | * |

* Data not available

EXAMPLE 4

Parison Densities, Bottle Densities, Weight, Top Load Performance, and Thickness for Formulations of Example 3

Containers formed according to Table 10 were subjected to a series of measurements and performance tests including core-layer parison density ($\rho$) measurements, container density ($\rho$) measurements, weight measurements, thickness measurements, and top load force performance measurements. The results are shown below in Table 11.

Density was determined by the apparatus and methods described in Example 2. Top load performance was measured by methods described in Example 7.

TABLE 11

Parison densities, container densities, weights, top load performance, and bottle side wall thicknesses of different core layer formulations of Example 3.

| Trial [#] | Parison Density [g/cc] | Container Density [g/cc] | Weight [g] | Top Load [lbs-F] | Thickness [mils] |
|---|---|---|---|---|---|
| 7.0.0 | 0.95 | 0.95 | 60.3 | 133 | 42.3 |
| 7.0.5 | 0.90 | * | * | * | * |
| 7.1.0 | 0.70 | * | * | * | * |
| 7.2.0 | 0.60 | * | * | * | * |
| 7.3.0 | 0.70 | * | * | * | * |
| 7.3.1 | 0.58 | * | * | * | * |
| 7.4.0 | 0.56 | * | * | * | * |
| 7.4.1 | 0.57 | * | * | * | * |
| 7.4.2 | 0.57 | * | * | * | * |
| 7.4.3 | 0.47 | * | * | * | * |
| 7.4.4 | 0.42 | * | * | * | * |
| 7.5.0 | 0.43 | * | * | * | * |
| 7.5.1 | 0.51 | * | * | * | * |
| 7.6.0 | 0.55 | 0.58 | * | * | * |
| 7.7.0 | 0.40 | * | * | * | * |
| 7.7.1 | 0.41 | 0.64 | * | * | * |
| Pre-7.8.0 Purge | * | 0.62 | * | * | * |
| 7.8.0 | 0.42 | * | * | * | * |
| 7.8.1 | 0.42 | * | * | * | * |
| 7.9.0A | 0.41 | 0.62 | 30.7 | 31 | 38.1 |
| 7.9.0B | 0.51 | 0.73 | 49.0 | 87 | 43.1 |
| 7.9.1 | * | * | * | * | * |
| 7.9.2A | 0.43 | 0.68 | 41.9 | 56 | 40.4 |
| 7.9.2B | * | * | * | * | * |
| 7.10A | 0.48 | 0.51 | * | * | * |
| 7.10B | 0.61 | 0.81 | * | * | * |
| 7.10C | 0.66 | * | * | * | * |
| 7.11A | 0.52 | 0.72 | * | * | * |
| 7.9 | 0.43 | 0.74 | 56 | * | * |
| 7.10 | 0.43 | 0.73 | 56 | * | * |
| 7.11 | 0.43 | 0.73 | 56 | * | * |
| 7.12 | 0.42 | 0.73 | 56 | * | * |
| 7.20 | * | 0.683 | 56 | * | * |
| 7.21 | * | 0.701 | 56 | * | * |

* Data not available

EXAMPLE 5

Molding Parameters Used to Form Containers

Core-layer formulation 48 is comprised FORMOSA PLASTICS® FORMOLENE® HB5502F HDPE hexene copolymer as a polyethylene base resin. The polyethylene base resin was blended with HYDROCEROL® CF 40E as a chemical blowing agent and nucleating agent, Heritage Plastics HT6000 LLDPE Based Talc Concentrate as an additional nucleating agent. $N_2$ was used as a blowing agent. The percentages were about:
  99.4% FORMOLENE® HB5502F HDPE hexene copolymer
  0.1% HYDROCEROL® CF 40E
  0.5% Heritage Plastics HT6000 LLDPE Based Talc Concentrate The HDPE and nucleating agents were added to an extruder hopper and blended to provide a formulation. The formulation was then heated in the extruder to form a molten formulation. The blowing agent was then added to the molten formulation at a rate of about:
  0.04 lbs/h The blowing agent, $N_2$ was injected into the molten formulation to expand the molten formulation and reduce the density of the mixture of polymer and nucleating agent. The resulting expanded formulation was then extruded through a die head to establish a parison, also called tube.

A mold was closed around the tube and a blow needle was inserted into a space formed in the tube. During inserting the needle, the mold moved away from the die head. In some examples, vacuum was applied to the mold and in others no vacuum was applied to the mold. Vacuum caused the pressure to decrease to $P_{VAC}$, which is between about 0 inches Hg and about 29 inches Hg. Pressurized gas, in some examples air, was pumped into a space formed in the tube to cause the tube to expand and take on the shape of the mold. In the next step, the mold was opened to reveal a container.

Parameters that were varied were cycle time, gas pressure, and vacuum. Cycle time is an amount of time between closing the mold around the tube and opening the mold to reveal a container. In some examples, cycle time was varied between 14 and 18 seconds. In further examples, gas pressure varied between about 40 psi and about 60 psi. In still further examples, pressurized gas was about room temperature.

TABLE 12

Molding parameters used to form containers of Example 5.

| Run [#] | Cycle [s] | Air [psi] | Vacuum |
|---|---|---|---|
| 8.1.1 | 14 | 40 | Off |
| 8.1.2 | 14 | 40 | On |
| 8.1.3 | 14 | 60 | Off |
| 8.1.4 | 14 | 60 | On |
| 8.1.5 | 15 | 40 | Off |
| 8.1.6 | 15 | 40 | On |
| 8.1.7 | 15 | 60 | Off |
| 8.1.8 | 15 | 60 | On |
| 8.1.9 | 16 | 40 | Off |
| 8.1.10 | 16 | 40 | On |
| 8.1.11 | 16 | 60 | Off |
| 8.1.12 | 16 | 60 | On |
| 8.1.13 | 17 | 40 | Off |
| 8.1.1 | 17 | 40 | On |
| 8.1.2 | 17 | 60 | Off |
| 8.1.3 | 17 | 60 | On |
| 8.1.4 | 18 | 40 | Off |
| 8.1.5 | 18 | 40 | On |
| 8.1.6 | 18 | 60 | Off |
| 8.1.7 | 18 | 60 | On |

EXAMPLE 6

Drop Test Measurements

General Procedure

Drop testing determines a likelihood of container survival due to a drop or impact to the container. Containers were subjected to a drop testing procedure based on ASTM D2463 (Standard Test Method for Drop Impact Resistance of Blow-Molded Thermoplastic Containers), which is incorporated by reference herein in its entirety.

The drop test was performed according to the following procedure. A bucket was filled with tap water. The water in the bucket was allowed to condition for at least 24 hours at about room temperature and about 75% relative humidity. The container was filled with water from the bucket and closed off with, for example, a lid. The filled, capped containers were then subjected to the following procedure: (a) the filled, capped container was located at about five feet above a hard surface such as concrete or tile; (b) the filled, capped container was then oriented such that a bottom of the filled, capped container was arranged to lie in a substantially parallel relation to the hard surface; (c) each of five or ten capped, filled containers were dropped; (d) upon impact, each filled, capped container was examined for any break or shattering of the wall that causes water to leak out of the bottle; and (d) the total number of bottles showing any sign of leakage after the drop test were counted as failures.

EXAMPLE 7

Top Load Measurements

General Procedure

Top load testing determines how much force a container can withstand before the container fails or necks in to form an hourglass shape. Various containers 10 were subjected to top load testing. An Instron tester, such as and generally consistent with an Instron Series 5500 Load Frame, may be used to determine top load performance as suggested in FIG. 15.

The top load test was generally performed according to the following procedure. A container was placed on a flat surface such that the floor of the container was arranged to lie in a substantially parallel relation to the flat surface. A crosshead of the Instron tester applied a compressive force to the top of the neck of the container. A load transducer, mounted in series with the container, measured the applied load. Containers 10 were tested until they failed or necked in to form an hourglass shape. Once failure or necking was observed, the value shown on Instron tester was recorded.

EXAMPLE 8

Parison Densities, Bottle Densities, Weight, Top Load Performance, Thickness, and Drop Test Results for Formulations of Example 5

Containers formed according to Table 12 were subjected to a series of measurements and performance tests including core-layer parison density (ρ) measurements, container density (ρ) measurements, weight measurements, thickness measurements, top load force performance measurements, and drop testing. The results are shown below in Table 13.

Density was determined by the apparatus and methods described in Example 2. Drop tests were conducted by methods described in Example 6. Top load performance was measured by methods described in Example 7.

TABLE 13

Parison densities, bottle densities, weight, top load performance, bottle side wall thicknesses, and drop test results of different core layer formulations of Example 5.

| Run [#] | Parison Density [g/cc] | Container Density [g/cc] | Weight [g] | Thickness [mils] | Top Load [lbs-F] | Drop Test [Pass %] |
|---|---|---|---|---|---|---|
| 8.1.1 | 0.546 | 0.748 | 52.8 | 43.8 | 109.0 | 40 |
| 8.1.2 | 0.570 | 0.795 | 53.8 | 44.6 | 107.5 | 80 |
| 8.1.3 | 0.542 | 0.706 | 51.2 | 44.0 | 111.4 | 20 |
| 8.1.4 | 0.538 | 0.724 | 51.8 | 46.6 | 105.3 | 20 |

TABLE 13-continued

Parison densities, bottle densities, weight, top load performance, bottle side wall thicknesses, and drop test results of different core layer formulations of Example 5.

| Run [#] | Parison Density [g/cc] | Container Density [g/cc] | Weight [g] | Thickness [mils] | Top Load [lbs-F] | Drop Test [Pass %] |
|---|---|---|---|---|---|---|
| 8.1.5 | 0.553 | 0.792 | 52.0 | 42.8 | 107.0 | 60 |
| 8.1.6 | 0.559 | 0.789 | 52.4 | 42.9 | 107.5 | 40 |
| 8.1.7 | 0.542 | 0.844 | 53.5 | 40.0 | 108.8 | 80 |
| 8.1.8 | 0.550 | 0.798 | 52.6 | 39.1 | 106.8 | 100 |
| 8.1.9 | 0.536 | 0.649 | 48.8 | 45.1 | 102.8 | 0 |
| 8.1.10 | 0.549 | 0.788 | 51.4 | 42.3 | 102.7 | 60 |
| 8.1.11 | 0.540 | 0.825 | 52.1 | 38.7 | 107.1 | 100 |
| 8.1.12 | 0.555 | 0.840 | 51.5 | 39.2 | 103.1 | 80 |
| 8.1.13 | 0.548 | 0.791 | 49.8 | 40.7 | 97.1 | 100 |
| 8.1.14 | 0.544 | 0.789 | 50.0 | 40.4 | 95.0 | 100 |
| 8.1.15 | 0.543 | 0.716 | 47.3 | 40.0 | 91.4 | 0 |
| 8.1.16 | 0.548 | 0.707 | 47.5 | 40.1 | 89.4 | 20 |
| 8.1.17 | 0.546 | 0.806 | 49.7 | 38.4 | 93.1 | 60 |
| 8.1.18 | 0.540 | 0.792 | 50.1 | 40.2 | 94.5 | 80 |
| 8.1.19 | 0.533 | 0.833 | 49.0 | 35.3 | 94.9 | 100 |
| 8.1.20 | 0.547 | 0.829 | 48.8 | 36.1 | 92.6 | 80 |

EXAMPLE 9

Formulations Comprising Electron Beam Modified HDPE

Core-layer formulation 48 comprised FORMOSA PLASTICS® FORMOLENE® HB5502F HDPE hexene copolymer as a first material of a polyethylene base resin. EQUISTAR® ALATHON® H5520 HDPE copolymer (available from Lyondell Chemical Company), electron beam modified to have long-chain branching and a melt index of about 0.75 g/10 min, was used as a second material of the polyethylene base resin. The polyethylene base resin was blended with HYDROCEROL® CF 40E as a chemical blowing agent and nucleating agent. N$_2$ was used as a blowing agent. The blowing agent was used at levels between about 0.03 lbs/h to about 0.11 lbs/h.

The blowing agent, N$_2$, was injected into the molten formulation to expand the molten formulation and reduce the density of the mixture of polymer and nucleating agent. The resulting expanded formulation was then extruded through a die head to establish a core-layer parison. The core-layer parison, also called tube, was molded to form a container according to the present disclosure.

TABLE 14

Comparison of different core layer formulations of Example 9.

| Run [#] | Formosa [%] | E-Beam HDPE [%] | Chemical Blowing Agent [%] | Nitrogen [lbs/h] |
|---|---|---|---|---|
| 8.2.1 | 25 | 75 | 0.1 | 0.035 |
| 8.2.2 | 25 | 75 | 0.5 | 0.07 |

TABLE 14-continued

Comparison of different core layer formulations of Example 9.

| Run [#] | Formosa [%] | E-Beam HDPE [%] | Chemical Blowing Agent [%] | Nitrogen [lbs/h] |
|---|---|---|---|---|
| 8.2.3 | 25 | 75 | 1.0 | 0.105 |
| 8.2.4 | 50 | 50 | 0.1 | 0.07 |
| 8.2.5 | 50 | 50 | 0.5 | 0.105 |
| 8.2.6 | 50 | 50 | 1.0 | 0.035 |
| 8.2.7 | 75 | 25 | 0.1 | 0.105 |
| 8.2.8 | 75 | 25 | 0.5 | 0.035 |
| 8.2.9 | 75 | 25 | 1.0 | 0.07 |

EXAMPLE 10

Parison Densities, Bottle Densities, Weight, Top Load Performance, and Thickness for Formulations of Example 9

Containers formed according to Table 12 were subjected to a series of measurements and performance tests including core-layer parison density (ρ) measurements, container density (ρ) measurements, weight measurements, thickness measurements, and top load force performance measurements. The results are shown below in Table 13.

Density was determined by the apparatus and methods described in Example 2. Drop tests were conducted by methods described in Example 6. Top load performance was measured by methods described in Example 7.

TABLE 15

Parison densities, bottle densities, weight, top load performance, and bottle side wall thicknesses of different core layer formulations of Example 9.

| Run [#] | Parison Density [g/cc] | Container Density [g/cc] | Weight [g] | Thickness [mils] | Top Load [lbs-F] | Drop Test [Pass] |
|---|---|---|---|---|---|---|
| 8.2.1 | 0.560 | 0.821 | 43.1 | 33.8 | 78.0 | 0.0 |
| 8.2.2 | 0.401 | 0.681 | * | * | * | * |

TABLE 15-continued

Parison densities, bottle densities, weight, top load performance, and bottle side wall thicknesses of different core layer formulations of Example 9.

| Run [#] | Parison Density [g/cc] | Container Density [g/cc] | Weight [g] | Thickness [mils] | Top Load [lbs-F] | Drop Test [Pass] |
|---|---|---|---|---|---|---|
| 8.2.3 | 0.693 | 0.676 | * | * | * | * |
| 8.2.4 | 0.407 | 0.658 | 35.7 | 28.7 | 42.8 | 0.0 |
| 8.2.5 | 0.565 | 0.650 | * | * | * | * |
| 8.2.6 | 0.494 | 0.723 | 41.3 | 34.1 | 70.2 | 0.0 |
| 8.2.7 | 0.360 | 0.387 | * | * | * | * |
| 8.2.8 | 0.496 | 0.743 | 41.6 | 33.2 | 71.2 | 0.0 |
| 8.2.9 | 0.422 | 0.378 | * | * | * | * |

* Data not available

EXAMPLE 11

Formulations Comprising Electron Beam Modified LLDPE

Core-layer formulation 48 comprises FORMOSA PLASTICS® FORMOLENE® HB5502F HDPE hexene copolymer as a first material of a polyethylene base resin. DOW® DOWLEX™ 2045G LLDPE (available from The Dow Chemical Company), electron beam modified to have long-chain branching and a melt index of about 0.15 g/10 min, is used as a second material of a second polyethylene base resin. The polyethylene base resin is blended with HYDROCEROL® CF 40E as a chemical blowing agent and nucleating agent and Heritage Plastics HT6000 LLDPE Based Talc Concentrate as an additional nucleating agent. $N_2$ is used as a blowing agent.

The blowing agent, $N_2$, is injected into the molten formulation to expand the molten formulation and reduce the density of the mixture of polymer and nucleating agent. The resulting expanded formulation is then extruded through a die head to establish a core-layer parison. The tube is molded to form a container according to the present disclosure.

TABLE 16

Comparison of different core layer formulations of Example 11.

| Run [#] | Formosa [%] | E-Beam LLDPE [%] | Chemical Blowing Agent [%] | $N_2$ [lbs/h] | HT6000 [%] |
|---|---|---|---|---|---|
| 8.3.1 | 55 | 45 | 0.1 | 0.035 | 0.25 |
| 8.3.2 | 55 | 45 | 0.5 | 0.07 | 0.5 |
| 8.3.3 | 55 | 45 | 1.0 | 0.105 | 1 |
| 8.3.4 | 70 | 30 | 0.1 | 0.07 | 1 |
| 8.3.5 | 70 | 30 | 0.5 | 0.105 | 0.25 |
| 8.3.6 | 70 | 30 | 1.0 | 0.035 | 0.5 |
| 8.3.7 | 85 | 15 | 0.1 | 0.105 | 0.5 |
| 8.3.8 | 85 | 15 | 0.5 | 0.035 | 0.01 |
| 8.3.9 | 85 | 15 | 1.0 | 0.07 | 0.25 |

EXAMPLE 12

Formulations Using Virgin and Regrind HDPE

Core-layer formulation 48 comprised FORMOSA PLASTICS® FORMOLENE® HB5502F HDPE hexene copolymer as a first material of a polyethylene base resin. In some examples, the FORMOSA PLASTICS® FORMOLENE® HB5502F HDPE hexene copolymer comprises various amounts of virgin and regrind materials. The polyethylene base resin was blended with HYDROCEROL® CF 40E as a chemical blowing agent and nucleating agent and Heritage Plastics HT6000 LLDPE Based Talc Concentrate as an additional nucleating agent. $N_2$ was used as a blowing agent. The percentages were about:

99.4% FORMOLENE® HB5502F HDPE hexene copolymer 0.1% HYDROCEROL® CF 40E 0.5% Heritage Plastics HT6000 LLDPE Based Talc Concentrate The HDPE and nucleating agents were added to an extruder hopper and blended to provide a formulation. The formulation was then heated in the extruder to form a molten formulation. The blowing agent was then added to the molten formulation at a rate of about:

0.04 lbs/h

The blowing agent, $N_2$ was injected into the molten formulation to expand the molten formulation and reduce the density of the mixture of polymer and nucleating agent. The resulting expanded formulation was then extruded through a die head to establish a parison.

A mold was closed around the tube and a blow needle was inserted into a space formed in the tube. During inserting the needle, the mold moved away from the die head. Vacuum was applied to the mold and caused the pressure to decrease to $P_{VAC}$, which is between about 0 inches Hg and about 29 inches Hg. Pressurized gas, in some examples air, was pumped into a space formed in the tube to cause the tube to expand and take on the shape of the mold. The pressurized gas in this example was about 40 psi and about room temperature. In the next step, the mold was opened to reveal a container. Cycle time is an amount of time between closing the mold around the tube and opening the mold to reveal a container. The cycle time in this example was between 14 and 16 second. In one example, cycle time was 15 seconds.

TABLE 17

Virgin/regrind percentages and molding parameters used to form containers of Example 12.

| Run [#] | Virgin HDPE [%] | Regrind HDPE [%] | Cycle Time [s] |
|---|---|---|---|
| 9.1.Control | 100 | 0 | 15 |
| 9.1.1 | 80 | 20 | 14 |
| 9.1.2 | 80 | 20 | 15 |
| 9.1.3 | 80 | 20 | 16 |
| 9.1.4 | 60 | 40 | 14 |
| 9.1.5 | 60 | 40 | 15 |

TABLE 17-continued

Virgin/regrind percentages and molding parameters used to form containers of Example 12.

| Run [#] | Virgin HDPE [%] | Regrind HDPE [%] | Cycle Time [s] |
|---|---|---|---|
| 9.1.6 | 60 | 40 | 16 |
| 9.1.7 | 40 | 60 | 14 |
| 9.1.8 | 40 | 60 | 15 |
| 9.1.9 | 40 | 60 | 16 |
| 9.1.10 | 20 | 80 | 14 |
| 9.1.11 | 20 | 80 | 15 |
| 9.1.12 | 20 | 80 | 16 |

EXAMPLE 13

Parison Densities, Bottle Densities, Weight, Top Load Performance, and Thickness for Formulations of Example 12

Containers formed according to Table 17 were subjected to a series of measurements and performance tests including core-layer parison density ($\rho$) measurements, container density ($\rho$) measurements, weight measurements, thickness measurements, top load force performance measurements, and drop testing. The results are shown below in Table 18.

Density was determined by the apparatus and methods described in Example 2. Drop tests were conducted by methods described in Example 6. Top load performance was measured by methods described in Example 7.

TABLE 18

Parison densities, bottle densities, weights, top load performance, and bottle side wall thicknesses of different core layer formulations of Example 12.

| Run [#] | Parison Density [g/cc] | Container Density [g/cc] | Weight [g] | Thickness [mils] | Top Load [lbs-F] | Drop Test [Pass %] |
|---|---|---|---|---|---|---|
| 9.1.Control | 0.617 | 0.757 | 51.6 | 43.8 | 95.3 | 20 |
| 9.1.1 | 0.524 | 0.769 | 53.6 | 42.7 | 98.0 | 0 |
| 9.1.2 | 0.493 | 0.728 | 51.5 | 43.2 | 96.2 | 40 |
| 9.1.3 | 0.499 | 0.747 | 50.2 | 43.0 | 91.4 | 40 |
| 9.1.4 | 0.519 | 0.747 | 52.4 | 44.3 | 93.9 | 20 |
| 9.1.5 | 0.531 | 0.751 | 51.0 | 43.1 | 92.8 | 0 |
| 9.1.6 | 0.523 | 0.742 | 49.6 | 41.1 | 88.9 | 0 |
| 9.1.7 | 0.493 | 0.718 | 52.0 | 44.0 | 90.9 | 20 |
| 9.1.8 | 0.435 | 0.697 | 49.8 | 43.3 | 81.6 | 0 |
| 9.1.9 | 0.444 | 0.682 | 47.3 | 42.0 | 76.1 | 20 |
| 9.1.10 | 0.442 | 0.690 | 50.1 | 44.4 | 83.9 | 0 |
| 9.1.11 | 0.483 | 0.726 | 49.3 | 42.4 | 85.5 | 0 |
| 9.1.12 | 0.493 | 0.728 | 47.7 | 39.8 | 80.7 | 0 |

EXAMPLE 14

Formulations Using Virgin and Regrind HDPE

Core-layer formulation 48 comprised FORMOSA PLASTICS® FORMOLENE® HB5502F HDPE hexene copolymer as a first material of a polyethylene base resin. DOW® DOWLEX™ 2045G LLDPE (available from The Dow Chemical Company), electron beam modified to have long-chain branching and a melt index of about 0.15 g/10 min, was used as a second material of a second polyethylene base resin. The polyethylene base resin was blended with HYDROCEROL® CF 40E as a Chemical Blowing Agent (CBA) and nucleating agent and Heritage Plastics HT6000 LLDPE Based Talc Concentrate as an additional nucleating agent. $N_2$ was used as a blowing agent.

The blowing agent, $N_2$, was injected into the molten formulation at a rate between about 0.03 and 0.11 lbs/h to expand the molten formulation and reduce the density of the mixture of polymer and nucleating agent. The resulting expanded formulation was then extruded through a die head to establish a core-layer parison.

A mold was closed around the tube and a blow needle was inserted into a space formed in the tube. During inserting the needle, the mold moved away from the die head. Vacuum was applied to the mold and caused the pressure to decrease to $P_{VAC}$, which is between about 0 inches Hg and about 29 inches Hg. Pressurized gas, in some examples air, was pumped into a space formed in the tube to cause the tube to expand and take on the shape of the mold. The pressurized gas in this example was about 40 psi and about room temperature. In the next step, the mold was opened to reveal a container. Cycle time is an amount of time between closing the mold around the tube and opening the mold to reveal a container. The cycle time in this example was between 14 and 16 second. In one example, cycle time was 15 seconds.

TABLE 19

Comparison of different core layer formulations of Example 14.

| Run [#] | Formosa [%] | E-Beam LLDPE [%] | CBA [%] | Nitrogen [lbs/h] |
|---|---|---|---|---|
| 9.2.1 | 25 | 75 | 0.1 | 0.035 |
| 9.2.2 | 25 | 75 | 0.5 | 0.07 |
| 9.2.3 | 25 | 75 | 1.0 | 0.105 |
| 9.2.4 | 50 | 50 | 0.1 | 0.07 |
| 9.2.5 | 50 | 50 | 0.5 | 0.105 |
| 9.2.6 | 50 | 50 | 1.0 | 0.035 |
| 9.2.7 | 75 | 25 | 0.1 | 0.105 |
| 9.2.8 | 75 | 25 | 0.5 | 0.035 |
| 9.2.9 | 75 | 25 | 1.0 | 0.07 |

EXAMPLE 15

Parison Densities, Bottle Densities, Weight, Top Load Performance, and Thickness for Formulations of Example 14

Containers formed according to Table 19 were subjected to a series of measurements and performance tests including core-layer parison density (ρ) measurements, container density (ρ) measurements, weight measurements, thickness measurements, top load force performance measurements, and drop testing. The results are shown below in Table 20.

Density was determined by the apparatus and methods described in Example 2. Drop tests were conducted by methods described in Example 6. Top load performance was measured by methods described in Example 7.

TABLE 20

Parison densities, bottle Densities, weight, top load performance, and bottle side wall thicknesses of different core layer formulations of Example 14.

| Run [#] | Parison Density [g/cc] | Container Density [g/cc] | Weight [g] | Thickness [mils] | Top Load [lbs-F] | Drop Test [Pass %] |
|---|---|---|---|---|---|---|
| 9.2.1 | 0.688 | 0.760 | 42.6 | 36.6 | 28.3 | 0 |
| 9.2.2 | 0.529 | 0.401 | * | * | * | * |
| 9.2.3 | 0.474 | 0.587 | * | * | * | * |
| 9.2.4 | 0.432 | 0.661 | 40.7 | 38.0 | 35.8 | 0 |
| 9.2.5 | 0.478 | 0.647 | * | * | * | * |
| 9.2.6 | 0.527 | 0.768 | * | * | * | * |
| 9.2.7 | 0.371 | 0.503 | * | * | * | * |
| 9.2.8 | 0.555 | 0.802 | 47.1 | 41.5 | 74.0 | 40 |
| 9.2.9 | 0.432 | 0.419 | * | * | * | * |

* Data not available

EXAMPLE 16

Formulations Using Virgin and Second Pass Regrind HDPE

Core-layer formulation 48 comprised FORMOSA PLASTICS® FORMOLENE® HB5502F HDPE hexene copolymer as a first material of a polyethylene base resin. In some examples, the FORMOSA PLASTICS® FORMOLENE® HB5502F HDPE hexene copolymer comprises various amounts of virgin and second pass regrind material. Second pass regrind material may be, for example, material prepared previously in Table 17 which included first pass regrind. The polyethylene base resin was blended with HYDROCEROL® CF 40E as a chemical blowing agent and nucleating agent and Heritage Plastics HT6000 LLDPE Based Talc Concentrate as an additional nucleating agent. $N_2$ was used as a blowing agent. The percentages were about:

99.4% FORMOLENE® HB5502F HDPE hexene copolymer
0.1% HYDROCEROL® CF 40E
0.5% Heritage Plastics HT6000 LLDPE Based Talc Concentrate The HDPE and nucleating agents were added to an extruder hopper and blended to provide a formulation. The formulation was then heated in the extruder to form a molten formulation. The blowing agent was then added to the molten formulation at a rate of about:

0.04 lbs/h

The blowing agent, $N_2$ was injected into the molten formulation to expand the molten formulation and reduce the density of the mixture of polymer and nucleating agent. The resulting expanded formulation was then extruded through a die head to establish a parison.

A mold was closed around the tube and a blow needle was inserted into a space formed in the tube. During inserting the needle, the mold moved away from the die head. Vacuum was applied to the mold and caused the pressure to decrease to $P_{VAC}$, which is between about 0 inches Hg and about 29 inches Hg. Pressurized gas, in some examples air, was pumped into a space formed in the tube to cause the tube to expand and take on the shape of the mold. The pressurized gas in this example was about 40 psi and about room temperature. In the next step, the mold was opened to reveal a container. Cycle time is an amount of time between closing the mold around the tube and opening the mold to reveal a container. The cycle time in this example was between 14 and 16 second. In one example, cycle time was 15 seconds.

TABLE 21

Virgin/second pass regrind percentages and molding parameters used to form containers of Example 16. Table 17 formulations were run through Table 21.

| Run [#] | Virgin [%] | Second Pass Regrind [%] | Cycle Time [s] |
|---|---|---|---|
| 9.3.1 | 80 | 20 | 14 |
| 9.3.2 | 80 | 20 | 15 |
| 9.3.3 | 80 | 20 | 16 |
| 9.3.4 | 60 | 40 | 14 |
| 9.3.5 | 60 | 40 | 15 |
| 9.3.6 | 60 | 40 | 16 |
| 9.3.7 | 40 | 60 | 14 |
| 9.3.8 | 40 | 60 | 15 |
| 9.3.9 | 40 | 60 | 16 |
| 9.3.10 | 20 | 80 | 14 |
| 9.3.11 | 20 | 80 | 15 |
| 9.3.12 | 20 | 80 | 16 |
| 9.3.13 | 0 | 100 | 14 |
| 9.3.14 | 0 | 100 | 15 |
| 9.3.15 | 0 | 100 | 16 |

EXAMPLE 17

Parison Densities, Bottle Densities, Weight, Top Load Performance, and Thickness for Formulations of Example 16.

Containers formed according to Table 21 were subjected to a series of measurements and performance tests including core-layer parison density (ρ) measurements, container density (ρ) measurements, weight measurements, thickness measurements, top load force measurements, and drop testing. The results are shown below in Table 22.

Density was determined by the apparatus and methods described in Example 2. Drop tests were conducted by methods described in Example 6. Top load performance was measured by methods described in Example 7.

TABLE 22

Parison densities, bottle densities, weight, top load performance, and bottle side wall thicknesses of different core layer formulations of Example 16.

| Run [#] | Parison Density [g/cc] | Container Density [g/cc] | Weight [g] | Thickness [mils] | Top Load [lbs-F] | Drop Test [Pass, %] |
|---|---|---|---|---|---|---|
| 9.3.1 | 0.536 | 0.773 | 52.66072 | 44.1 | 105.4 | 20 |
| 9.3.2 | 0.502 | 0.764 | 52.33318 | 43.9 | 111.5 | 40 |

TABLE 22-continued

Parison densities, bottle densities, weight, top load
performance, and bottle side wall thicknesses of different
core layer formulations of Example 16.

| Run [#] | Parison Density [g/cc] | Container Density [g/cc] | Weight [g] | Thickness [mils] | Top Load [lbs-F] | Drop Test [Pass, %] |
|---|---|---|---|---|---|---|
| 9.3.3 | 0.496 | 0.778 | 50.3535 | 41.0 | 104.9 | 0 |
| 9.3.4 | * | * | * | * | * | * |
| 9.3.5 | * | * | * | * | * | * |
| 9.3.6 | * | * | * | * | * | * |
| 9.3.7 | * | * | * | * | * | * |
| 9.3.8 | * | * | * | * | * | * |
| 9.3.9 | * | * | * | * | * | * |
| 9.3.10 | * | * | * | * | * | * |
| 9.3.11 | * | * | * | * | * | * |
| 9.3.12 | * | * | * | * | * | * |
| 9.3.13 | * | * | * | * | * | * |
| 9.3.14 | * | * | * | * | * | * |
| 9.3.15 | * | * | * | * | * | * |

* Data not available formulation was then heated in the extruder to form a molten formulation. The blowing agent was then added to the molten formulation at a rate of about:

0.04 lbs/h

Containers were prepared according to the present disclosure. The molding machine 52 was a rotary extrusion blow-molding machine available from Wilmington Machinery of Wilmington, N.C. The RPM speed of this machine was at levels between about 5 RPM to about 75 RPM.

Containers were subjected to a series of measurements and performance tests including core-layer parison density (ρ) measurements, container density (ρ) measurements, weight measurements, thickness measurements, top load force measurements, and drop testing. The results are shown below in Table 23.

Density was determined by the apparatus and methods described in Example 2. Drop tests were conducted by methods described in Example 6. Top load performance was measured by methods described in Example 7.

TABLE 23

Parison densities, bottle densities, weight, top load performance, and bottle side
wall thicknesses of core layer formulations formed at different RPM levels.

| Run [#] | RPM | Parison Density [g/cc] | Container Density [g/cc] | Weight [g] | Thickness [mils] | Top Load [lbs-F] | Drop Test [Pass, %] |
|---|---|---|---|---|---|---|---|
| 9.4.5 | 48 | 0.711 | 0.892 | 54.5 | 41.2 | 87.562 | 100 |
| 9.4.1 | 36 | 0.660 | 0.842 | 50.2 | 37.7 | 92.696 | 100 |
| 9.4.1A | 36 | 0.638 | 0.780 | 51.5 | 43.6 | 89.578 | 100 |
| 9.4.2 | 27 | 0.577 | 0.817 | 53.4 | 42.1 | 105.806 | 100 |
| 9.4.3 | 18 | 0.495 | 0.756 | 45.0 | 37.0 | 73.94 | 20 |
| 9.4.4 | 11 | 0.396 | 0.601 | 32.0 | 30.7 | 36.764 | 0 |

EXAMPLE 18

Throughput Study

Core-layer formulation 48 comprised FORMOSA PLASTICS® FORMOLENE® HB5502F HDPE hexene copolymer as a first material of a polyethylene base resin. In some examples, the FORMOSA PLASTICS® FORMOLENE® HB5502F HDPE hexene copolymer comprises various amounts of virgin and second pass regrind material. The polyethylene base resin was blended with HYDROCEROL® CF 40E as a chemical blowing agent and nucleating agent and Heritage Plastics HT6000 LLDPE Based Talc Concentrate as an additional nucleating agent. $N_2$ was used as a blowing agent. The percentages were about:

99.4% FORMOLENE® HB5502F HDPE hexene copolymer 0.1% HYDROCEROL® CF 40E 0.5% Heritage Plastics HT6000 LLDPE Based Talc Concentrate The HDPE and nucleating agents were added to an extruder hopper and blended to provide a formulation. The

EXAMPLE 19

Formulations

Outer-layer formulation 44 comprised about 95% to about 100% MARLEX® HHM 5502BN HDPE (available from Chevron Phillips Chemical Company) and about 0% to about 5% COLORTECH® 11933-19 Titanium Oxide Colorant (available from COLORTECH® a PPM Company). Inner-layer formulation 40 comprised about 100% Marlex® HHM 5502BN HDPE (available from Chevron Phillips Chemical Company).

Core-layer formulation 48 comprised about 100% Marlex® HHM 5502BN HDPE (available from Chevron Phillips Chemical Company) as a first material of a polyethylene base resin. EQUISTAR® ALATHON® H5520 HDPE copolymer (available from Lyondell Chemical Company), electron beam modified to have long-chain branching and a melt index of about 0.75 g/10 min, was used as a second material of the polyethylene base resin. The polyethylene base resin was blended with HYDROCEROL® CF 40E as a chemical blowing agent and Heritage Plastics HT6000 LLDPE talc as another nucleating agent. $N_2$ was used as a blowing agent.

The blowing agent, $N_2$, was injected into the molten formulation at levels between about 0.01 lbs/h to about 0.15 lbs/h to expand the molten formulation and reduce the density of the mixture of polymer and nucleating agent. The resulting expanded formulation was then extruded through a die head to establish a core-layer parison. Inner and outer layers were extruded through the die head, locating the expanded formulation therebetween, to form a multi-layer tube. The multi-layer tube was molded to form a container according to the present disclosure.

TABLE 24

Comparison of different core layer formulations of Example 19.

| Sample ID | Core Layer [%] | | | | Outer[%] | | Inside[%] | Process N$_2$ [kg/h] |
|---|---|---|---|---|---|---|---|---|
| | Chevron | Alathon | CBA | HT6000 | Chevron | Color | Chevron | |
| 10.A | 100 | 0 | 0 | 0 | 100 | 0 | 100 | 0 |
| 10.B | 98.75 | 0 | 0.75 | 0.50 | 100 | 0 | 100 | 0.017 |
| 10.C | 79.20 | 19.80 | 0.50 | 0.50 | 100 | 0 | 100 | 0.011 |
| 10.E | 0 | 0 | 0 | 0 | 100 | 0 | 100 | 0 |
| 10.F | 0 | 0 | 0 | 0 | 95 | 5 | 100 | 0 |
| 10.G | 99.20 | 0 | 0.20 | 0.60 | 95 | 5 | 100 | 0.011 |
| 10.H | 99.20 | 0 | 0.20 | 0.60 | 100 | 0 | 100 | 0.007 |

EXAMPLE 20

Densities, Weights, and Layer Thicknesses for Formulations of Example 19

Multi-layer containers formed according to Table 24 were subjected to a series of measurements including container the average of several density measurements (ρ), weight measurements, and thickness measurements. The results are shown below in Table 25.

Density was determined by the apparatus and methods described in Example 2.

TABLE 25

Densities, weights, top load performance, and layer thicknesses of core layer formulations of Example 19.

| Sample ID | Weight [g] | ρ [g/cc] | Core [mil] | Outer [mil] | Inner [mil] |
|---|---|---|---|---|---|
| 10.A | 45.1 | 0.916 | 43.2 | * | * |
| 10.B | 35.9 | 0.735 | 36.9 | 4.3 | 5.1 |
| 10.C | 36.0 | 0.712 | 38.0 | 4.4 | 4.6 |
| 10.E | 22.9 | 0.938 | 36.9 | * | * |
| 10.F | 23.2 | 0.941 | 37.5 | * | * |
| 10.G | 16.0 | 0.649 | 26.3 | 3.7 | 4.9 |
| 10.H | 16.9 | 0.638 | 27.7 | 4.7 | 3.2 |

* Data not available

EXAMPLE 21

Rigidity Test

General Procedure

Rigidity testing determines how resistant containers are to deformation. Various multi-layer containers 10 in accordance with the present disclosure were subjected to rigidity testing. Each multi-layer container was placed in a rigidity tester as shown in FIG. 16 and tested to determine rigidity as shown below in Table 3. Testing involved placing a multi-layer container in a rigidity tester 300 as shown in FIG. 16 in two orientations. The rigidity tester included a stationary cylindrical stop 302 on a left side and a movable anvil 304 and force gauge 306 on a right side. The movable anvil was generally T-shaped as shown in FIG. 16. For each orientation, side wall 90 of multi-layer container 10 was deformed about midway between floor 88 and neck 92 of multi-layer container 10. Side wall 90 was deformed about 0.25 inches over a 10 second interval and the force required to do so was recorded in pounds-Force. The first orientation placed a mold seam of multi-layer container in alignment to engage movable anvil 304 (0 Degrees). The second orientation rotated multi-layer container 10 so that the seam was about 90 degrees away from the movable anvil (90 Degrees). The second orientation is reported for rigidity measurements herein.

EXAMPLE 22

Top Load Performance, Rigidity, and Drop Test Results for Formulations of Example 19

Multi-layer containers formed according to Table 24 were subjected to a series of measurements and performance tests including top load force performance measurements, rigidity measurements, and drop testing. The results are shown below in Table 25.

Drop tests were conducted by methods described in Example 6. Top load performance was measured by methods described in Example 7. Rigidity was measured by methods described in Example 21.

TABLE 26

Drop Test Results, Rigidity, and Top Load Performance of core layer formulations of Example 19.

| Sample ID | Drop [Pass, %] | Rigidity [kg-F] | Top Load [lbF] |
|---|---|---|---|
| 10.A | 100 | 1.879 | 62.3 |
| 10.B | 100 | 1.145 | 63.0 |
| 10.C | 100 | 1.208 | 58.7 |
| 10.E | 100 | 1.096 | 104.4 |
| 10.F | 100 | 1.086 | 98.6 |
| 10.G | 100 | 0.817 | 58.6 |
| 10.H | 100 | 0.921 | 63.9 |

EXAMPLE 23

Formulations

Outer-layer formulation 44 comprised about 75% to about 100% Marlex® HHM 5502BN HDPE (available from Chevron Phillips Chemical Company), about 5% COLORTECH® 11933-19 Titanium Oxide Colorant (available from COLORTECH® a PPM Company), and about 0% to about 20% Hyperform® HPR-803i (available from Milliken Chemical) as a reinforcing fiber. Inner-layer formulation 40 comprised about 85% to 100% Marlex® HHM 5502BN HDPE (available from Chevron Phillips Chemical Company) and about 0% to about 20% Hyperform® HPR-803i (available from Milliken Chemical) as a reinforcing fiber. In some embodiments, the inner-layer formulation 40 comprises about 3% to about 7.5% reinforcing fiber.

Core-layer formulation 48 comprised about 98% to about 100 Marlex® HHM 5502BN HDPE (available from Chevron Phillips Chemical Company) which was used as a polyethylene base resin. The polyethylene base resin was blended with HYDROCEROL® CF 40E as a chemical blowing agent and nucleating agent and Heritage Plastics HT6000 LLDPE talc as another nucleating agent. $N_2$ was used as a blowing agent.

The blowing agent, $N_2$, was injected into the molten formulation at levels of about 11 kg/h to expand the molten formulation and reduce the density of the mixture of polymer and nucleating agent. The resulting expanded formulation was then extruded through a die head to establish a core-layer parison. Inner and outer layers were extruded through the die head, locating the expanded formulation therebetween, to form a multi-layer tube. The multi-layer tube was molded to form a container according to the present disclosure.

TABLE 27

Comparison of different core layer formulations of Example 23.

| Trial | Core Layer [%] | | | Outer [%] | | | Inside [%] | |
|---|---|---|---|---|---|---|---|---|
| ID | Chevron | CBA | HT6000 | Chevron | Color | Fiber | Chevron | Fiber |
| Control | 100 | 0 | 0 | 95 | 5 | 0 | 100 | 0 |
| DOE 1-1 | 100 | 0.10 | 0.30 | 95 | 5 | 0 | 100 | 0 |
| DOE 1-2 | 100 | 0.10 | 0.30 | 95 | 5 | 0 | 100 | 0 |
| DOE 1-3 | 100 | 0.10 | 0.30 | 95 | 5 | 0 | 100 | 0 |
| DOE 1-4 | 98.4 | 0.10 | 1.50 | 95 | 5 | 0 | 100 | 0 |
| DOE 1-5 | 98.4 | 0.10 | 1.50 | 95 | 5 | 0 | 100 | 0 |
| DOE 1-6 | 98.4 | 0.10 | 1.50 | 95 | 5 | 0 | 100 | 0 |
| DOE 1-7 | 99.2 | 0.50 | 0.30 | 95 | 5 | 0 | 100 | 0 |
| DOE 1-8 | 99.2 | 0.50 | 0.30 | 95 | 5 | 0 | 100 | 0 |
| DOE 1-9 | 99.2 | 0.50 | 0.30 | 95 | 5 | 0 | 100 | 0 |
| DOE 1-10 | 98.0 | 0.50 | 1.50 | 95 | 5 | 0 | 100 | 0 |
| DOE 1-10A (Dual Fiber) | 98.0 | 0.50 | 1.50 | 80 | 5 | 15 | 85 | 15 |
| DOE 1-11 | 98.0 | 0.50 | 1.50 | 95 | 5 | 0 | 100 | 0 |
| DOE 1-12 | 98.0 | 0.50 | 1.50 | 95 | 5 | 0 | 100 | 0 |
| DOE 1-1 10% | 99.6 | 0.10 | 0.30 | 85 | 5 | 10 | 100 | 0 |
| DOE 1-1 15% | 99.6 | 0.10 | 0.30 | 80 | 5 | 15 | 100 | 0 |
| DOE 1-1 20% | 99.6 | 0.10 | 0.30 | 75 | 5 | 20 | 100 | 0 |

TABLE 28

Visual score, densities, Weight, Top Load Performance, and Layer Thicknesses of core layer formulations of Example 23.

| Trial ID | Average Visual Score Max 12 | Physical | | Wall Thickness | | |
|---|---|---|---|---|---|---|
| | | Weight [g] | Density [g/cc] | Avg. [mils] | Min [mils] | Max [mils] |
| Control | 12 | 23.0 | 0.934 | 0.032 | 0.019 | 0.044 |
| DOE 1-1 | 11.35 | 17.1 | 0.710 | 0.039 | 0.025 | 0.062 |
| DOE 1-2 | 11.65 | 16.9 | 0.734 | 0.032 | 0.021 | 0.056 |
| DOE 1-3 | 11.25 | 17.1 | 0.760 | 0.030 | 0.022 | 0.055 |
| DOE 1-4 | 11.4 | 17.7 | 0.644 | 0.036 | 0.025 | 0.064 |
| DOE 1-5 | 11.35 | 17.2 | 0.685 | 0.033 | 0.022 | 0.057 |
| DOE 1-6 | 11.5 | 16.8 | 0.744 | 0.030 | 0.020 | 0.050 |
| DOE 1-7 | 10.35 | 17.4 | 0.612 | 0.037 | 0.025 | 0.065 |
| DOE 1-8 | 10.8 | 17.3 | 0.697 | 0.034 | 0.023 | 0.059 |
| DOE 1-9 | 10.9 | 17.1 | 0.760 | 0.030 | 0.021 | 0.052 |
| DOE 1-10 | 10.7 | 17.0 | 0.625 | 0.038 | 0.024 | 0.060 |
| DOE 1-10A | 11.25 | 17.0 | 0.479 | 0.047 | 0.031 | 0.070 |
| DOE 1-11 | 10.5 | 17.1 | 0.693 | 0.032 | 0.021 | 0.051 |
| DOE 1-12 | 11.6 | 17.5 | 0.784 | 0.029 | 0.022 | 0.044 |
| DOE 1-1 10% | 10.8 | 17.0 | 0.624 | 0.040 | 0.018 | 0.063 |
| DOE 1-1 15% | 10.3 | 17.5 | 0.656 | 0.034 | 0.020 | 0.056 |
| DOE 1-1 20% | 9 | 17.1 | 0.665 | 0.034 | 0.023 | 0.055 |

EXAMPLE 24

Densities, Weights, Layer Thicknesses, and Visual Scores for Formulations of Example 23

Multi-layer containers formed according to Table 27 were subjected to a series of measurements including visual score (determined according to Example 30), container density (ρ) measurements, weight measurements, and thickness measurements. The results are shown below in Table 28.

Density was determined by the apparatus and methods described in Example 2.

EXAMPLE 25

Top Load Performance, Rigidity, Drop Test Results, and Cap Application and Removal for Formulations of Example 23

Multi-layer containers formed according to Table 27 were subjected to a series of measurements and performance tests including top load force performance measurements, rigidity measurements, drop testing, and cap application and removal. The results are shown below in Table 29.

Drop tests were conducted by methods described in Example 6. In some examples, the method described in Example 6 was followed with the exception of replacing water with shampoo. Top load performance was measured by methods described in Example 7. In some examples, the method described in Example 7 was performed with a container that was closed with a cap. In other examples, the method in Example 7 was performed with a container without a cap. Rigidity was measured by methods described in Example 21. The forces required to remove and apply caps to the containers were measured. Containers having caps were subjected to application and removal testing based on ASTM D3473-88 (Standard Test Methods for Lifting Force Required to Remove Certain Child-Resistant Snap Caps) and ASTM D3480-88 (Standard Test Methods for Downward Force Required to Open or Activate Child-Resistant Snap-Engagement Packages), each of which is incorporated by reference herein in its entirety.

TABLE 29

Drop test results, rigidity, top load performance, and cap application and removal of core layer formulations of Example 23.

| Trial ID | Water Drop Pass [%] | Rigidity [kg-F] | Top Load Uncapped [N] | Top Load Capped [N] | Cap Removal [lb-f] | Cap Removal [N] | Cap Application [lb-f] | Cap Application [N] |
|---|---|---|---|---|---|---|---|---|
| Control | 100 | 1.82 | 343 | 495 | 26 | 117 | 20 | 91 |
| DOE 1-1 | 70 | 1.43 | 184 | * | 17 | 74 | 20 | 89 |
| DOE 1-2 | 80 | 1.04 | 162 | * | 16 | 73 | 27 | 118 |
| DOE 1-3 | 70 | 0.90 | 149 | * | 18 | 79 | 25 | 113 |
| DOE 1-4 | 90 | 1.28 | 194 | * | 17 | 76 | 22 | 100 |
| DOE 1-5 | 100 | 1.01 | 167 | 243 | 17 | 77 | 25 | 109 |
| DOE 1-6 | 80 | 0.88 | 150 | * | 18 | 79 | 28 | 125 |
| DOE 1-7 | 60 | 1.16 | 180 | * | 18 | 81 | 26 | 114 |
| DOE 1-8 | 100 | 1.07 | 167 | 239 | 18 | 79 | 28 | 125 |
| DOE 1-9 | 100 | 0.88 | 151 | * | 17 | 74 | 21 | 95 |
| DOE 1-10 | 100 | 1.32 | 197 | 271 | 18 | 79 | 24 | 107 |
| DOE 1-10A | 60 | 1.87 | 245 | * | 17 | 77 | 22 | 96 |
| DOE 1-11 | 100 | 0.99 | 173 | 260 | 18 | 78 | 26 | 116 |
| DOE 1-12 | 100 | 0.88 | 165 | * | 18 | 79 | 24 | 106 |
| DOE 1-1 10% | 100 | 1.34 | 209 | 309 | 18 | 79 | 26 | 116 |
| DOE 1-1 15% | 90 | 1.15 | 207 | * | 19 | 85 | 36 | 161 |
| DOE 1-1 20% | 90 | 1.15 | 212 | * | 19 | 85 | 26 | 117 |

* Data not available

EXAMPLE 26

Visual Score

General Procedure

Containers were given scores based on a set of twelve observable factors. Each time a container lacked an observable factor, one point was awarded. Thus, a container lacking all observable factors obtained a best score of 12. The observable factors included: 1) presence of holes, 2) the presence of foreign material, 3) whether the container was malformed, 4) engraving on the container, 5) undesirable appearance of the container, 6) undesirable color of the container, 7) presence of odor in the container, 8) neck top of the container lacking smoothness, 9) neck bore of the container lacking smoothness, 10) whether the container had a rocker bottom defect, 11) undesirable finish quality, and 12) undesirable parting line. In some examples, several containers were formed, tested, and the scores were averaged.

EXAMPLE 27

Multi-Layer Tubes Comprising Various Amounts of Chemical Blowing Agent and Formed at Various Temperatures Outer-layer formulation 44 comprised about 85% Marlex® HHM 5502BN HDPE (available from Chevron Phillips Chemical Company), about 5% Ampacet 112761 White Polyethylene Masterbatch (available from Ampacet Corporation) as a coloring agent, and about 10% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company). Core-layer formulation 48 comprised between about 99.2% and about 99.6% Marlex® HHM 5502BN HDPE (available from Chevron Phillips Chemical Company), as shown in Table 30, which was used as a polyethylene base resin. The polyethylene base resin was blended with between about 0.1% and about 0.5% HYDROCEROL® CF 40E as a chemical blowing agent (CBA) and nucleating agent, as shown in Table 30, and about 0.3% Heritage Plastics HT6000 LLDPE talc as another nucleating agent. $N_2$ was used as a blowing agent and was injected into the rest of the molten core-layer formulation 48 at a level of about 0.044 kg/h.

The extruder head temperature was varied between about 180° C. and about 190° C., and the core layer extruder barrel temperature was varied between about 180° C. and about 190° C., as shown in Table 30. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 6% of the thickness of the entire tube, the outer layer provided about 6% of the thickness of the entire tube, and the core layer provided about 88% of the thickness of the entire tube. For each formulation, density was measured for six tubes according to the procedure of Example 2, as shown in Table 31 as Density. The average of the six densities for each formulation is shown as Average Density in Table 31. The melt temperature for each formulation was also determined and is reported in Table 31 as Melt Temp.

TABLE 30

Amount of CBA, amount of HDPE, head temperature, and barrel temperature for tubes of Example 27.

| Trial [#] | CBA [%] | HDPE [%] | Head Temp [° C.] | Barrel Temp [° C.] |
|---|---|---|---|---|
| 12.A.0 | 0.10 | 99.6 | 180 | 180 |
| 12.A.1 | 0.50 | 99.2 | 180 | 180 |
| 12.A.2 | 0.10 | 99.6 | 190 | 180 |
| 12.A.3 | 0.50 | 99.2 | 190 | 180 |
| 12.A.4 | 0.10 | 99.6 | 180 | 190 |
| 12.A.5 | 0.50 | 99.2 | 180 | 190 |
| 12.A.6 | 0.10 | 99.6 | 190 | 190 |
| 12.A.7 | 0.50 | 99.2 | 190 | 190 |

TABLE 31

Density, average density, and melt temperature for tubes of Example 27.

| Trial [#] | Density [g/cm$^3$] | Average Density [g/cm$^3$] | Melt Temp [° C.] |
|---|---|---|---|
| 12.A.0a | 0.488 | 0.493 | 180 |
| 12.A.0b | 0.499 | | |
| 12.A.0c | 0.486 | | |
| 12.A.0d | 0.495 | | |
| 12.A.0e | 0.494 | | |
| 12.A.0f | 0.498 | | |
| 12.A.1a | 0.491 | 0.509 | 180 |
| 12.A.1b | 0.514 | | |
| 12.A.1c | 0.509 | | |
| 12.A.1d | 0.517 | | |
| 12.A.1e | 0.510 | | |
| 12.A.1f | 0.511 | | |
| 12.A.2a | 0.484 | 0.480 | 180 |
| 12.A.2b | 0.486 | | |
| 12.A.2c | 0.470 | | |
| 12.A.2d | 0.486 | | |
| 12.A.2e | 0.474 | | |
| 12.A.2f | 0.482 | | |
| 12.A.3a | 0.500 | 0.504 | 181 |
| 12.A.3b | 0.499 | | |
| 12.A.3c | 0.503 | | |
| 12.A.3d | 0.508 | | |
| 12.A.3e | 0.504 | | |
| 12.A.3f | 0.509 | | |
| 12.A.4a | 0.495 | 0.500 | 190 |
| 12.A.4b | 0.505 | | |
| 12.A.4c | 0.493 | | |
| 12.A.4d | 0.507 | | |
| 12.A.4e | 0.494 | | |
| 12.A.4f | 0.505 | | |
| 12.A.5a | 0.498 | 0.500 | 190 |
| 12.A.5b | 0.506 | | |
| 12.A.5c | 0.486 | | |
| 12.A.5d | 0.507 | | |
| 12.A.5e | 0.495 | | |
| 12.A.5f | 0.510 | | |
| 12.A.6a | 0.484 | 0.492 | 189 |
| 12.A.6b | 0.494 | | |
| 12.A.6c | 0.494 | | |
| 12.A.6d | 0.494 | | |
| 12.A.6e | 0.492 | | |
| 12.A.6f | 0.493 | | |
| 12.A.7a | 0.512 | 0.514 | 190 |
| 12.A.7b | 0.523 | | |
| 12.A.7c | 0.511 | | |
| 12.A.7d | 0.520 | | |
| 12.A.7e | 0.490 | | |
| 12.A.7f | 0.526 | | |

EXAMPLE 28

Multi-Layer Tubes Formed at Various $N_2$ Flow Rates

Outer-layer formulation 44 comprised about 85% Marlex® HHM 5502BN HDPE (available from Chevron Phillips Chemical Company), about 5% Ampacet 112761 White Polyethylene Masterbatch (available from Ampacet Corporation) as a coloring agent, and about 10% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at a level between about 0.034 kg/h and about 0.104 kg/h, as shown in Table 32.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 6% of the thickness of the entire tube, the outer layer provided about 6% of the thickness of the entire tube, and the core layer provided about 88% of the thickness of the entire tube. In one embodiment, the inner layer provided about 5.8% of the thickness of the entire tube, the outer layer provided about 6.1% of the thickness of the entire tube, and the core layer provided about 88.2% of the thickness of the entire tube. In another embodiment, the inner layer provided about 5.9% of the thickness of the entire tube, the outer layer provided about 6.1% of the thickness of the entire tube, and the core layer provided about 88.0% of the thickness of the entire tube. The thicknesses for two tubes formed at each $N_2$ flow rate were measured and are described in Table 33 as Outer Layer Thickness, Core Layer Thickness, Inner Layer Thickness, and Total Thickness. For each $N_2$ flow rate, density was measured for four tubes according to the procedure of Example 2, as shown in Table 34 as Parison Density. The average of the four densities for each $N_2$ flow rate is shown as Average Density in Table 34. The melt temperature for each formulation was also determined and is reported in Table 34 as Melt Temp.

TABLE 32

$N_2$ flow rate for tubes of Example 28.

| Trial [#] | $N_2$ Flow Rate [kg/h] |
|---|---|
| 12.B.0 | 0.034 |
| 12.B.1 | 0.044 |
| 12.B.2 | 0.054 |
| 12.B.3 | 0.064 |

TABLE 32-continued

N₂ flow rate for tubes of Example 28.

| Trial [#] | N₂ Flow Rate [kg/h] |
|---|---|
| 12.B.4 | 0.074 |
| 12.B.5 | 0.084 |
| 12.B.6 | 0.094 |
| 12.B.7 | 0.104 |

TABLE 33

Outer layer thickness, core layer thickness, inner layer thickness, and total thickness for tubes of Example 28.

| Trial [#] | Outer Layer Thickness [mils] [%] | Core Layer Thickness [mils] [%] | Inner Layer Thickness [mils] [%] | Total Thickness [mils] |
|---|---|---|---|---|
| 12.B.0a | 7.18 (6.0) | 104.24 (86.8) | 8.63 (7.2) | 120.05 |
| 12.B.0b | 6.87 (6.1) | 98.98 (87.4) | 7.44 (6.6) | 113.29 |
| 12.B.1a | 5.46 (4.6) | 106.51 (89.0) | 7.67 (6.4) | 119.64 |
| 12.B.1b | 6.39 (5.4) | 103.43 (87.7) | 8.06 (6.8) | 117.88 |
| 12.B.2a | 6.93 (5.5) | 110.55 (87.6) | 8.76 (6.9) | 126.24 |
| 12.B.2b | 7.25 (5.5) | 114.98 (87.9) | 8.52 (6.5) | 130.75 |
| 12.B.3a | 7.77 (5.8) | 119.12 (88.6) | 7.54 (5.6) | 134.43 |
| 12.B.3b | 7.00 (5.2) | 118.8 (88.7) | 8.07 (6.0) | 133.87 |
| 12.B.4a | 8.79 (6.7) | 115.64 (87.4) | 7.28 (5.5) | 131.71 |
| 12.B.4b | 7.62 (5.5) | 123.04 (89.5) | 6.85 (5.0) | 137.51 |
| 12.B.5a | 8.03 (5.8) | 122.68 (89.4) | 6.56 (4.8) | 137.27 |
| 12.B.5b | 6.81 (5.1) | 119.64 (89.8) | 6.82 (5.1) | 133.27 |
| 12.B.6a | 7.07 (5.2) | 120.52 (89.2) | 7.50 (5.6) | 135.09 |
| 12.B.6b | 6.95 (4.9) | 128.6 (91.2) | 5.43 (3.9) | 140.98 |
| 12.B.7a | 6.60 (6.7) | 84.9 (86.8) | 6.33 (6.5) | 97.83 |
| 12.B.7b | 8.51 (9.1) | 76.01 (81.6) | 8.65 (9.3) | 93.17 |

TABLE 34

Density, average density, and melt temp for tubes of Example 28.

| Trial [#] | Density [g/cm³] | Average Density [g/cm³] | Melt Temp [° C.] |
|---|---|---|---|
| 12.B.0a | 0.554 | 0.542 | 180 |
| 12.B.0b | 0.537 | | |
| 12.B.0c | 0.538 | | |
| 12.B.0d | 0.540 | | |
| 12.B.1a | 0.506 | 0.508 | 180 |
| 12.B.1b | 0.505 | | |
| 12.B.1c | 0.513 | | |
| 12.B.1d | 0.508 | | |
| 12.B.2a | 0.466 | 0.470 | 180 |
| 12.B.2b | 0.472 | | |
| 12.B.2c | 0.472 | | |
| 12.B.2d | 0.468 | | |
| 12.B.3a | 0.425 | 0.431 | 180 |
| 12.B.3b | 0.430 | | |
| 12.B.3c | 0.434 | | |
| 12.B.3d | 0.435 | | |
| 12.B.4a | 0.401 | 0.408 | 180 |
| 12.B.4b | 0.407 | | |
| 12.B.4c | 0.411 | | |
| 12.B.4d | 0.414 | | |
| 12.B.5a | 0.379 | 0.374 | 180 |
| 12.B.5b | 0.370 | | |
| 12.B.5c | 0.372 | | |
| 12.B.5d | 0.375 | | |
| 12.B.6a | 0.393 | 0.398 | 180 |
| 12.B.6b | 0.393 | | |
| 12.B.6c | 0.401 | | |
| 12.B.6d | 0.405 | | |
| 12.B.7a | 0.559 | 0.544 | 180 |
| 12.B.7b | 0.541 | | |
| 12.B.7c | 0.537 | | |
| 12.B.7d | 0.540 | | |

EXAMPLE 29

Bottles Formed at Various N₂ Flow Rates

Outer-layer formulation 44 comprised about 85% Marlex® HHM 5502BN HDPE (available from Chevron Phillips Chemical Company), about 5% Ampacet 112761 White Polyethylene Masterbatch (available from Ampacet Corporation) as a coloring agent, and about 10% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at a level between about 0.034 kg/h and about 0.104 kg/h, as shown in Table 35.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 6% of the thickness of the entire tube, the outer layer provided about 6% of the thickness of the entire tube, and the core layer provided about 88% of the thickness of the entire tube.

A mold was closed around the tube and a blow needle was inserted into a space formed in the tube. During inserting the needle, the mold was moved away from the die head. Vacuum was applied to the mold and caused the pressure to decrease to $P_{VAC}$, which was about 27 inches Hg. Pressurized air was pumped into a space formed in the tube to cause the tube to expand and take on the shape of the mold. The pressurized air in this example was delivered at about 2.5 bar and at about 2° C. In the next step, the mold was opened to reveal a container, also referred to as a bottle. Cycle time is an amount of time between closing the mold around the tube and opening the mold to reveal a container. The cycle time in this example was about 10 seconds. For each of $N_2$ flow rate, density was measured for several bottles according to the procedure of Example 2 and mean density for each formulation shown in Table 35 as Average Bottle Density. The mean bottle weight for each $N_2$ flow rate is reported in Table 35 as Bottle Weight.

TABLE 35

$N_2$ flow rate, average bottle density, and bottle weight for bottles of Example 29.

| Trial [#] | $N_2$ Flow Rate [kg/h] | Average Bottle Density [g/cm$^3$] | Bottle Weight [g] |
|---|---|---|---|
| 12.B.0 | 0.034 | 0.705 | 21.22 |
| 12.B.1 | 0.044 | 0.674 | 20.26 |
| 12.B.2 | 0.054 | 0.674 | 18.96 |
| 12.B.3 | 0.064 | 0.616 | 18.57 |
| 12.B.4 | 0.074 | 0.574 | 17.5 |
| 12.B.5 | 0.084 | 0.553 | 16.77 |
| 12.B.6 | 0.094 | 0.572 | 16.31 |

EXAMPLE 30

Bottles Formed at Various Pressures

Outer-layer formulation 44 comprised about 85% Marlex® HHM 5502BN HDPE (available from Chevron Phillips Chemical Company), about 5% Ampacet 112761 White Polyethylene Masterbatch (available from Ampacet Corporation) as a coloring agent, and about 10% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at a level of about 0.084 kg/h.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 6% of the thickness of the entire tube, the outer layer provided about 6% of the thickness of the entire tube, and the core layer provided about 88% of the thickness of the entire tube.

A mold was closed around the tube and a blow needle was inserted into a space formed in the tube. During inserting the needle, the mold was moved away from the die head. In some instances, vacuum was applied to the mold and caused the pressure to decrease to $P_{VAC}$, which was about 27 inches Hg. The presence or absence of vacuum as indicated in Table 36. Pressurized air was pumped into a space formed in the tube to cause the tube to expand and take on the shape of the mold. The pressurized air in this example was delivered between about 1.0 bar and about 4.0 bar and at about 2° C. as shown in Table 36. In the next step, the mold was opened to reveal a container, also referred to as a bottle. Cycle time is provided as an amount of time between closing the mold around the tube and opening the mold to reveal a container. The cycle time in this example was about 10 seconds. For each of set of parameters, mean top load capacity of several bottles was measured according to the procedure of Example 7, mean rigidity of several bottles was measured according to the procedure of Example 21 and the bottom drop test was performed according to the procedure of Example 6 (five bottles were dropped for each set of parameters). The results are shown below in Table 36 for each $N_2$ flow rate and labeled as Top Load Capacity, Rigidity, and Bottom Drop Test Pass Rate, respectively. The average top load capacity for bottles made using all sets of parameters was 36.64 lbs-F and the average rigidity for bottles made using all sets of parameters was 4.08 kgF.

TABLE 36

Vacuum setting, blow air pressure, top load capacity, rigidity, and drop test for bottles of Example 30.

| Trial [#] | Vacuum | Blow Air Pressure [bar] | Top Load Capacity [lbs-F] | Rigidity [kgF] | Bottom Drop Test Pass Rate [%] |
|---|---|---|---|---|---|
| 12.D.1 | Off | 1.0 | 50.49 | 6.878 | 100 |
| 12.D.2 | Off | 2.0 | 38.21 | 3.799 | 100 |
| 12.D.3 | Off | 3.0 | 35.99 | 4.458 | 100 |
| 12.D.4 | Off | 4.0 | 27.45 | 2.662 | 100 |
| 12.D.5 | On | 1.0 | 42.45 | 7.144 | 100 |
| 12.D.6 | On | 2.0 | 33.57 | 2.635 | 100 |
| 12.D.7 | On | 3.0 | 31.88 | 2.726 | 100 |
| 12.D.8 | On | 4.0 | 33.05 | 2.371 | 100 |

EXAMPLE 31

Side Drop Test Measurements

General Procedure

Side drop testing determines a likelihood of container survival due to a drop or impact to the container. Containers were subjected to a side drop testing procedure based on ASTM D2463 (Standard Test Method for Drop Impact Resistance of Blow-Molded Thermoplastic Containers), which is incorporated by reference herein in its entirety.

The side drop test was performed according to the following procedure. A bottle was filled with tap water. The water in the bucket was allowed to condition for at least 24 hours at about room temperature and about 75% relative humidity. The container was filled with water from the bucket and closed off with, for example, a lid. The filled, capped containers were then subjected to the following procedure: (a) the filled, capped container was located at about five feet above a hard surface such as concrete or tile; (b) the filled, capped container was then oriented such that a side of the filled, capped container was arranged to lie in a substantially parallel relation to the hard surface; (c) each of five or ten capped, filled containers were dropped; (d) upon impact, each filled, capped container was examined for any break or shattering of the wall that causes water to leak out of the bottle; and (d) the total number of bottles showing any sign of leakage after the drop test were counted as failures.

EXAMPLE 32

Formulations and Test Results for Tubes with about 6% Inner/Outer Layer Thickness and Bottles Formed Therefrom Outer-layer formulation 44 comprised about 85% Marlex® HHM 5502BN HDPE (available from Chevron Phillips Chemical Company), about 5% Ampacet 112761 White Polyethylene Masterbatch (available from Ampacet Corporation) as a coloring agent, and about 10% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at levels between about 0.034 kg/h and about 0.104 kg/h as shown in Table 37.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 6% of the thickness of the entire tube, the outer layer provided about 6% of the thickness of the entire tube, and the core layer provided about 88% of the thickness of the entire tube. In one embodiment, the inner layer provided about 6.1% of the thickness of the entire tube, the outer layer provided about 5.8% of the thickness of the entire tube, and the core layer provided about 88.2% of the thickness of the entire tube. For each $N_2$ flow rate, the mean density of several tubes was measured according to the procedure of Example 2 and is shown below in Table 37 as Average Tube Density.

For tubes where tube density was not measured, a mold was closed around the tube and a blow needle was inserted into a space formed in the tube. During inserting the needle, the mold was moved away from the die head. Vacuum was applied to the mold and caused the pressure to decrease to $P_{VAC}$, which was about 27 inches Hg. Pressurized air was pumped into a space formed in the tube to cause the tube to expand and take on the shape of the mold. The pressurized air in this example was delivered at about 2.5 bar and at about 2° C. In the next step, the mold was opened to reveal a container, also referred to as a bottle. Cycle time is as an amount of time between closing the mold around the tube and opening the mold to reveal a container. The cycle time in this example was about 10 seconds. After molding, the inner layer of the bottle provided about 10% of the thickness of the entire bottle, the outer layer of the bottle provided about 10% of the thickness of the entire bottle, and the core layer of the bottle provided about 80% of the thickness of the entire bottle. In one embodiment, the inner layer of the bottle provided about 7.9% of the thickness of the entire bottle, the outer layer of the bottle provided about 9.9% of the thickness of the entire bottle, and the core layer of the bottle provided about 82.2% of the thickness of the entire bottle. In this embodiment, blow molding caused the inner layer's contribution to bottle thickness to increase by 30.6%, the outer layer's contribution to bottle thickness to increase by 71.6%, and the core layer's contribution to bottle thickness to decrease by 6.8%. For each $N_2$ flow rate, mean density of several bottles was measured according to the procedure of Example 2, mean rigidity of several bottles was measured according to the procedure of Example 21, the bottom drop test was performed according to the procedure of Example 6 (five bottles were dropped for each set of parameters), and the side drop test was performed according to the procedure of Example 31 (five bottles were dropped for each set of parameters). The results are shown below in Table 37 for each $N_2$ flow rate and labeled as Average Bottle Density, Rigidity, Bottom Drop Test Pass Rate, and Side Drop Test Pass Rate, respectively.

TABLE 37

$N_2$ flow rate, average tube density, average bottle density, rigidity, bottom drop test pass rate, and side drop test pass rate for tubes and bottles of Example 32.

| Trial [#] | $N_2$ Flow Rate [kg/h] | Average Tube Density [g/cm³] | Average Bottle Density [g/cm³] | Rigidity [kgF] | Bottom Drop Test Pass Rate [%] | Side Drop Test Pass Rate [%] |
|---|---|---|---|---|---|---|
| 13.A.1 | 0.034 | 0.542 | 0.705 | * | 60 | 60 |
| 13.A.2 | 0.044 | 0.508 | 0.674 | * | 100 | 100 |
| 13.A.3 | 0.054 | 0.470 | 0.674 | * | 100 | 100 |
| 13.A.4 | 0.064 | 0.431 | 0.616 | * | 0 | 100 |
| 13.A.5 | 0.074 | 0.408 | 0.574 | * | 40 | 100 |
| 13.A.6 | 0.084 | 0.374 | 0.553 | 2.310 | 0 | 40 |
| 13.A.7 | 0.094 | 0.398 | 0.572 | 2.448 | 0 | 0 |
| 13.A.8 | 0.104 | 0.544 | 0.622 | * | 0 | 0 |

* Data not available

EXAMPLE 33

Formulations and Test Results for Tubes with about 12% Inner/Outer Skin Thickness Outer-layer formulation 44 comprised about 85% Marlex® HHM 5502BN HDPE (available from Chevron Phillips Chemical Company), about 5% Ampacet 112761 White Polyethylene Masterbatch (available from Ampacet Corporation) as a coloring agent, and about 10% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at levels between about 0.044 kg/h and about 0.114 kg/h as shown in Table 38.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 12% of the thickness of the entire tube, the outer layer provided about 12% of the thickness of the entire tube, and the core layer provided about 76% of the thickness of the entire tube. In one embodiment, the inner layer provided about 10.9% of the thickness of the entire tube, the outer layer provided about 11.1% of the thickness of the entire tube, and the core layer provided about 78.0% of the thickness of the entire tube. For each $N_2$ flow rate, average outer, core, and inner layer thicknesses of the tubes were measured and are shown in Table 38. In addition, for each of $N_2$ flow rate, density was measured for four tubes according to the procedure of Example 2 and is shown in Table 39 as Density. The average of the four densities for each $N_2$ flow rate is shown as Average Density in Table 39.

TABLE 38

$N_2$ flow rate, outer layer thickness, core layer thickness, inner layer thickness, and total thickness for tubes of Example 33.

| Trial [#] | $N_2$ Flow Rate [kg/h] | Outer Layer Thickness [mils] [%] | Core Layer Thickness [mils] [%] | Inner Layer Thickness [mils] [%] | Total Thickness [mils] |
|---|---|---|---|---|---|
| 13.B.0.1 | 0.044 | 14.29 (12.3) | 86.21 (74.5) | 15.29 (13.2) | 115.79 |
| 13.B.1.1 | 0.054 | 13.79 (11.1) | 98.07 (78.8) | 12.54 (10.1) | 124.4 |
| 13.B.2.1 | 0.064 | 13.04 (10.8) | 93.23 (77.3) | 14.29 (11.9) | 120.56 |
| 13.B.3.1 | 0.074 | 13.37 (10.8) | 97.92 (79.3) | 12.2 (9.9) | 123.49 |
| 13.B.4.1 | 0.084 | 13.12 (9.9) | 105.76 (79.7) | 13.79 (10.4) | 132.67 |
| 13.B.5.1 | 0.094 | 13.70 (11.3) | 94.82 (78.2) | 12.7 (10.5) | 121.22 |
| 13.B.6.1 | 0.104 | 13.62 (11.8) | 90.23 (78.3) | 11.36 (9.9) | 115.21 |
| 13.B.7.1 | 0.114 | 13.46 (11.0) | 95.15 (77.5) | 14.13 (11.5) | 122.74 |

TABLE 39

Density and average density for tubes of Example 33.

| Trial [#] | Density [g/cm³] | Average Density [g/cm³] |
|---|---|---|
| 13.B.0.1a | 0.567 | 0.563 |
| 13.B.0.1b | 0.553 | |
| 13.B.0.1c | 0.571 | |
| 13.B.0.1d | 0.559 | |
| 13.B.1.1a | 0.539 | 0.529 |
| 13.B.1.1b | 0.534 | |
| 13.B.1.1c | 0.517 | |
| 13.B.1.1d | 0.526 | |
| 13.B.2.1a | 0.507 | 0.500 |
| 13.B.2.1b | 0.503 | |
| 13.B.2.1c | 0.487 | |
| 13.B.2.1d | 0.502 | |
| 13.B.3.1a | 0.484 | 0.479 |
| 13.B.3.1b | 0.479 | |
| 13.B.3.1c | 0.478 | |
| 13.B.3.1d | 0.476 | |
| 13.B.4.1a | 0.437 | 0.431 |
| 13.B.4.1b | 0.428 | |
| 13.B.4.1c | 0.431 | |
| 13.B.4.1d | 0.427 | |
| 13.B.5.1a | 0.430 | 0.432 |
| 13.B.5.1b | 0.421 | |
| 13.B.5.1c | 0.445 | |
| 13.B.5.1d | 0.433 | |
| 13.B.6.1a | 0.491 | 0.489 |
| 13.B.6.1b | 0.466 | |
| 13.B.6.1c | 0.497 | |
| 13.B.6.1d | 0.502 | |
| 13.B.7.1a | 0.528 | 0.494 |
| 13.B.7.1b | 0.525 | |
| 13.B.7.1c | 0.464 | |
| 13.B.7.1d | 0.460 | |

EXAMPLE 34

Formulations and Test Results for Bottles with about 12% Inner/Outer Skin Thickness Outer-layer formulation 44 comprised about 85% Marlex® HHM 5502BN HDPE (available from Chevron Phillips Chemical Company), about 5% Ampacet 112761 White Polyethylene Masterbatch (available from Ampacet Corporation) as a coloring agent, and about 10% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at levels between about 0.044 kg/h and about 0.114 kg/h as shown in Table 40.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 12% of the thickness of the entire tube, the outer layer provided about 12% of the thickness of the entire tube, and the core layer provided about 76% of the thickness of the entire tube.

A mold was closed around the tube and a blow needle was inserted into a space formed in the tube. During inserting the needle, the mold was moved away from the die head. Vacuum was applied to the mold and caused the pressure to decrease to $P_{VAC}$, which was about 27 inches Hg. Pressurized air was pumped into a space formed in the tube to cause the tube to expand and take on the shape of the mold. The pressurized air in this example was delivered at about 2.5 bar and at about 2° C. In the next step, the mold was opened to reveal a container, also referred to as a bottle. Cycle time is an amount of time between closing the mold around the tube and opening the mold to reveal a container. The cycle time in this example was about 10 seconds. After molding, the inner layer of the bottle provided about 15% of the thickness of the entire bottle, the outer layer of the bottle provided about 15% of the thickness of the entire bottle, and the core layer of the bottle provided about 70% of the thickness of the entire bottle. In one embodiment, the inner layer of the bottle provided about 13.2% of the thickness of the entire bottle, the outer layer of the bottle provided about 17.5% of the thickness of the entire bottle, and the core layer of the bottle provided about 69.3% of the thickness of the entire bottle. In this embodiment, blow molding caused the inner layer's contribution to bottle thickness to increase by 20.9%, the outer layer's contribution to bottle thickness to increase by 57.4%, and the core layer's contribution to bottle thickness to decrease by 11.1%. The thicknesses for two tubes formed at each $N_2$ flow rate were measured and are described in Table 40 as Outer Layer Thickness, Core Layer Thickness, Inner Layer Thickness, and Total Thickness. In addition, for each of $N_2$ flow rate, density was measured for three bottles according to the procedure of Example 2 and is shown in Table 41 as Bottle Density. The average of the four densities for each $N_2$ flow rate is shown as Average Bottle Density in Table 41. Mean weight of several bottles was measured and is shown in Table 41. Mean rigidity of several bottles was measured according to the procedure of Example 21, the bottom drop test was performed according to the procedure of Example 6 (five bottles were dropped for each set of parameters), and the side drop test was performed according to the procedure of Example 31 (five bottles were dropped for each set of parameters). The results are shown below in Table 42 for each $N_2$ flow rate and are labeled as Average Bottle Density, Rigidity, Bottom Drop Test Pass Rate, and Side Drop Test Pass Rate, respectively.

TABLE 40

$N_2$ flow rate, outer layer thickness, core layer thickness, inner layer thickness, and total thickness for bottles of Example 34.

| Trial [#] | $N_2$ Flow Rate [kg/h] | Outer Layer Thickness [mils] [%] | Core Layer Thickness [mils] [%] | Inner Layer Thickness [mils] [%] | Total Thickness [mils] |
|---|---|---|---|---|---|
| 13.B.0.2 | 0.044 | 8.98 (19.3) | 30.5 (65.7) | 6.94 (15.0) | 46.42 |
| 13.B.1.2 | 0.054 | 7.39 (19.5) | 25.07 (66.2) | 5.4 (14.3) | 37.86 |
| 13.B.2.2 | 0.064 | 5.73 (17.9) | 21.28 (66.3) | 5.08 (15.8) | 32.09 |
| 13.B.3.2 | 0.074 | 7.59 (21.2) | 22.59 (63.1) | 5.64 (15.7) | 35.82 |
| 13.B.4.2 | 0.084 | 4.79 (15.3) | 23.16 (73.8) | 3.45 (11.0) | 31.4 |
| 13.B.5.2 | 0.094 | 6.6 (13.6) | 37.47 (77.0) | 4.6 (9.5) | 48.67 |
| 13.B.6.2 | 0.104 | 8.65 (20.1) | 28.1 (65.2) | 6.38 (14.8) | 43.13 |
| 13.B.7.2 | 0.114 | 8.27 (13.4) | 47.55 (77.1) | 5.85 (9.5) | 61.67 |

TABLE 41

Bottle density, average bottle density, and bottle weight for bottles of Example 34.

| Trial [#] | Bottle Density [g/cm$^3$] | Average Bottle density [g/cm$^3$] | Bottle Weight [g] |
|---|---|---|---|
| 13.B.0.2a | 0.748 | 0.758 | 20.30 |
| 13.B.0.2b | 0.763 | | |
| 13.B.0.2c | 0.762 | | |
| 13.B.1.2a | 0.715 | 0.728 | 19.54 |
| 13.B.1.2b | 0.737 | | |
| 13.B.1.2c | 0.733 | | |
| 13.B.2.2a | 0.718 | 0.716 | 18.89 |
| 13.B.2.2b | 0.713 | | |
| 13.B.2.2c | 0.717 | | |
| 13.B.3.2a | 0.677 | 0.670 | 18.47 |
| 13.B.3.2b | 0.659 | | |
| 13.B.3.2c | 0.674 | | |
| 13.B.4.2a | 0.624 | 0.636 | 17.71 |
| 13.B.4.2b | 0.622 | | |
| 13.B.4.2c | 0.662 | | |
| 13.B.5.2a | 0.623 | 0.594 | 17.19 |
| 13.B.5.2b | 0.585 | | |
| 13.B.5.2c | 0.575 | | |
| 13.B.6.2a | 0.593 | 0.576 | 16.69 |
| 13.B.6.2b | 0.545 | | |
| 13.B.6.2c | 0.590 | | |
| 13.B.7.2a | 0.571 | 0.555 | 16.85 |
| 13.B.7.2b | 0.522 | | |
| 13.B.7.2c | 0.573 | | |

TABLE 42

Rigidity, bottom drop test result, and side drop test result for bottles of Example 34.

| Trial [#] | Rigidity [kgF] | Bottom Drop Test [Pass %] | Side Drop Test [Pass %] |
|---|---|---|---|
| 13.B.0 | * | 100 | 100 |
| 13.B.1 | * | 100 | 100 |
| 13.B.2 | * | 100 | 100 |
| 13.B.3 | * | 100 | 20 |
| 13.B.4 | 2.833 | 80 | 40 |
| 13.B.5 | 2.779 | 100 | 100 |
| 13.B.6 | * | 0 | 40 |
| 13.B.7 | * | 0 | 80 |

* Data not available

EXAMPLE 35

Formulations and Test Results for Tubes with about 18% Inner/Outer Skin Thickness Outer-layer formulation 44 comprised about 85% Marlex® HHM 5502BN HDPE (available from Chevron Phillips Chemical Company), about 5% Ampacet 112761 White Polyethylene Masterbatch (available from Ampacet Corporation) as a coloring agent, and about 10% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at levels between about 0.044 kg/h and about 0.124 kg/h as shown in Table 43.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 18% of the thickness of the entire tube, the outer layer provided about 18% of the thickness of the entire tube, and the core layer provided about 64% of the thickness of the entire tube. In one embodiment, the inner layer provided about 15.1% of the thickness of the entire tube, the outer layer provided about 17.1% of the thickness of the entire tube, and the core layer provided about 67.8% of the thickness of the entire tube. For each $N_2$ flow rate, average outer, core, and inner layer thicknesses of the tubes were measured and are shown in Table 43. Also, for each of $N_2$ flow rate, density was measured for four tubes according to the procedure of Example 2 and is shown in Table 44 as Density. The average of the four densities for each $N_2$ flow rate is shown as Average Density in Table 44.

TABLE 43

$N_2$ flow rate, outer layer thickness, core layer thickness, inner layer thickness, and total thickness for tubes of Example 35.

| Trial [#] | $N_2$ Flow Rate [kg/h] | Outer Layer Thickness [mils] [%] | Core Layer Thickness [mils] [%] | Inner Layer Thickness [mils] [%] | Total Thickness [mils] |
|---|---|---|---|---|---|
| 13.C.0.1 | 0.044 | 25.32 (20.5) | 75.52 (61.2) | 22.64 (18.3) | 123.48 |
| 13.C.1.1 | 0.054 | 21.47 (16.8) | 84.05 (65.8) | 22.14 (17.3) | 127.66 |
| 13.C.2.1 | 0.074 | 18.13 (14.5) | 91.65 (73.1) | 15.54 (12.4) | 125.32 |
| 13.C.3.1 | 0.084 | 18.48 (14.5) | 89.08 (69.8) | 20.1 (15.7) | 127.66 |
| 13.C.4.1 | 0.094 | 18.63 (15.6) | 83.14 (69.7) | 17.46 (14.6) | 119.23 |
| 13.C.5.1 | 0.104 | 19.47 (17.3) | 77.6 (68.8) | 15.72 (13.9) | 112.79 |
| 13.C.6.1 | 0.114 | 20.56 (19.3) | 71.17 (66.9) | 14.62 (13.7) | 106.35 |
| 13.C.7.1 | 0.124 | 19.63 (23.0) | 49.96 (58.6) | 15.71 (18.4) | 85.3 |
| 13.C.8.1 | 0.064 | 19.55 (15.5) | 87.64 (69.6) | 18.8 (14.9) | 125.99 |

TABLE 44

Density and average density for tubes of Example 35.

| Trial [#] | Density [g/cm³] | Average Density [g/cm³] |
|---|---|---|
| 13.C.0.1a | 0.601 | 0.605 |
| 13.C.0.1b | 0.599 | |
| 13.C.0.1c | 0.608 | |
| 13.C.0.1d | 0.610 | |
| 13.C.1.1a | 0.582 | 0.575 |
| 13.C.1.1b | 0.561 | |
| 13.C.1.1c | 0.579 | |
| 13.C.1.1d | 0.579 | |
| 13.C.2.1a | 0.514 | 0.512 |
| 13.C.2.1b | 0.533 | |
| 13.C.2.1c | 0.500 | |
| 13.C.2.1d | 0.500 | |
| 13.C.3.1a | 0.490 | 0.482 |
| 13.C.3.1b | 0.491 | |
| 13.C.3.1c | 0.477 | |
| 13.C.3.1d | 0.468 | |
| 13.C.4.1a | 0.442 | 0.504 |
| 13.C.4.1b | 0.517 | |
| 13.C.4.1c | 0.501 | |
| 13.C.4.1d | 0.555 | |
| 13.C.5.1a | 0.474 | 0.518 |
| 13.C.5.1b | 0.581 | |
| 13.C.5.1c | 0.460 | |
| 13.C.5.1d | 0.555 | |
| 13.C.6.1a | 0.503 | 0.576 |
| 13.C.6.1b | 0.627 | |
| 13.C.6.1c | 0.531 | |
| 13.C.6.1d | 0.644 | |
| 13.C.7.1a | 0.610 | 0.506 |
| 13.C.7.1b | 0.469 | |
| 13.C.7.1c | 0.538 | |
| 13.C.7.1d | 0.406 | |
| 13.C.8.1a | 0.496 | 0.496 |
| 13.C.8.1b | 0.494 | |
| 13.C.8.1c | 0.485 | |
| 13.C.8.1d | 0.508 | |

EXAMPLE 36

Formulations and Test Results for Bottles with about 18% Inner/Outer Skin Thickness Outer-layer formulation 44 comprised about 85% Marlex® HHM 5502BN HDPE (available from Chevron Phillips Chemical Company), about 5% Ampacet 112761 White Polyethylene Masterbatch (available from Ampacet Corporation) as a coloring agent, and about 10% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at levels between about 0.044 kg/h and about 0.124 kg/h as shown in Table 45.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 18% of the thickness of the entire tube, the outer layer provided about 18% of the thickness of the entire tube, and the core layer provided about 64% of the thickness of the entire tube.

A mold was closed around the tube and a blow needle was inserted into a space formed in the tube. During inserting the needle, the mold was moved away from the die head. Vacuum was applied to the mold and caused the pressure to decrease to $P_{VAC}$, which was about 27 inches Hg. Pressurized air was pumped into a space formed in the tube to cause the tube to expand and take on the shape of the mold. The pressurized air in this example was delivered at about 2.5 bar and at about 2° C. In the next step, the mold was opened to reveal a container, also referred to as a bottle. Cycle time is an amount of time between closing the mold around the tube and opening the mold to reveal a container. The cycle time in this example was about 10 seconds. After molding, the inner layer of the bottle provided about 22% of the thickness of the entire bottle, the outer layer of the bottle provided about 22% of the thickness of the entire bottle, and the core layer of the bottle provided about 56% of the thickness of the entire bottle. In one embodiment, the inner layer of the bottle provided about 20.1% of the thickness of the entire bottle, the outer layer of the bottle provided about 24.2% of the thickness of the entire bottle, and the core layer of the bottle provided about 55.7% of the thickness of the entire bottle. In this embodiment, blow molding caused the inner layer's contribution to bottle thickness to increase by 32.7%, the outer layer's contribution to bottle thickness to increase by 41.7%, and the core layer's contribution to bottle thickness to decrease by 17.8%. The thicknesses for two tubes formed at each $N_2$ flow rate were measured and are described in Table 45 as Outer Layer Thickness, Core Layer Thickness, Inner Layer Thickness, and Total Thickness. Also, for each of $N_2$ flow rate, density was measured for three bottles according to the procedure of Example 2 and is shown in Table 46 as Bottle density. The average of the four densities for each $N_2$ flow rate is shown as Average Bottle Density in Table 46. Mean weight of several bottles was measured and is shown in Table 46. Mean rigidity of several bottles was measured according to the procedure of Example 21, the bottom drop test was performed according to the procedure of Example 6 (five bottles were dropped for each set of parameters), and the side drop test was performed according to the procedure of Example 31 (five bottles were dropped for each set of parameters). The results are shown below in Table 47 for each $N_2$ flow rate and are labeled as Rigidity, Bottom Drop Test Pass Rate, and Side Drop Test Pass Rate, respectively.

TABLE 45

$N_2$ flow rate, outer layer thickness, core layer thickness, inner layer thickness, and total thickness for bottles of Example 36.

| Trial [#] | $N_2$ Flow Rate [kg/h] | Outer Layer Thickness [mils] [%] | Core Layer Thickness [mils] [%] | Inner Layer Thickness [mils] [%] | Total Thickness [mils] |
|---|---|---|---|---|---|
| 13.C.0.2 | 0.044 | 11.45 (28.6) | 20.86 (52.1) | 7.72 (19.3) | 40.03 |
| 13.C.1.2 | 0.054 | 7.72 (26.3) | 14.01 (47.7) | 7.64 (26.0) | 29.37 |
| 13.C.2.2 | 0.074 | 10.03 (24.8) | 22.72 (56.1) | 7.76 (19.2) | 40.51 |
| 13.C.3.2 | 0.084 | 9.55 (24.9) | 21.59 (56.4) | 7.15 (18.7) | 38.29 |
| 13.C.4.2 | 0.094 | 8.73 (26.0) | 17.42 (51.8) | 7.47 (22.2) | 33.62 |
| 13.C.5.2 | 0.104 | 9.91 (29.1) | 16.29 (47.8) | 7.88 (23.1) | 34.08 |
| 13.C.6.2 | 0.114 | 7.51 (19.8) | 22.54 (59.4) | 7.92 (20.9) | 37.97 |
| 13.C.7.2 | 0.124 | 10.03 (14.1) | 52.99 (74.3) | 8.27 (11.6) | 71.29 |
| 13.C.8.2 | 0.064 | 10.4 (28.5) | 19.1 (52.4) | 6.98 (19.1) | 36.48 |

TABLE 46

Bottle density, average bottle density, and bottle weight for bottles of Example 36.

| Trial [#] | Bottle Density [g/cm³] | Average Bottle density [g/cm³] | Bottle Weight [g] |
|---|---|---|---|
| 13.C.0.2a | 0.801 | 0.796 | 21.19 |
| 13.C.0.2b | 0.794 | | |
| 13.C.0.2c | 0.793 | | |
| 13.C.1.2a | 0.765 | 0.762 | 20.37 |
| 13.C.1.2b | 0.754 | | |
| 13.C.1.2c | 0.767 | | |
| 13.C.2.2a | 0.727 | 0.710 | 19.36 |
| 13.C.2.2b | 0.695 | | |
| 13.C.2.2c | 0.708 | | |
| 13.C.3.2a | 0.684 | 0.676 | 18.60 |
| 13.C.3.2b | 0.667 | | |
| 13.C.3.2c | 0.677 | | |
| 13.C.4.2a | 0.637 | 0.650 | 18.07 |
| 13.C.4.2b | 0.629 | | |
| 13.C.4.2c | 0.684 | | |
| 13.C.5.2a | 0.647 | 0.640 | 18.03 |
| 13.C.5.2b | 0.615 | | |
| 13.C.5.2c | 0.657 | | |
| 13.C.6.2a | 0.603 | 0.618 | 17.92 |
| 13.C.6.2b | 0.644 | | |
| 13.C.6.2c | 0.606 | | |
| 13.C.7.2a | 0.551 | 0.547 | 18.26 |
| 13.C.7.2b | 0.539 | | |
| 13.C.7.2c | 0.551 | | |
| 13.C.8.2a | 0.739 | 0.734 | 19.72 |
| 13.C.8.2b | 0.737 | | |
| 13.C.8.2c | 0.726 | | |

TABLE 47

Rigidity, bottom drop test result, and side drop test result for bottles of Example 36.

| Trial [#] | Rigidity [kgF] | Bottom Drop Test [Pass %] | Side Drop Test [Pass %] |
|---|---|---|---|
| 13.C.0 | * | 100 | 100 |
| 13.C.1 | * | 100 | 100 |
| 13.C.2 | * | 100 | 100 |
| 13.C.3 | 3.107 | 100 | 0 |
| 13.C.4 | 3.055 | 0 | 20 |

TABLE 47-continued

Rigidity, bottom drop test result, and side drop test result for bottles of Example 36.

| Trial [#] | Rigidity [kgF] | Bottom Drop Test [Pass %] | Side Drop Test [Pass %] |
|---|---|---|---|
| 13.C.5 | * | 60 | 80 |
| 13.C.6 | * | 60 | 100 |
| 13.C.7 | * | 0 | 100 |
| 13.C.8 | * | 100 | 100 |

* Data not available

EXAMPLE 37

Formulations and Test Results for Tubes with Various Amounts of Reinforcing Fiber Outer-layer formulation 44 comprised between about 75% and about 95% Marlex® HHM 5502BN HDPE (available from Chevron Phillips Chemical Company), about 5% Ampacet 112761 White Polyethylene Masterbatch (available from Ampacet Corporation) as a coloring agent, and between about 0% and about 20% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised between about 80% and about 100% Marlex® HHM 5502BN HDPE (available from Chevron Phillips Chemical Company) and between about 0% and about 20% of a reinforcing fiber blend of about 15% Hyperform® HPR-803i (available from Milliken Chemical) and about 85% Braskem F020HC High Crystallinity Polypropylene (available from Braskem). Amounts of reinforcing fiber and HDPE for formulations made in this example are described in Table 48.

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at a level of corresponding to about 0.266% saturation.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided between about 8% and about 12% of the thickness of the entire tube, the outer layer provided between about 8% and about 12% of the thickness of the entire tube, and the core layer provided between about 76% and about of 84% the thickness of the entire tube. The layer thicknesses for several tubes of each formulation were measured and the mean values of these thicknesses for each tube are described in Table 49 as Outer Layer Thickness, Core Layer Thickness, Inner Layer Thickness, and Total Thickness. Outer, core, and inner layer thicknesses of several tubes of each formulation were measured and are shown in Table 49. Also, for each formulation, density was measured for several tubes according to the procedure of Example 2 and the average of the four densities for each formulation is shown as Average Density in Table 49.

TABLE 48

Compositions of outer and inner layers of tubes of Example 37.

| | Outer Layer | | Inner Layer | |
|---|---|---|---|---|
| Trial [#] | Reinforcing Fiber Blend [%] | HDPE [%] | Reinforcing Fiber [%] | HDPE [%] |
| 13.D.1.1 | 10 | 85 | 0 | 100 |
| 13.D.2.1 | 10 | 85 | 0 | 100 |
| 13.D.3.1 | 0 | 95 | 0 | 100 |
| 13.D.4.1 | 0 | 95 | 0 | 100 |
| 13.D.5.1 | 20 | 75 | 0 | 100 |
| 13.D.6.1 | 20 | 75 | 20 | 80 |

TABLE 49

Outer layer thickness, core layer thickness, inner layer thickness, total thickness, and average density for tubes of Example 37.

| Trial [#] | Outer Layer Thickness [mils] [%] | Core Layer Thickness [mils] [%] | Inner Layer Thickness [mils] [%] | Total Thickness [mils] | Average Density |
|---|---|---|---|---|---|
| 13.D.1.1 | 12.37 (10.2) | 96.01 (79.3) | 12.62 (10.4) | 121 | 0.457 |
| 13.D.2.1 | 13.04 (10.4) | 101.43 (80.8) | 11.04 (8.8) | 125.51 | 0.406 |
| 13.D.3.1 | 10.03 (8.1) | 102.67 (82.5) | 11.7 (9.4) | 124.4 | 0.397 |
| 13.D.4.1 | 12.7 (12.0) | 81.6 (77.0) | 11.64 (11.0) | 105.94 | 0.468 |
| 13.D.5.1 | (about 12) | (about 76) | (about 12) | * | * |
| 13.D.6.1 | (about 12) | (about 76) | (about 12) | * | * |

* Data not available

EXAMPLE 38

Formulations and Test Results for Bottles with Various Amounts of Reinforcing Fiber Outer-layer formulation 44 comprised between about 75% and about 95% Marlex® HHM 5502BN HDPE (available from Chevron Phillips Chemical Company), about 5% Ampacet 112761 White Polyethylene Masterbatch (available from Ampacet Corporation) as a coloring agent, and between about 0% and about 20% of a reinforcing fiber blend of about 15% Hyperform® HPR-803i (available from Milliken Chemical) and about 85% Braskem F020HC High Crystallinity Polypropylene (available from Braskem).

Inner-layer formulation 40 comprised between about 80% and about 100% Marlex® HHM 5502BN HDPE (available from Chevron Phillips Chemical Company) and between about 0% and about 20% of a reinforcing fiber blend of about 15% Hyperform® HPR-803i (available from Milliken Chemical) and about 85% Braskem F020HC High Crystallinity Polypropylene (available from Braskem) Amounts of reinforcing fiber and HDPE for formulations made in this example are described in Table 50.

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at a level of corresponding to about 0.266% saturation.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided between about 8% and about 12% of the thickness of the entire tube, the outer layer provided between about 8% and about 12% of the thickness of the entire tube, and the core layer provided between about 76% and about of 84% the thickness of the entire tube. The target thickness of each layer of each tube used in making the resulting bottles of this example is shown in Table 51.

A mold was closed around the tube and a blow needle was inserted into a space formed in the tube. During inserting the needle, the mold was moved away from the die head. Vacuum was applied to the mold and caused the pressure to decrease to $P_{VAC}$, which was about 27 inches Hg. Pressurized air was pumped into a space formed in the tube to cause the tube to expand and take on the shape of the mold. The pressurized air in this example was delivered at about 2.5 bar and at about 2° C. In the next step, the mold was opened to reveal a container, also referred to as a bottle. Cycle time is an amount of time between closing the mold around the tube and opening the mold to reveal a container. The cycle time in this example was about 10 seconds. After molding, the inner layer of the bottle provided between about 10% and about 20% of the thickness of the entire bottle, the outer layer of the bottle provided between about 8% and 19% of the thickness of the entire bottle, and the core layer of the bottle provided between about 82% and 61% of the thickness of the entire bottle. The layer thicknesses for several tubes of each formulation were measured and the mean values of these thicknesses for each tube are described in Table 52 as Outer Layer Thickness, Core Layer Thickness, Inner Layer Thickness, and Total Thickness. Also, for each formulation, density was measured for several tubes according to the procedure of Example 2 and the average of the several densities for each formulation rate is shown as Average Bottle Density in Table 53. Mean weight of several bottles was measured and is shown in Table 53. For each formulation, the top load capacity of several bottles was measured according to the procedure of Example 7, mean rigidity of several bottles was measured according to the procedure of Example 21, the bottom drop test was performed according to the procedure of Example 6 (five bottles were dropped for each set of parameters), and the side drop test was performed according to the procedure of Example 31 (five bottles were dropped for each set of parameters). The results are shown below in Table 54 for each formulation and are labeled as Top Load Capacity, Rigidity, Bottom Drop Test Pass Rate, and Side Drop Test Pass Rate, respectively.

TABLE 50

Compositions of outer and inner layers of bottles of Example 38.

| | Outer Layer | | Inner Layer | |
|---|---|---|---|---|
| Trial [#] | Reinforcing Fiber Blend [%] | HDPE [%] | Reinforcing Fiber [%] | HDPE [%] |
| 13.D.1 | 10 | 85 | 0 | 100 |
| 13.D.2 | 10 | 85 | 0 | 100 |
| 13.D.3 | 0 | 95 | 0 | 100 |
| 13.D.4 | 0 | 95 | 0 | 100 |
| 13.D.5 | 20 | 75 | 0 | 100 |
| 13.D.6 | 20 | 75 | 20 | 80 |

TABLE 51

Target outer layer thickness, target core layer thickness, and target inner layer thickness of parisons used for making bottles of Example 38.

| Trial [#] | Target Outer Layer Thickness [mils] [%] | Target Core Layer Thickness [mils] [%] | Target Inner Layer Thickness [mils] [%] |
|---|---|---|---|
| 13.D.1 | 12 | 76 | 12 |
| 13.D.2 | 8 | 84 | 8 |
| 13.D.3 | 8 | 84 | 8 |
| 13.D.4 | 12 | 76 | 12 |
| 13.D.5 | 12 | 76 | 12 |
| 13.D.6 | 12 | 76 | 12 |

TABLE 52

Outer layer thickness, core layer thickness, inner layer thickness, and total thickness of bottles of Example 38.

| Trial [#] | Outer Layer Thickness [mils] [%] | Core Layer Thickness [mils] [%] | Inner Layer Thickness [mils] [%] | Total Thickness (mils) |
|---|---|---|---|---|
| 13.D.0 | 9.44 (16.0) | 42.34 (71.9) | 7.1 (12.1) | 58.88 |
| 13.D.1 | 8.02 (11.2) | 56.14 (78.7) | 7.19 (10.1) | 71.35 |
| 13.D.2 | 5.68 (8.7) | 52.46 (80.3) | 7.19 (11.0) | 65.33 |
| 13.D.3 | 5.69 (18.5) | 18.8 (61.2) | 6.21 (20.2) | 30.7 |
| 13.D.4 | * | * | * | * |
| 13.D.5 | * | * | * | * |
| 13.D.6 | * | * | * | * |

* Data not available

TABLE 53

Parison density and average parison density of parisons having cellular non-aromatic polymeric material formulations of Example 38.

| Trial [#] | Average Bottle density [g/cm³] | Bottle Weight [g] |
|---|---|---|
| 13.D.0 | 0.616 | 17.61 |
| 13.D.1 | 0.547 | 16.81 |
| 13.D.2 | 0.503 | 16.33 |
| 13.D.3 | 0.54 | 17.04 |
| 13.D.4 | * | * |
| 13.D.5 | * | * |
| 13.D.6 | * | * |

* Data not available

TABLE 54

Top load capacity, rigidity, bottom drop test result, and side drop test result of bottles of Example 38.

| Trial [#] | Top Load Capacity [lbs-F] | Rigidity [kgF] | Bottom Drop Test Pass Rate [%] | Side Drop Test Pass Rate [%] |
|---|---|---|---|---|
| 13.D.0 | 47.03 | 2.614 | 100 | 100 |
| 13.D.1 | 31.63 | 3.435 | 100 | 60 |
| 13.D.2 | 31.700 | 3.823 | 100 | 60 |
| 13.D.3 | 37.89 | 3.362 | 100 | 80 |
| 13.D.4 | * | * | * | * |
| 13.D.5 | * | * | * | * |
| 13.D.6 | * | * | * | * |

* Data not available

EXAMPLE 39

Formulations and Test Results for Bottles with Varying Inner/Outer Layer Thickness Outer-layer formulation 44 comprised about 85% Marlex® HHM 5502BN HDPE (available from Chevron Phillips Chemical Company), about 5% Ampacet 112761 White Polyethylene Masterbatch (available from Ampacet Corporation) as a coloring agent, and about 10% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at a level of corresponding to about 0.266% saturation.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided between about 8% and about 14% of the thickness of the entire tube, the outer layer provided between about 8% and about 14% of the thickness of the entire tube, and the core layer provided between about 72% to about 84% of the thickness of the entire tube. The thicknesses for the tubes of each formulation are described in Table 55 as Outer Layer Thickness and Inner Layer Thickness.

A mold was closed around the tube and a blow needle was inserted into a space formed in the tube. During inserting the needle, the mold was moved away from the die head. Vacuum was applied to the mold and caused the pressure to decrease to $P_{VAC}$, which was about 27 inches Hg. Pressurized air was pumped into a space formed in the tube to cause the tube to expand and take on the shape of the mold. The pressurized air in this example was delivered at about 2.5 bar and at about 2° C. In the next step, the mold was opened to reveal a container, also referred to as a bottle. Cycle time is an amount of time between closing the mold around the tube and opening the mold to reveal a container. The cycle time in this example was about 10 seconds. For set of parameters, density was measured for several bottles according to the procedure of Example 2 the average of the several densities for each set of parameters is shown as Average Bottle Density in Table 55. Mean weight of several bottles was measured and is shown in Table 55. For each set of parameters, the top load capacity of several bottles was measured according to the procedure of Example 7, mean rigidity of several bottles was measured according to the procedure of Example 21, the bottom drop test was performed according to the procedure of Example 6 (five bottles were dropped for each set of parameters), and the side drop test was performed according to the procedure of Example 31 (five bottles were dropped for each set of parameters). The results are shown below in Table 56 for each formulation and are labeled as Top Load Capacity, Rigidity, Bottom Drop Test Pass Rate, and Side Drop Test Pass Rate, respectively.

TABLE 55

Outer layer thickness, core layer thickness, average bottle density, and average bottle weight for bottles of Example 39.

| Trial [#] | Outer Layer Thickness [%] | Inner Layer Thickness [%] | Average Bottle Density [g/cm³] | Average Bottle Weight [g] |
|---|---|---|---|---|
| 13.E.0 | 11.2 | 10.9 | 0.692 | 17.26 |
| 13.E.1 | 8 | 8 | 0.583 | 17.12 |
| 13.E.2 | 8 | 11 | 0.610 | 17.29 |
| 13.E.3 | 8 | 14 | 0.688 | 17.14 |
| 13.E.4 | 11 | 8 | 0.609 | 17.19 |
| 13.E.5 | 11 | 11 | 0.638 | 17.11 |
| 13.E.6 | 11 | 14 | 0.654 | 16.82 |
| 13.E.7 | 14 | 8 | 0.642 | 17.13 |
| 13.E.8 | 14 | 11 | 0.674 | 17.35 |
| 13.E.9 | 14 | 14 | 0.684 | 16.84 |

TABLE 56

Top load capacity, rigidity, bottom drop test result,
and side drop test result of bottles of Example 39.

| Trial [#] | Top Load Capacity [lbs-F] | Rigidity [kgF] | Bottom Drop Test Pass Rate [%] | Side Drop Test Pass Rate [%] |
|---|---|---|---|---|
| 13.E.0 | 38.680 | 2.614 | 100 | 50 |
| 13.E.1 | 34.070 | 1.936 | 100 | 100 |
| 13.E.2 | 32.330 | 2.624 | 100 | 30 |
| 13.E.3 | 30.510 | 2.237 | 100 | 50 |
| 13.E.4 | 28.830 | 2.143 | 100 | 50 |
| 13.E.5 | 29.340 | 2.467 | 60 | 60 |
| 13.E.6 | 35.840 | 2.043 | 100 | 80 |
| 13.E.7 | 38.810 | 2.321 | 100 | 90 |
| 13.E.8 | 43.740 | 2.323 | 100 | 70 |
| 13.E.9 | 45.250 | 2.325 | 100 | 80 |

EXAMPLE 40

Formulations and Test Results for Tubes with Varying $N_2$ Saturation

Outer-layer formulation 44 comprised about 75% Marlex® HHM 5502BN HDPE (available from Chevron Phillips Chemical Company), about 5% Ampacet 112761 White Polyethylene Masterbatch (available from Ampacet Corporation) as a coloring agent, and about 20% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at a level between about 0.045 kg/h and about 0.070 kg/h, corresponding to between about 0.20% and about 0.30% as shown in Table 57.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. The core layer extruder was operated at 13 RPM. Inner and outer layers were extruded through the die head, locating the expanded formulation therebetween, to form a multi-layer tube. The layers were extruded such that the inner layer provided about 11% of the thickness of the entire tube, the outer layer provided about 14% of the thickness of the entire tube, and the core layer provided about 75% of the thickness of the entire tube. The layer thicknesses for several tubes of flow rate were measured and the mean values of these thicknesses for each tube are described in Table 57 as Inner Layer Thickness and Outer Layer Thickness.

TABLE 57

$N_2$ saturation, $N_2$ flow rate, inner layer thickness, and outer layer thickness, and total thickness for tubes of Example 40.

| Trial [#] | $N_2$ Saturation [%] | $N_2$ Flow Rate [kg/h] | Inner Layer Thickness [%] | Outer Layer Thickness [mils] [%] |
|---|---|---|---|---|
| 14.A.1 | 0.20 | 0.045 | 11.65 | 16.55 |
| 14.A.2 | 0.22 | 0.0495 | 11.55 | 16.15 |
| 14.A.3 | 0.24 | 0.054 | 11.65 | 16.55 |
| 14.A.4 | 0.26 | 0.0585 | * | * |
| 14.A.5 | 0.28 | 0.0629 | * | * |
| 14.A.6 | 0.30 | 0.069 | * | * |

* Data not available

EXAMPLE 41

Formulations and Test Results for Bottles with Varying $N_2$ Saturation

Outer-layer formulation 44 comprised about 75% Marlex® HHM 5502BN HDPE (available from Chevron Phillips Chemical Company), about 5% Ampacet 112761 White Polyethylene Masterbatch (available from Ampacet Corporation) as a coloring agent, and about 20% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at a level between about 0.045 kg/h and about 0.070 kg/h as shown in Table 58.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. The core layer extruder was operated at 13 RPM. Inner and outer layers were extruded through the die head, locating the expanded formulation therebetween, to form a multi-layer tube. The layers were extruded such that the inner layer provided about 11% of the thickness of the entire tube, the outer layer provided about 14% of the thickness of the entire tube, and the core layer provided about 75% of the thickness of the entire tube.

A mold was closed around the tube and a blow needle was inserted into a space formed in the tube. During inserting the needle, the mold was moved away from the die head. Vacuum was applied to the mold and caused the pressure to decrease to $P_{VAC}$, which was about 27 inches Hg. Pressurized air was pumped into a space formed in the tube to cause the tube to expand and take on the shape of the mold. The pressurized air in this example was delivered at about 2.5 bar and at about 2° C. In some embodiments, the mold was a Porcerax mold to provide desirable surface finish. In the next step, the mold was opened to reveal a container, also referred to as a bottle. Cycle time is an amount of time between closing the mold around the tube and opening the mold to reveal a container. The cycle time in this example was about 10 seconds. For each N$_2$ flow rate, the weight of three bottles was measured and is shown in Table 58 as Bottle Weight. The average of the three weights for each N$_2$ flow rate is shown as Average Bottle Weight in Table 58. The target bottle weight was 17 g. Also, for each N$_2$ flow rate, density was measured for three bottles according to the procedure of Example 2 and is shown in Table 58 as Bottle Density. The mean of the three densities for each N$_2$ flow rate is shown as Average Bottle Density in Table 58. The target bottle density was 0.6 g/cm$^3$. For each N$_2$ flow rate, the top load capacity of three bottles was measured according to the procedure of Example 7, the mean of the three top load capacities was determined, the rigidity of three other bottles was measured according to the procedure of Example 21, the mean of the three rigidities was determined and the bottom drop test was performed according to the procedure of Example 6 (ten bottles were dropped for each set of parameters). The results are shown below in Table 59 for each N$_2$ flow rate and are labeled as Top Load Capacity, Average Top Load Capacity, Rigidity, Average Rigidity, and Bottom Drop Test Pass Rate, respectively. The target top load capacity was greater than 150 N, and the target rigidity was 1.

TABLE 58

N$_2$ flow rate, bottle weight, average bottle weight, bottle density, and average bottle density for bottles of Example 41.

| Trial [#] | N$_2$ Flow Rate [kg/h] | Bottle Weight [g] | Average Bottle Weight [g] | Bottle density [g/cm$^3$] | Average Bottle density [g/cm$^3$] |
|---|---|---|---|---|---|
| 14.A.1a | 0.045 | 17.21 | 17.3 | 0.710 | 0.710 |
| 14.A.1b |  | 17.08 |  | 0.703 |  |
| 14.A.1c |  | 17.61 |  | 0.718 |  |
| 14.A.2a | 0.0495 | 17.01 | 16.9 | 0.694 | 0.700 |
| 14.A.2b |  | 17.01 |  | 0.696 |  |
| 14.A.2c |  | 16.7 |  | 0.697 |  |
| 14.A.3a | 0.054 | 17.08 | 17.0 | 0.674 | 0.670 |
| 14.A.3b |  | 16.96 |  | 0.671 |  |
| 14.A.3c |  | 16.95 |  | 0.668 |  |
| 14.A.4a | 0.0585 | 17.38 | 17.4 | 0.651 | 0.653 |
| 14.A.4b |  | 17.5 |  | 0.655 |  |
| 14.A.4c |  | 17.36 |  | 0.653 |  |
| 14.A.5a | 0.0629 | 17.14 | 17.2 | 0.653 | 0.646 |
| 14.A.5b |  | 17.17 |  | 0.642 |  |
| 14.A.5c |  | 17.16 |  | 0.644 |  |
| 14.A.6a | 0.069 | 16.84 | 16.9 | 0.640 | 0.642 |
| 14.A.6b |  | 16.91 |  | 0.649 |  |
| 14.A.6c |  | 16.81 |  | 0.637 |  |

TABLE 59

Top load capacity, average top load capacity, rigidity, average rigidity, and bottom drop test pass rate for bottles of Example 41.

| Trial [#] | Top Load Capacity [lbs-F] | Average Top Load Capacity [N] | Rigidity [kgF] | Average Rigidity [kgF] | Bottom Drop Test Pass Rate [%] |
|---|---|---|---|---|---|
| 14.A.1a | 44.91 | 210.36 | 1.916 | 2.08 | 100 |
| 14.A.1b | 44.6 |  | 2.3 |  |  |
| 14.A.1c | 52.36 |  | 2.012 |  |  |
| 14.A.2a | 46.75 | 201.13 | 1.743 | 1.96 | 100 |
| 14.A.2b | 42.21 |  | 2.134 |  |  |
| 14.A.2c | 46.69 |  | 1.999 |  |  |
| 14.A.3a | 43.97 | 199.24 | 2.209 | 2.06 | 100 |
| 14.A.3b | 47.28 |  | 2.101 |  |  |
| 14.A.3c | 43.12 |  | 1.87 |  |  |

TABLE 59-continued

Top load capacity, average top load capacity, rigidity, average rigidity, and bottom drop test pass rate for bottles of Example 41.

| Trial [#] | Top Load Capacity [lbs-F] | Average Top Load Capacity [N] | Rigidity [kgF] | Average Rigidity [kgF] | Bottom Drop Test Pass Rate [%] |
|---|---|---|---|---|---|
| 14.A.4a | 50.34 | 220.01 | 1.66 | 2.08 | 100 |
| 14.A.4b | 49.24 |  | 1.691 |  |  |
| 14.A.4c | 48.8 |  | 2.319 |  |  |
| 14.A.5a | 44.73 | 196.54 | 2.41 | 2.08 | 100 |
| 14.A.5b | 43.48 |  | 1.607 |  |  |
| 14.A.5c | 44.34 |  | 2.22 |  |  |
| 14.A.6a | 42.8 | 191.99 | 2.00 | 2.17 | 100 |
| 14.A.6b | 43.21 |  | 2.063 |  |  |
| 14.A.6c | 43.47 |  | 2.455 |  |  |

EXAMPLE 42

Formulations and Test Results for Tubes with Varying N$_2$ Saturation

Outer-layer formulation 44 comprised about 75% Marlex® HHM 5502BN HDPE (available from Chevron Phillips Chemical Company), about 5% Ampacet 112761 White Polyethylene Masterbatch (available from Ampacet Corporation) as a coloring agent, and about 20% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. N$_2$ was used as a blowing agent and was injected into the rest of the molten core-layer formulation 48 at a level between about 0.045 kg/h and about 0.070 kg/h, corresponding to between about 0.20% and about 0.30% as shown in Table 60.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. The core layer extruder was operated at 13 RPM. Inner and outer layers were extruded through the die head, locating the expanded formulation therebetween, to form a multi-layer tube. The inner layer extruder was operated at 20 rpm and the outer layer extruded was operated at 34 rpm such that the inner layer provided about 8% of the thickness of the entire tube, the outer layer provided about 14% of the thickness of the entire tube, and the core layer provided about 78% of the thickness of the entire tube. The layer thicknesses for several tubes of flow rate were measured and the mean values of these thicknesses for each tube are described in Table 60 as Inner Layer Thickness and Outer Layer Thickness.

TABLE 60

N₂ saturation, N₂ flow rate, inner layer thickness, and outer layer thickness, and total thickness for tubes of Example 50.

| Trial [#] | N₂ Saturation [%] | N₂ Flow Rate [kg/h] | Inner Layer Thickness [%] | Outer Layer Thickness [mils] [%] |
|---|---|---|---|---|
| 14.A.7  | 0.20 | 0.045  | 7.30 | 16.85 |
| 14.A.8  | 0.22 | 0.0495 | 9.05 | 15.15 |
| 14.A.9  | 0.24 | 0.054  | 8.85 | 17.2  |
| 14.A.10 | 0.26 | 0.0585 | 11.8 | 18.9  |
| 14.A.11 | 0.28 | 0.0629 | *    | *     |
| 14.A.12 | 0.30 | 0.069  | *    | *     |

* Data not available

EXAMPLE 43

Formulations and Test Results for Bottles with Varying N₂ Saturation

Outer-layer formulation 44 comprised about 75% Marlex® HHM 5502BN HDPE (available from Chevron Phillips Chemical Company), about 5% Ampacet 112761 White Polyethylene Masterbatch (available from Ampacet Corporation) as a coloring agent, and about 20% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. N₂ was used as a blowing agent and was injected into the rest of the molten core-layer formulation 48 at a level between about 0.045 kg/h and about 0.070 kg/h as shown in Table 61.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. The core layer extruder was operated at 13 RPM. Inner and outer layers were extruded through the die head, locating the expanded formulation therebetween, to form a multi-layer tube. The inner layer extruder was operated at 20 rpm and the outer layer extruded was operated at 34 rpm such that the inner layer provided about 8% of the thickness of the entire tube, the outer layer provided about 14% of the thickness of the entire tube, and the core layer provided about 78% of the thickness of the entire tube.

A mold was closed around the tube and a blow needle was inserted into a space formed in the tube. During inserting the needle, the mold was moved away from the die head. Vacuum was applied to the mold and caused the pressure to decrease to $P_{VAC}$, which was about 27 inches Hg. Pressurized air was pumped into a space formed in the tube to cause the tube to expand and take on the shape of the mold. The pressurized air in this example was delivered at about 2.5 bar and at about 2° C. In some embodiments, the mold was a Porcerax mold to provide desirable surface finish. In the next step, the mold was opened to reveal a container, also referred to as a bottle. Cycle time is an amount of time between closing the mold around the tube and opening the mold to reveal a container. The cycle time in this example was about 10 seconds. For each N₂ flow rate, the weight of three bottles was measured and is shown in Table 61 as Bottle Weight. The average of the three weights for each N₂ flow rate is shown as Average Bottle Weight in Table 61. The target bottle weight was 17 g. Also, for each N₂ flow rate, density was measured for three bottles according to the procedure of Example 2 and is shown in Table 61 as Bottle Density. The mean of the three densities for each N₂ flow rate is shown as Average Bottle Density in Table 61. The target bottle density was 0.6 g/cm³. For each N₂ flow rate, the top load capacity of three bottles was measured according to the procedure of Example 7, the mean of the three top load capacities was determined, the rigidity of three other bottles was measured according to the procedure of Example 6, the mean of the three rigidities was determined and the bottom drop test was performed according to the procedure of Example 6 (ten bottles were dropped for each set of parameters). The results are shown below in Table 62 for each N₂ flow rate and are labeled as Top Load Capacity, Average Top Load Capacity, Rigidity, Average Rigidity, and Bottom Drop Test Pass Rate, respectively. The target top load capacity was greater than 150 N, and the target rigidity was 1.

TABLE 61

N₂ flow rate, bottle weight, average bottle weight, bottle density, and average bottle density for bottles of Example 43.

| Trial [#] | N₂ Flow Rate [kg/h] | Bottle Weight [g] | Average Bottle Weight [g] | Bottle density [g/cm³] | Average Bottle density [g/cm³] |
|---|---|---|---|---|---|
| 14.A.7a  | 0.045  | 17.02 | 17.0 | 0.694 | 0.691 |
| 14.A.7b  |        | 17.13 |      | 0.700 |       |
| 14.A.7c  |        | 16.81 |      | 0.678 |       |
| 14.A.8a  | 0.0495 | 17.23 | 17.2 | 0.669 | 0.659 |
| 14.A.8b  |        | 17.2  |      | 0.652 |       |
| 14.A.8c  |        | 17.3  |      | 0.657 |       |
| 14.A.9a  | 0.054  | 17.26 | 17.2 | 0.606 | 0.618 |
| 14.A.9b  |        | 17.24 |      | 0.641 |       |
| 14.A.9c  |        | 17.18 |      | 0.607 |       |
| 14.A.10a | 0.0585 | 16.85 | 16.9 | 0.617 | 0.600 |
| 14.A.10b |        | 16.93 |      | 0.593 |       |
| 14.A.10c |        | 16.9  |      | 0.590 |       |
| 14.A.11a | 0.0629 | 17.31 | 17.2 | 0.562 | 0.569 |
| 14.A.11b |        | 17.09 |      | 0.589 |       |
| 14.A.11c |        | 17.21 |      | 0.557 |       |
| 14.A.12a | 0.069  | 17    | 17.1 | 0.601 | 0.585 |
| 14.A.12b |        | 17.31 |      | 0.577 |       |
| 14.A.12c |        | 17.11 |      | 0.578 |       |

TABLE 62

Top load capacity, average top load capacity, rigidity, average rigidity, and bottom drop test pass rate for bottles of Example 43.

| Trial [#] | Top Load Capacity [lb] | Average Top Load Capacity [N] | Rigidity [kgF] | Average Rigidity [kgF] | Bottom Drop Test Pass Rate [%] |
|---|---|---|---|---|---|
| 14.A.7a | 47.57 | 196.08 | 1.865 | 2.00 | 100 |
| 14.A.7b | 46.79 |        | 1.615 |      |     |
| 14.A.7c | 37.88 |        | 2.057 |      |     |
| 14.A.8a | 38.53 | 188.44 | 2.266 | 1.85 | 100 |
| 14.A.8b | 48.59 |        | 2.046 |      |     |
| 14.A.8c | 39.97 |        | 1.684 |      |     |
| 14.A.9a | 40.18 | 193.44 | 1.967 | 2.05 | 90  |
| 14.A.9b | 49.85 |        | 2.127 |      |     |

TABLE 62-continued

Top load capacity, average top load capacity, rigidity, average rigidity, and bottom drop test pass rate for bottles of Example 43.

| Trial [#] | Top Load Capacity [lb] | Average Top Load Capacity [N] | Rigidity [kgF] | Average Rigidity [kgF] | Bottom Drop Test Pass Rate [%] |
|---|---|---|---|---|---|
| 14.A.9c | 40.43 | | * | | |
| 14.A.10a | 45.39 | 193.28 | * | * | 100 |
| 14.A.10b | 46.82 | | * | | |
| 14.A.10c | 38.14 | | * | | |
| 14.A.11a | * | * | * | * | 100 |
| 14.A.11b | * | | * | | |
| 14.A.11c | * | | * | | |
| 14.A.12a | * | * | * | * | 70 |
| 14.A.12b | * | | * | | |
| 14.A.12c | * | | * | | |

EXAMPLE 44

Formulations and Test Results for Bottles with Varying Process Aid

Outer-layer formulation 44 comprised between about 72% and about 75% of a base resin blend of 50% Marlex® HHM 5502BN HDPE (available from Chevron Phillips Chemical Company) and 50% DOW LLDPE 50041 Polyethylene, Low Density (available from the Dow Chemical Company) about 5% Ampacet 112761 White Polyethylene Masterbatch (available from Ampacet Corporation) as a coloring agent, about 20% of a reinforcing fiber blend of about 15% Hyperform® HPR-803i (available from Milliken Chemical) and about 85% Braskem F020HC High Crystallinity Polypropylene (available from Braskem), and between about 0% and about 3% of an Ampacet 102823 as a process aid. Inner-layer formulation 40 comprised about 100% Marlex® HHM 5502BN HDPE (available from Chevron Phillips Chemical Company). The outer-layer formulation is further described in Table 63.

Core-layer formulation 48 comprised between about 99.6% and about 99.9% Marlex® HHM 5502BN HDPE (available from Chevron Phillips Chemical Company), which was used as a polyethylene base resin. The polyethylene base resin was blended with between about 0.1% and about 0.3% HYDROCEROL® CF 40E as a chemical blowing agent and nucleating agent and between about 0.1% and about 0.3% Heritage Plastics HT6000 LLDPE talc as another nucleating agent. $N_2$ was used as a blowing agent and was injected into the rest of the molten core-layer formulation 48 at a level between of about 0.060 kg/h. The core-layer formulation is further described in Table 63.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. The core layer extruder was operated at 13 RPM. Inner and outer layers were extruded through the die head, locating the expanded formulation therebetween, to form a multi-layer tube. The inner layer extruder was operated at 20 rpm and the outer layer extruded was operated at 34 rpm such that the inner layer provided about 8% of the thickness of the entire tube, the outer layer provided about 14% of the thickness of the entire tube, and the core layer provided about 78% of the thickness of the entire tube.

A mold was closed around the tube and a blow needle was inserted into a space formed in the tube. During inserting the needle, the mold was moved away from the die head. Vacuum was applied to the mold and caused the pressure to decrease to $P_{VAC}$, which was about 27 inches Hg. Pressurized air was pumped into a space formed in the tube to cause the tube to expand and take on the shape of the mold. The pressurized air in this example was delivered at about 2.5 bar and at about 2° C. In the next step, the mold was opened to reveal a container, also referred to as a bottle. Cycle time is an amount of time between closing the mold around the tube and opening the mold to reveal a container. The cycle time in this example was about 10 seconds. For each $N_2$ flow rate, the weight of ten bottles was measured. The average of the ten weights for each $N_2$ flow rate is shown as Average Bottle Weight in Table 64. The target bottle weight was 17 g. Also, for each $N_2$ flow rate, density was measured for three bottles according to the procedure of Example 2 and is shown in Table 64 as Bottle Density. The mean of the three densities for each $N_2$ flow rate is shown as Average Bottle Density in Table 64. The target bottle density was 0.6 g/cm$^3$. For each $N_2$ flow rate, the top load capacity of three bottles was measured according to the procedure of Example 7, the mean of the three top load capacities was determined, the rigidity of three other bottles was measured according to the procedure of Example 6, the mean of the three rigidities was determined and the bottom drop test was performed according to the procedure of Example 6 (ten bottles were dropped for each set of parameters). The results are shown below in Table 65 for each $N_2$ flow rate and are labeled as Top Load Capacity, Average Top Load capacity, Rigidity, Average Rigidity, and Bottom Drop Test Pass Rate, respectively. The target top load capacity was greater than 150 N, and the target rigidity was 1.

TABLE 63

Amounts base resin blend, process aid, HDPE, talc, and chemical blowing agent for bottles of Example 44.

| | Outer Layer | | Core Layer | | |
|---|---|---|---|---|---|
| | Base | | | | |
| Trial [#] | resin blend [%] | 102823 [%] | 5502BN [%] | HT6000 [%] | CF 40E [%] |
| 14.B.1 | 75 | 0 | 99.6 | 0.3 | 0.1 |
| 14.B.2 | 75 | 0 | 99.9 | 0 | 0.1 |
| 14.B.3 | 75 | 0 | 99.7 | 0 | 0.3 |
| 14.B.4 | 72 | 3 | 99.6 | 0.3 | 0.1 |
| 14.B.5 | 72 | 3 | 99.9 | 0 | 0.1 |
| 14.B.6 | 72 | 3 | 99.7 | 0 | 0.3 |
| 14.B.7 | 75 | 0 | 99.9 | 0 | 0.1 |

TABLE 64

Average bottle weight, bottle density, and average bottle density for bottles of Example 44.

| Trial [#] | Average Bottle Weight [g] | Bottle density [g/cm$^3$] | Average Bottle density [g/cm$^3$] |
|---|---|---|---|
| 14.B.1a | 17.1 ± 0.3 | 0.672 | 0.68 |
| 14.B.1b | | 0.683 | |
| 14.B.1c | | 0.690 | |
| 14.B.2a | 17.0 ± 0.1 | 0.669 | 0.67 |
| 14.B.2b | | 0.678 | |
| 14.B.2c | | 0.676 | |

TABLE 64-continued

Average bottle weight, bottle density, and average bottle density for bottles of Example 44.

| Trial [#] | Average Bottle Weight [g] | Bottle density [g/cm³] | Average Bottle density [g/cm³] |
|---|---|---|---|
| 14.B.3a | 17.1 ± 0.2 | 0.665 | 0.67 |
| 14.B.3b |  | 0.675 |  |
| 14.B.3c |  | 0.669 |  |
| 14.B.4a | 17.0 ± 0.4 | 0.670 | 0.67 |
| 14.B.4b |  | 0.676 |  |
| 14.B.4c |  | 0.676 |  |
| 14.B.5a | 17.2 ± 0.2 | 0.681 | 0.68 |
| 14.B.5b |  | 0.670 |  |
| 14.B.5c |  | 0.674 |  |
| 14.B.6a | 17.0 ± 0.2 | 0.672 | 0.67 |
| 14.B.6b |  | 0.665 |  |
| 14.B.6c |  | 0.667 |  |
| 14.B.7a | 17.1 ± 0.2 | 0.657 | 0.65 |
| 14.B.7b |  | 0.655 |  |
| 14.B.7c |  | 0.648 |  |

TABLE 65

Top load capacity, average top load capacity, rigidity, average rigidity, and bottom drop test pass rate for bottles of Example 44.

| Trial [#] | Top Load Capacity [lb] | Average Top Load Capacity [N] | Rigidity [kgF] | Average Rigidity [kgF] | Bottom Drop Test Pass Rate [%] |
|---|---|---|---|---|---|
| 14.B.1a | 45.82 | 201.5 | 1.1 | 1.13 | 100 |
| 14.B.1b | 45.67 |  | 1.12 |  |  |
| 14.B.1c | 44.4 |  | 1.17 |  |  |
| 14.B.2a | 41.61 | 194.2 | 1.36 | 1.25 | 100 |
| 14.B.2b | 44.81 |  | 1.12 |  |  |
| 14.B.2c | 44.57 |  | 1.26 |  |  |
| 14.B.3a | 43.95 | 197.0 | 1.29 | 1.21 | 100 |
| 14.B.3b | 44.68 |  | 1.07 |  |  |
| 14.B.3c | 44.23 |  | 1.26 |  |  |
| 14.B.4a | 43.83 | 192.5 | 1.22 | 1.22 | 100 |
| 14.B.4b | 43.42 |  | 1.2 |  |  |
| 14.B.4c | 42.58 |  | 1.24 |  |  |
| 14.B.5a | 43.23 | 194.8 | 1.26 | 1.22 | 100 |
| 14.B.5b | 43.45 |  | 1.16 |  |  |
| 14.B.5c | 44.72 |  | 1.24 |  |  |
| 14.B.6a | 42.79 | 195.8 | 1.20 | 1.17 | 100 |
| 14.B.6b | 44.49 |  | 1.13 |  |  |
| 14.B.6c | 44.75 |  | 1.18 |  |  |
| 14.B.7a | 37.52 | 170.5 | 1.08 | 1.11 | 100 |
| 14.B.7b | 38.64 |  | 1.09 |  |  |
| 14.B.7c | 38.86 |  | 1.15 |  |  |

EXAMPLE 45

Formulation and Test Results for Bottles with 50% Regrind

Outer-layer formulation 44 comprised about 75% Marlex® HHM 5502BN HDPE (available from Chevron Phillips Chemical Company), about 5% Ampacet 112761 White Polyethylene Masterbatch (available from Ampacet Corporation) as a coloring agent, and about 20% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 50% first-pass regrind material and about 50% of a formulation comprising about 99.6% Marlex® HHM 5502BN HDPE (available from Chevron Phillips Chemical Company), which was used as a polyethylene base resin, blended with about 0.1% HYDROCEROL® CF 40E as a chemical blowing agent and nucleating agent, and about 0.3% Heritage Plastics HT6000 LLDPE talc as another nucleating agent. $N_2$ was used as a blowing agent and was injected into the rest of the molten core-layer formulation 48 at a level between that led to 0.22% $N_2$ saturation.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 11% of the thickness of the entire tube, the outer layer provided about 14% of the thickness of the entire tube, and the core layer provided about 75% of the thickness of the entire tube.

A mold was closed around the tube and a blow needle was inserted into a space formed in the tube. During inserting the needle, the mold was moved away from the die head. Vacuum was applied to the mold and caused the pressure to decrease to $P_{VAC}$, which was about 27 inches Hg. Pressurized air was pumped into a space formed in the tube to cause the tube to expand and take on the shape of the mold. The pressurized air in this example was delivered at about 2.5 bar and at about 2° C. In the next step, the mold was opened to reveal a container, also referred to as a bottle. Cycle time is an amount of time between closing the mold around the tube and opening the mold to reveal a container. The cycle time in this example was about 10 seconds. The weights of three bottles were measured to be 17.25 g, 17.16 g, and 17.39 g leading to an average weight of 17.3 g. The target bottle weight was 17 g. Also, density was measured for three bottles according to the procedure of Example 2 to be 0.689 g/cm³, 0.676 g/cm³, and 0.680 g/cm³ leading to an average density of 0.682 g/cm³. The target bottle density was 0.6 g/cm³. The top load capacity of three bottles was measured according to the procedure of Example 7 to be 50.4 lbs-F, 49.1 lbs-F, and 47.9 lbs-F leading to an average top load capacity of 218.5 N. The bottom drop test was performed according to the procedure of Example 6 (ten bottles were dropped for each set of parameters) as all bottles passed the drop test. The dimension T, as shown in FIGS. 22 and 23 as 212E,F, was measured to be 0.938 inches.

EXAMPLE 46

Formulation and Test Results for Bottles Various Amounts of Fiber

Outer-layer formulation 44 comprised about 87% to about 92% Marlex® HHM 5502BN HDPE (available from Chevron Phillips Chemical Company), about 5% Ampacet 112761 White Polyethylene Masterbatch (available from Ampacet Corporation) as a coloring agent, and about 3% to about 8% Hyperform® HPR-803i (available from Milliken Chemical) as shown in Table 66. Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and between about 0.3% Heritage Plastics HT6000 LLDPE talc as another nucleating agent. $N_2$ was used as a blowing agent and was injected into the rest of the molten core-layer formulation 48 at a level between that led to about 0.22% $N_2$ saturation.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 11% of the thickness of the entire tube, the outer layer provided about 14% of the thickness of the entire tube, and the core layer provided about 75% of the thickness of the entire tube.

A mold was closed around the tube and a blow needle was inserted into a space formed in the tube. During inserting the needle, the mold was moved away from the die head. Vacuum was applied to the mold and caused the pressure to decrease to $P_{VAC}$, which was about 27 inches Hg. Pressurized air was pumped into a space formed in the tube to cause the tube to expand and take on the shape of the mold. The pressurized air in this example was delivered at about 2.5 bar and at about 2° C. In the next step, the mold was opened to reveal a container, also referred to as a bottle. Cycle time is an amount of time between closing the mold around the tube and opening the mold to reveal a container. The cycle time in this example was about 10 seconds. For formulation, the weight of three bottles was measured and is shown in Table 66 as Bottle Weight. The target bottle weight was 17 g. Also, for each formulation, density was measured for three bottles according to the procedure of Example 2 and is shown in Table 66 as Bottle density. The target bottle density was 0.6 g/cm³. For each formulation, the top load capacity of three bottles was measured according to the procedure of Example 7 and is shown in Table 66 as Top Load Capacity. The target top load capacity was greater than 150 N, and the target rigidity was 1.

TABLE 66

Amount of fiber formulation, bottle weight, bottle density, and top load capacity for bottles of Example 46.

| Trial [#] | HPR-803i [%] | Bottle Weight [g] | Bottle density [g/cm³] | Top Load Capacity [N] |
|---|---|---|---|---|
| 15.B.1a | 7.5 | 17.1 | 0.679 | 221.30 |
| 15.B.1b |  | 17.1 | 0.681 | 222.23 |
| 15.B.1c |  | 17.3 | 0.674 | 222.99 |
| 15.B.2a | 5 | 16.7 | 0.667 | 209.24 |
| 15.B.2b |  | 16.9 | 0.664 | 196.03 |
| 15.B.2c |  | 16.7 | 0.671 | 215.47 |
| 15.B.3a | 3 | 17.2 | 0.693 | 208.62 |
| 15.B.3b |  | 17.0 | 0.680 | 204.62 |
| 15.B.3c |  | 17.2 | 0.688 | 204.80 |

EXAMPLE 47

Formulations and Test Results for Bottles with Various Amounts of Regrind

Outer-layer formulation 44 comprised about 75% Marlex® HHM 5502BN HDPE (available from Chevron Phillips Chemical Company), about 12.5% Braskem Polypropylene Inspire 6025N (available from Braskem), about 5% Ampacet 112761 White Polyethylene Masterbatch (available from Ampacet Corporation) as a coloring agent, and about 7.5% Hyperform® HPR-803i (available from Milliken Chemical). Inner-layer formulation 40 comprised about 100% Marlex® HHM 5502BN HDPE (available from Chevron Phillips Chemical Company).

Core-layer formulation 48 comprised between about 0% and about 50% first-pass regrind material, as shown in Table 67, and between about 0% and about 50% of a formulation comprising about 99.6% Marlex® HHM 5502BN HDPE (available from Chevron Phillips Chemical Company), which was used as a polyethylene base resin, blended with about 0.1% HYDROCEROL® CF 40E as a chemical blowing agent and nucleating agent, and about 0.3% Heritage Plastics HT6000 LLDPE talc as another nucleating agent. $N_2$ was used as a blowing agent and was injected into the rest of the molten core-layer formulation 48 at a level between that led to 0.22% $N_2$ saturation.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 11% of the thickness of the entire tube, the outer layer provided about 14% of the thickness of the entire tube, and the core layer provided about 75% of the thickness of the entire tube.

A mold was closed around the tube and a blow needle was inserted into a space formed in the tube. During inserting the needle, the mold was moved away from the die head. Vacuum was applied to the mold and caused the pressure to decrease to $P_{VAC}$, which was about 27 inches Hg. Pressurized air was pumped into a space formed in the tube to cause the tube to expand and take on the shape of the mold. The pressurized air in this example was delivered at about 2.5 bar and at about 2° C. In the next step, the mold was opened to reveal a container, also referred to as a bottle. Cycle time is an amount of time between closing the mold around the tube and opening the mold to reveal a container. The cycle time in this example was about 10 seconds. For each formulation, the weights of several bottles were measured. The average of the weights for each $N_2$ flow rate is shown as Average Bottle Weight in Table 67. The target bottle weight was 17 g. Also, for each formulation, density was measured for several bottles according to the procedure of Example 2. The mean of the densities for each formulation is shown as Average Bottle Density in Table 67. The target bottle density was 0.6 g/cm³. For each formulation, the top load capacity of three bottles was measured according to the procedure of Example 7, the mean of the three top load capacities was determined, the rigidity of three other bottles was measured according to the procedure of Example 6, the mean of the three rigidities was determined, and the bottom drop test was performed according to the procedure of Example 6 (ten bottles were dropped for each set of parameters). The results are shown below in Table 68 for each formulation and are labeled as Top Load Capacity, Average Top Load Capacity, Rigidity, Average rigidity, and Bottom Drop Test Pass Rate, respectively. The target top load capacity was greater than 150 N, and the target rigidity was 1. The dimension T, as shown in FIGS. 22 and 23 as 212E,F, was measured for each formulation and is shown in Table 68 as T average. The target value for the dimension T was 0.943 inches. For 20 bottles, T was measured 20 minutes and 48 hours after formation. T shrunk an average of 0.0006 inches and did not shrink more than 0.001 inches for any of the 20 bottles.

TABLE 67

Amount of regrind, average bottle weight, bottle density, and average bottle density for bottles of Example 47.

| Trial [#] | Regrind [%] | Average Bottle Weight [g] | Average Bottle Density [g/cm³] |
|---|---|---|---|
| 16.A.1 | 0 | 17.3 ± 4 | 0.685 ± 0.008 |
| 16.B.1 | 25 | 17.2 ± 2 | 0.690 ± 0.004 |
| 16.B.2 | 50 | 17.4 ± 2 | 0.670 ± 0.015 |

TABLE 68

Top load capacity, average top load capacity, rigidity, average rigidity, and bottom drop test pass rate for bottles of Example 47.

| Trial [#] | Top Load Capacity [N] | Average Top Load Capacity [N] | Rigidity [kgF] | Average Rigidity [kgF] | Bottom Drop Test Pass Rate [%] | T average [inches] |
|---|---|---|---|---|---|---|
| 16.A.1a | 208.977 | 215.83 | 2.76 | 215.83 | 100 | 0.934 |
| 16.A.1b | 218.407 | | 1.942 | | | |
| 16.A.1c | 220.097 | | 2.928 | | | |
| 16.B.1a | 217.740 | 215.78 | 3.386 | 215.78 | 100 | 0.939 |
| 16.B.1b | 217.740 | | 3.334 | | | |
| 16.B.1c | 211.869 | | 2.744 | | | |
| 16.B.2a | 220.142 | 217.55 | 2.252 | 217.55 | 100 | 0.938 |
| 16.B.2b | 216.450 | | 2.354 | | | |
| 16.B.2c | 216.050 | | 2.366 | | | |

EXAMPLE 48

Formulations and Test Results for Bottles with Various Amounts of Regrind

Outer-layer formulation 44 comprised about 75% Marlex® HHM 5502BN HDPE (available from Chevron Phillips Chemical Company), about 12.5% Braskem Polypropylene Inspire 6025N (available from Braskem), about 5% Ampacet 112761 White Polyethylene Masterbatch (available from Ampacet Corporation) as a coloring agent, and about 7.5% Hyperform® HPR-803i (available from Milliken Chemical). Inner-layer formulation 40 comprised about 100% Marlex® HHM 5502BN HDPE (available from Chevron Phillips Chemical Company).

Core-layer formulation 48 comprised between about 0% and about 50% regrind material, as shown in Table 69, and between about 100% and about 50% of a formulation comprising about 99.6% Marlex® HHM 5502BN HDPE (available from Chevron Phillips Chemical Company), which was used as a polyethylene base resin, blended with about 0.1% HYDROCEROL® CF 40E as a chemical blowing agent and nucleating agent, and about 0.3% Heritage Plastics HT6000 LLDPE talc as another nucleating agent. Several stages of bottles production were performed using different amounts of multiple-pass regrind, as shown in Table 69. First pass regrind was obtained from bottles made of virgin material (stage 0), second pass regrind was obtained from bottles made of material from stage 1, third pass regrind was obtained from bottles made of material from stage 2, fourth pass regrind was obtained from bottles made of material from stage 3, fifth pass regrind was obtained from bottles made of material from stage 4, and sixth pass regrind was obtained from bottles made of material from stage 5. $N_2$ was used as a blowing agent and was injected into the rest of the molten core-layer formulation 48 at a level between that led to 0.22% $N_2$ saturation.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core parison. Inner and outer layers were extruded through the die head, locating the expanded formulation therebetween, to form a multi-layer tube. The layers were extruded such that the inner layer provided about 14% of the thickness of the entire tube, the outer layer provided about 14% of the thickness of the entire tube, and the core layer provided about 72% of the thickness of the entire tube.

A mold was closed around the tube and a blow needle was inserted into a space formed in the tube. During inserting the needle, the mold was moved away from the die head. Vacuum was applied to the mold and caused the pressure to decrease to $P_{VAC}$, which was about 27 inches Hg. Pressurized air was pumped into a space formed in the tube to cause the tube to expand and take on the shape of the mold. The pressurized air in this example was delivered at about 2.5 bar and at about 2° C. In the next step, the mold was opened to reveal a container, also referred to as a bottle. Cycle time is an amount of time between closing the mold around the tube and opening the mold to reveal a container. The cycle time in this example was about 10 seconds.

TABLE 69

Pass level of regrind material used in different stages of production of bottles of Example 46.

| | Regrind Stage | | | | | | |
|---|---|---|---|---|---|---|---|
| | Stage 0 | Stage 1 | Stage 2 | Stage 3 | Stage 4 | Stage 5 | Stage 6 |
| Virgin | 100.00% | 50.00% | 50.00% | 50.00% | 50.00% | 50.00% | 50.00% |
| 1st Pass | | 50.00% | 25.00% | 25.00% | 25.00% | 25.00% | 25.00% |
| 2nd Pass | | | 25.00% | 12.50% | 12.50% | 12.50% | 12.50% |
| 3rd Pass | | | | 12.50% | 6.25% | 6.25% | 6.25% |
| 4th Pass | | | | | 6.25% | 3.13% | 3.13% |
| 5th Pass | | | | | | 3.13% | 1.56% |
| 6th Pass | | | | | | | 1.56% |

The bottles formed in stages 0-6, as shown in Table 49, were subjected to Differential Scanning calorimetry (DSC), Fourier Transmission Near Infrared (FTIR), and Melt Flow Index.

DSC results are shown in FIGS. 31-40 and Tables 70-71. DSC was performed using Netzsch Instruments DSC 204 F1 Phoenix. 4 mm round samples were punched from a standard die or pellets were cut to fit in sample pans. Both were weighed to 0.001 mg. Samples were placed in aluminum DSC sample pans and lidded. The DSC cycle was as follows:
1. Preparation: Cool to −100° C.,
2. First Heat: Heat to 250° C.,
3. Cooling: Cool to −100° C.,
4. Second Heat: Heat to 250° C.

All heating and cooling cycles performed at a rate of 10° C./min in an inert atmosphere of $N_2$. The resulting data was analyzed using Proteus 61 software from Netzsch Instruments. All iterations, regrind and bottles, showed 2 melting peaks on first heat: Between 133° C. and 140° C., indicating HDPE and between 165° C. and 166° C., indicating PP. All iterations, regrind and bottles, showed 3 crystallization peaks: Between 79° C. and 82° C., indicating HDPE, between 112° C. and 115° C., indicating HDPE, between 128° C. and 130° C., indicating nucleated PP. All iterations, regrind and bottles, showed 2 melting peaks on second heat: Between 134° C. and 137° C., indicating HDPE and between 165° C. and 168° C., indicating PP. Crystallinities varied by iteration and stage, ranging from 202 J/g in the Lab Line sample to 136 J/g in T 1D samples.

TABLE 70

DSC results for the bottles from Example 46.

| | | First Heat | | | Cooling | | | | Second Heat | | |
| | | | | | Crystal- | | | Crystal- | | | |
| | Sample | Peak Melt (HDPE) (° C.) | Crystallinity (J/g) | Other Melt (PP) (° C.) | lization (HDPE) (° C.) | Crystallinity (J/g) | Crystallization (° C.) | lization (PP) (° C.) | Peak Melt (HDPE) (° C.) | Crystallinity (J/g) | Other Melt (PP) (° C.) |
|---|---|---|---|---|---|---|---|---|---|---|---|
| T1A | #1 | 133.1 | 162.3 | 164.7 | 114.4 | 189.3 | 81.1 | 130.3 | 133.9 | 184.1 | 165.2 |
| | #2 | 134.4 | 148.8 | 166.4 | 113.4 | 180.9 | 81.9 | 129.1 | 135.1 | 176.2 | 167.7 |
| | #3 | 134.5 | 155.1 | 166.2 | 113.9 | 181.2 | 80.2 | 129.0 | 135.1 | 178.5 | 166.4 |
| | Ave | 134.0 | 155.4 | 165.8 | 113.9 | 183.8 | 81.1 | 129.5 | 134.7 | 179.6 | 166.4 |
| | Range | 1.4 | 13.5 | 1.7 | 1.0 | 8.4 | 1.7 | 1.3 | 1.2 | 7.9 | 2.5 |
| T1B | #1 | NA | NA | NA | NA | NA | NA | NA | NA | NA | NA |
| | #2 | 134.8 | 147.3 | 165.2 | 114.1 | 167.6 | 81.30 | 129.5 | 135.0 | 166.1 | 165.4 |
| | #3 | 133.7 | 149.5 | 166.4 | 113.4 | 181.1 | 82.4 | 128.5 | 134.9 | 182.7 | 166.5 |
| | Ave | 134.3 | 148.4 | 165.8 | 113.8 | 174.4 | 81.9 | 129.0 | 135.0 | 174.4 | 166.0 |
| | Range | 1.1 | 2.2 | 1.2 | 0.7 | 13.5 | 1.1 | 1.0 | 0.1 | 16.6 | 1.1 |
| T1C | #1 | NA | NA | NA | NA | NA | NA | NA | NA | NA | NA |
| | #2 | 134.4 | 153.3 | 166.2 | 113.7 | 183.9 | 82.1 | 128.8 | 135.4 | 178.8 | 166.2 |
| | #3 | 133.8 | 154.2 | 165.8 | 114.4 | 179.6 | 80.7 | 129.1 | 134.7 | 179.2 | 166.1 |
| | Ave | 134.1 | 153.8 | 166.0 | 114.1 | 181.8 | 81.4 | 129.0 | 135.1 | 179.0 | 166.2 |
| | Range | 0.6 | 0.9 | 0.4 | 0.7 | 4.3 | 1.4 | 0.3 | 0.7 | 0.4 | 0.1 |
| T1D | #1 | 135.2 | 146.1 | 165.6 | 114.0 | 165.3 | 82.4 | 129.7 | 134.5 | 158.3 | 165.0 |
| | #2 | 134.7 | 143.8 | 165.7 | 112.9 | 167.6 | 81.6 | 129.9 | 136.4 | 159.8 | 165.6 |
| | #3 | 133.9 | 136.6 | 166.3 | 113.2 | 173.4 | 80.6 | 128.5 | 134.8 | 167.9 | 166.4 |
| | Ave | 134.6 | 142.2 | 165.9 | 113.4 | 168.8 | 81.5 | 129.4 | 135.2 | 162.0 | 165.7 |
| | Range | 1.3 | 9.5 | 0.7 | 1.1 | 8.1 | 1.8 | 1.4 | 1.9 | 9.6 | 1.4 |
| Lab Line | #1 | NA | NA | NA | NA | NA | NA | NA | NA | NA | NA |
| | #2 | 133.0 | 158.0 | NA | 113.6 | 182.4 | 81.8 | NA | 135.5 | 191.4 | NA |
| | #3 | 133.9 | 161.5 | NA | 113.1 | 202.4 | 80.3 | NA | 135.5 | 193.2 | NA |
| | Ave | 133.5 | 159.8 | NA | 113.4 | 192.4 | 81.1 | NA | 135.5 | 192.3 | NA |
| | Range | 0.9 | 3.5 | NA | 0.5 | 20.0 | 1.5 | NA | 0.0 | 1.8 | NA |

TABLE 71

DSC results for the bottles from Example 46.

| | | First Heat | | | Cooling | | | | Second Heat | | |
| | | | | | Crystal- | | | Crystal- | | | |
| | Sample | Peak Melt (HDPE) (° C.) | Crystallinity (J/g) | Other Melt (PP) (° C.) | lization (HDPE) (° C.) | Crystallinity (J/g) | Crystallization (° C.) | lization (PP) (° C.) | Peak Melt (HDPE) (° C.) | Crystallinity (J/g) | Other Melt (PP) (° C.) |
|---|---|---|---|---|---|---|---|---|---|---|---|
| Stage 0 Rg | #1 | 135.3 | 168.7 | 165.8 | 114.8 | 169.6 | 80.5 | 129.9 | 134.1 | 165.8 | 165.6 |
| | #2 | 138.1 | 187.3 | 165.1 | 112.8 | 179.4 | 79.2 | 129.1 | 135.9 | 181.9 | 165.7 |
| | #3 | 138.4 | 185.8 | 165.4 | 112.6 | 183.2 | 80.0 | 128.7 | 136.5 | 181.9 | 165.8 |
| | Ave | 137.3 | 180.6 | 165.4 | 113.4 | 177.4 | 79.9 | 129.2 | 135.5 | 176.5 | 165.7 |
| | Range | 3.1 | 18.6 | 0.7 | 2.2 | 13.6 | 1.3 | 1.2 | 2.4 | 16.1 | 0.2 |
| Stage 1 Rg | #1 | 132.9 | 149.8 | 166.2 | 115.2 | 169.4 | 81.6 | 129.7 | 134.1 | 170.2 | 165.0 |
| | #2 | 137.8 | 160.7 | 165.7 | 114.0 | 173.2 | 80.1 | 129.9 | 135.2 | 168.6 | 165.8 |
| | #3 | 139.7 | 168.2 | 165.7 | 112.3 | 174.4 | 80.4 | 127.7 | 135.9 | 174.1 | 165.1 |
| | Ave | 136.8 | 159.6 | 165.9 | 113.8 | 172.3 | 80.7 | 129.1 | 135.1 | 171.0 | 165.3 |
| | Range | 6.8 | 18.4 | 0.5 | 2.9 | 5.0 | 1.5 | 2.2 | 1.8 | 5.5 | 0.8 |

TABLE 71-continued

DSC results for the bottles from Example 46.

| | Sample | First Heat | | | Cooling | | | Second Heat | | |
|---|---|---|---|---|---|---|---|---|---|---|
| | | Peak Melt (HDPE) (° C.) | Crystal-linity (J/g) | Other Melt (PP) (° C.) | Crystal-lization (HDPE) (° C.) | Crystal-linity (J/g) | Crystal-lization (° C.) | Crystal-lization (PP) (° C.) | Peak Melt (HDPE) (° C.) | Crystal-linity (J/g) | Other Melt (PP) (° C.) |
| Stage 2 Rg | #1 | 136.5 | 154.9 | 165.8 | 114.8 | 143.4 | NA | 129.5 | 134.5 | 159.1 | 166.0 |
| | #2 | 135.2 | 143.5 | 165.6 | 114.5 | 164.3 | 80.5 | 129.3 | 134.2 | 163.8 | 165.6 |
| | #3 | 133.4 | 144.0 | 165.2 | 114.8 | 175.9 | 81.4 | 129.2 | 134.1 | 175.4 | 165.8 |
| | Ave | 135.0 | 147.5 | 165.5 | 114.7 | 161.2 | 81.0 | 129.3 | 134.3 | 166.1 | 165.8 |
| | Range | 3.1 | 11.4 | 0.6 | 0.3 | 32.5 | 0.9 | 0.3 | 0.4 | 16.3 | 0.4 |
| Stage 3 Rg | #1 | 133.0 | 140.1 | 165.8 | 114.8 | 168.3 | 81.9 | 128.6 | 133.9 | 161.8 | 165.7 |
| | #2 | 133.2 | 146.8 | 165.8 | 114.4 | 161.0 | 81.6 | 129.8 | 134.9 | 159.6 | 165.5 |
| | #3 | NA | NA | NA | NA | NA | NA | NA | NA | NA | NA |
| | Ave | 133.1 | 143.5 | 165.8 | 114.6 | 164.7 | 81.8 | 129.2 | 134.4 | 160.7 | 165.6 |
| | Range | 0.2 | 6.7 | 0.0 | 0.4 | 7.3 | 0.3 | 1.2 | 1.0 | 2.2 | 0.2 |

FTIR was performed using PerkinElmer spectrometer using ATR (attenuated total reflectance) method. FTIR results are shown in FIGS. 41-43. Samples were compressed on a diamond crystal to ensure proper contact. The Scanning Program Resolution was 16 scans at 2 μm with a range of 4,000 to 650 cm$^{-1}$. The resulting spectra were analyzed Spectrum software from PerkinElmer. All samples tested matched with 99.9% correlation for HDPE. Qualitative differences were observed at 1742 cm$^{-1}$, 1641 cm$^{-1}$, and 1593 cm$^{-1}$, which are usually indicative of the presence of anti-stat and slip agents, indicating that the concentration of these additives is increasing in each stage.

The melt flow was determined for each regrind stage and results are as follows: Stage 0=0.32 g/10 min, Stage 1=0.42 g/10 min, Stage 2=0.43 g/10 min, Stage 3=0.42 g/10 min. The increase from Stage 0 to Stage 1 was 30% and there were no increases after Stage 1, indicating that degradation was not occurring.

Top load testing was performed per standard procedures and no trends were apparent. Based on the results of top load testing, there is no correlation between top load performance and regrind stage used.

EXAMPLE 49

Formulations and Test Results for Bottles with Different Parison Profiles

Outer-layer formulation 44 comprised about 75% Marlex® HHM 5502BN HDPE (available from Chevron Phillips Chemical Company), about 12.5% Braskem Polypropylene Inspire 6025N (available from Braskem), about 5% Ampacet 112761 White Polyethylene Masterbatch (available from Ampacet Corporation) as a coloring agent, and about 7.5% Hyperform® HPR-803i (available from Milliken Chemical). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin, blended with about 0.1% HYDROCEROL® CF 40E as a chemical blowing agent and nucleating agent, and about 0.3% Heritage Plastics HT6000 LLDPE talc as another nucleating agent. $N_2$ was used as a blowing agent and was injected into the rest of the molten core-layer formulation 48 at a level between that led to 0.22% $N_2$ saturation.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 11% of the thickness of the entire tube, the outer layer provided about 14% of the thickness of the entire tube, and the core layer provided about 75% of the thickness of the entire tube.

Two tube profiles, C1 and C2, were formed using parison profiles shown in FIGS. 25 and 26, respectively. Various parison thicknesses were created according to methods known in the art. The die was raised and lowered while the pin stayed stationary. Additional material was added to the bottom base and the neck of the bottle compared to other parts of the bottle.

A mold was closed around the tube and a blow needle was inserted into a space formed in the tube. During inserting the needle, the mold was moved away from the die head. Vacuum was applied to the mold and caused the pressure to decrease to $P_{VAC}$, which was about 27 inches Hg. Pressurized air was pumped into a space formed in the tube to cause the tube to expand and take on the shape of the mold. The pressurized air in this example was delivered at about 2.5 bar and at about 2° C. In the next step, the mold was opened to reveal a container, also referred to as a bottle. Cycle time is an amount of time between closing the mold around the tube and opening the mold to reveal a container. The cycle time in this example was about 10 seconds.

Thickness was measured at several locations on six bottles of each of parison profiles C1 and C2. Measurements for C1 are shown in Table 71 and measurements for C2 are shown in Table 73. Minimum wall bottom thickness was measured at the center of the bottom panel using the min function on a Magna-Mike and is shown in Tables 72-73 as Min Wall Bottom. The minimum wall bottom heel thickness was measured at the transition corner where the bottom turns into the side and measure at the crown side and is shown in Tables 72-73 as Min Wall Bottom Heel. The sidewalls were measured for thickness at three different heights along the bottles. As shown in tables 72-73, measurements labeled Bottom Sidewall were measured at 5 mm from the base, measurements labeled Mid Sidewall were measured 90.25 mm from the base, and measurements labeled Upper Sidewall were measured at 158 mm from the base. Four measurements were taken in four different spots at 90 degrees from each around the perimeter of the bottle sidewall for each height, as indicated by columns labeled A, B, C, and D as shown in Tables 72-73. A was measured at the crown side, B was measured 90 degrees clockwise from A, C was measured 90 degrees clockwise from B, and D was measured 90 degrees clockwise from C.

For each profile, the weights of six bottles were measured and are shown in Tables 72-73 as Bottle Weight. The target bottle weight was 17 g. Also, for each profile, density was measured for six bottles according to the procedure of Example 2 and is shown in Tables 72-73 as Bottle Density. The target bottle density was 0.6 g/cm$^3$. For each profile, the top load capacities of six bottles were measured according to the procedure of Example 7, and are labeled in Tables 72-73 as Top Load Capacity.

A square of the sample to be subjected to the parison cell counting method is cut out from the center of the parison. The excised square of the parison is then divided by cutting across the diagonal exposing the underlying cell structure. The cells are then visualized and counted using microscopy.

EXAMPLE 51

Formulations and Test Results for Containers with Varying LDPE

Outer-layer formulation 44 comprised about 95% Dow DMDA 6400 NT7 and about 5% Ampacet 11078 as a white colorant. Inner-layer formulation 40 comprised about 100% Marlex® HHM 5502BN HDPE (available from Chevron Phillips Chemical Company). In some examples, outer-layer formulation 44 includes 2.5%

TABLE 72

Profile setting, minimum wall bottom thickness, minimum wall bottom heel thickness, and sidewall thicknesses of bottles of Example 49.

| Trial [#] | Profile | Min Wall Bottom [in] | Min Wall Bottom Heel [in] | Bottom Sidewall [in] | | | | Mid Sidewall [in] | | | | Top Sidewall [in] | | | |
|---|---|---|---|---|---|---|---|---|---|---|---|---|---|---|---|
| | | | | a | b | c | d | a | b | c | d | a | b | c | d |
| 18.C1a | C1 | 0.020 | 0.012 | 0.030 | 0.033 | 0.025 | 0.031 | 0.031 | 0.034 | 0.026 | 0.028 | 0.030 | 0.037 | 0.030 | 0.028 |
| 18.C1b | C1 | 0.018 | 0.015 | 0.024 | 0.037 | 0.024 | 0.032 | 0.030 | 0.033 | 0.024 | 0.030 | 0.029 | 0.032 | 0.035 | 0.029 |
| 18.C1c | C1 | 0.018 | 0.014 | 0.028 | 0.034 | 0.031 | 0.036 | 0.033 | 0.036 | 0.022 | 0.032 | 0.031 | 0.033 | 0.039 | 0.029 |
| 18.C1d | C1 | 0.020 | 0.014 | 0.029 | 0.031 | 0.031 | 0.036 | 0.033 | 0.035 | 0.025 | 0.029 | 0.031 | 0.032 | 0.036 | 0.029 |
| 18.C1e | C1 | 0.019 | 0.014 | 0.025 | 0.037 | 0.030 | 0.029 | 0.022 | 0.034 | 0.033 | 0.032 | 0.031 | 0.033 | 0.038 | 0.028 |
| 18.C1f | C1 | 0.017 | 0.015 | 0.032 | 0.036 | 0.030 | 0.036 | 0.031 | 0.030 | 0.026 | 0.037 | 0.034 | 0.033 | 0.031 | 0.031 |
| 18.C2a | C2 | 0.020 | 0.017 | 0.024 | 0.038 | 0.029 | 0.032 | 0.022 | 0.033 | 0.032 | 0.029 | 0.031 | 0.032 | 0.034 | 0.029 |
| 18.C2b | C2 | 0.023 | 0.017 | 0.028 | 0.038 | 0.027 | 0.032 | 0.023 | 0.034 | 0.033 | 0.032 | 0.031 | 0.035 | 0.028 | 0.036 |
| 18.C2c | C2 | 0.023 | 0.014 | 0.026 | 0.034 | 0.030 | 0.037 | 0.024 | 0.034 | 0.030 | 0.035 | 0.031 | 0.031 | 0.029 | 0.036 |
| 18.C2d | C2 | 0.021 | 0.017 | 0.035 | 0.037 | 0.035 | 0.029 | 0.034 | 0.024 | 0.034 | 0.032 | 0.032 | 0.030 | 0.028 | 0.036 |
| 18.C2e | C2 | 0.022 | 0.016 | 0.025 | 0.034 | 0.030 | 0.037 | 0.027 | 0.031 | 0.035 | 0.025 | 0.034 | 0.031 | 0.033 | 0.031 |
| 18.C2f | C2 | 0.022 | 0.014 | 0.028 | 0.034 | 0.034 | 0.032 | 0.033 | 0.023 | 0.029 | 0.031 | 0.031 | 0.030 | 0.030 | 0.034 |

TABLE 73

Bottle weight, bottle density, and top load capacity of bottles of Example 49.

| Trial [#] | Profile | Bottle Weight [g] | Bottle Density [g] | Top Load Capacity [N] |
|---|---|---|---|---|
| 18.C1a | C1 | 17.30 | 0.72 | 277.1 |
| 18.C1b | C1 | 17.00 | 0.75 | 277.4 |
| 18.C1c | C1 | 17.27 | 0.74 | 277.9 |
| 18.C1d | C1 | 17.08 | 0.73 | 277.1 |
| 18.C1e | C1 | 17.23 | 0.73 | 277.5 |
| 18.C1f | C1 | 16.99 | 0.71 | 277.1 |
| 18.C2a | C2 | 17.30 | 0.72 | 277.1 |
| 18.C2b | C2 | 17.00 | 0.75 | 277.4 |
| 18.C2c | C2 | 17.27 | 0.74 | 277.9 |
| 18.C2d | C2 | 17.08 | 0.73 | 277.1 |
| 18.C2e | C2 | 17.23 | 0.73 | 277.5 |
| 18.C2f | C2 | 16.99 | 0.71 | 277.1 |

EXAMPLE 50

Parison Cell Counting Method

General Procedure

Parison cell counting is a measurement of the quality of the foam of the extruded material. The extruded material, for example a parison, is cut in cross sections and viewed with microscopy. The number of cells are counted in a given unit volume, for example cubic inches.

Core-layer formulation 48 comprised a percentage of DOW DMDA 6400 NT7 as shown in Table 74, a percentage of DOW™ LDPE 692 LDPE HEALTH+™ as shown in Table 74 to form a core masterbatch that was about 98.9% of the overall formulation, about 0.1% HYDROCEROL® CF 40E as a chemical blowing agent and nucleating agent, and about 1% Heritage Plastics HT4HP talc as another nucleating agent. The $N_2$ was introduced at about 0.032 kg/h. The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. The core layer extruder was operated at 13 RPM. Inner and outer layers were extruded through the die head, locating the expanded formulation therebetween, to form a multi-layer tube. The inner layer extruder was operated at 20 rpm and the outer layer extruded was operated at 34 rpm such that the inner layer provided about 15% of the thickness of the entire tube, the outer layer provided about 15% of the thickness of the entire tube, and the core layer provided about 70% of the thickness of the entire tube. The multi-layer tube was blow molded to form a container, as shown for example in FIGS. 27-30, to provide a multi-layer bottle wherein the inner layer is about 30%, the outer layer is about 30% and the core layer is about 40% of the total bottle thickness. The Top Load performance was measured according to the Top Load Method described in Example 7, and the results are shown in Table 75. The parison was analyzed using the Cell Count of Parison Method described in Example 50, and the results are shown in Table 74. Table 74 shows the parison densities, the cell count of the parison in the diagonal, the bottle density and the top load measurement. Bottle density is shown in Table 76.

TABLE 74

Performance measurements of parisons comprising LDPE in the core layer formulation.

| Percentage LDPE | Parison Density (g/cm$^3$) | Cell count of parison in diagonal (per in$^3$) |
|---|---|---|
| 0 | 0.526 | 1,081,339 |
| 10 | 0.531 | 1,712,299 |
| 20 | 0.522 | 1,761,616 |
| 30 | 0.517 | 2,033,991 |
| 40 | 0.517 | 2,542,148 |
| 50 | 0.514 | 2,942,949 |
| 60 | 0.514 | 2,842,743 |
| 70 | 0.507 | 3,276,861 |
| 80 | 0.506 | 3,121,752 |
| 90 | 0.512 | 3,174,007 |
| 100 | 0.491 | 2,877,073 |

TABLE 75

Performance measurements of bottles comprising LDPE in the core layer formulation.

| Percentage LDPE | Bottle Top Load Capacity [lbs-F] | | | | | | | | | | Average Bottle Top Load Capacity [lbs-F] |
|---|---|---|---|---|---|---|---|---|---|---|---|
| 0 | 93.6 | 91.3 | 91.6 | 91.5 | 90.7 | 93.4 | 93.0 | 89.9 | 89.1 | 90.2 | 91.4 |
| 10 | 93.8 | 96.5 | 93.9 | 91.6 | 92.7 | 93.0 | 92.4 | 89.1 | 88.9 | 90.3 | 92.2 |
| 20 | 95.8 | 94.9 | 93.6 | 95.1 | 94.4 | 94.3 | 93.6 | 94.9 | 92.4 | 91.3 | 94.0 |
| 30 | 92.8 | 90.5 | 86.8 | 84.1 | 81.4 | 85.2 | 89.0 | 88.7 | 91.4 | 89.3 | 87.9 |
| 40 | 91.9 | 90.4 | 84.2 | 90.4 | 87.8 | 83.3 | 83.2 | 92.4 | 91.4 | 88.7 | 88.4 |
| 50 | 84.5 | 85.8 | 80.1 | 83.2 | 79.3 | 82.9 | 94.6 | 96.7 | 93.8 | 91.8 | 87.3 |
| 60 | 86.2 | 81.2 | 89.9 | 87.3 | 89.0 | 85.6 | 85.4 | 88.6 | 87.2 | 87.4 | 86.8 |
| 70 | 80.7 | 89.9 | 90.6 | 89.3 | 88.6 | 88.0 | 91.8 | 84.7 | 85.4 | NA | 87.7 |
| 80 | 83.7 | 84.3 | 79.4 | 79.6 | 79.7 | 82.1 | 81.1 | 84.2 | 87.2 | 85.3 | 82.7 |
| 90 | 80.9 | 80.9 | 80.9 | 78.5 | 82.5 | 77.5 | 82.2 | 82.0 | 82.4 | 81.7 | 81.0 |
| 100 | 90.6 | 84.8 | 83.1 | 92.9 | 89.1 | 86.3 | 89.6 | 95.1 | 92.2 | 89.7 | 89.3 |

TABLE 76

Bottle Density of bottles comprising LDPE in the core-layer formulation.

| Percentage LDPE | Bottle Density (g/cm$^3$) |
|---|---|
| 0 | 0.710 |
| 10 | 0.723 |
| 20 | 0.714 |
| 30 | 0.711 |
| 40 | 0.720 |
| 50 | 0.711 |
| 60 | 0.714 |
| 70 | 0.705 |
| 80 | 0.708 |
| 90 | 0.682 |
| 100 | 0.657 |

EXAMPLE 52

Formulations and Test Results for Tubes with Varying LDPE

Outer-layer formulation 44 comprised about 92.5% Dow DMDA 6400 NT7, 2.5% Vistamaxx™ available from the ExxonMobil™ Corporation, and about 5% Ampacet 11078 as a white colorant or about 95% Dow DMDA 6400 NT7 and 5% Ampacet 11078. Inner-layer formulation 40 comprised about 97.5% Marlex® HHM 5502BN HDPE (available from Chevron Phillips Chemical Company) and 2.5% Vistamaxx™ available from the ExxonMobil™ Corporation, or 100% Marlex HHM 5502BN HDPE.

Core-layer formulation 48 comprised about 98.9% DOW DMDA 6400 NT7, about 0.1% HYDROCEROL® CF 40E as a chemical blowing agent and nucleating agent, and about 1% Heritage Plastics HT4HP talc as another nucleating agent, or core-layer formulation comprised about 94.9%% DOW DMDA 6400 NT7, about 0.1% HYDROCEROL® CF 40E as a chemical blowing agent and nucleating agent, and about 1% Heritage Plastics HT4HP talc as another nucleating agent. The $N_2$ was introduced at about 0.032 kg/h. The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. The core layer extruder was operated at 13 RPM. Inner and outer layers were extruded through the die head, locating the expanded formulation therebetween, to form a multi-layer tube. The inner layer extruder was operated at 20 rpm and the outer layer extruded was operated at 34 rpm such that the inner layer provided about 15% of the thickness of the entire tube, the outer layer provided about 15% of the thickness of the entire tube, and the core layer provided about 70% of the thickness of the entire tube. The multi-layer tube was blow molded to form a container, as shown for example in FIGS. 27-30, to provide a multi-layer bottle wherein the inner layer is about 30%, the outer layer is about 30% and the core layer is about 40% of the total bottle thickness. The Top Load performance was measured according to the Top Load Method described in Example 7, and the results are shown in Table 75. The parison was analyzed using the Cell Count of Parison Method described in Example 50, and the results are shown in Table 77. Table 77 shows the parison densities, the cell count of the parison in the diagonal, the bottle density and the top load measurement.

TABLE 77

Top load and density parameters for bottles containing Vistamaxx ™ as an impact modifier.

| Vistamaxx ™ Location | Individual Bottle Top Load Capacity [lbs-F] | | | | | | Average Top Load Capacity [lbs-F] | Parison Density (g/cm$^3$) | Cell count of parison in diagonal (per in$^3$) | Bottle Density (g/cm$^3$) |
|---|---|---|---|---|---|---|---|---|---|---|
| Core | 92.9 | 90.1 | 88.5 | 89.5 | 92.9 | 85.2 | 89.9 | 0.527 | 1.26E+06 | 0.728 |
| Skin | 80.9 | 81.9 | 80.3 | 80.0 | 78.0 | 78.8 | 80.0 | 0.541 | 1.29E+06 | NA |

The invention claimed is:

1. A method of producing a multi-layer vessel, the method comprising
extruding a core parison, an inner parison, and an outer parison,
aligning the inner parison, the core parison, and the outer parison to cause the core parison to be located between the inner parison and the outer parison to cause the core parison to surround the inner parison and to be surrounded by the outer parison to form a multi-layer tube having an inner layer, an outer layer, and a core layer located between the inner layer and the outer layer,
placing the multi-layer tube in a mold cavity formed in a mold, and
expanding the multi-layer tube to cause the outer layer to engage an inner surface of the mold and cause the multi-layer tube to deform to create a multi-layer vessel having an interior region, an inner layer facing the interior region, an outer layer forming an exterior surface of the multi-layer vessel, and a core layer located between the inner layer and the outer layer,
wherein the core of the multi-layer tube is up to 85% of a total thickness of the multi-layer tube and the core layer of the multi-layer vessel is up to 80% of a total thickness of the multi-layer vessel, and
wherein the thickness of the core layer of the multi-layer tube is greater than the thickness of the core layer of the multi-layer vessel.

2. The method of claim 1, further comprising the step of applying a vacuum in a range of about 5 inches Hg to about 30 inches Hg to the mold cavity during the expanding step whereby the outer parison engages with the inner surface of the mold.

3. The method of claim 2, wherein the expanding step includes inserting a blow needle into the interior region of the multi-layer tube and pumping pressurized gas into the interior region at a pressure in a range of about 1 bar to about 4 bar.

4. The method of claim 3, wherein the pressurized gas has a temperature in a range of about 35° F. to about 75° F.

5. The method of claim 4, wherein the vacuum is a two-stage vacuum.

6. The method of claim 3, wherein at least a portion of the mold is formed of a porous metal.

7. The method of claim 3, wherein the core layer of the multi-layer vessel comprises an insulative cellular non-aromatic polymeric material comprising a high density polyethylene (HDPE) base resin, a chemical blowing agent, and a nucleating agent.

8. The method of claim 7, wherein the insulative cellular non-aromatic polymeric material further comprises a low density polyethylene (LDPE) base resin up to about 50% by weight of the core layer.

9. The method of claim 8, wherein at least a portion of the mold is formed of a porous metal.

10. The method of claim 8, wherein the inner layer of the multi-layer vessel is up to about 30% of a total thickness of the multi-layer vessel.

11. The method of claim 8, wherein the inner layer a of the multi-layer vessel and the outer layer of the multi-layer vessel each comprise HDPE.

12. The method of claim 8, wherein the multi-layer vessel has a blow-up ratio up to about 4.

13. The method of claim 7, wherein the core layer of the multi-layer tube has a density in a range of about 0.25 g/cm$^3$ to about 0.4 g/cm$^3$.

14. The method of claim 13, wherein the density of the core layer of the multi-layer tube is about 0.35 g/cm$^3$.

15. The method of claim 13, wherein the multi-layer vessel has a density less than about 0.7 g/cm$^3$.

16. The method of claim 13, wherein the multi-layer vessel has a top load performance in a range between about 50 lbs-F to about 100 lbs-F.

17. The method of claim 16, wherein the thickness of a side wall of the multi-layer vessel is in a range of about 10 mils to about 40 mils.

18. A method of producing a multi-layer container, the method comprising
extruding a core parison, an inner parison, and an outer parison,
aligning the inner parison, the core parison, and the outer parison to cause the core parison to be located between the inner parison and the outer parison to cause the core parison to surround the inner parison and to be surrounded by the outer parison to form a multi-layer tube having an inner layer, an outer layer, and a core layer located between the inner layer and the outer layer,
placing the multi-layer tube in a mold cavity formed in a mold,
expanding the multi-layer tube to cause the outer layer to engage an inner surface of the mold and cause the multi-layer tube to deform to create a multi-layer vessel having an interior region, and
trimming excess material from the multi-layer vessel to form a multi-layer container including an inner layer facing the interior region, an outer layer forming an exterior surface of the multi-layer container, and a core layer located between the inner layer and the outer layer,
wherein the core layer of the multi-layer container has a density in a range of about 0.2 g/cm$^3$ to about 0.6 g/cm$^3$.

19. The method of claim 18, wherein the expanding step includes applying a vacuum in a range of about 5 inches Hg to about 30 inches Hg to the mold cavity, inserting a blow needle into the interior region of the multi-layer tube, and pumping pressurized gas through the blow needle into the interior region at a pressure in a range of about 1 bar to about 4 bar.

20. The method of claim 19, wherein the core layer of the multi-layer container comprises an insulative cellular non-aromatic polymeric material comprising a high density polyethylene (HOPE) base resin, a chemical blowing agent, and a nucleating agent, and each of the inner layer of the multi-layer container and the outer layer of the multi-layer container comprise HDPE.

21. The method of claim 20, wherein the insulative cellular non-aromatic polymeric material further comprises a low density polyethylene (LDPE) base resin up to about 30% by weight of the insulative cellular non-aromatic polymeric material.

22. The method of claim 21, wherein the multi-layer tube has a cell count in the diagonal in a range of about $1 \times 10^6$ to about $3 \times 10^6$ cells per cubic inch.

23. The method of claim 18, wherein the density of the core layer of the multi-layer tube is in a range of about 0.25 $g/cm^3$ to about 0.4 $g/cm^3$.

24. The method of claim 23, wherein the multi-layer container has a density less than about 0.7 $g/cm^3$.

25. The method of claim 24, wherein the multi-layer tube has a density less than the density of the multi-layer container.

26. The method of claim 25, wherein the multi-layer vessel has a top load performance in a range of about 50 lbs-F to about 100 lbs-F.

27. A multi-layer container comprising
an inner layer arranged to face an interior region formed in the multi-layer container,
an outer layer spaced-apart from the inner layer to form an outer surface of the multi-layer container, and
a core layer comprising an insulative cellular non-aromatic polymeric material that extends between and interconnects the inner layer and the outer layer,
wherein the multi-layer container has a density between about 0.4 $g/cm^3$ to about 0.8 $g/cm^3$, and
wherein the insulative cellular non-aromatic polymeric material comprises a high density polyethylene (HDPE) base resin, a chemical blowing agent, and a nucleating agent.

28. The multi-layer container of claim 27, wherein the insulative cellular non-aromatic polymeric material further comprises a low density polyethylene (LDPE) base resin up to about 30% by weight of the core layer.

29. The multi-layer container of claim 28, wherein the density of the core layer is in a range of about 0.25 $g/cm^3$ to about 0.4 $g/cm^3$.

30. The multi-layer container of claim 29, wherein the density of the core layer is about 0.35 $g/cm^3$.

31. The multi-layer container of claim 27, wherein a side wall of the multi-layer container has a thickness in a range of about 10 mils to about 40 mils.

32. The multi-layer container of claim 31, wherein the multi-layer container has a top load performance of at least 50 lbs-F.

33. The multi-layer container of claim 32, wherein the top load performance is in a range of about 50 lbs-F to about 100 lbs-F.

* * * * *